Oct. 20, 1970 M. G. PORTER 3,535,499
DATA PROCESSING SYSTEM HAVING IMPROVED DIVIDE ALGORITHM
Filed July 14, 1967 39 Sheets-Sheet 1

DATA PROCESSING SYSTEM

INVENTOR.
MARION G. PORTER
BY
Arnold E. Renner
ATTORNEY

INTERFACE LINES

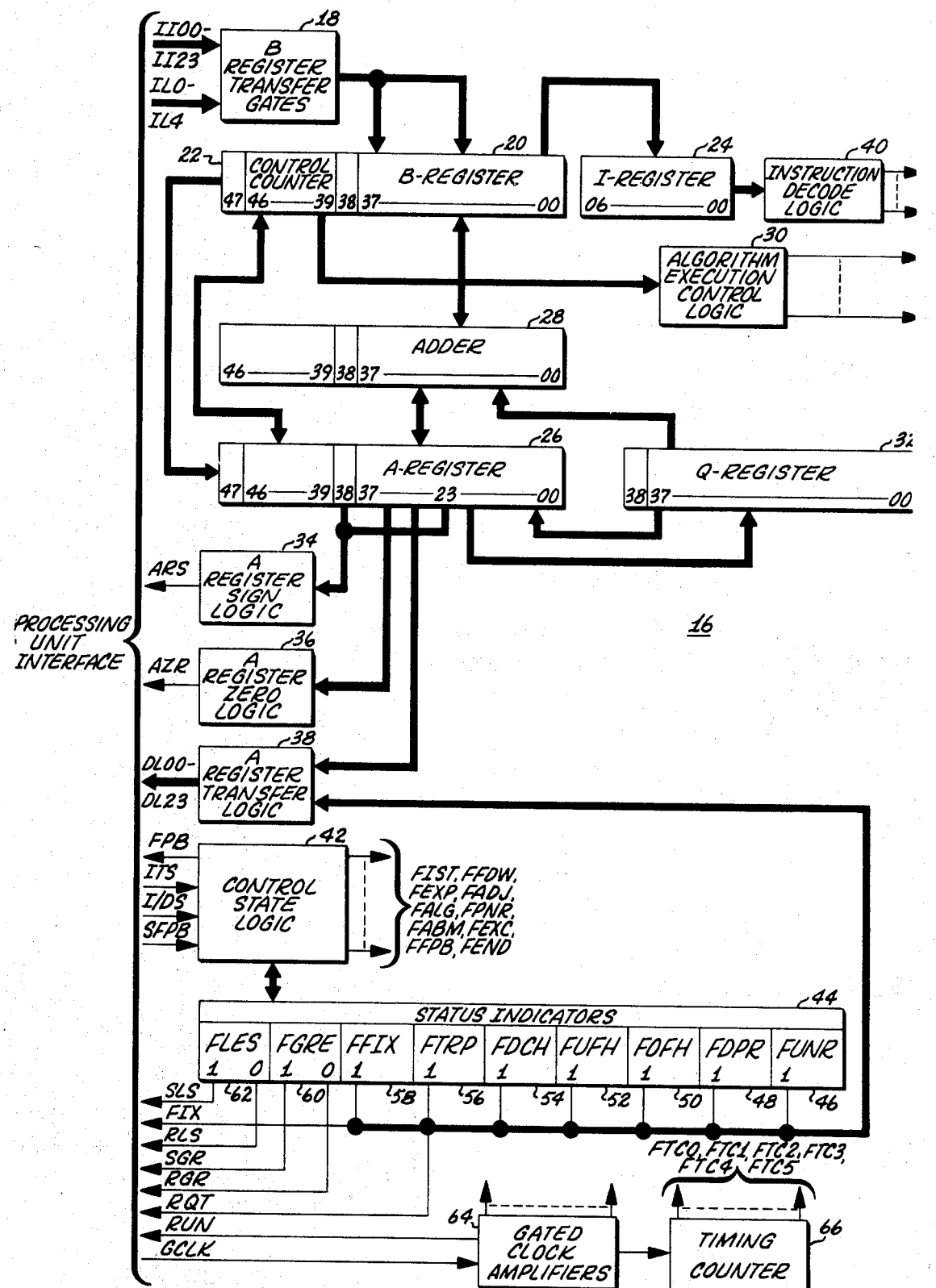

BASIC INSTRUCTION WORD FORMAT

GENERAL INSTRUCTIONS WORD FORMAT

WORD FORMAT OF FIRST WORD OF FLOATING POINT
OPERATION INSTRUCTION

WORD FORMAT OF SECOND WORD OF FLOATING POINT
OPERATION INSTRUCTION

STATUS WORD FORMAT

FIXED DATA POINT FORMAT IN MEMORY

FLOATING POINT DATA FORMAT IN MEMORY WORD 1

FLOATING POINT DATA FORMAT IN MEMORY WORD 2

FLOATING POINT ACCUMULATOR DATA FORMAT

DATA FORMAT OF MANTISSA EXTENSION OF FLOATING POINT ACCUMULATOR

FIXED POINT DATA FORMAT IN FLOATING POINT ACCUMULATOR

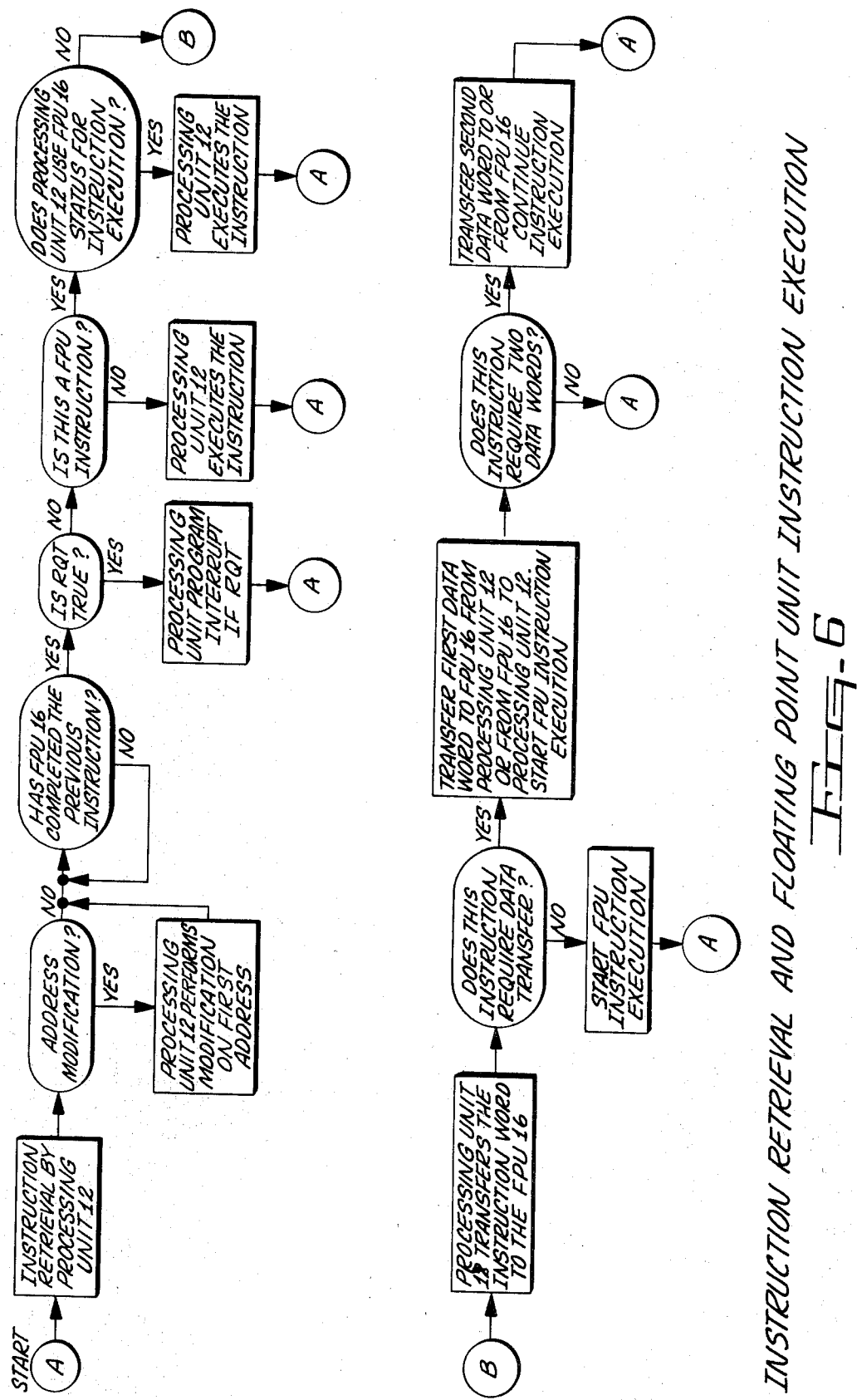

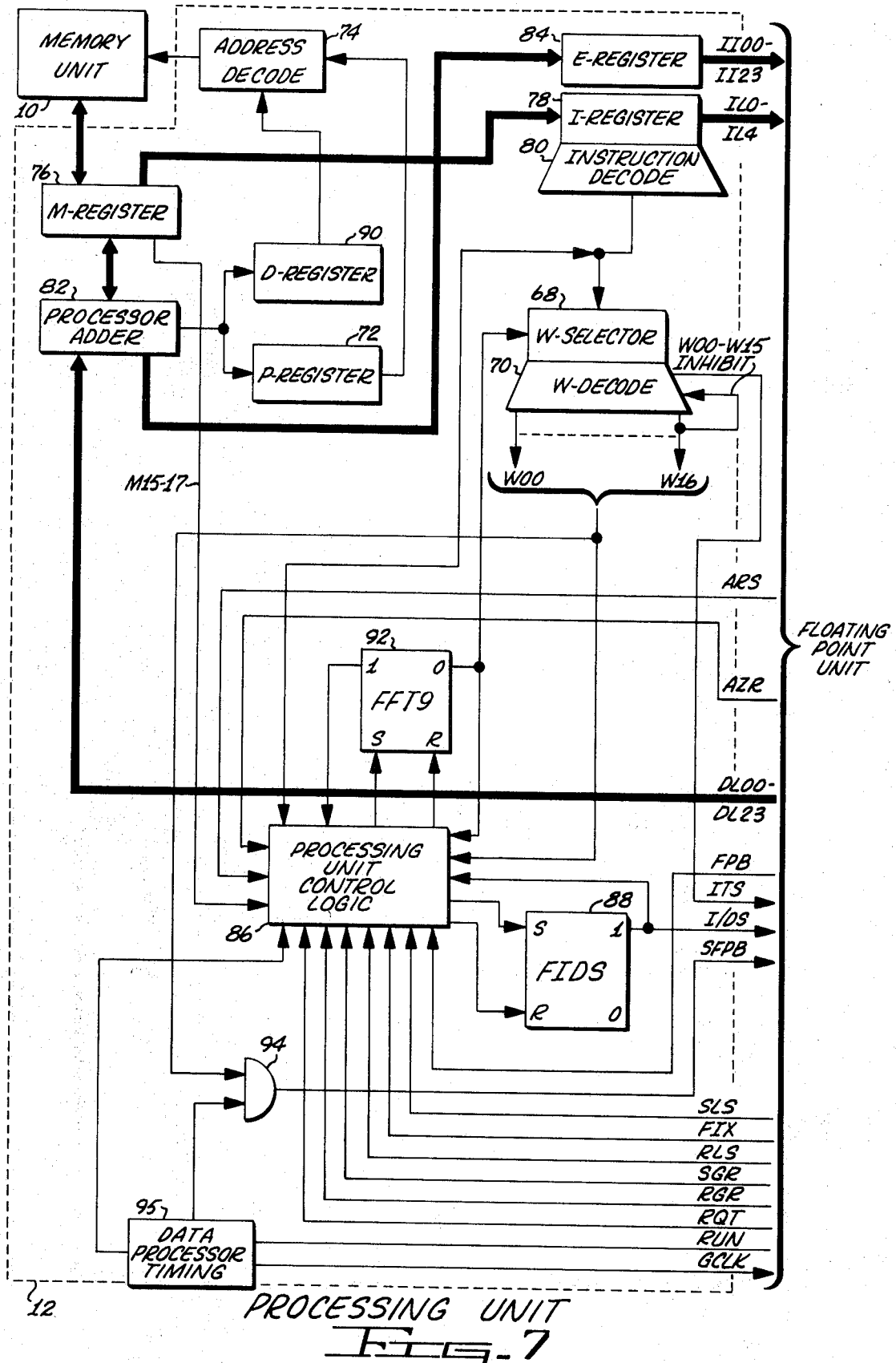

CONTROL STATE LOGIC

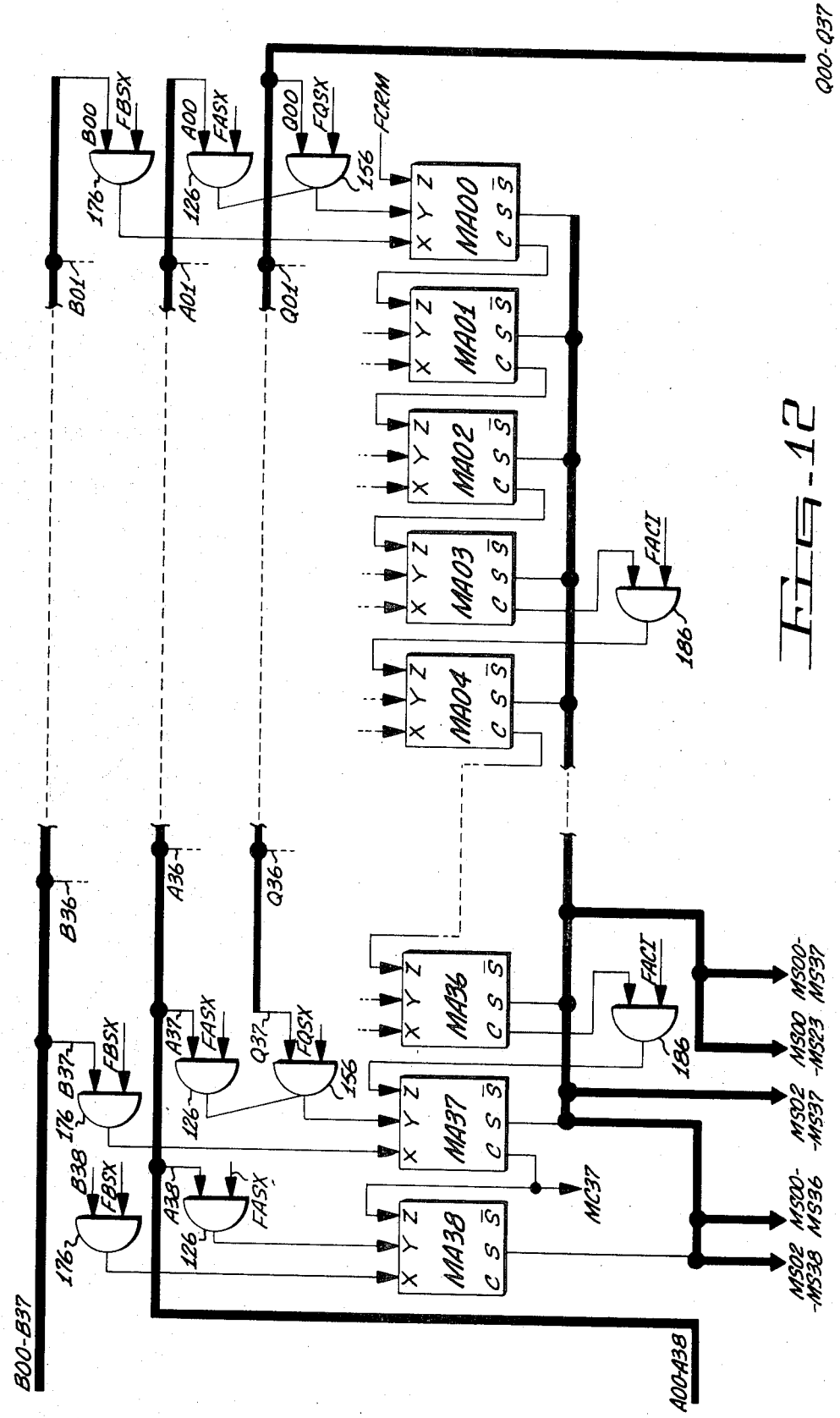

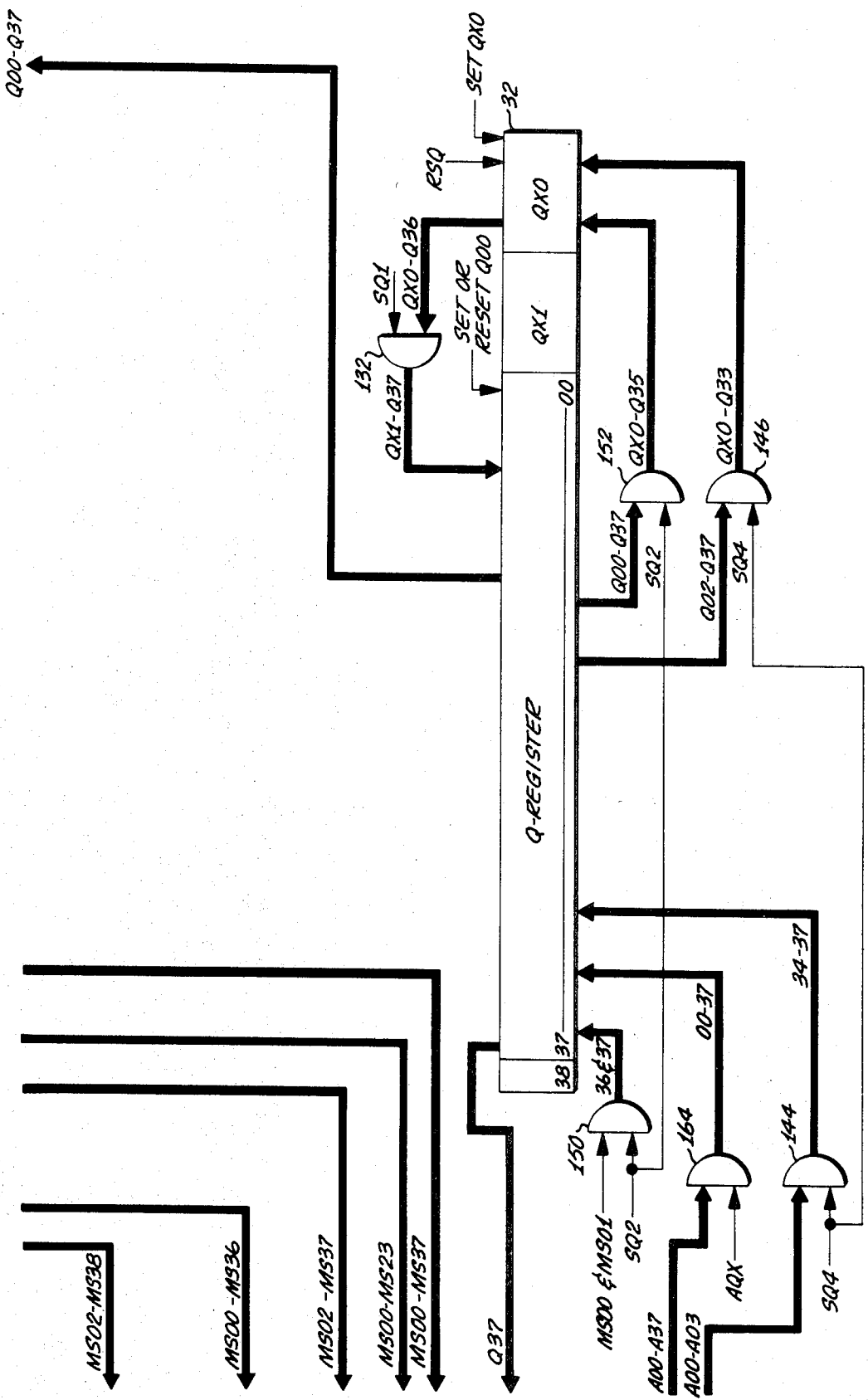

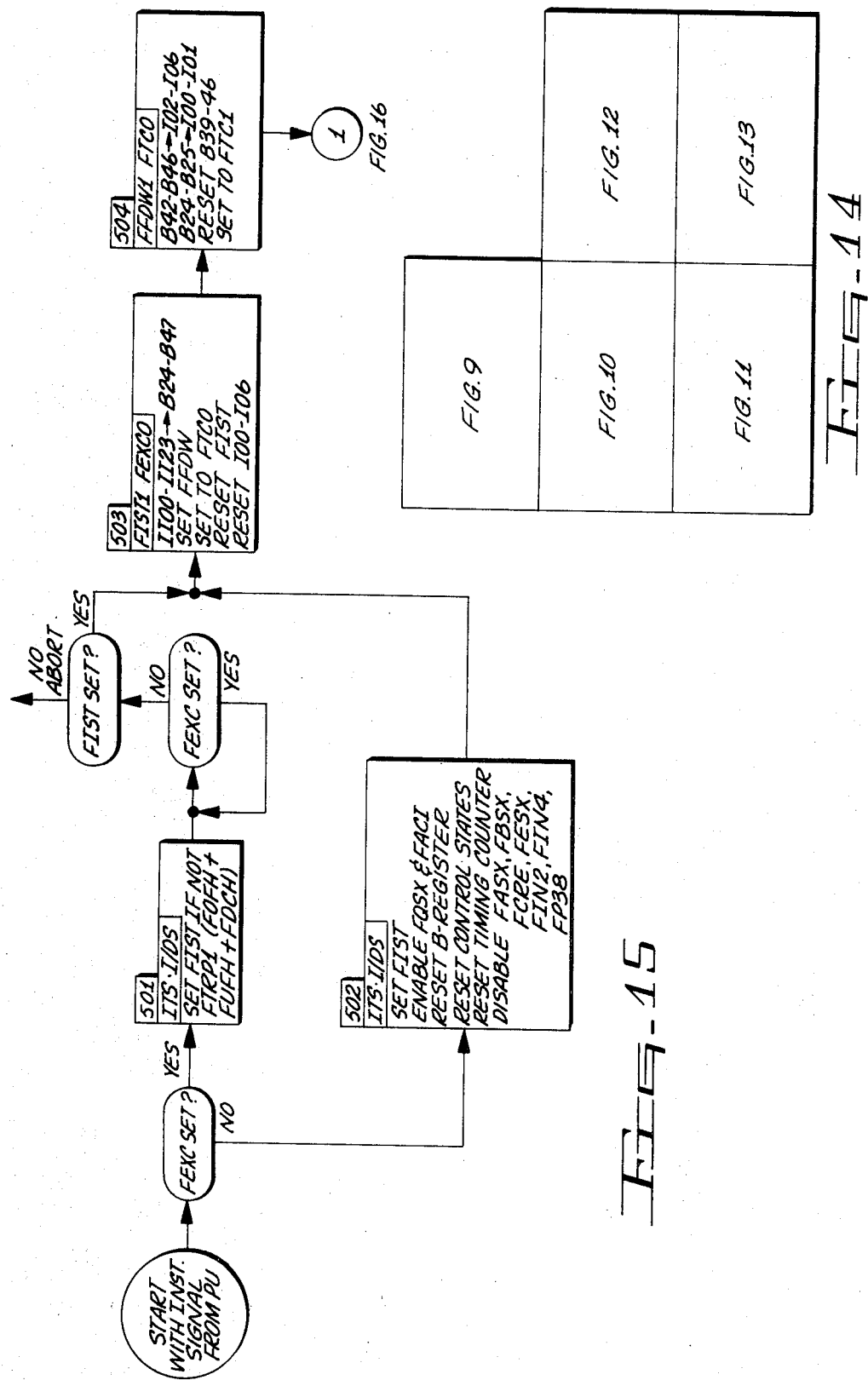

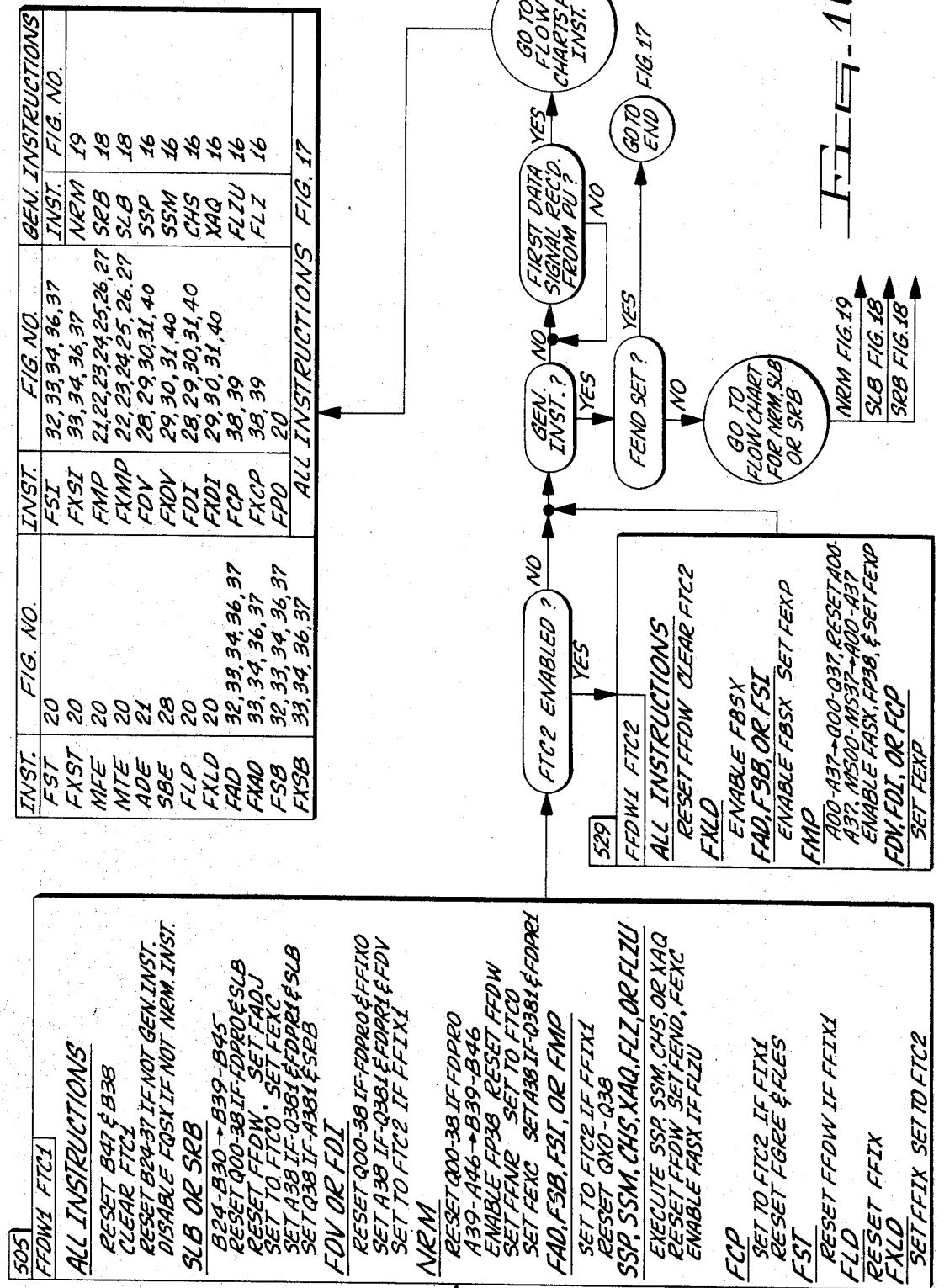

506
FEND1

ALL INSTRUCTIONS
 RESET A38 IF A00-A37=0 ≠ NOT FLD INST.
 RESET A00-A38 IF UFL, DCK, OR FLZ
 RESET Q00-Q38 IF UFL OR DCK
 SET A39-A47 IF UFL OR DCK ≠ FFIX0 OR FLZ INST.
 RESET FIST IF-FTRP1 ≠ (OFL OR DCK OR UFH INST.)
 ENABLE FOFH IF OFL
 SET FDCH IF DCK
 SET FUFH IF UFL ≠ [FUNR1 OR A00-37 ≠ 0 OR
   NOT (FMP OR FDV OR FDI)]
 RESET FEXC, FEND, B00-B47, FTC0-FTC05, FFPB
 DISABLE FASX, FBSX, FCRE, DCK, FESX, FIN2,
   FIN4, OFL, FP38, UFL
 ENABLE FQSX ≠ FACI

FAD, FSB, FSI, FDV, FDI, FMP, OR NRM
 SET A39-A47 IF ZMG, ZMG IF A00-A37=0 ≠ (NRM+FUNR0
   ≠ FFIX0) OR (UFL OR DCK ≠ FFIX0)
 ES391-ES461→A39-A46 IF A47=1 ≠ ZMG
 ES390-ES460→A39-A46 IF A47=0 ≠ ZMG
 A38→Q38 IF UFL ≠ (FAD, FSB, FSI, OR FMP)

FLD, MTE, FXLD, OR FLZU
 B47→A47, ES391-ES461→A39-A46
 B38→A38 IF FLD, FXLD, OR FLZU
 MS00-MS37→A00-A37 IF FLD OR FXLD
 MS00-MS23→A00-A23 IF FLZU

FPO
 EXECUTE INSTRUCTION IF OR STATUS,
   AND STATUS, OR SET STATUS.

FCP
 RESET FLES IF FTCO ≠ A38=0 ≠ B00-37=0
 RESET FGRE IF FTCO ≠ B38=0 ≠ A00-37=0
 SET FLES IF FTCO ≠ B38=0 ≠ B00-B37≠0 ≠ A00-A37=0
 SET FGRE IF FTCO ≠ A38=0 ≠ A00-A37≠0 ≠ B00-A37=0

(END) →

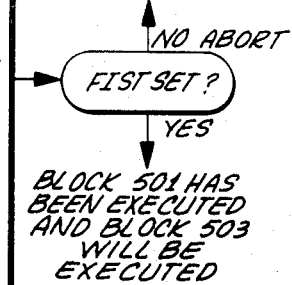

NO ABORT ↑
FIST SET?
YES ↓

BLOCK 501 HAS
BEEN EXECUTED
AND BLOCK 503
WILL BE
EXECUTED

Fig-17

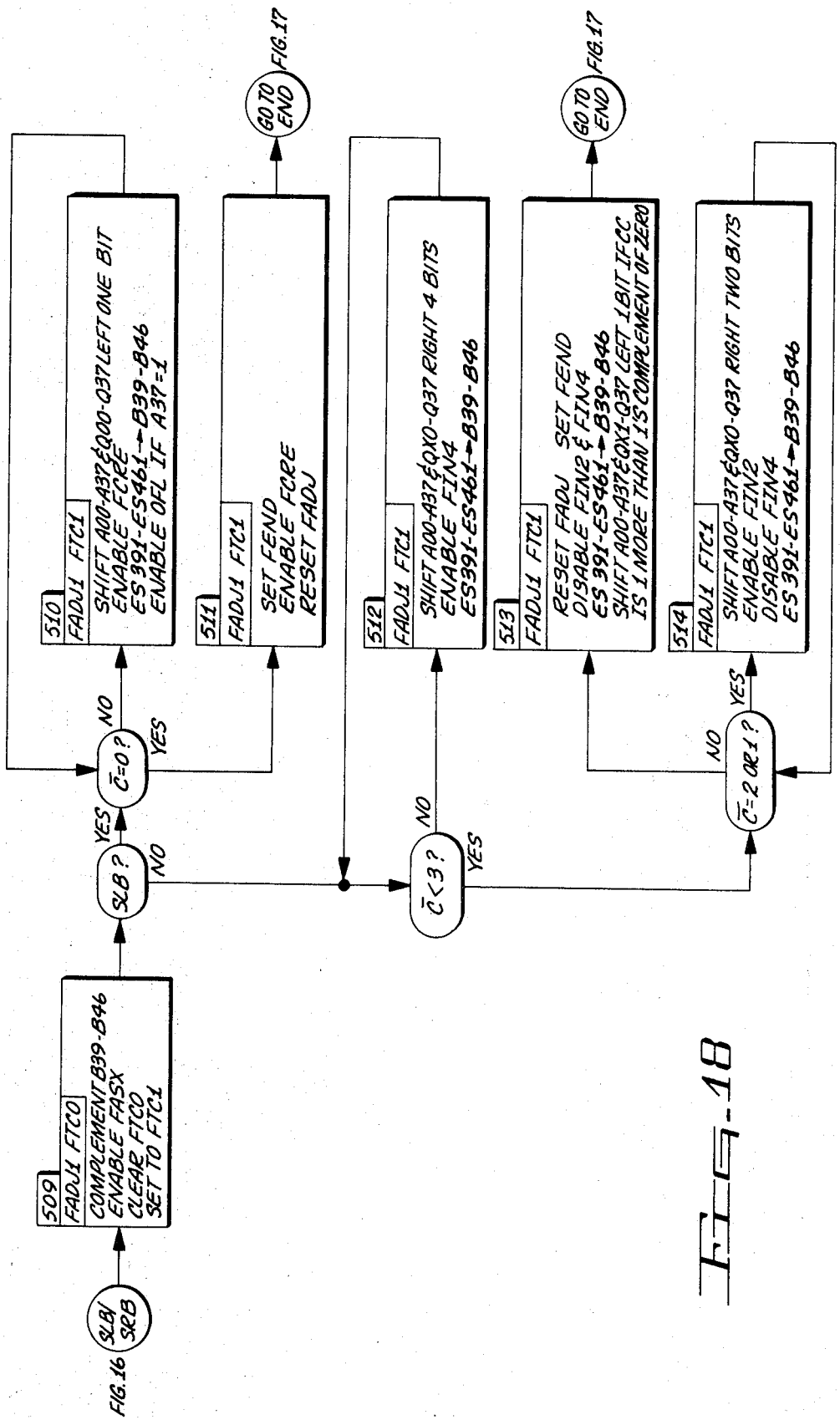
FIG_18

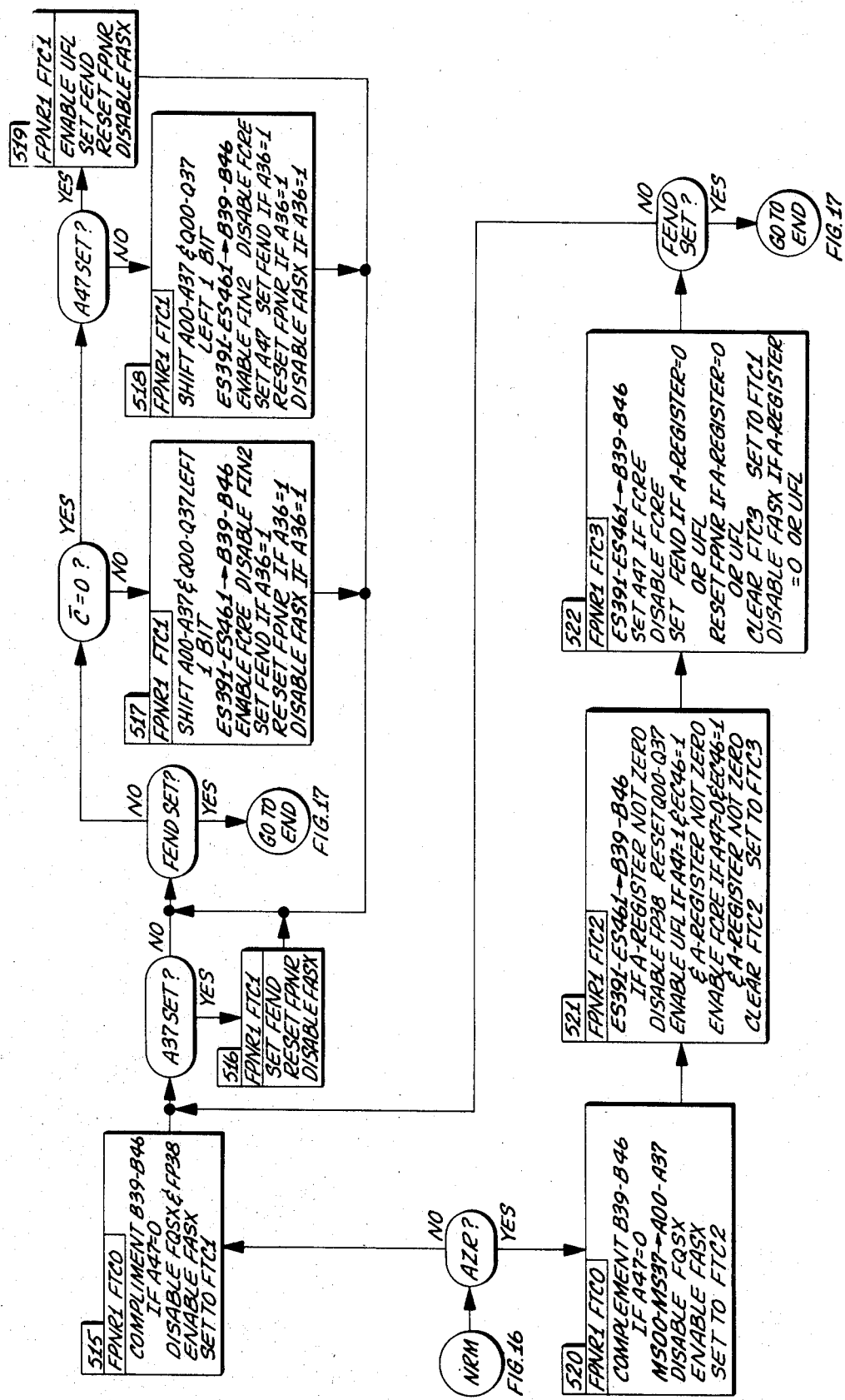

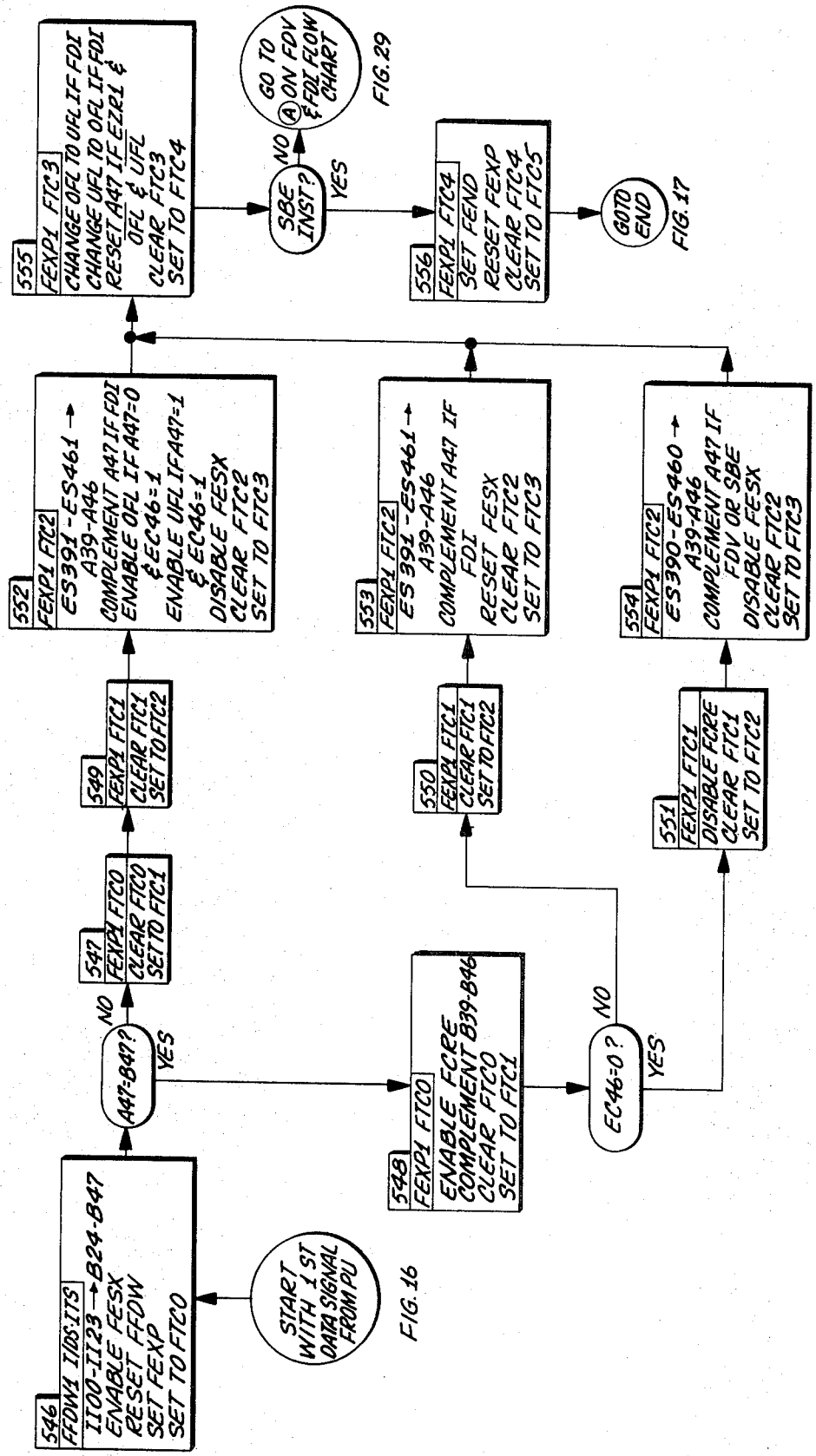

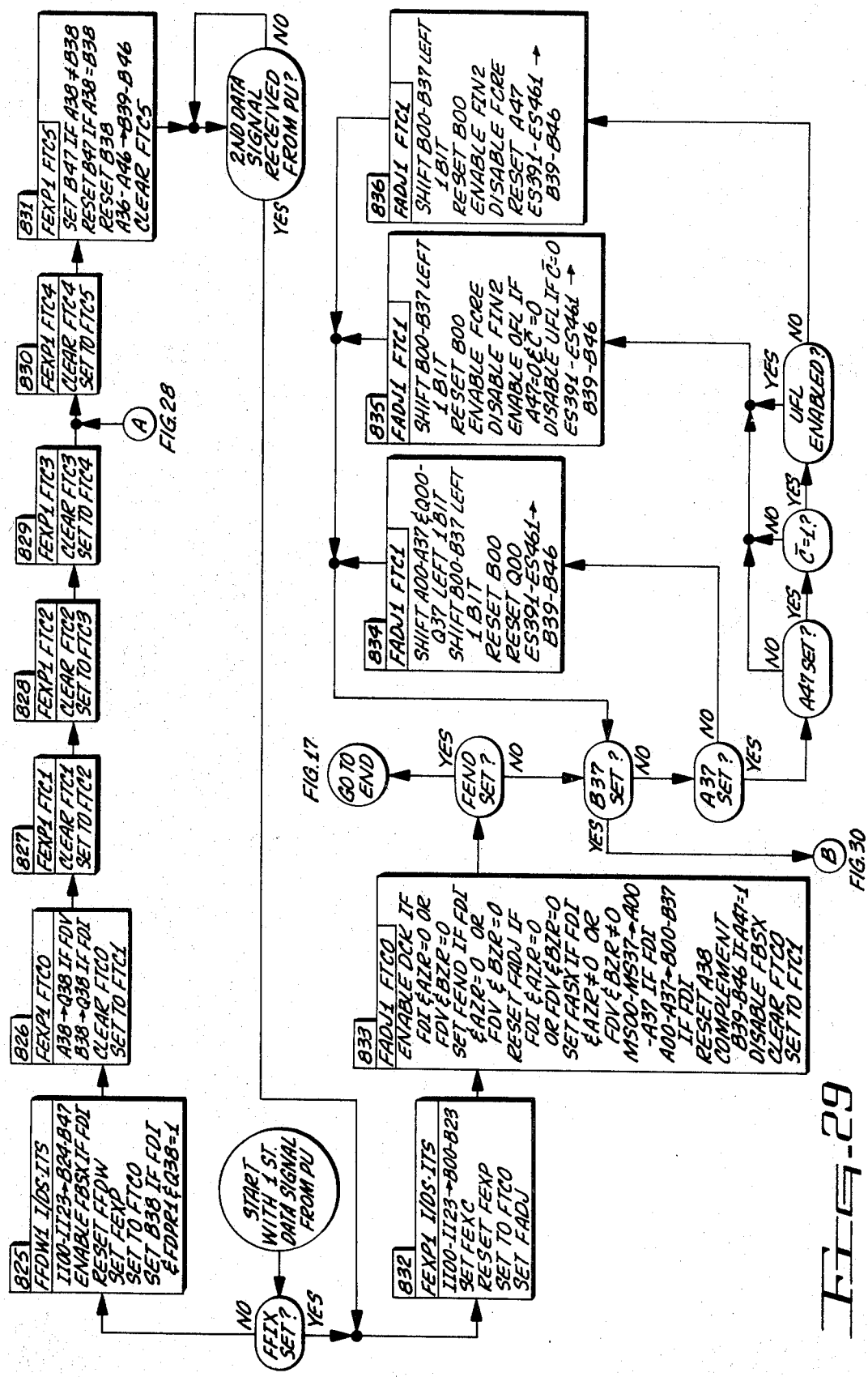

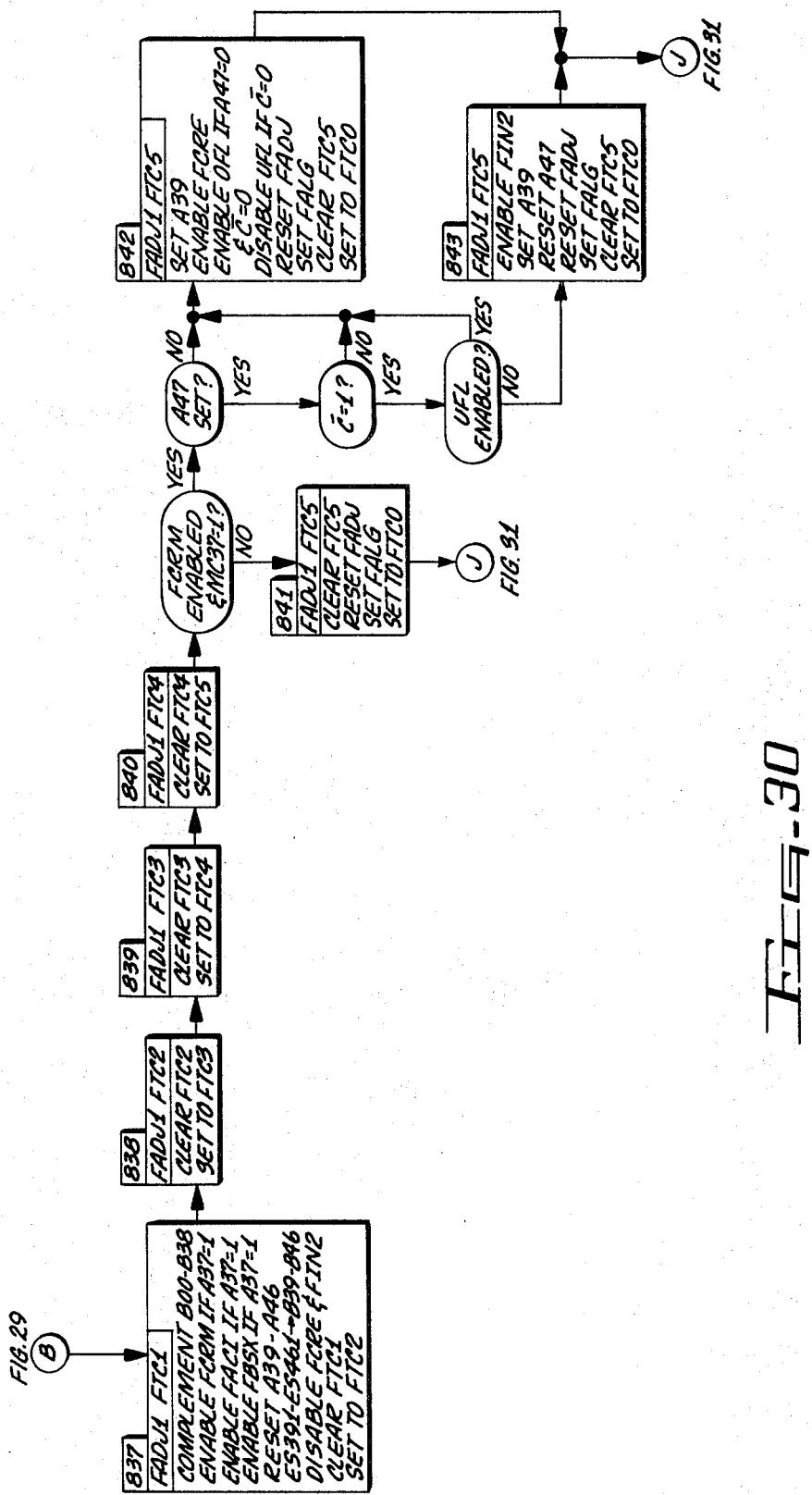

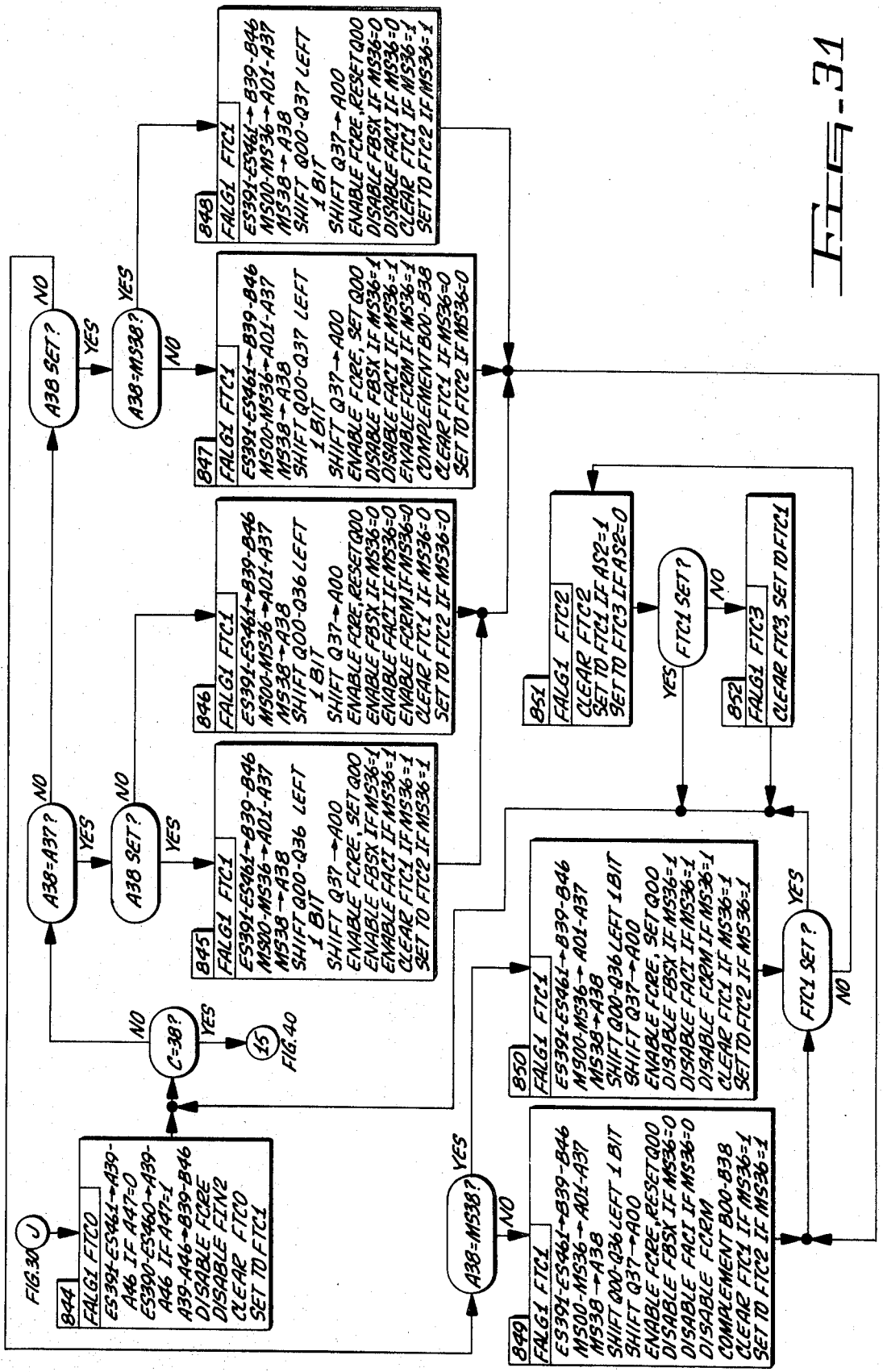

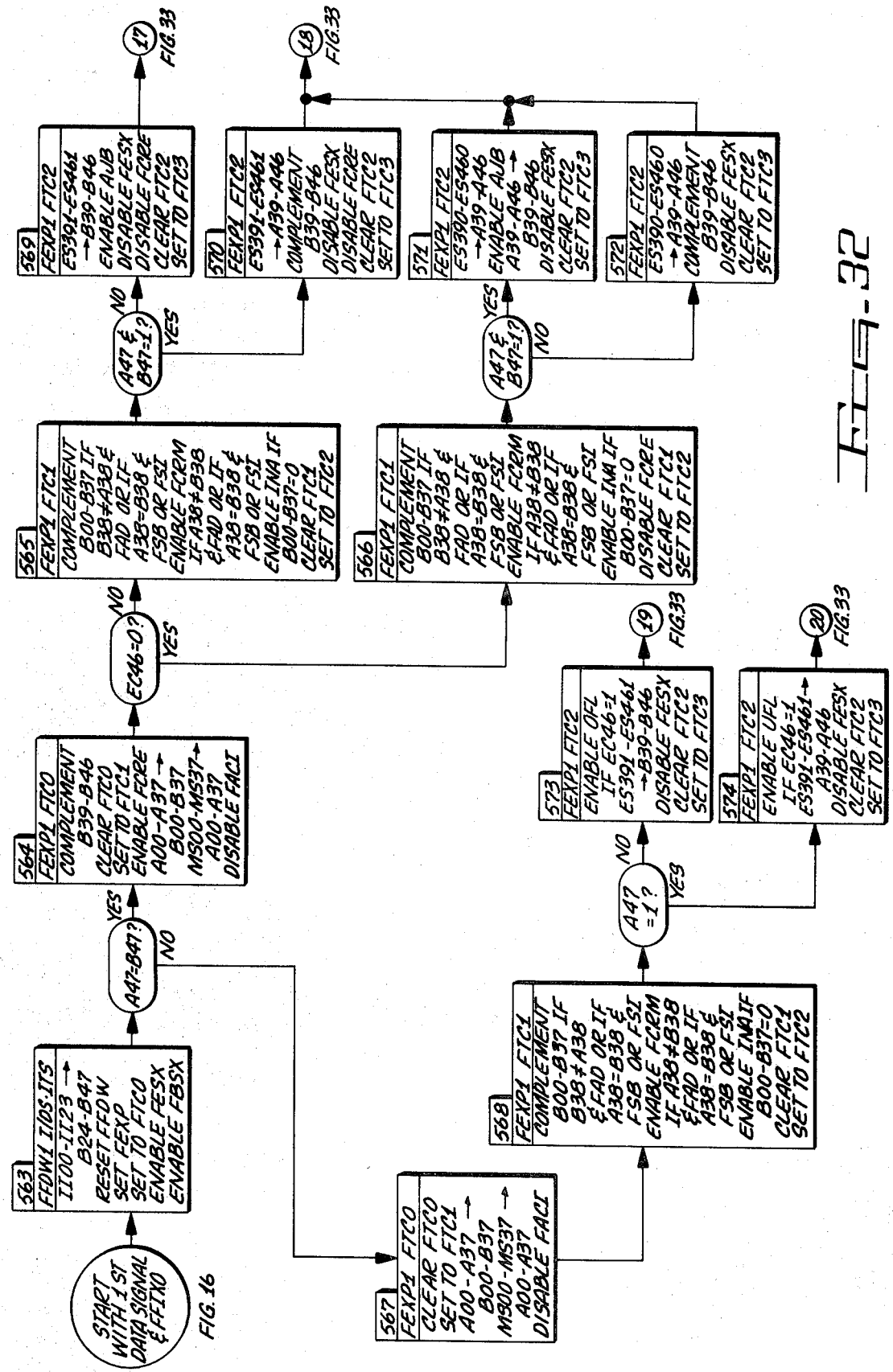

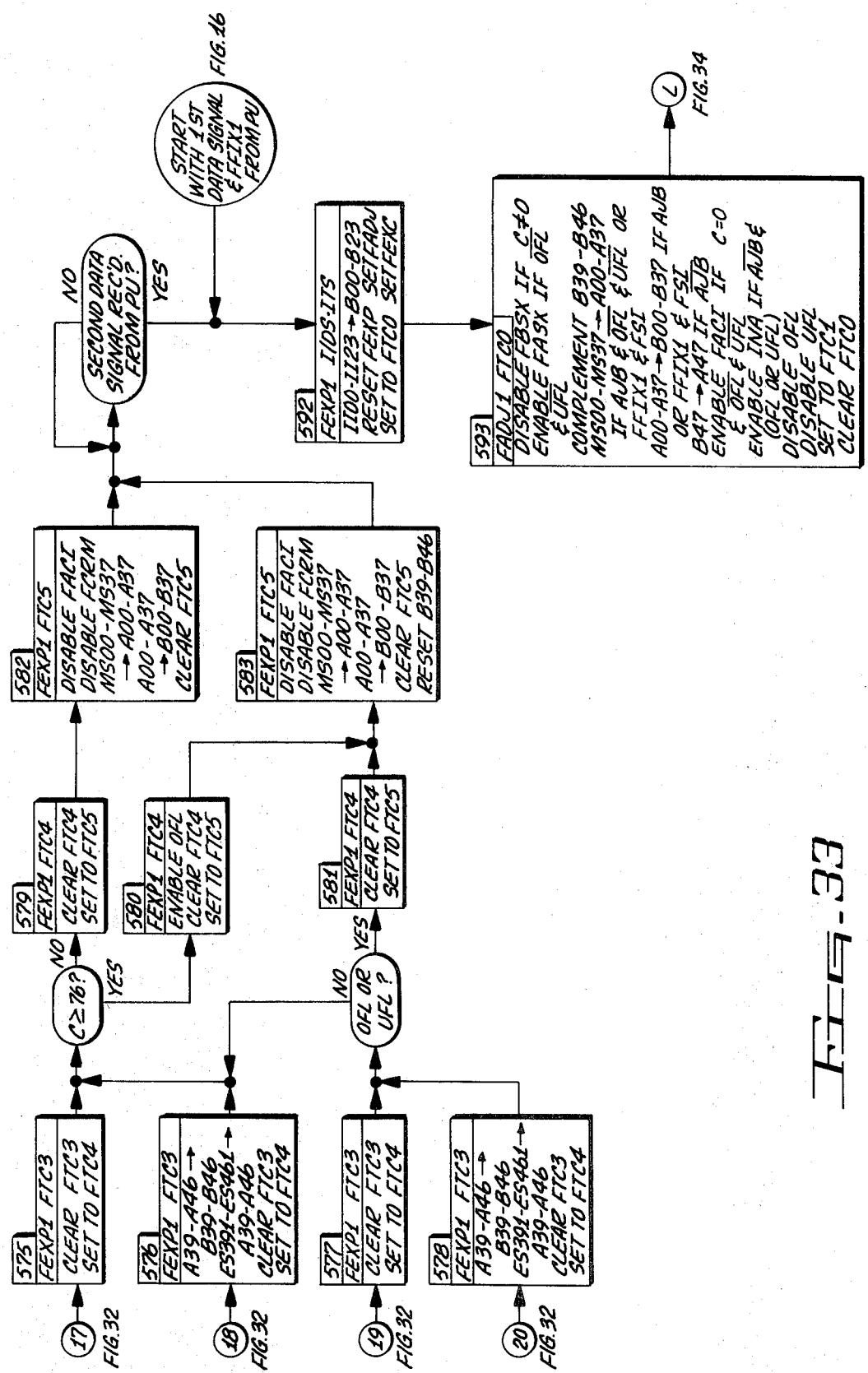

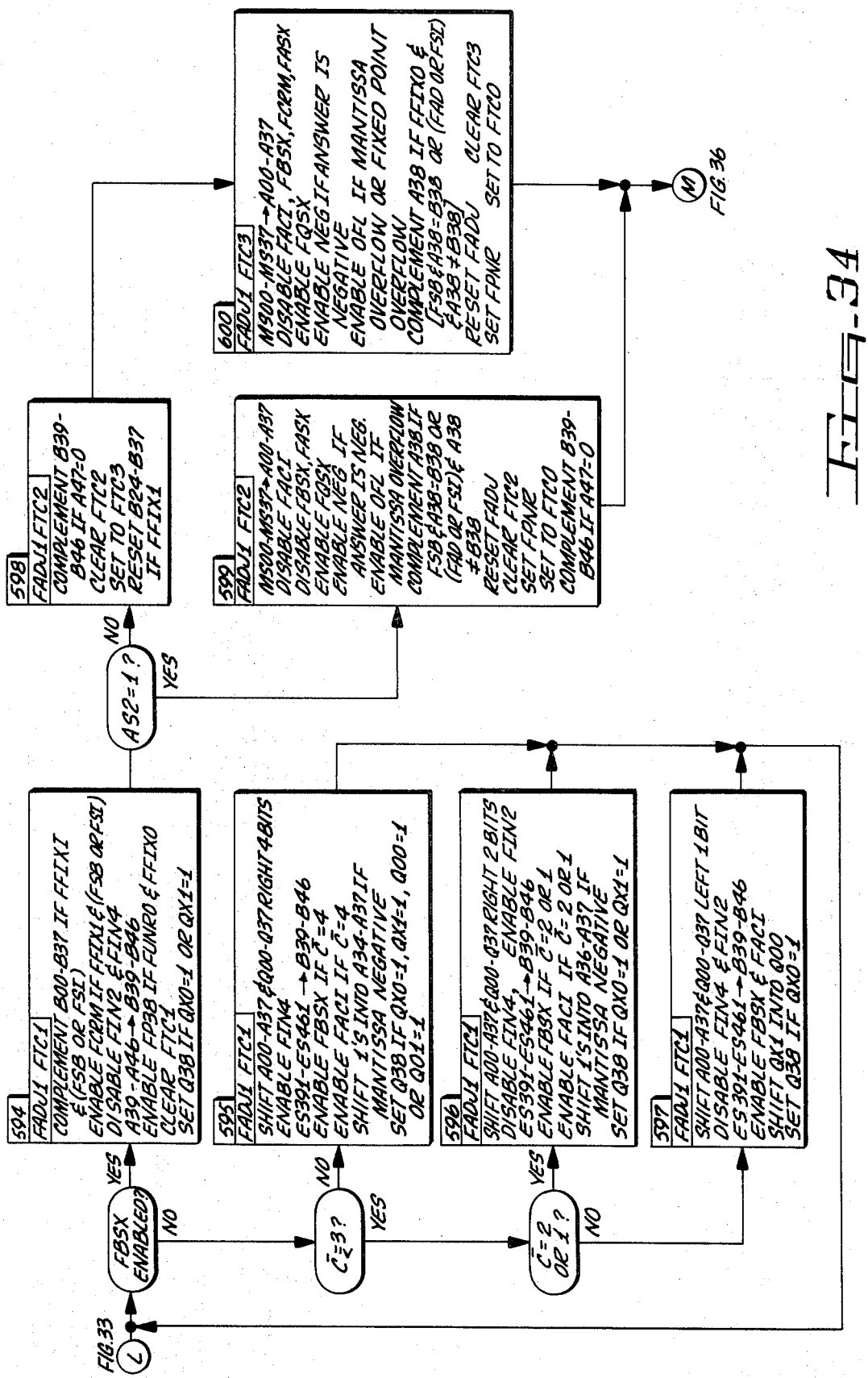

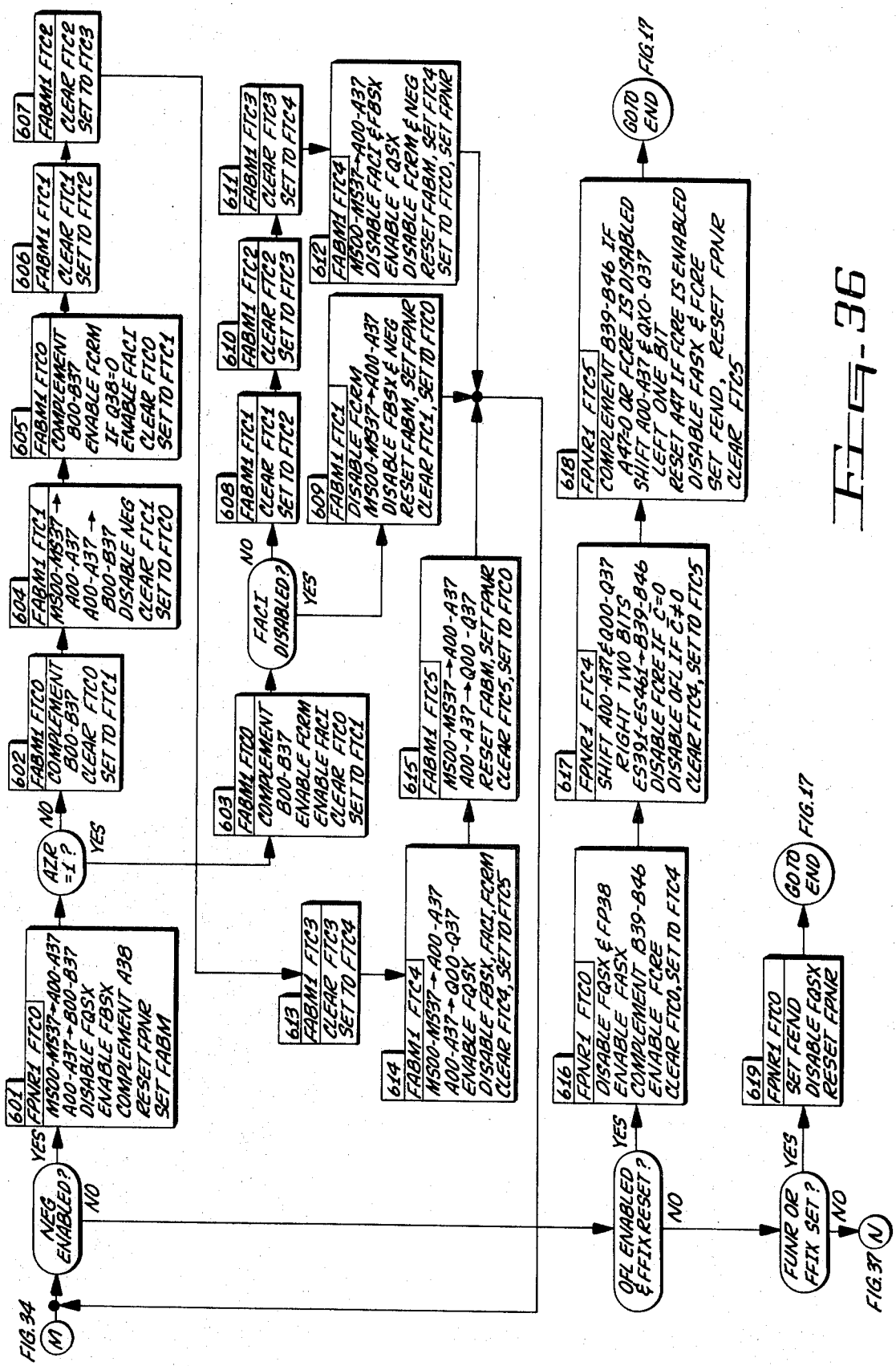

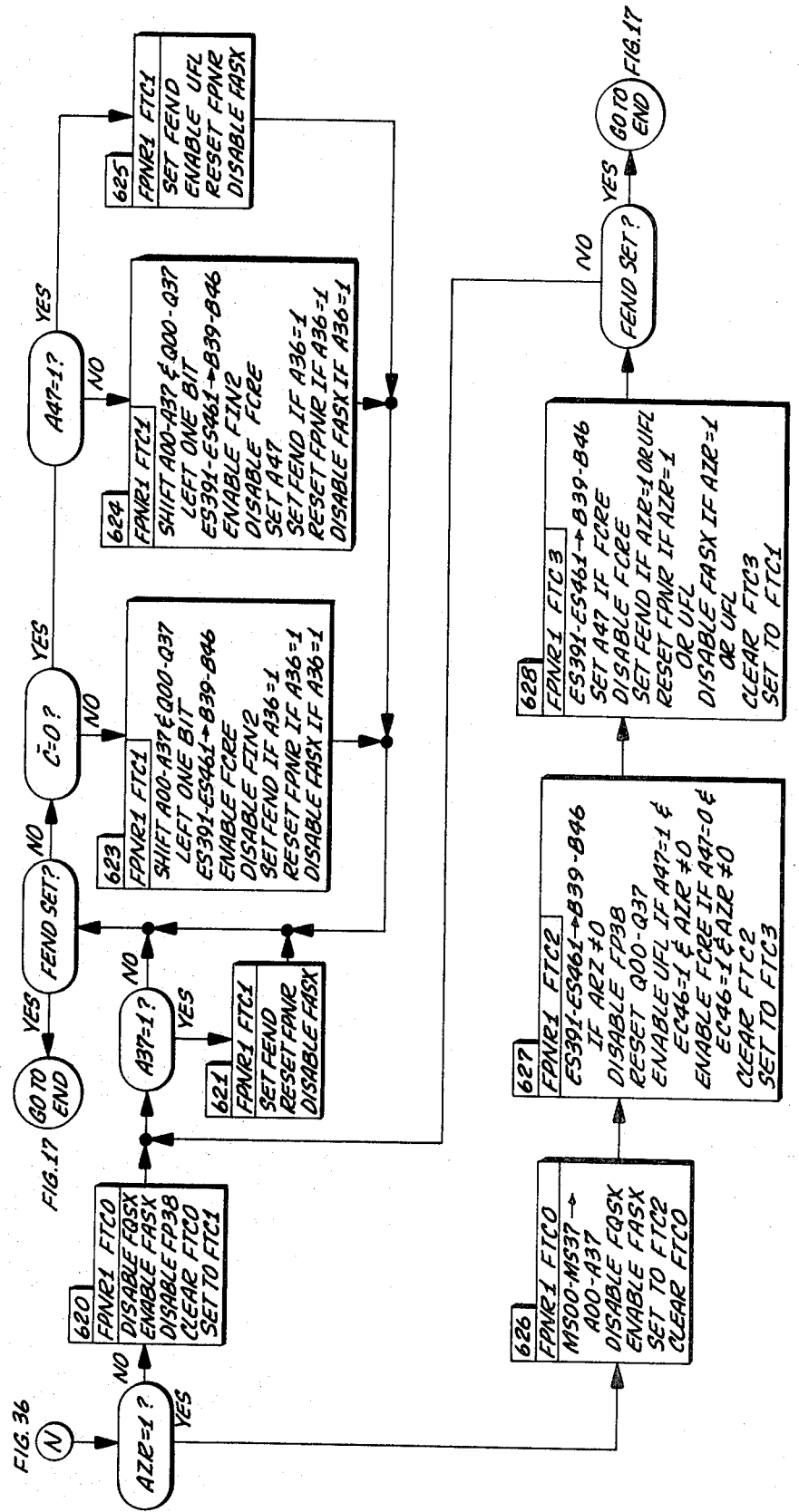

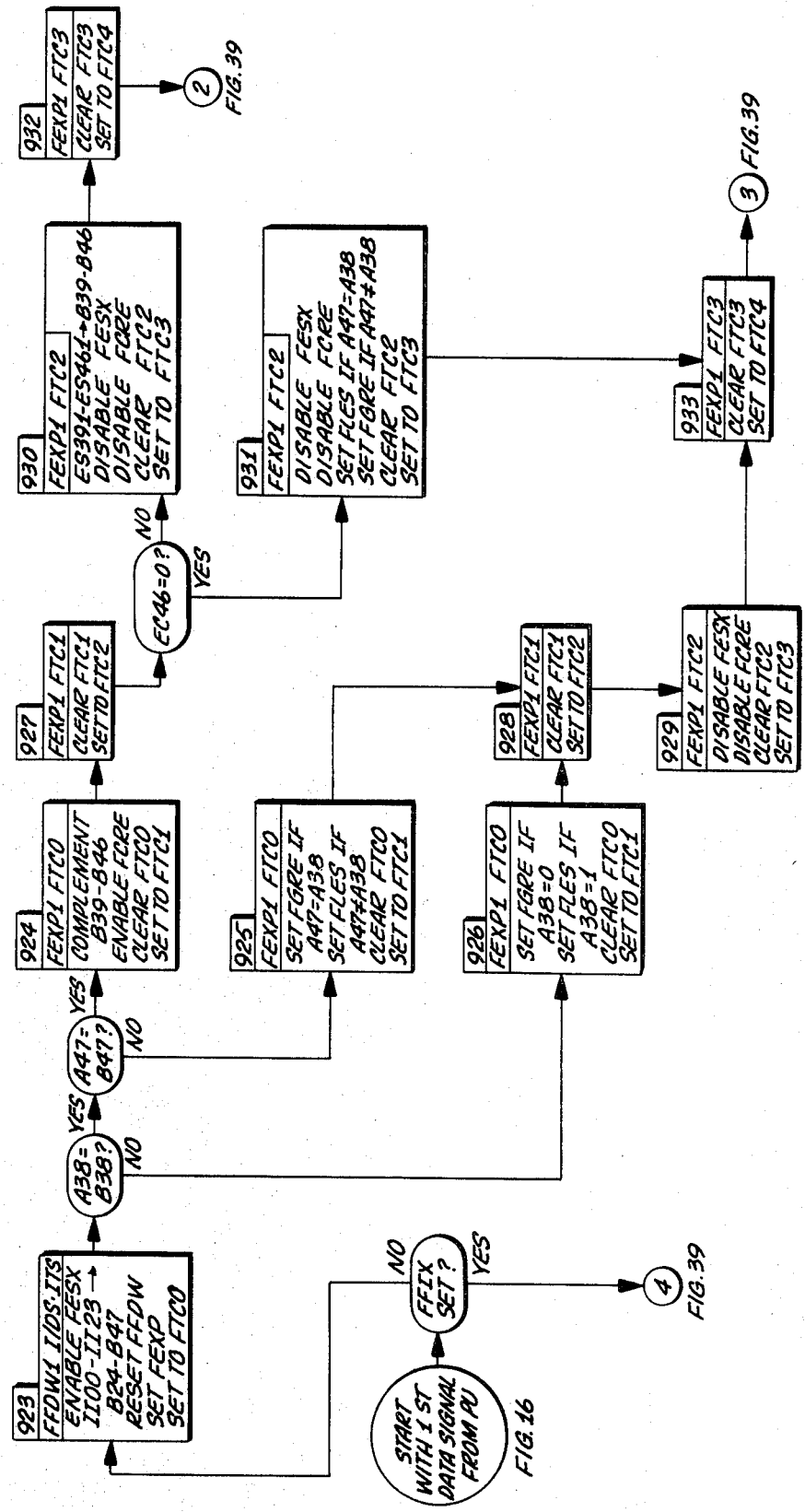

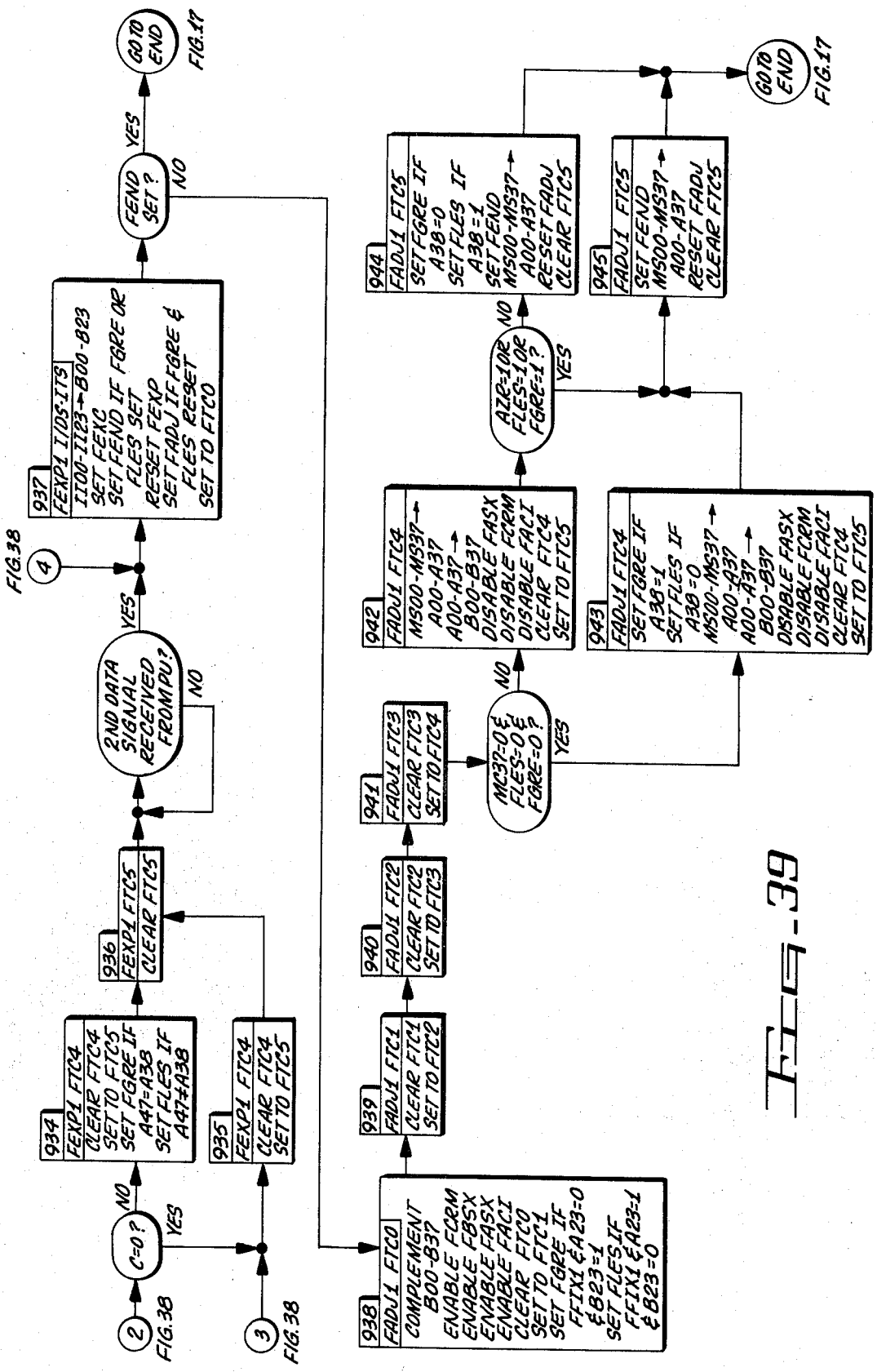

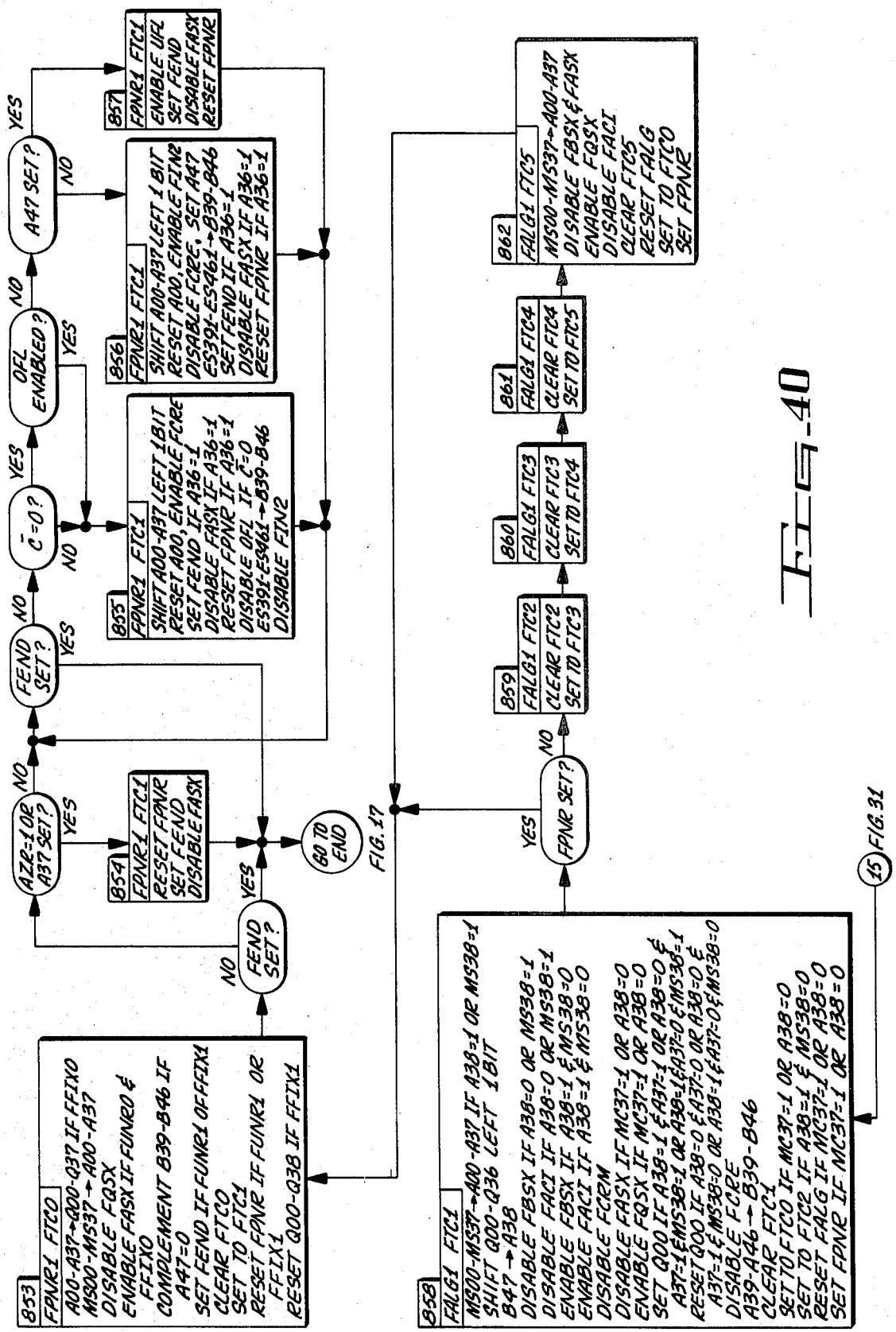

United States Patent Office 3,535,499
Patented Oct. 20, 1970

3,535,499
DATA PROCESSING SYSTEM HAVING IMPROVED DIVIDE ALGORITHM
Marion G. Porter, Phoenix, Ariz., assignor to General Electric Company, a corporation of New York
Filed July 14, 1967, Ser. No. 653,495
Int. Cl. G06f 7/39
U.S. Cl. 235—164                               7 Claims

ABSTRACT OF THE DISCLOSURE

A data processing system including an arithmetic unit in communication with a data processing unit provides the capability of executing a floating point divide algorithm upon data supplied thereto from the processing unit. The divide algorithm executed by the arithmetic unit utilizes a normalized divisor and is a "non-restoring" division process which develops a quotient by shifting over strings of binary 0's when a dividend or partial remainder is positive and shifting over strings of binary 1's when the dividend or partial remainder is negative.

BACKGROUND OF THE INVENTION

The present invention relates generally to electronic data processing systems and more particularly to the arithmetic portion or section of a data processing system.

Data processing systems which provide arithmetic capabilities are inclusive of an arithmetic unit or portion which will normally include some form of combining means such as an adder for arithmetically combining two or more information items or data words, normally configurations represented by binary bits (1's and 0's) the format of which is representative of some unit of information; e.g., a numerical quantity. Additionally, it is customary to provide, either in or closely associated with the arithmetic unit, suitable temporary storage means or registers for holding the data words to be acted upon by the combining unit.

Many arithmetic units are capable of performing arithmetic operations upon data words in the so-called floating point mode. By floating point mode is meant that a data word representing a numerical quantity is in the form of an exponent and a mantissa. The binary bits or digits in the exponent portion designate powers of two while those in the mantissa portion represent the reciprocals of powers of two.

One of the arithmetic operations performed upon data in the floating point mode is a division operation between two data words, a divisor and a dividend. Before initiating the division operation it is customary in the art to normalize the mantissa portions of the divisor and the dividend with appropriate adjustment of their respective exponents. After the mantissas of the divisor and dividend are normalized, a subtraction operation is performed by subtracting the divisor mantissa from the dividend mantissa. In the prior art systems, difficulty is encountered when the divisor mantissa was less than the dividend mantissa. In this situation the subtraction does not yield a valid quotient bit and the dividend mantissa is shifted to the right one bit position to assure that the divisor is the larger, its exponent portion is adjusted, and another subtraction performed to produce the first valid quotient bit.

This double subtraction and shifting is a time consuming operation requiring additional data manipulations without the generation of a usable result.

SUMMARY OF THE INVENTION

The present invention alleviates this problem of the prior art by providing the generation of a quotient bit immediately upon subtracting the normalized divisor and dividend mantissas regardless of the relative magnitudes of the mantissas. In the problem area of the prior art, when the divisor is less than the dividend the present invention provides that a quotient bit is generated and an initial exponent portion of the quotient, which was earlier generated, is simultaneously varied by one to perform the multiple step operations of the prior art in a single step.

It is, therefore, an object of the present invention to provide an electronic data processing system having enhanced data handling capabilities.

It is another object of the present invention to provide a data processing system having an arithmetic portion capable of more rapidly performing division operations.

Still another object is to provide a method and means in an arithmetic unit for use in the data processing system to perform division operations upon floating point binary numbers in an expeditious and efficient manner.

The foregoing and other objects will become apparent as this description proceeds and the features of novelty which characterize the invention will be pointed out in particularity in the claims annexed to and forming a part of this specification.

BRIEF DESCRIPTION OF DRAWING

For a better understanding of the invention, reference may be had to the accompanying drawing, in which:

FIG. 3 is a major block diagram illustrating paths of information movement with respect to the floating point arithmetic unit of the present system;

FIG. 6 is a flow chart illustrating the basic operations performed in the system of the present invention in the execution of instructions involving the floating point arithmetic unit;

FIG. 7 is a major block diagram illustrating paths of information movement with respect to the data processing unit of the present system;

FIGS. 9–13, taken together collectively as shown in FIG. 14, constitute a detailed schematic drawing for the movement of information within the floating point arithmetic unit;

FIGS. 15–34 and 36–40 are flow charts useful, taken in conjunction with FIGS. 9–13, in understanding the execution of instructions by the floating point arithmetic unit of the present system; and, FIGS. 35a and 35b considered in combination illustrate one feature of the floating point arithmetic unit of the present system.

DESCRIPTION OF THE PREFERRED EMBODIMENT

Floating Point Arithmetic Unit

Figure 1:
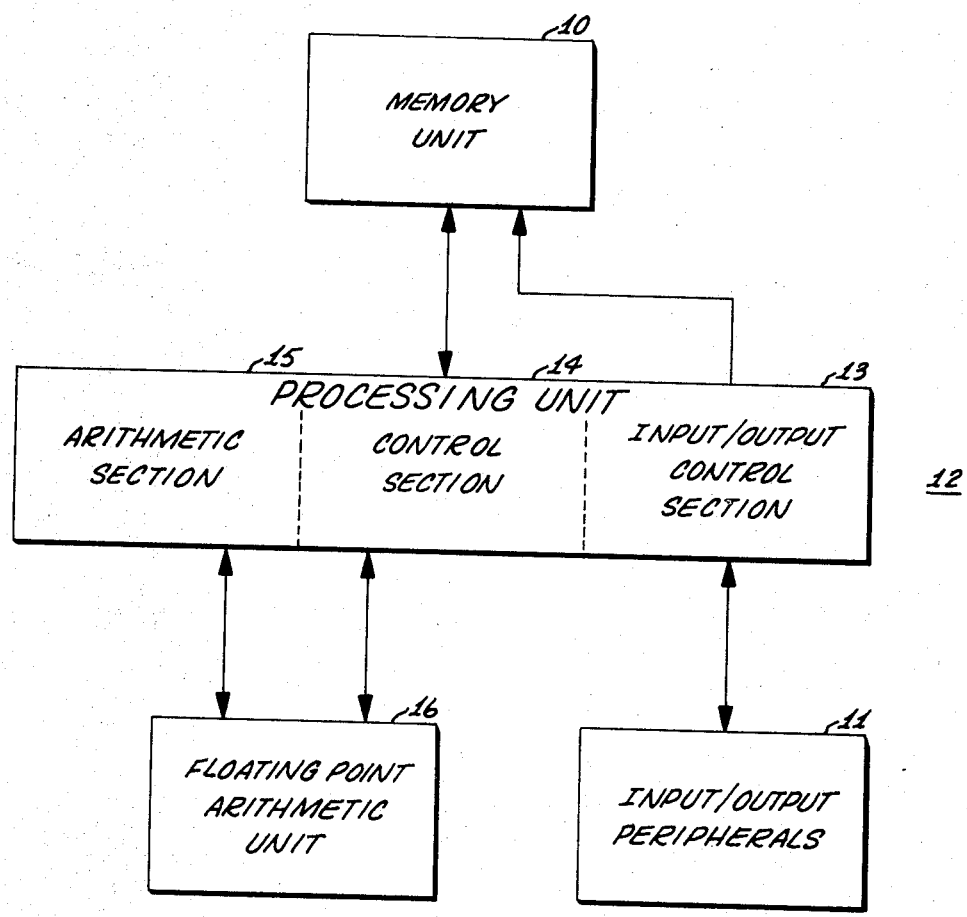
FIG. 1 is a block diagram illustrating the major components of the data processing system of the present invention.

Referring now to FIG. 1, there is shown in block diagram form a data processing system comprising a memory unit 10, input/output peripherals 11, a floating point arithmetic unit 16 (hereinafter referred to as the floating point unit) and a data processing unit 12 comprised of an input/output control section 13, a control section 14, and an arithmetic section 15. Lines interconnecting the various units symbolically represent the flow of information between the units such as digital data representative of alphabetic characters or numeric quantities, digital instruction signals, and control signals.

Figure 2:
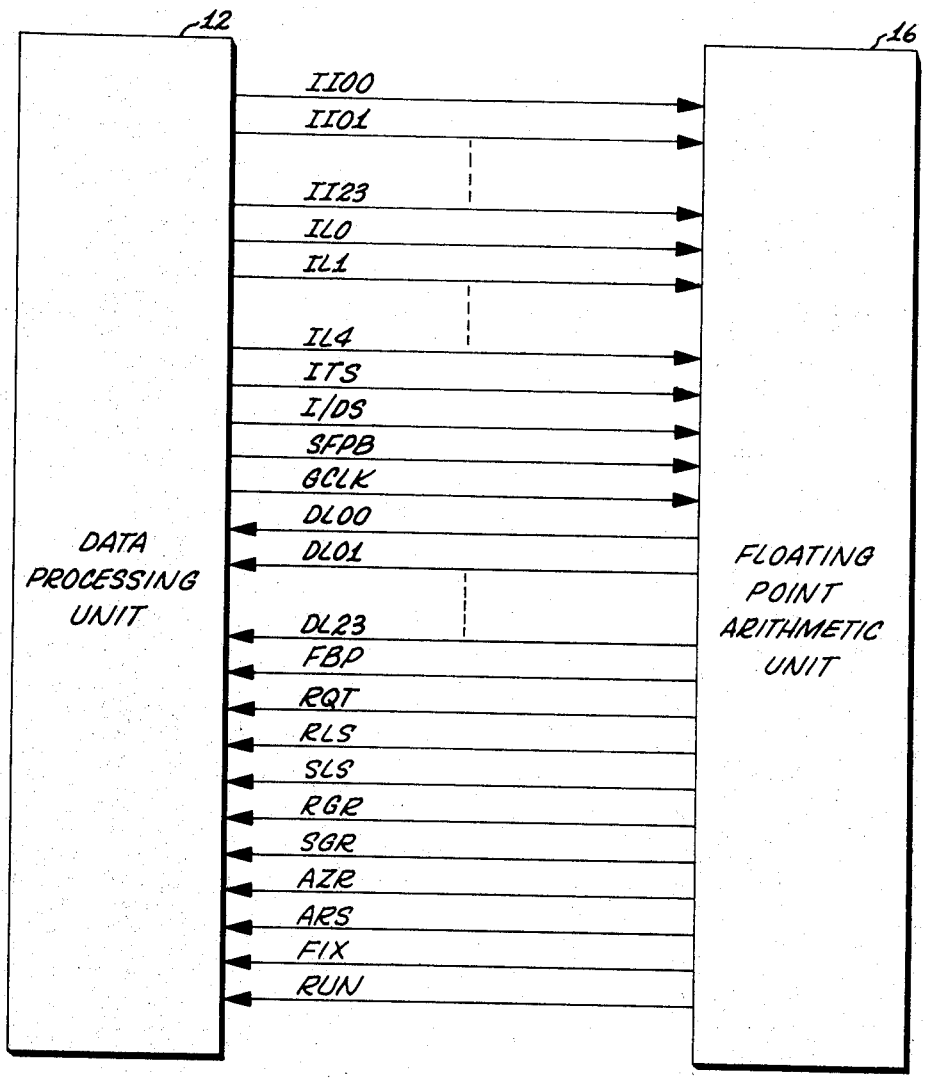
FIG. 2 illustrates the signal lines which interface the data processing unit and the floating point arithmetic unit of the system of FIG. 1.

Communications between the floating point arithmetic unit and the data processing unit are provided through interface lines as shown in FIG. 2. Referring now to FIG. 2, the interface lines may be considered as being divided into two basic categories: (a) those lines extending from the processing unit to the floating point unit, and (b) those lines extending from the floating point unit to the processing unit. The interface lines are further defined as follows:

(I) Interface Lines from the Processing Unit to the Floating Point Unit (A) Information Item-Lines 00–23 (II00–II23): The Information Item-Lines II00–II23 serve to convey information representative of an instruction word, a status word, or a data word, collectively designated information items, from the processing unit to the floating point unit.

(B) Instruction Lines 0–4 (IL0–IL4): These lines contain a specified portion, to be defined hereinafter, of an instruction word during the time that an instruction word is being transferred from the processing unit to the floating point unit.

(C) Instruction Time Signal Line (ITS): This line is utilized to transmit a signal which designates that the information item being transferred from the processing unit to the floating point unit is either an instruction word or a data word.

(D) Instruction Data Signal Line (I/DS): This line contains a signal pulse at the time an information item is to be transferred between the processing unit and the floating point unit. It is used to gate instruction words and data words into the floating point unit.

(E) Set Floating Point Busy Line (SFPB): This line is used to set a floating point busy flip-flop in the floating point unit when, as detected by the processing unit, the floating point unit is executing an instruction.

(F) Gated Clock (GCLK): This line transfers gated clock signals from the processing unit to the floating point unit. These clock signals are gated by a signal designated RUN (item IIK, Run Clock, which follows).

(II) Interface Lines from the Floating Point Unit to the Processing Unit (A) Data Lines 00–23 (DL00–DL23): These lines contain data words or status words which are the results of the floating point unit instruction executions. The information on these lines is transferred to the memory unit via the data processing unit.

(B) Floating Point Busy Line (FPB): The state of of this line is used to indicate, to the processing unit, that the floating point unit is executing an instruction (busy), or s ready to execute another instruction (not busy).

(C) Request Trap Line (ROT): This line provides, under prescribed conditions, a program interrupt signal to the processing unit if, during an arithmetic operation by the Floating point unit, an over-flow, an under-flow, or a divide check occurs. The latter event occurs if an attempt is made to divide by zero.

(D) Reset Less Than Flip-Flop (RLS): A signal on this line is used to reset a flip-flop (Less Than flip-flop) in the processing unit during the execution of a compare command by the floating point unit when the number in the floating point unit is greater than a designated number in the memory unit.

(E) Set Less Than Flip-Flop Line (SLS): This line is used to set the Less Than flip-flop in the processing unit during the execution of a compare command by the floating point unit when the number in the floating point unit is less than a designated number in the memory unit.

(F) Reset Greater Than Flip-Flop Line (RGR): This line is used to reset a flip-flop (Greater Than flip-flop) in the processing unit during the execution of a compare command by the floating point unit when the number in the floating point unit is less than a designated number in the memory unit.

(G) Set Greater Than Flip-Flop Line (SGR): A signal on this line is used to set the Greater Than flip-flop in the processing unit during the execution of a compare command by the floating point unit when the number in the floating point unit is greater than a designated number in the memory unit.

(H) A-Register Zero Line (AZR): This line provides a signal to the processing unit when a portion (mantissa field) of the contents of an Accumulator Register in the floating point unit is zero. The processing unit uses the signal on this line to initiate a branch operation.

(I) A-Register Sign Line (ARS): A signal on this line indicates to the processing unit that the sign of the floating point unit Accumulator mantissa field is positive or negative. The processing unit uses this signal to initiate a branch operation based on the condition of the Accumulator sign bit.

(J) Fixed Point Mode Line (FIX): A signal on this line is used by the processing unit to determine whether the floating point unit is in either the fixed point or the floating point mode of operation.

(K) Run Clock (RUN): This line delivers a signal to clock logic in the processing unit to enable the transfer of a train of clock pulses to the floating point unit.

FLOATING POINT UNIT MAJOR BLOCK DESCRIPTION

The basic operation of the floating point unit can best be understood with reference to FIG. 3. FIG. 3 is a major block diagram showing the functional blocks of control logic, registers and data flow paths within the floating point unit.

As can be seen by FIG. 3, information items from the processing unit are transferred into the floating point unit on lines II00–II23 and IL0–IL4. These information items are transferred into a B-Register 20 via B-Register transfer gates 18. The B-Register is a 48 bit buffer register which performs a plurality of functions. The B-Register:

(1) Temporarily holds an instruction word received from the processing unit for subsequent transfer to an I-Register 24 prior to instruction execution;

(2) Holds the addend prior to addition;

(3) Holds the subtrahend prior to subtraction;

(4) Holds the multiplicand prior to multiplication;

(5) Holds the divisor prior to division;

(6) Receives, during a floating load operation, two 24 bit words (operands) sequentially from the memory unit via the processing unit and assembles them into one 48 bit operand for subsequent transfer into an A-Register 26 via an Adder 28; and, (7) Performs all complementary arithmetic required in the floating point unit.

During instruction execution, information is selectively transferred from the B-Register into the Adder 28, the A-Register 26, and into an Algorithm Execution Control Logic 30. Also during this time, information may be received by the B-Register from the Adder and from the A-Register. Bit positions 39–46 of the B-Register 20 are time-shared. A portion of the time these posiitons serve to hold the exponent field of a 48 bit floating point word and at other times these positions serve as a Control Counter 22. This is possible since all fixed point arithmetic operations use only bits 00–23 of the B-Register; i.e., fixed point numbers are handled in absolute binary form and have no exponent. While all floating point 48 bit operands have an exponent and require exponent calculations, thus utilizing bit positions 39–46 of the B-Register, these calculations are completed before instruction execution requires use of the Control Counter 22. This method of time-sharing the Control Counter will be described in greater detail hereinafter. The Control Counter 22 can be incremented by varying amounts depending upon the instruction being executed or it can be loaded with a number representative of the number of bit positions to be shifted during the execution of floating point shift instructions. The Control Counter 22 is also used in multiply and divide instructions to control the number of bits examined and the number of quotient bits generated.

The Adder 28 is 47 bits in length and consists of two portions. In the first portion (bits 00–38), bit positions 00–37 contain the mantissa of the floating point word and bit position 38 holds the sign of the mantissa. The second portion, bit positions 39–46, contains the floating word exponent. Both portions of the Adder are full adders receiving inputs from the B-Register 20, the A-Register 26, and a Q-Register 32 to perform full adder functions for mantissa and exponent calculations during the execution of floating point instructions. The results of these calculations are selectively transferred into the A-Register or the B-Register.

The A-Register, receiving inputs from the Adder 28, the B-Register 20, and the Q-Register 32, is a 48 bit Accumulator. In the A-Register, the mantissa of a floating point word is represented in positions 00–38 with bit 38 being the sign bit. The exponent is represented by bits 39–47, bit 47 being the exponent sign bit. The A-Register performs the functions of:

(1) Holding the augend prior to an addition operation and the most significant bits of the sum after addition;

(2) Holding the minuend prior to a subtraction operation and the most significant bits of the difference after subtraction;

(3) Holding the most significant bits of the product after multiplication;

(4) Holding the most significant bits of the dividend prior to a division operation and the entire quotient after division;

(5) Receiving a 48 bit operand word from the B-Register 20 via the Adder 28 during a floating load operation; and (6) Providing a 48 bit operand to the memory unit via suitable logic designated A-Register transfer logic 38 on data lines DL00–DL23 during the execution of a floating store instruction.

When the contents of the A-Register 26 are zero, detection of this fact is made by an A-Register Zero Logic 36 which generates a signal AZR which is sent to the processing unit 12 (FIG. 1).

When the floating point unit is in the floating point mode of operation, sign bit 38 of the A-Register is transferred to the processing unit 12 over line ARS via suitable logic 34 designated A-Register Sign Logic. If the floating point unit is in the fixed point mode of operation, bit 23 of the A-Register is transferred to the processing unit via the A-Register Sign Logic 34. The A-Register also provides outputs to the Control Counter 22 and to the Q-Register 32 during the execution of arithmetic calculations.

The Q-Register 32 which receives input information from the A-Register is a 39 bit Accumulator, with bit 38 serving as the sign bit. The Q-Register provides the function of:

(1) Holding the least significant portion of the sum after floating point addition;

(2) Holding the least significant portion of the difference after floating point subtraction;

(3) Holding the least significant portion of the product after multiplication; and (4) Holding the least significant portion of the dividend prior to double precision or fixed point division and holding the remainder after floating point division.

During the execution of certain instructions, sign bit 38 of the Q-Register in conjunction with sign bit 38 of the A-Register determines the final sign of a number. Outputs from the Q-Register 32 are provided to the Adder 28 and to the A-Register 26 during left shift operations.

It will be remembered from the previous discussion of the B-Register 20 that one of its outputs is to the I-Register 24. The I-Register is a 7 bit instruction register which contains the operation code, or a portion thereof, of the instruction currently being executed by the floating point unit. The I-Register contents form the input to an Instruction Decode Logic 40 which decodes the operation code of the instruction word to provide the control for directing the operation of the floating point unit during the execution of the instruction.

Also as is shown (FIG. 3), an Algorithm Execution Control Logic 30 receives its inputs from the Control Counter 22 of the B-Register 20 and uses these inputs to generate control signals which govern the floating point unit in initiating algorithm execution and in the detection of algorithm execution completion.

Additional logic designated Control State Logic 42 provides outputs to and receives, inter alia, inputs from a group of flip-flops collectively called Status Indicators 44. The Control State Logic 42 provides an output signal FPB which is sent to the processing unit and receives input signals ITS, I/DS and SFPB from the processing unit. The Control State Logic 42 contains logic and flip-flops to control the internal execution of instructions within the floating point unit such as: instruction execution, register-to-register transfers, adder transfer path enable, etc., as will be more fully explained later in this specification.

The Status Indicators 44 (FIG 3) are a plurality of flip-flops which receive control inputs from the Control State Logic. Included within the Status Indicators 44 is a FUNR flip-flop 46 (unnormalized mode flip-flop) which is in its set state when the floating point unit is in the unnormalized mode. When the FUNR flip-flop 46 is in its reset (normal) state the floating point unit 16 will normalize numbers before executing an instruction. In the floating point unit, when working on floating point numbers, the mantissa is considered to be fractional; i.e., the binary point is always considered to be to the immediate left of the bit 37 as the number appears in the A-Register 26. Positive and negative numbers are normalized by shifting the mantissa to the left until its most significant bit (bit 37) in the A-Register is a binary 1. For each position shifted left, one is subtracted from the exponent in the A-Register.

A second flip-flop, a FDPR flip-flop 48 (double precision mode flip-flop), is set when the floating point unit is in the double precision mode. In this mode the floating point unit has the capability of performing double precision floating point arithmetic. When in the double precision mode, a double length mantissa is placed in the A- and Q-Registers (see FIGS. 5a and 5b) at the start of the double precision instruction and a double length mantissa is generated at the end of the instruction. If the FDPR flip-flop is in its reset state, the floating point unit is in a single precision mode. When in a single precision mode the Q-Register 32 is not used as an extension of the A-Register. This flip-flop is set by the execution of an instruction called floating point operation which will be described hereinafter.

Over-flow conditions are indicated by the setting of a FOFH flip-flop 50 (over-flow hold flip-flop) by the A-Register. An over-flow condition has occurred when the resultant exponent becomes greater than +255 (decimal).

Under-flow conditions are indicated by a FUFH flip-flop 52 (under-flow hold flip-flop) which is set by A-Register under-flow. An under-flow condition has occurred when the resultant exponent becomes less than −255 (decimal). If under-flow occurs, binary 0's are placed in bit positions 00-38 of the A-Register and the A-Register exponent is set to the largest negative exponent (−255 decimal). That is, the A-Register exponent field is set to all ones.

During the execution of a divide instruction, if an attempt is made to divide by zero, a FDCH flip-flop 54 (divide check hold flip-flop) is set. This flip-flop is used to generate a signal RQT to be described hereinafter.

Also included within the Status Indicators 44 is a FTRP flip-flop 56 (trap mode flip-flop) which is set during the execution of an instruction called floating point operation. The setting of this flip-flop will place the floating point unit in a trap mode condition. If the FTRP flip-flop 56 is set and there occurs an over-flow, under-flow, or divide check, a signal RQT (FIG. 3) will be generated to request the processing unit to issue a program interrupt.

Another flip-flop, FFIX flip-flop 58 (fixed point mode flip-flop) is used to place the floating point unit in the fixed point mode. When this flip-flop is set the floating point unit is in the fixed point mode, thus establishing that all data words to be operated on by the floating point unit are to be 24 bits in length. When in the A-Register this number is contained in bits 00-23 with bit 23 being the sign bit (FIG. 4f). With the FFIX flip-flop set, the signal FIX is transmitted to the processing unit. This flip-flop is placed into its set condition by the execution of a floating point operation instruction or of a fixed load instruction. It can be placed into its reset condition by the execution of a floating load instruction or by the previously mentioned floating point operation instruction.

The status of seven flip-flops FUNR 46, FDPR 48, FOFH 50, FUFH 52, FDCH 54, FTRP 56 and FFIX 58 is transferred to the A-Register Transfer Logic 38 during the execution of a floating point instruction and from there to the processing unit over the data lines DL00-DL23. These flip-flops also supply status conditions to the floating point unit for various control purposes. The last two elements shown in the Status Indicators 44 are used during the execution of the floating compare instruction. These two elements are the two flip-flops FGRE 60 (greater than flip-flop) and FLES 62 (less than flip-flop) which are used, respectively, to detect the results of a comparison. The FLES flip-flop is set if the contents of the A-Register are less than the floating point or fixed point number in the memory unit. The FGRE flip-flop is set if the contents of the A-Register are greater than the floating point or fixed point number in the memory unit. The status of these two flip-flops is transferred to the processing unit over the lines SLS and RLS from, respectively, the 1 and 0 outputs of the FLES flip-flop 62 and over lines SGR and RGR, respectively, from the 1 and 0 outputs of the FGRE flip-flop 60. These signals are used to set or reset the less than or greater than flip-flop indicators in the processing unit.

A multiplicity of gated output signals to various portions of the floating point unit for the purpose of controlling the shifting of information between registers, establishing various control states required during the shifting of information internally within the registers, etc. are provided by logic designated Gated Clock Amplifiers 64. Shown in FIG. 3, the Gated Clock Amplifiers provide the signal RUN to the processing unit (see FIG. 2) and receive the signal GCLK (gated clock) from the processing unit. This signal is used to gate the signals from the Gated Clock Amplifiers 64 to the floating point unit at well as provide signals to a Timing Counter 66. Timing Counter 66 is used to generate basic timing within the Control State Logic 42 during the execution of instructions within the floating point unit. The output signals from the Timing Counter 66 are used to gate the various data and control signals into registers and associated logic during execution of instructions.

FLOATING POINT NUMBERS

In elaboration of what was briefly discussed earlier in this specification, the use of floating point numbers is desirable in performing arithmetic calculations where it is anticipated that the range of numbers in a given calculation is either large or unpredictable, or where an investigation of the range of numbers involved in the calculation results in almost as much work as actually performing the calculation. When these conditions exist in processing equipment which operates on well-known fixed point numbers, it is sometimes difficult for the programmer to keep track of where the binary point (corresponding to the decimal point in the decimal system), which separates the integral part of a number from the fractional part of the number, is to be located. This problem is alleviated by a combination of proper logic design for performing arithmetic calculations and the floating point number notation which describes a floating point number in two portions.

The first of the two portions of a floating point number, the exponent, presents the magnitude of the number, and the other portion of the number, the mantissa, presents the exact size of the number within the range as specified by the first portion (the exponent). The two terms, exponent and mantissa, are used because of the similarity they have to their use with respect to logarithms.

Figure 5A:

In the floating point unit of the present invention, all numbers are represented in binary form. Since the exponent of a floating point number describes the order of magnitude; i.e., the power of the base, and the mantissa describes the number within the range of the exponent magnitude, a floating point binary number can be represented as $M \times 2^E$. In this expression the M represents a signed mantissa, the 2 is the radix of the binary number to be represented in the exponent, and the E represents a signed exponent. FIG. 5a represents the manner in which a floating point number appears in the floating point unit 16.

The exponent and the mantissa each have their own associated sign bits with a binary 0 designating a positive value and a binary 1 designating a negative value. It should be noted that the binary point (FIG. 5a) is considered to be positioned between the mantissa sign bit and the most significant bit position of the mantissa (between bits 37 and 38), thus signifying that the mantissa M is always a fractional value representing a binary number less than 1.

A floating point number can be represented with the greatest precision when the fractional portion (mantissa) of the number is normalized. A floating point number is said to be normalized when a binary 1 exists in the most significant bit position of the mantissa. A number is said to be unnormalized so long as a 0 exists in the most significant bit position of the mantissa. For example, the binary number .100 is a normalized number, whereas the number .001 is an unnormalized number. To normalize a number, the mantissa is shifted left until a 1 is located in the most significant bit position of the mantissa. For example, to normalize the binary number .001, the number is shifted left two places to form the number .100 and the exponent portion of the number is adjusted accordingly as described below.

In the binary system proceeding to the right of the binary point, the bit magnitudes progress respectively from the lower to the higher negative powers of 2; thus, proceeding to the right from the binary point, the bit values represent ½ ($2^{-1}$), ¼ ($2^{-2}$), ⅛ ($2^{-3}$), etc. Thus it is seen that the shifting of the mantissa to the left is the equivalent of multiplying the number by 2 for each bit position shifted and that the mantissa of a normalized number is a fraction greater than or equal to one-half but less than 1.

It may also be seen from the floating point number notation $M \times 2^E$ that the fractional portion (mantissa) of the number cannot validly be normalized without adjusting the exponent accordingly. Thus, for each binary 0 shifted left out of the mantissa during normalization, a binary 1 must be subtracted from the exponent in order to keep the entire number in its true value. For example, to normalize the binary number 10.01 (which equals $2^2 \times ¼ = 4 \times ¼ = 1$) the mantissa is shifted to the left one bit, and one is subtracted from the exponent. After normalization the number appears as 01.10 (which equals $2^1 \times ½ = 1$). The value of the number has not been changed. (It should be noted that, from the left of the binary point, the magnitude of the exponent (E) increments from the lower to the higher powers of 2. That is, starting from the binary point the exponent powers (E) are 1, 2, 4, etc.

INFORMATION FORMATS

The floating point unit 16 is capable of executing a multiplicity of instructions to perform arithmetic operations on data words which are delivered thereto from the processing unit. The formats of instruction words and data words, 24 bits each, as they appear in the memory unit 10 are shown in FIGS. 4a through 4h.

Figure 4A:
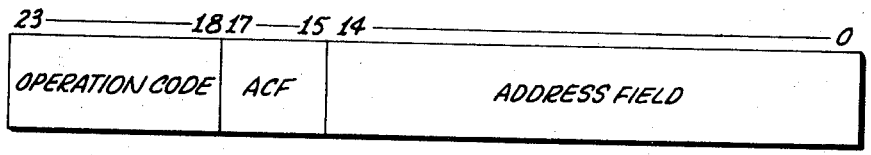
FIGS. 4a–4h and 5a–5c illustrate typical information word formats utilized in the system of the present invention.

FIG. 4a illustrates the format of a basic instruction word. As shown in FIG. 4a, bit positions 0-14 are designated address field and these bits specify the location of an operand in the memory unit. The term operand as used in the present specification designates that information item upon which an operation is to be performed. Bits 15, 16 and 17 of the basic instruction word are designated as ACF (address control field) bits and are used by the processing unit to determine if address modification is to be performed on the address field bits 0-14. Bits 18-23 are called operation code bits and define the operation to be performed. If this operation is one involving the floating point unit 16 (FIG. 1) the processing unit will fetch the operand from the memory unit 10 at the location specified by the address field, subject to any address modifications, and send the entire instruction plus the operand to the floating point unit at the proper time. Instruction words which use this particular format are arithmetic instructions such as add, subract, muliply, divide, compare, load and store operations.

For a more complete understanding of the basic word format, address modification and the overall operation of the processing unit 12, reference is made to United States Pat. 3,413,609 by F. Boyle et al., issued Nov. 29, 1968, and assigned to the assignee of the present invention.

Figure 4B:
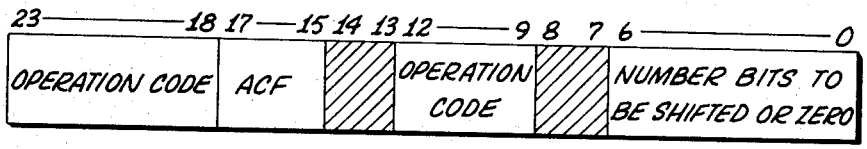

FIG. 4b represents the format for general instruction words used by the floating point unit 16. Instruction words utilizing this format require no memory accesses, that is, they do not require the bringing of an operand from the memory unit. They are used, for example, for floating point unit register-to-register transfers, shifting operations, sign changing, and for the Normalize instruction which will be more fully explained hereinafter. Bits 9-12 and 18-23 of the general instruction word are the operation code bits and specify the type of operation to be performed. The address control field bits are again bits 15, 16, and 17. For those instructions which require the shifting of information within the floating point unit bits 0-6 designate the number of bits to be shifted internally within the registers or from register-to-register in the floating point unit. For those instructions not requiring shifting, bits 0-6 will be 0's.

Figure 4C:
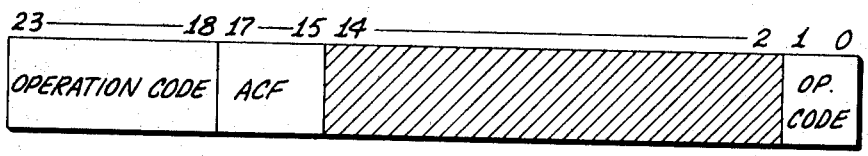
Figure 4D:
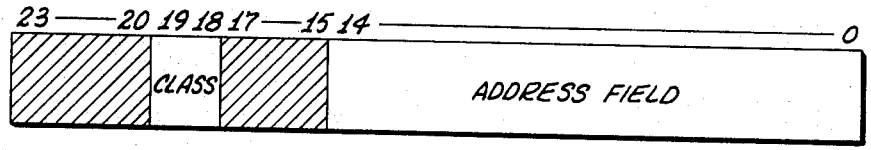
Figure 4E:
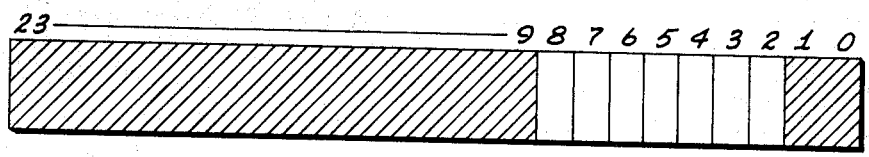
Figure 4F:
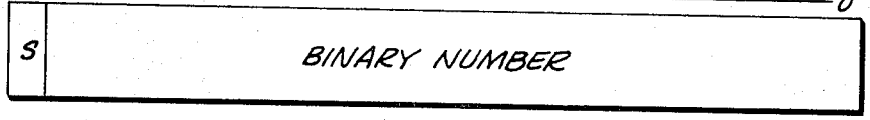

FIGS. 4c and 4d exemplify the format for the floating point operation instruction. This instruction is executed by the processing unit as a two address instruction. That is, the processing unit automatically executes this instruction by decoding the operation code (bits 0-1 and 18-23) of the first word (FIG. 4c), then accessing the second word (FIG. 4d) of the instruction from the memory unit. The address field of the second word, subject to modification, references an operand location in memory, this location being the location of a status word in memory having a format as shown in FIG. 4e. The address control field bits of the first word (FIG. 4c) are, as before, bits 15, 16, and 17. Bits 2-14 of the first word and bits 15-17 and 20-23 of the second word (FIG. 4d) are not used. Bits 18 and 19 (class bits) of the second word are examined by the processing unit for continuation of address modification after a first address modification sequence has been completed as specified by the address control field bits 15, 16, and 17 of the first word (FIG. 4c).

Referring again to FIG. 4e, the status word uses bits 2-8 as status indicators representative of various status conditions which can exist within the floating point unit. Bits 9-23 are not used. This status word, as specified by the operation code of the instruction (FIG. 4c) can be transferred to the Status Indicators 44 (FIG. 3) in the floating point unit 16, or the status of these Indicators 44 in the floating point unit can be transferred into the memory location as specified by the address field of the instruction (FIG. 4d).

The floating point unit 16 operates on fixed point and floating point data words or operands. The format for a fixed point data word is shown by FIG. 4f wherein bit 23 represents the sign (+ or −) of a number specified by bits 0-22.

Figure 4G:
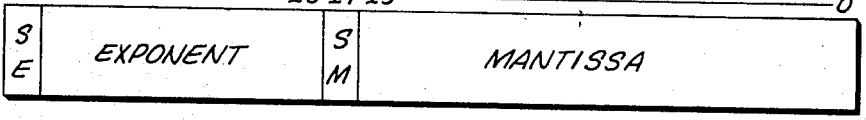
Figure 4H:
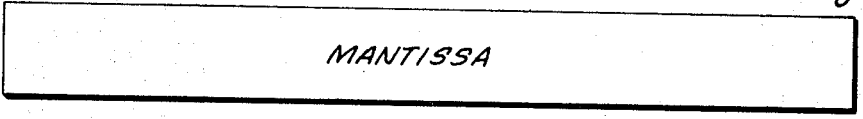

Floating point data words; i.e., quantities designated by an exponent and a mantissa, are 48 bits in length and are comprised of a pair of 24 bit words as may be seen in FIGS. 4g and 4h. The first word of the pair, FIG. 4g, includes a mantissa in bits 0-13 and a mantissa sign bit in position 14. Bits 15-22 of the first word represent the exponent and the sign of the exponent is designated by bit 23. The full 24 bit second word of the pair (FIG. 4h) is an extension of and completes the mantissa of the floating point word.

Figure 5B:
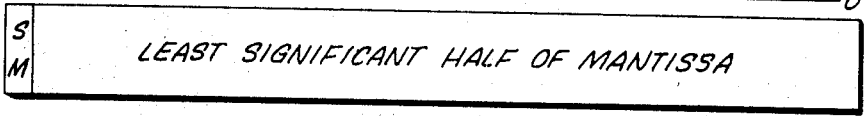

In the operation of the system the first word is retrieved from a location X in the memory unit 10 and is transmitted to the floating point unit 16 via the processing unit 12, followed by the second word from memory from location X+1. These two words are assembled in the floating point unit as shown in FIG. 5a which represents the contents in the floating point Accumulator (A-Register 26). As shown, the mantissa is in bit positions 0-37 with the mantissa sign as bit 38. The exponent is represented by bits 39-46 with bit 47 representing the exponent sign. If a mantissa of greater length than 38 bits is required, an extension of the mantissa of FIG. 5a may be placed in the Q-Register 32 of the floating point unit which serves as an extension of the A-Register. The contents of the Q-Register are shown in FIG. 5b in which bits 0-37 represent the binary value of the least significant half of the mantissa with bit 38 representing the sign. Bit 38 in FIG. 5b is used in conjunction with bit 38 of the mantissa in FIG. 5a to establish the final sign of the mantissa which is represented in bit position 38 of the Accumulator (FIG. 5a).

Figure 5C:
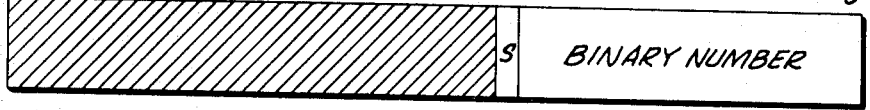

The floating point unit also operates on fixed point data which is represented in the floating point Accumulator in the format shown in FIG. 5c. Bits 0–23 represent the binary value of the number of the data word with bit 23 representing the sign of the number. Bits 24–47 of the Accumulator are 0's. Thus, the Accumulator contains no exponent when operating on fixed point data. In the operation of the system the fixed point data word is retrieved from the memory location X, the accessing of location X+1 not being required for floating point instructions which operate on fixed point data words.

INSTRUCTION REPERTOIRE

The instruction repertoire for the floating point unit can be broken down into four basic categories as follows:

Arithmetic Instructions
General Instructions
Branch Instructions
Floating Point Operation Instructions The following are brief descriptions of the several instructions executed by the floating point unit in each of the above categories.

ARITHMETIC INSTRUCTIONS

Floating Store (FST)

The contents (operand) of the A-Register 26 (FIG. 3) replace the contents of memory locations X and X+1. A-Register bits 24–47 are stored at location X and A-Register bits 0–23 are stored at location X+1. The contents of the A-Register are not changed. The operand in the A-Register is not normalized by this instruction. The fixed point mode flip-flop 58 in the floating point unit 16 must be reset to execute this instruction.

Fixed Store (FXST)

Bits 0–23 of the A-Register replace the contents of memory location X. The contents of the A-Register are not changed. The fixed point mode flip-flop in the floating point unit must be set to execute this instruction. It should be noted at this time that all instructions which operate in the fixed point mode must have the fixed point mode flip-flop 58 set by previously executing a floating point operation instruction, FPO (see below).

Move From Exponent (MFE)

The exponent field of the A-Register (bits 39–47) is stored in memory location X (bit positions 15–23). The contents of the A-Register are unchanged.

Move To Exponent (MTE)

The exponent field (bits 39–47) of the A-Register is loaded from memory location X (bits 15–23). The contents of memory location X are unchanged. The rest of the A-Register (bits 0–38) remains unchanged.

Add To Exponent (ADE)

The contents of memory location X (bits 15–23) are added algebraically to the exponent field of the A-Register (bits 39–47). The sum now forms the exponent field of the A-Register. The rest of the A-Register (bits 0–38) is unchanged. If under-flow or over-flow occurs, the corresponding indicator flip-flop (FUFH 52 or FOFH 50) is set. If over-flow occurs, binary zeros are placed in bits 0–38 of the A-Register, and the A-Register exponent is set to the largest negative exponent (−255 decimal). The contents of memory location X are unchanged.

Subtract From Exponent (SBE)

The contents of memory location X (bits 15–23) are subtracted algebraically from the exponent field of the A-Register. The remaining contents of the A-Register (bits 0–38) are unchanged. If over-flow or under-flow occurs, the contents of the A-Register exponent are set to the largest negative exponent (−255 decimal).

Fixed Load (FXLD)

The contents of memory location X replace the contents of bits 0–23 of the A-Register. Zeros are loaded into bit positions 24–47 of the A-Register. The contents of memory location X are unchanged. If the fixed point mode flip-flop 58 in the floating point unit is not set, it will be set during execution of this instruction.

Floating Load (FLD)

The contents of memory locations X and X+1 replace the contents of the A-Register with the contents of location X being loaded into A-Register bit positions 24–47 and the contents of location X+1 being loaded into A-Register bit positions 0–23. The contents of memory locations X and X+1 are unchanged. The operand in the A-Register is not normalized by the FLD instruction. If the fixed point mode flip-flop 68 in the floating point unit is set, it will be reset by this instruction.

Floating Add (FAD)

A floating point number (double word) in memory locations X and X+1 is added algebraically to the contents of the A-Register. The sum is left in the A- and Q-Registers in "sign plus absolute magnitude" format. The sign bit in the Q-Register is set equal to the A-Register mantissa sign bit.

Before two floating point numbers can be added or subtracted they must have equal exponents. The operation of achieving this condition in the floating point unit is referred to as mantissa adjustment and is accomplished by forming the difference between the two exponents and then shifting the mantissa of the smaller exponent to the right the number of places equal to the difference between the two exponents. The exponent of the floating point number thus adjusted is set equal to the larger exponent.

Binary 0's are placed in the Q-Register before execution of this instruction. If over-flow or under-flow occurs, the appropriate indicator flip-flop (FUFH 52 or FOFH 50) is set. If under-flow occurs, binary 0's are placed in bits 0–38 of both the A- and Q-Registers, and the A-Register exponent is set to the largest negative exponent (−255 decimal). The fixed point mode flip-flop must be reset to execute this instruction. Normalization is not performed prior to the execution of this instruction. If the floating point unit is in the normalized mode, the sum of the addition is left normalized in the A- and Q-Registers at completion of this instruction. The contents of memory locations X and X+1 are unchanged. A normal addition is executed if either or both mantissas are zero. When in the normalized mode, if the mantissa of the resultant sum, as now contained in the A-Register, is equal to zero, the A-Register exponent (bits 46–39) and the A-Register exponent sign (bit 47) are set to all 1's. As a result, the A-Register will have a zero mantissa with the largest negative exponent.

Fixed Add (FXAD)

At the initiation of this instruction, bit positions 24–47 of the A-Register and the entire Q-Register must contain 0's. The contents of memory location X are added to bits 0–23 of the A-Register and this sum is placed in bit positions 0–23 of the A-Register. The contents of the memory location X are unchanged. Bit 23 of the A-Register is the sign bit (0 for positive and 1 for negative). Negative numbers are represented in two's complement form. If the sum exceeds the capacity of bits 0–23 of the A-Register ($2^{23}-1$ if positive or $2^{23}$ if negative), the over-flowed data bit will be in the sign position (bit 23) and the floating point unit over-flow indicator flip-flop 50 is set. The fixed point mode flip-flop 58 in the floating point unit must be set to execute this instruction.

Floating Subtract (FSB)

The Q-Register is reset to all 0's before execution of this instruction and the fixed point mode flip-flop 58 must be in its reset state. The floating point number (double word) in memory locations X and X+1 is algebraically subtracted from the contents of the A-Register. The difference is placed in the A- and Q-Registers in "sign plus absolute magnitude" format. The sign bit of the Q-Register is set equal to the A-Register mantissa sign bit. Mantissa adjustment is performed in the A- and Q-Registers (bits shifted out of A are shifted into Q). If over-flow or under-flow occurs, the appropriate indicator flip-flop is set. In the case of under-flow, binary 0's are placed in bits 0–38 of the A- and Q-Registers and the A-Register exponent is set to the largest negative exponent (−255 decimal).

No normalization is performed in the execution of this instruction. If the floating point unit is in the normalized mode, the difference is left normalized in the A- and Q-Registers at completion of this instruction. The contents of memory are unchanged. A normal subtraction is executed if either or both mantissas are zero. When in the normalized mode, if the resultant A-Register mantissa is equal to zero, the A-Register exponent (bits 46–39) and the A-Register exponent sign (bit 47) are all set to binary 1's. As a result, the A-Register will have a zero mantissa with the largest negative exponent.

Fixed Subtract (FXSB)

Bits 24–47 of the A-Register and the entire Q-Register must be zero at instruction initiation. The contents of memory location X are subtracted from bits 0–23 of the A-Register. The difference is placed in bits 0–23 of the A-Register. The contents of memory location X are unchanged. Bit 23 of the A-Register is considered the sign bit with 0 for positive and 1 for negative. Negative numbers are to be represented in two's complement form. If the difference exceeds the capacity of bits 0–23 of the A-Register ($2^{23}-1$ if positive or $2^{23}$ if negative), the floating point unit over-flow indicator flip-flop FOFH 50 is set by the over-flowed data bit in the sign position. The fixed point mode flip-flop in the floating point unit must be in its set state to execute this instruction.

Floating Subtract Inverse (FSI)

This instruction is the same as FSB (Floating Subtract) except that the A-Register is subtracted algebraically from the floating point number in memory locations X and X+1. The contents of memory are unchanged.

Fixed Subtract Inverse (FXSI)

This instruction is the same as FXSB (Fixed Subtract) except that bits 0–23 of the A-Register are subtracted from the contents of memory location X. The difference is placed in bits 0–23 of the A-Register and the contents of memory location X are unchanged.

Floating Multiply (FMP)

The Q-Register is reset all binary 0's before the execution of this instruction. The floating point number in memory locations X and X+1 is multiplied by the contents of the A-Register. The product is placed in the A- and Q-Registers in "sign plus absolute magnitude." With the least significant half of the product in the Q-Register, the Q-Register sign bit is set equal to the A-Register mantissa sign bit.

Normalization is not performed prior to the execution of this instruction. If the floating point unit is in the normalized mode, the product is normalized in the A- and Q-Registers at completion of this instruction. If over-flow or under-flow occurs, the appropriate indicator is set. If under-flow occurs, binary 0's are placed in bits 0–38 of the A- and Q-Registers and the A-Register exponent is set to the largest negative exponent. The fixed point mode flip-flop 58 must be reset to execute this instruction. The contents of memory are unchanged. When in the normalized mode, if the resultant A-Register mantissa is equal to zero, binary 1's are placed in the A-Register exponent (bits 46–39) and the A-Register exponent sign bit 47. As a result, the A-Register will have a zero mantissa with the largest negative exponent. Also, if the resultant product is equal to zero, a check for under-flow is not made.

Fixed Multiply (FXMP)

Binary 0's are placed in the entire Q-Register and in bits 24–47 of the A-Register at instruction initiation. The contents of memory location X are multiplied by the contents of bits 0–23 of the A-Register, generating a 48 bit product which is placed in the A- and Q- Registers with the least significant 24 bits of the product in bit positions 0–23 of the Q-Register and the most significant 24 bits in bit positions 24–37 of the Q-Register, and 0–9 of the A-Register. The contents of memory location X are unchanged. The FFIX flip-flop 58 in the floating point unit 16 must be set to execute this instruction.

Floating Divide (FDV)

A floating point number contained in memory locations X+1. The Q-Register is used as an extension of the divi-Registers. The quotient is left in the A-Register and the remainder mantissa is placed in the Q-Register in "sign plus absolute magnitude." The remainder mantissa sign bit (bit 38 of the Q-Register) is set equal to the dividend mantissa sign bit. If the floating point unit is in the normalized mode, the quotient is normalized at completion of this instruction. The remainder in the Q-Register is not normalized. If an under-flow, an over-flow, or a divide check occurs, the appropriate indicator is set. If the condition is detected as under-flow or divide check, binary 0's are placed in bits 0–38 of the A- and Q-Registers, and the A-Register exponent is set to the largest negative value. The contents of memory are unchanged. If the floating point unit is in the single precision mode, binary 0's are placed in the Q-Register before the division is executed.

Fixed Divide (FXDV)

The contents of memory location X are divided into bits 0–23 of the Q-Register. Bits 24–38 of the Q-Register and bits 0–47 of the A-Register should be zero at instruction initiation. The quotient is left in bit positions 0–23 of the A-Register. No remainder will be generated and the Q-Register wil contain binary 0's (bits 0–38) at instruction completion. The contents of memory location X are unchanged. If an attempt is made to divide by zero, the divide check indicator is set and the contents of the A- and Q-Registers are not saved. The fixed point mode flip-flop in the floating point unit must be set to execute this instruction.

Floating Divide Inverse (FDI)

This instruction is the same as FDV (Floating Divide) except that the contents of the A-Register are divided into the floating point number in memory locations X and X+1. The Q-Register is used as an extension of the dividend mantissa if the floating point unit is in the double precision mode. If in single precision mode the Q-Register will contain all 0's. The contents of the memory unit locations are unchanged.

Fixed Divide Inverse (FXDI)

This instruction is the same as FXDV (Fixed Divide) except that bit positions 0–23 of the A-Register are divided into bit positions 0–23 of the Q-Register. Bit positions 24–47 of the A-Register, and 24–38 of the Q-Register, should be binary 0's at instruction initiation. The contents of memory location X are immaterial as they will be transferred to the floating point unit but will not be used and will not be changed.

Floating Compare (FCP)

The floating point number in memory locations X and X+1 is compared to the contents of the A-Register. The result of the comparison (A-Register contents less than, equal to, or greater than the contents of the memory locations) is transferred to the processing unit comparison indicators. For correct results, the numbers in the A-Register and from the memory locations must be normalized. The contents of the A-Register and memory remain unchanged. The fixed point mode flip-flop 58 (FIG. 3) in the floating point unit must be reset to execute this instruction. A number with a zero mantissa will compare "less than" any positive non-zero mantissa, independent of exponent values. Two numbers containing zero in their mantissa fields will compare "equal to," independent of exponent values.

Fixed Compare (FXCP)

The binary number in memory location X is compared algebraically to the contents of bits 0–23 of the A-Register. The result of the comparison (A-Register contents less than, equal to, or greater than) is transfererd to the processing unit comparison indicators. Bits 24–47 of the A-Register should be zero at instruction initiation. Negative numbers are considered to be in two's complement form with bit 23 being a binary 0 if the number is positive, or a binary 1 if the number is negative. The fixed point mode flip-flop 58 in the floating point unit must be set to execute this instruction.

GENERAL INSTRUCTIONS

Normalize (NRM)

The contents of the A- and Q-Registers are normalized. If under-flow occurs, the appropriate indicator is set. For each mantissa bit position shifted, one is subtracted from the A-Register exponent. If the floating point unit is in the single precision mode, the Q-Register will contain all binary 0's before normalization. If the floating point unit is in the double precision mode, the A-Register sign bit will be made a binary 1 if either the A- or Q-Register sign bits is a binary 1. If the A- and Q-Register mantissas are equal to zero, the A-Register exponent (bits 39–46) and the A-Register exponent (bits 39–46) and the A-Register exponent sign (bit 47) are all made binary 1's. As a result, the A-Register will have a zero mantissa with the largest negative exponent (−255 decimal).

Shift Right Binary/Shift Left Binary (SRB/SLB)

The mantissa field of the A-Register is shifted right or left the number of bit positions defined by the binary number in bits 0–6 of the address field of the instruction word. The sign bit does not shift and zeros are shifted into the vacated bit positions of the mantissa. The Q-Register is considered an extension of the A-Register and it is shifted along with the A-Register. Binary 0's are placed in the Q-Register in the single precision mode prior to executing SLB. If a bit is shifted out of the high order bit position during SLB, the over-flow indicator is set and the shifting continues the defined number of positions. The sign bit does not change. If the A-Register mantissa field is zero after execution of SLB or SRB, the A-Register mantissa sign bit (bit 38) will be set to 0. During SLB, if in the double precision mode, the A-Register sign bit will be set to a binary 1 if either the A- or Q-Register sign bit is a binary 1. The A-Register sign bit is made a binary 1 if either sign bit is a binary 1 during SRB Independent of the mode.

Set Sign Plus/Set Sign Minus (SSP/SSM)

The mantissa sign bit (bit 38) of the A-Register is reset or set. Reset corresponds to a binary 0 for a positive sign, and set corresponds to a binary 1 for a negative sign.

Change Sign (CHS)

The mantissa sign bit of the A-Register (bit 38) is replaced by its complement.

Exchange A and Q (XAQ)

The contents of the A- and Q-Registers are interchanged (sign and magnitude of the mantissa only). The exponent in the A-Register is unchanged. If the A-Register mantissa is zero, with the sign bit (bit 38) a binary 1 after being loaded from the Q-Register, the sign bit will be changed to a binary 0.

Load Zero Into Upper A (FLZU)

Bits 24–47 of the A-Register are all set to binary 0. Bits 0–23 of the A-Register and bits 0–38 of the Q-Register are unchanged.

Floating Load Zero (FLZ)

Binary 0's are placed into the A-Register mantissa field (bits 0–38) and the largest negative exponent (−255) is forced into the exponent field (bits 39–47). The Q-Register is not changed.

Floating Point Arithmetic Unit Branch Instructions

While the floating point unit does not actually execute branch instructions, the processing unit does execute five branch instructions, which are: Branch On Greater (BRG), Branch On Less (BRL), Branch On Even (BRE), Branch On Minus (BRM), and Branch On Zero (BRZ). As was previously explained with respect to the FCP (Floating Compare) instruction, the result of the Floating Compare is transferred to the processing unit comparison indicators. A correct branch, corresponding to the results of the FCP instruction, will be executed by the processing unit provided that the branch is made before execution of a processing unit instruction which affects the processing unit comparison indicators. The mantissa sign bit used for BRM is bit 38 of the A-Register, if not in fixed point mode, or if in fixed point mode, bit 23 of the A-Register. The processing unit executes the floating point unit branch instructions in the same manner as described in the aforementioned United States Pat. 3,413,609, with the exception that the branch decision is based on the floating point unit A-Register mantissa sign bit for BRM or A-Register mantissa contents for BRZ.

FLOATING POINT OPERATION INSTRUCTION

Floating Point Operation (FPO)

This instruction permits the status of specific ones of the floating point unit Status Indicators 44 (FIG. 3) to be stored in a location in the memory unit, or a status word in the memory unit to be placed into specified ones of the floating point unit status indicators. The status word in memory as previously described and as shown by FIG. 4e, uses bits 2–8 as status indicators. These are described as follows. Bit 2 of the status word is effective upon the unnormalized mode flip-flop FUNR 46 (binary 0=normalized mode, binary 1=unnormalized mode). Bit 3 corresponds to the double precision mode flip-flop FDPR 48 to specify either single precision or double precision operation (binary 0=single precision, binary 1=double precision). Bits 4 and 5 correspond, respectively, to the A-Register over-flow hold flip-flop FOFH 50 and under-flow hold flip-flop FUFH 52 (binary 1=over-flow or under-flow). Bit 6 relates to the divide check hold flip-flop FDCH 54 which is placed into its set state if an attempt is made to divide by zero during the execution of an FDV or FDI instruction. Bit 7 corresponds to the trap mode flip-flop FTRP 56 which when set places the floating point unit in a trap mode condition and a program interrupt will be requested of the procesing unit if over-flow, under-flow, or divide check occurs.

Referring now to FIG. 4c, there is shown the word format of the first word of the floating point operation instruction. This word contains the operation code in bits 0–1 and bits 18–23. The bit configuration of bits 18–23 defines the basic floating point operation instruction whereas bits 0 and 1 define the operation which is to be performed. When bits 0 and 1 contain a binary 00, the instruction is "Request Status" and the status (binary 1 or 0) of the specifier floating point unit indicator flip-flop is stored to a status word location in memory. When the bit configuration is a binary 01 the instruction is "OR from Stored Status Word to Floating Point Unit Indicators" indicating that for each bit (8–2) in the stored status word (FIG. 4c) which is a binary 1, the corresponding flip-flop in the floating point unit Status Indicator 44 is set. For any bit (8–2) which is a binary 0, there is no effect. When bits 0 and 1 contain a binary 10 the instruction is "AND from Stored Status Word to Floating Point Unit Indicators" indicating that for any bit (8–2) in the stored status word which is a binary 1, there is no effect and for any bit (8–2) which is a binary 0, the corresponding flip-flop in the floating point unit Status Indicators 44 is reset. When the bit configuration is a binary 11, the instruction is "Set the Stored Word into the Floating Point Unit Indicators" indicating that for any bit (8–2) in the stored status word which is a binary 1, the corresponding flip-flop in the floating point unit Status Indicators 44 is set. For any bit (8–2) which is a binary 0, the corresponding status indicator flip-flop is reset.

OPERATIONAL DESCRIPTION

The floating point unit 16 operates through the interface with the processing unit 12 (see interface lines of FIG. 2) and functions as a passive device. That is, it must be acted upon by an externally interconnected device, the processing unit 12 in the present specification, before it can perform its intended functions. The floating point unit relies on the processing unit to perform the following major functions: (1) instruction retrieval, (2) address modification, if required, (3) operand retrieval and storage, when required, (4) control of transmission of information items to and from the floating point unit, (5) synchronization of the floating point unit operation with the processing unit, (6) formulation of branch decisions based on the floating point unit status indicators, and (7) execution of program interruptions based on floating point unit trap signals.

Referring now to FIG. 6, there is shown a flow diagram representing the major logic decisions made and the functions performed during instruction retrieval by the processing unit 12 and instruction execution by the floating point unit 16. Beginning at point A of FIG. 6, the starting point in the flow diagram, it is seen that the processing unit will retrieve the instructions from the memory unit, and examine the contents of the address control field (bits 15, 16, and 17, as previously explained) to make a determination if address modification is required. If required, address modification is made. The processing unit after performing any required address modification on the first address of the instruction word, tests to see if the floating point unit 16 has completed executing a previous instruction. If the floating point unit is still executing a previous instruction, the processing unit will wait until the completion of that instruction. After the floating point unit completes the instruction execution (floating point unit goes not busy), the processing unit tests to see if a trap condition exists. In FIG. 6 this test is depicted by the block "Is RQT true?" If a trap condition does exist (RQT is true), the processing unit enters a program interrupt routine and the present instruction is aborted. In this case, after the processing unit acknowledges and services the program interrupt request from the floating point unit, it will return to the point in the program where it left off (point A in FIG. 6), retrieve the previously aborted instruction from the memory and continue the program. If at the end of instruction execution by the floating point unit the request trap indicator (RQT) was not set, that is, RQT was false, the processing unit tests to see if the instruction read out of memory is a floating point unit instruction. If it is not a floating point unit instruction, the processing unit will execute the instruction, return to point A of FIG. 6, and repeat the process again up to the point thus far described. If this instruction is a floating point unit instruction, the processing unit then tests to see if this is an instruction which makes use of the floating point unit Status Indicators 44 (FIG. 3) for instruction execution within the processing unit. If it is an instruction requiring use of the status indicators, the processing unit will execute the instruction and then continue by retrieving the next instruction from the memory (point A of FIG. 6). If the instruction, as decoded by the processing unit, does not involve the floating point unit Status Indicators 44 for its instruction execution, the processor immediately transfers the instruction across the interface to the floating point unit (point B of FIG. 6). Beginning at point B of FIG. 6 and after the transfer of the instruction, the floating point unit interrogates the operation code of this instruction to determine whether this instruction will require data transfer. If the instruction does not require data transfer, the floating point unit will immediately start execution of the instruction and the processing unit will fetch the next instruction from the memory as is shown in FIG. 6 by the point A indication after the block "Start FPU Instruction Execution." If the instruction decode indicates a data transfer is required and that data is to be sent from the floating point unit to the processing unit, the floating point unit will at this time send the first data word to the processing unit. If the floating point unit instruction decode indicates that the instruction requires data transfer from the processing unit, it will go into a wait cycle until the processing unit transfers the first data word to the floating point unit.

Immediately upon receipt of the first data word the floating point unit will commence instruction execution with, in the case of an instruction involving an algorithm operation of exponent arithmetic, the operation upon the exponent. If the instruction is decoded by the floating point unit as not requiring two data words, it will immediately complete its instruction execution and, simultaneously, the processing unit will retrieve the next instruction from memory while the floating point unit is executing its instruction. This operation is signified by FIG. 6 in the decision block "Does this Instruction Require Two Data Words?" where the "no" branch to point A is taken. If the instruction is decoded as requiring two data words, the floating point unit will enter a wait cycle after the exponent arithmetic operation until the processing unit transfers the second data word to the floating point unit. Upon receipt of the second data word the floating point unit will continue instruction execution. The processing unit will immediately retrieve the next instruction from the memory unit and perform any specified address modification on the first address. This retrieval and address modification by the processing unit occurs in parallel with the execution of the instruction by the floating point unit. The entire sequence just described is as indicated in FIG. 6 now repeated.

Referring now to FIG. 7, there is shown in major block diagram that portion of the processing unit 12 which is used in the present invention in combination with the floating point unit 16 (FIG. 3). For a more complete description and understanding of the processing unit, reference is once again made to the aforementioned U.S. Pat. 3,413,609. Before describing the operation of the processing unit's relationship to the floating point unit, it is well to consider the basic method of instruction processing within the processing unit and the component parts of the Control State Logic 42 (FIG. 3). The processing unit of the present specification utilizes a micro-instruction block selection scheme in order to implement the various sequences of events which take place during the execution of instructions within the processing unit. This micro-instruction block selection scheme is implemented by a W Selector 68 and a W Decode 70 (FIG. 7), the latter providing outputs W00 through W16, collectively referred to as the W outputs. The times of the W outputs from the W Decode 70 are referred to as micro-instruction blocks, or merely micro-blocks, wherein during the execution of instructions by the processing unit, various functions are performed such as register-to-register transfers, control flip-flops set, gating signals and information items transmitted across the interface to the floating point unit, etc.

Figure 8:
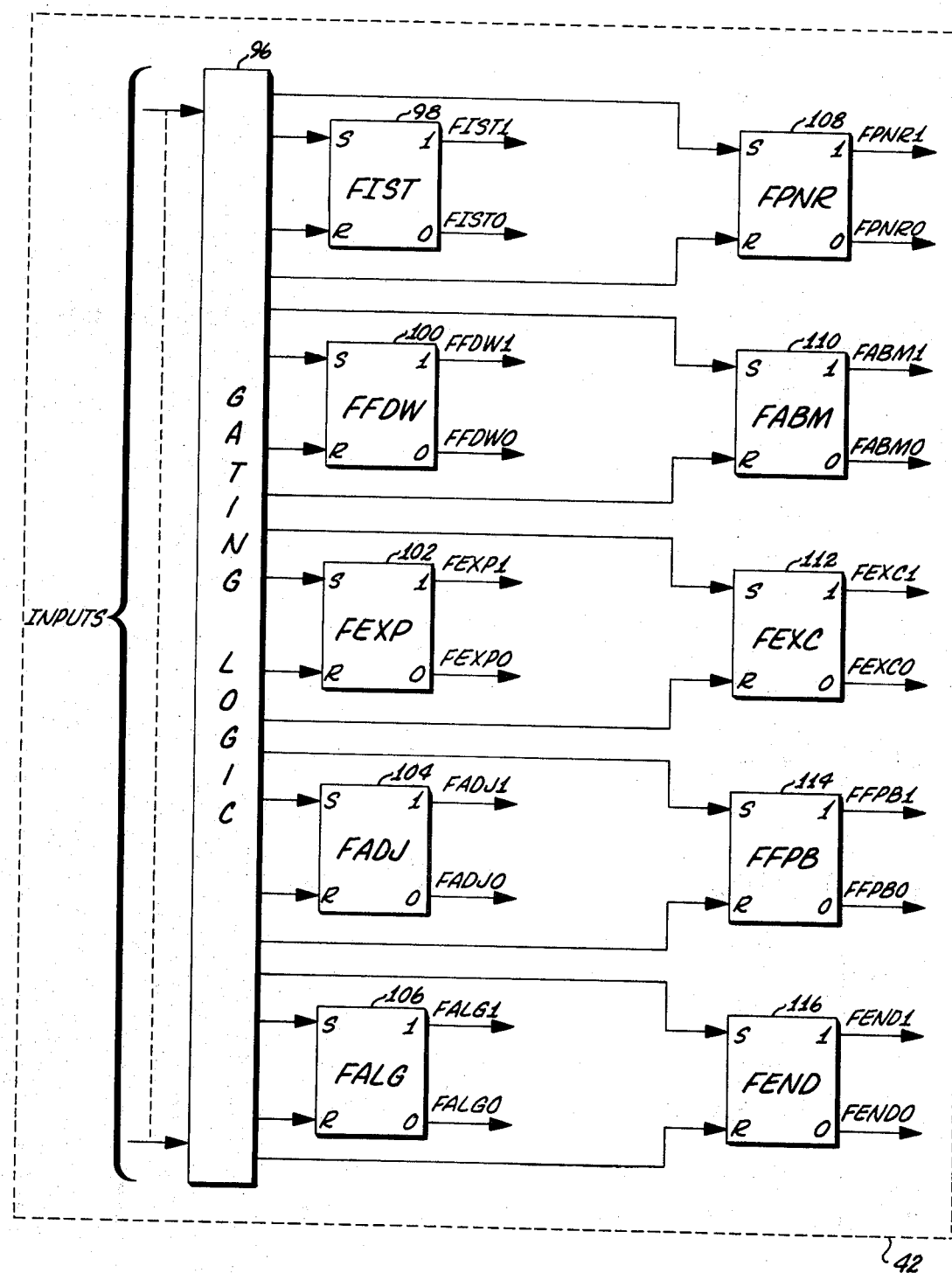
FIG. 8 is a block diagram showing in greater detail one of the elements of FIG. 3.

As was previously mentioned, the internal operation of the floating point unit 16 (FIG. 3) is governed by the several outputs of the Control State Logic 42. More specifically, the Control State Logic 42 contains ten flip-flops the states of which provide the internal control signals for the floating point unit 16. These ten flip-flops are shown in FIG. 8. Referencing that figure, suitable gating logic 96 responsive to input signals provides the set and reset signals to the ten flip-flops. The first of these is an FIST flip-flop 98 (instrutcion signal time flip-flop) which is always set by the two interface signals ITS and I/DS received from the processing unit. The setting of this flip-flop, its set output FIST 1 being true, indicates that the processing unit 12 has retrieved a floating point in struction from the memory unit 10 and has placed the instruction on the information lines II00–II23 and IL0–IL4 for entry into the B-Register 20 via the B-Register transfer gates 18 (FIG. 3). This flip-flop can be set at any time while the floating point unit is executing an instruction. If this flip-flop 98 is in its set state during the execution of an instruction by the floating point unit the flip-flop will be reset upon completion of instruction execution. This flip-flop is also reset if the FTRP (trap mode flip-flop) 56 (FIG. 3) is set and either an under-flow, an over-flow, or a divide check occurs. The resetting under these latter conditions is desirable since the occurrence of a trap condition requires that the last instruction retrieved from memory by the processing unit be aborted and the resetting of this flip-flop prevents gating the instruction word into the B-Register 20.

A FFDW flip-flop 100 establishes the first data word control state and is set by all instructions after the FIST flip-flop 98 is set and after the floating point unit has completed execution of the previous instruction. When this flip-flop is in its set state, its output (FFDW1) is used to gate the instruction word into the top half of the B-Register (bits 24–43). When it is in the reset state its output (FFDW0) is used to gate a second data word into the lower half of the B-Register (bits 00–23). It is also in the set state during transmission of the first data word into the B-Register 20 and controls gating of this first data word into the top half of the B-Register. Therefore, this flip-flop establishes a control state for gating the instruction word into the B-Register, and if the instruction requires data transfer it controls the transfer of the first operand word into the upper half of the B-Register. It is reset to control the gating of the second operand word into the lower half of the B-Register.

A third flip-flop FEXP (exponent calculation state flip-flop) 102 is placed into the set state by all instructions requiring an exponent calculation at the time of the receipt of the first floating point data word. That is, it is set during the FFDW1 control state. All required exponent arithmetic is performed while the FEXP flip-flop 102 is set and the second data word is also transferred to the floating point unit during this period of time. A FADJ flip-flop 104 (adjust mantissa control state flip-flop) is set by all instructions requiring initial mantissa adjustment during the FEXP control state upon the concurrent receipt of the second I/DS (instruction data signal) and a true ITS (instruction time signal) from the processing unit. This flip-flop is also set during the execution of the instructions and during mantissa adjustment necessary in SLB (shift left binary) and the SRB (shift right binary) the execution of the FAD (floating add), FSB (floating substract), and FSI (floating subtract inverse) instructions. It is also set during the time that the divisor, with the dividend shifting left simultaneously, is normalized prior to execution of the FDV (floating divide) and FDI (floating divide inverse) instructions. During the execution of the FCP (floating compare instruction), where mantissas are compared, this flip-flop is also set.

An additional flip-flop 106, designated FALG (algorithm execution control state flip-flop) is set during the execution of multiply and divide instructions. A FPNR flip-flop 108 (post normalization control state flip-flop) is set by instructions requiring normalization of the mantissa after execution of the instruction, or by execution of NRM (normalize instruction). Instructions which require normalization of the mantissa after execution and which cause this flip-flop 106 to enter into the set state are the FAD (floating add instruction), FSB (floating subtract instruction), FSI (floating subtract inverse instruction), FMP (floating multiply instruction), FDV (floating divide instruction), FDI (floating divide inverse instruction), and the previously mentioned NRM instruction. However, if the floating point unit is not in the normalized mode; i.e., it is in the fixed point mode, this flip-flop is not set except during the execution of the NRM instruction. As a result, the mantissa will not be normalized during the execution of the previously mentioned instructions.

Also included within the Control State Logic 42 as shown in FIG. 8 is a FABM flip-flop 110 (absolute magnitude control state flip-flop) which is set during the execution of FAD (floating add instruction), FSB (floating subtract instruction), and FSI (floating subtract inverse instructions) when the result of the arithmetic operation is in two's complement form and when the floating point unit is in the floating point mode. While in this control state the absolute magnitude of the arithmetic result is formed and the mantissa sign bit is corrected accordingly.

A FEXC flip-flop 112 (execution in process flip-flop) is set after the floating point unit has received all operand words from the processing unit. This flip-flop remains set during execution of instructions by the floating point unit and is reset during the FEND control state. The output of this flip-flop is used as one of the set inputs to a FFPB flip-flop 114 (floating point busy flip-flop), the output of which is used to inform the processing unit when the floating point unit is ready to accept and execute another instruction. The FFPB flip-flop 114 is set by the SFPB (set floating point busy flip-flop) interface signal from the processing unit if the floating point unit has not completed the execution of the present instruction; that is, the FEXC flip-flop is set and the floating point unit is not in the FEND control state. The output of flip-flop FFPB provides the previously described interface signal FPB to the process unit 12.

A FEND flip-flop 116 (end of instruction flip-flop) is set at the completion of instruction executions. The output of this flip-flop is used to initialize the floating point unit for receipt of the next instruction from the processing unit.

With reference once again to FIG. 7, when an instruction involving the floating point unit is being processed by the processing unit, the W Selector 68 will step through the appropriate W micro-blocks as dictated by the contents of an I-Register 78 as decoded by decoding logic designated Instruction Decode 80 to provide the various W output signals to the processing unit for control of its operation. The W Decode 70 provides one of the timing signals (ITS) to the floating point unit for gating information across the interface into the floating point unit. As previously mentioned, the floating point unit is a passive device which must receive appropriate input signals from the processing unit to initiate its operation. The execution of an instruction begins in the W00 micro-block with the retrieval of a floating point instruction word from the memory unit 10 (FIG. 7) at a memory location as specified by the contents of a P-Register 72 via an Address Decore 74. The floating point instruction thus retrieved is placed in an M-Regiser 76 and the operation code portion of this instruction is delivered from the M-Register to the I-register 78 to be decoded by the Instruction Decode 80. Simultaneously with the transfer to the I-Register 78, the instruction word is transferred from the M-Register 76 to a Processor Adder 82 and from there into an E-Register 84. The information contained in the E-Register 84 is present on the II00–II23 lines which interface with the floating point unit, and the information in the I-Register 78 (all or part of the instruction operation code) is present on the interface lines IL0–IL4. The information contained in the E-Register 84 will be either information not used by the floating point unit for instruction decoding or it can be information representative of a portion of the operation code which cannot be contained in the I-Register 78 due to the physical size of the register.

Also during the W00 micro-block the processing unit checks the address control field (ACF) to determine if address modification is to be performed. This is represented in FIG. 7 by a line designated M15–17 extending from the M-Register 76 to a block labeled Processing Unit Control Logic 86. If no address modification is specified, the Control Logic 86 sends a signal to the set input of a flip-flop FIDS 88 (instruction data signal flip-flop). If address modification is specified, a signal from the Processing Unit Control Logic 86 causes the W Selector 68 to go to the W01 micro-block during which time the specified address modification is performed on the address field of the instruction. In this latter situation the FIDS flip-flop 88 will be set by a signal from the Processing Unit Control Logic 86 generated during the W01 micro-block. The FIDS flip-flop 88 is reset by a signal from the Control Logic 86 during the W00 or W01 micro-block in which it was set.

The output from the FIDS flip-flop 86, I/DS (information data signal), is transmitted across the interface to the floating point unit 16 and is used in conjunction with a signal ITS (instruction time signal), generated by the W Decode 70, to set the FIST flip-flop (FIG. 8), the set output of which designates that an instruction word is on the interface lines (II00–II23 and IL0–IL4).

The ITS signal from the W Decode 70 is true at all times except during the W09 micro-block. The W09 micro-block is entered by the W Selector 68 for all instructions which are decoded requiring operand transfers to the floating point unit. If the floating point unit instruction as decoded by the processing unit specifies that operand data must be transferred to the floating point unit, the W Selector will enter the W09 micro-block and the operand word or words will be retrieved from the memory unit 10 locations X and X+1, these addresses being specified by the contents of a D-Register 90 via the Address Decode 74. The operand words from locations X and X+1 are successively read from the memory unit 10 through the M-Register 76, the Adder 82, and into the E-Register 84. When the W Selector 68 steps to the W09 micro-block, the FIDS flip-flop 88 is set and the signal I/DS sent to the floating point unit. The I/DS signal is interpreted as a data time signal and is used to control the gating of the data into the floating point unit B-Register 20 (FIG. 3). Simultaneously, the ITS signal from the W Decode 70 (FIG. 7) now goes not true for, as previously mentioned, ITS is true at all times except during W09. Therefore, the signals ITS false and I/DS true are interpreted by the floating point unit 16 as a data time signal and not at an instruction time signal. (Both ITS and I/DS must be true to generate an instruction time signal within the floating point unit.)

For those floating point unit instructions requiring two operand words from the processing unit, the processing unit must cycle through the W09 micro-block twice. This is controlled by a signal from the Processing Unit Control Logic 86 which sets a FFT9 flip-flop 92 (first time through W09 flip-flop) the first time the W09 micro-block is entered. The setting of the FFT9 flip-flop forces the W Selector 68 to remain in the W09 micro-block for a controlled time period, during the first time through the W09 micro-block, the flip-flop FIDS 88 is set as was previously described, and then reset later during the same W09 micro-block, and the first operand word is transferred into the floating point unit 16 from the E-Register 84 via the interface lines II00–II23. On the second time through the W09 micro-block, the FFT9 flip-flop 92 is reset by a reset signal from the Processing Unit Control Logic 86. Also during this time the FIDS flip-flop 88 is again set and reset and the second data word is transferred into the floating point unit. As soon as the FFT9 flip-flop resets, it supplies a signal to the W Selector 68 which causes the W selector to return to the W00 micro-block, and the next instruction will then be fetched from the memory unit.

The FIX signal (fixed point mode) derived from the FFIX flip-flop 58 of the floating point unit (see FIG. 3) delivered to the Processing Unit Control Logic 86 determines whether the W Selector 68 will go through the W09 micro-block once or twice during the fetching of operands from the memory unit 10. If the instruction operation code is decoded as a fixed mode instruction, the FIX signal will be true. When FIX signal is true, it prevents the FFT9 flip-flop 92 (FIG. 7) from being set on the first time through the W09 micro-block resulting in the W Selector 68 returning to the W00 micro-block to fetch the next instruction from memory.

As previously mentioned, the instruction word is transferred to the floating point unit 16 from the processing unit 12 during the time of the W00 micro-block. Also during this time a signal SFPB (set floating point busy flip-flop) from an AND-gate 94 (FIG. 7) is transmitted over to the floating point unit. This signal will set the floating point busy flip-flop (FFPB 114, see FIG. 8) if the floating point unit is still executing an instruction. When this flip-flop sets, the FPB signal (FIG. 7) will go true and, via the Processing Unit Control Logic 86, force the W Selector 68 into the W16 micro-block where the processing unit waits until the floating point unit completes its instruction execution. When this latter event occurs the FPB signal will go false and the processing unit will continue its program execution.

When required as specified by the ACC (bits 15–17 of the instruction word, see FIG. 4a) address modification will be performed on the instruction. If address modification is to be performed the W Selector 68 will step from the W00 to the W01 micro-block. If at the end of the W00 or, when used, the W01 micro-block, the floating point unit is still executing the previous instruction, the floating point busy signal FPB coming from the floating point unit into the Processing Unit Control Logic 86 will generate a signal with the Processing Unit Control Logic 86 will generate a signal within the Processing Unit Control Logic which will force the W Selector 68 into a W16 micro-block. The W16 micro-block is referred to as a floating point unit wait cycle. The W16 micro-block provides a W00–W15 inhibit signal to the W Decode 70 as shown in FIG. 7 in a manner similar to an R sequence inhibit described in the previously mentioned United States patent. While the processing unit is waiting in the W16 micro-block, the floating point unit is completing the execution of its instruction.

Immediately completion of the execution of the instruction by the floating point unit, the processing unit checks to see if the signal RQT (Request Trap), indicating an under-flow, over-flow, or divide check occurred in the floating point unit, exists. If the RQT signal is true, the Processing Unit Control Logic 86 issues a program interrupt to the processing unit causing it to enter into a program interrupt subroutine. During the program interrupt subroutine, the instruction which had just been retrieved from memory is aborted. Upon termination of the program interrupt subroutine, the subroutine program will re-address memory at the last address retrieve the aborted instruction from the memory unit 10 and continue to decode and process the instruction in the manner as previously described. If, however, the RQT signal was false when the floating point busy line EFB went false (the floating point unit has completed execution of its instruction) the processing unit will continue to process the instruction just retrieved. If this instruction requires a data transfer to the floating point unit 16, the data word(s) will be delivered thereto from the specified memory location(s). If this instruction does not involve the floating point unit 16, the processing unit will execute the instruction.

From that just described, it is seen that floating point unit 16 is capable of parallel operation with the processing unit 12. That is, while the floating point unit is executing an instruction, the processing unit is retrieving the next instruction from the memory and performing address modification on the address portion of the instruction word. In brief summary of this operation, the processing unit 12 retrieves a floating point instruction word from the memory unit 10 (FIG. 7) during the W00 micro-block. If address modification is required the processing unit will cycle to the W01 micro-block and perform address modification. From the W00 micro-block, or from the W01 micro-block where address modification is specified, the processing unit will move to the W09 micro-block. The W09 micro-block will be utilized either once or twice depending upon whether the instruction is decoded as requiring one or two operands. The operand(s) will be brought from the specificed location or locations in the memory unit 10 and delivered to the floating point unit.

As soon as the floating point unit receives the first operand data word it will begin instruction execution. The processing unit will now return to the W00 micro-block, retrieve the next instruction word from memory and, if required, perform address modification on the address contained in the instruction word after stepping to the W01 micro-block. After performing the instruction retrieval and address modification where required, the processing unit will check to ascertain if the floating point unit is still executing the previous instruction and, if so, the processing unit will enter the W16 micro-block (floating point wait cycle). Thus, the floating point unit instruction execution is done in parallel with instruction retrieval and address modification by the processing unit.

At the termination of instruction execution in the floating point unit, a check is made to determine whether or not to enter a program interrupt subroutine (for underflow, over-flow or divide check) and if so this is accomplished with a subsequent return to the normal program. If such a subroutine is not necesary, the normal program will be continued.

INSTRUCTION EXECUTION

Before beginning the description of floating point unit instruction execution, it is believed advantageous to consider the basic timing within the floating point unit 16. Referencing again FIG. 3, the previously mentioned GCLK signal is supplied to the floating point unit 16 from the processing unit 12 and terminates in the floating point unit at the Gated Clock Amplifiers 64. The GCLK signal is a continuous string of pulses with a frequency of, for example, 350 nanoseconds and is used to clock information throughout the floating point unit by providing clock pulses into the Gated Clock Amplifiers 64 and into the Timing Counter 66. It is also used throughout the floating point unit to clock data and control signals into registers and for setting and resetting flip-flops.

The Timing Counter 66 provides the basic timing within each of the control states in the floating point unit and consists primarily of six flip-flops with respective outputs FTC0–FTC5. The Timing Counter 66 functions basically as a ring type counter. However, it has the additional capability, due to suitable input gating logic, of returning to its FTC0 output state from any of the other output states and returning to the FTC1 output state from the FCT2 or FCT3 output states. The Timing Counter also may be latched into the FTC1 state in the performance of shift functions in the FADJ, FALG and FPNR control states (see FIG. 8). As each new control state is entered, the Timing Counter is set to its FTC0 output state. Each of the Timing Counter flip-flops is set or reset by the combination of the GCLK signal with an enable signal as dictated by a function being performed in the various control states. As such, each of the FTC0–FTC5 outputs has a basic duration equal to that of the frequency of the GCLK signal, in the present example 350 nanoseconds. The exception to this general rule is when the Timing Counter 66 is latched in the FTC1 state during the execution of the previously mentioned shift functions.

During the execution of instructions by the floating point unit 16, the Timing Counter 66 will be stepped through the FTC0–FTC5 output states either sequentially or nonsequentially as dictated by the instruction being executed and the control state in which the floating point unit exists during the execution of an instruction. While the floating point unit is executing instructions, various operations take place during each control state for each FTC time (FCT0–FCT5) which occurs during that control state. For example, in the execution of the Floating Add instruction during the FEXP1 control state (FIG. 8), at FTC0 time the B-Register bits 39–46 will be complemented. The FTC0 flip-flop will then be reset, the FTC1 flip-flop will be set and a carry will be placed in the least significant bit position of the exponent portion of the Adder 28 (bit position 39). Another example of operations which may take place during the FEXP1 control state at FTC2 time is the transferring of the Adder bits 39–46 to the A-Register bits 39–46, and the transferring of the A-Register bits 39–46 to the B-Register bits 39–46. The complete sequence of operations which the Timing Counter steps through during the execution of instructions will be more fully explained in the following description of instruction execution.

The Gated Clock Amplifiers 64 (FIG. 3) provide outputs, during various control states, which occur during various FTC times. In the execution of instructions it is necessary to provide signals for gating information into and out of registers, between registers and for shifting operations within registers. The Gated Clock Amplifiers 64 provide output signals shown in FIGS. 9, 11, and 13 and described in the following three paragraphs.

Figure 9:
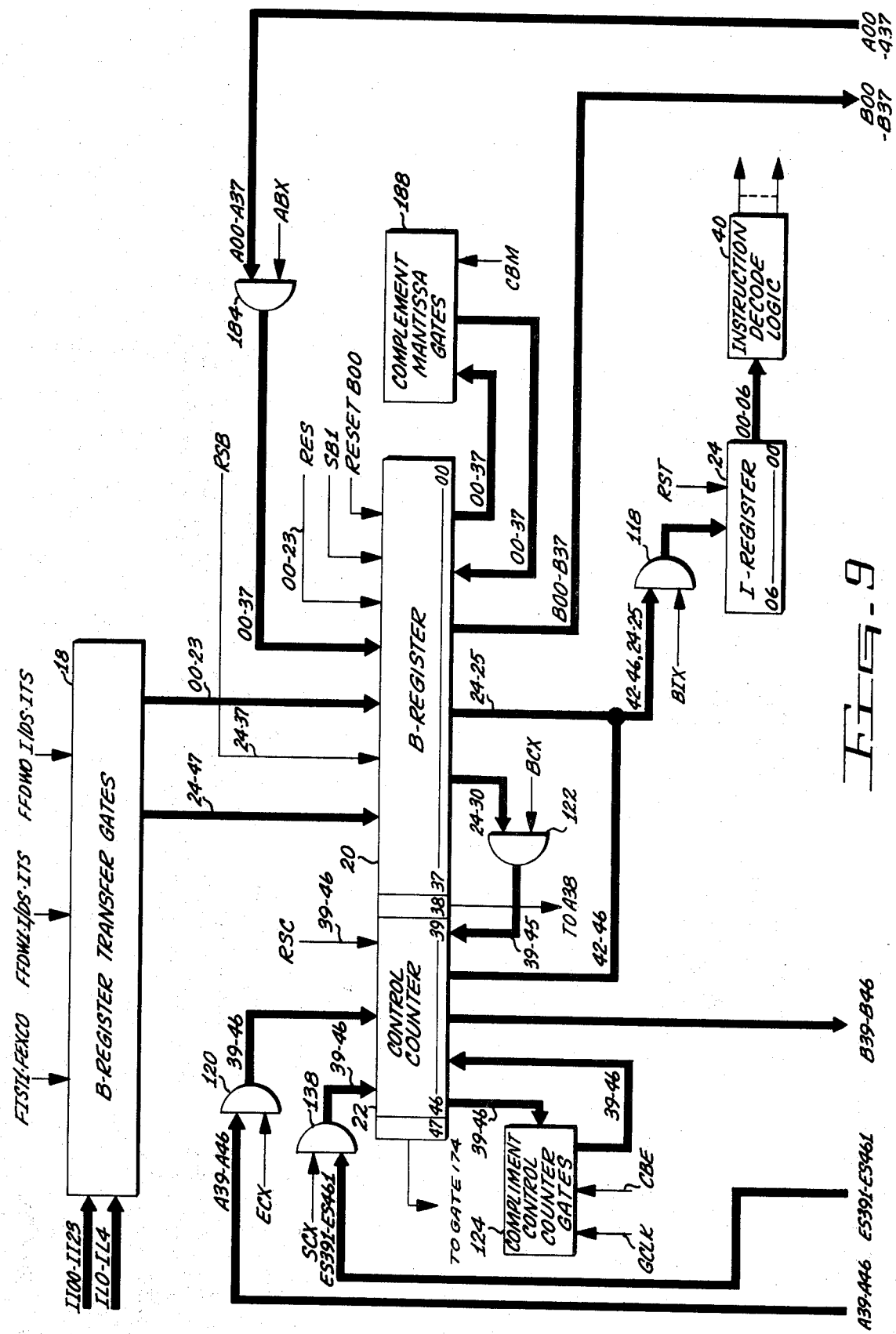

With specific reference now to FIG. 9, a signal BIX is true when the operand of an instruction word in the floating point unit 16 is being transferred from the B-Register 20 into the I-Register 24. Another signal, RST (initial clear) is used to reset (all binary 0's) the I-Register 24. The A-Register mantissa field is transferred to the B-Register mantissa field by a signal ABX. The resetting of bits 00–23 of the B-Register is provided by a signal RES and similarly a signal RSB is used to reset B-Register bits 24–37. An additional signal, RSC, resets bits 39–46 of the Control Counter 22. The B-Register mantissa field can be shifted left one bit by a signal SB1. During execution of the SLB (Shift Left Binary) and SRB (Shift Right Binary) instructions, a shift count contained in bit positions 24–30 of the B-Register is transferred into Control Counter bit positions 39–45 by a signal BCX. While the floating point unit is executing instructions involving exponent calculations, the exponent sum is transferred to the B-Register exponent field by a signal SCX. In a similar manner, the A-Register exponent is transferred into the B-Register exponent by a signal ECX.

Figure 11:
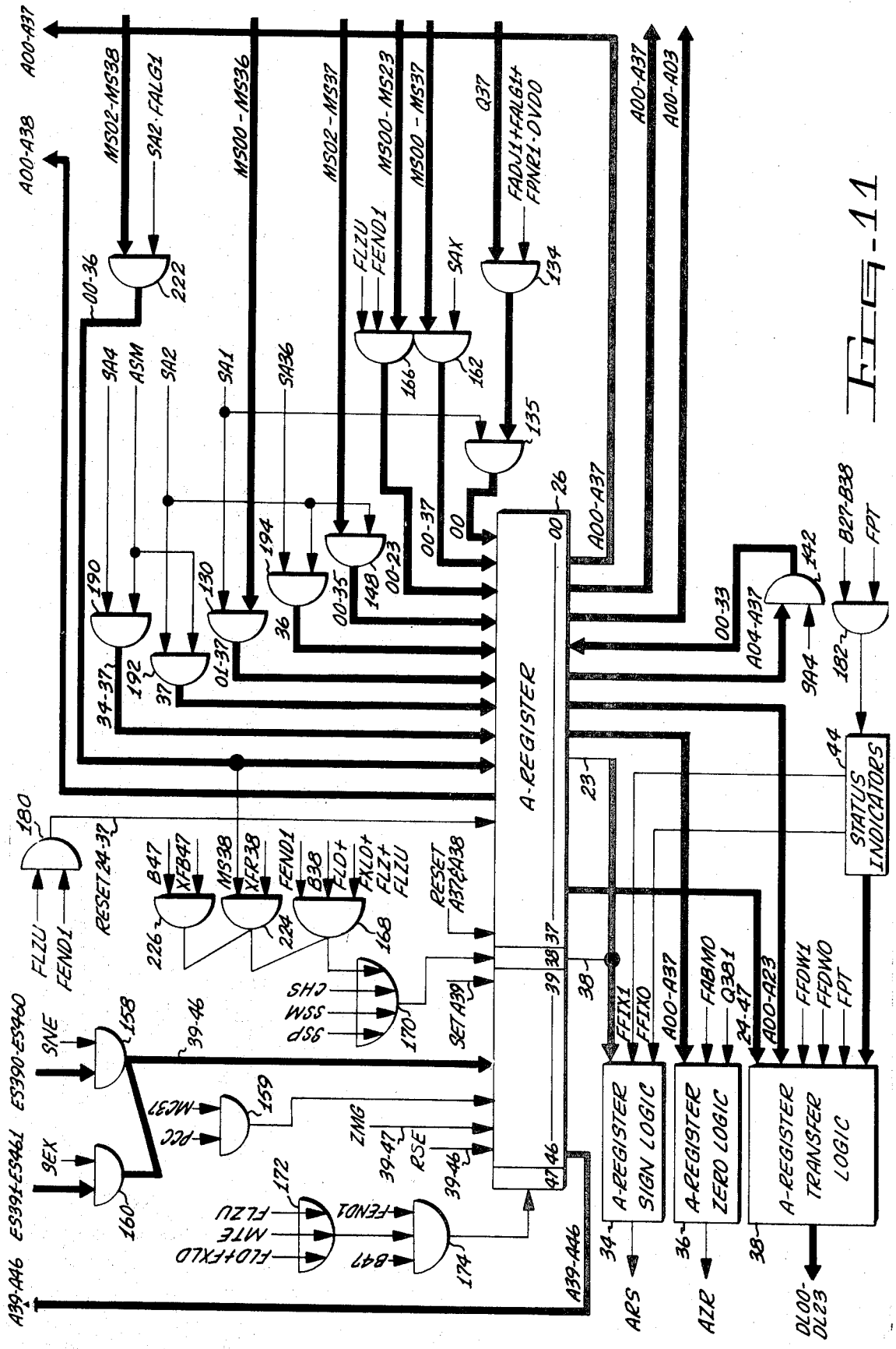

Referring now to FIG. 11, a signal RSE is shown which is used to reset the A-Register exponent field, bits 39–46. During the execution of certain instructions, the mantissa sum from the Adder 28 is transferred into the A-Register 26 displaced left one bit by a signal SA1 which is also used to transfer bit 37 of the Q-Register 32 into bit 00 of the A-Register during shift left operations. The mantissa sum from the Adder 28 is transferred into the A-Register displaced right two bits by a second signal SA2. In addition, the A-Register mantissa field can be shifted right four bits by a signal SA4. Direct transfer of the mantissa sum from the Adder 28 into the A-Register mantissa field is performed by a signal SAX. During the execution of add, subtract, and multiply operations, a signal ASM is used to set binary 0's into A-Register bit positions 34–37, if an SA4 condition exists, or into bit position 37 if an SA2 condition exists. An additional signal SA36 is also used to place a binary 1 into bit position 36 of the A-Register 26. During the execution of instructions involving exponent calculations, a signal SEX is used to transfer the exponent sum from the Adder 28 into the A-Register exponent field. When during the execution of certain instructions it is desired to transfer the one's complement of the exponent portion of the Adder 28 into the A-Register exponent field, this is accomplished by a signal SNE. As was previously mentioned in the brief description of the instruction repertoire, during the execution of several instructions it is desirable to force the exponent field of the A-Register to the largest negative exponent (−255). This is accomplished by signal ZMG. A PCC signal is used to preset a binary 1 into A-Register bit position 39 during the execution of the Divide instruction when the dividend and divisor magnitudes are compared and a quotient exponent of 1 is generated due to the comparison.

As shown in FIG. 13, a signal AQX is used to transfer the A-Register mantissa field into the Q-Register mantissa field and a signal RSQ serves to reset the Q-Register. The Q-Register can be shifted left one bit by a signal SQ1 shifted right two bits by a signal SQ2, or shifted right four bits by a signal SQ4.

The signals just described will always appear within the various control states during a particular FTC (FTC0–FTC5) time while instruction executions are being performed. The signals are gated by the signal GCLK. Thus, the establishment of timing throughout the entire floating point unit is based on the clock repetition frequency of GCLK. That is, all flip-flops in the Control State Logic 42 and Timing Counter 66 and all outputs from the Gated Clock Amplifiers 64 are gated by the GCLK signal.

For purposes of clarity and recognition, attention is again called to the Instruction Decode Logic 40 (FIG. 3) which serves the function of decoding the operation code portion of the instruction as it is contained in the I-Register 24. The Instruction Decode Logic provides, in response to this decoding, signals throughout the floating point unit for the execution of the various instructions.

In addition to the Timing Counter 64 and the Gated Clock Amplifiers 66, the Algorithm Execution Control Logic 30 (FIG. 3) plays an important role in the overall operation of the floating point unit in that it supplies control signals for transferring information into the Adder 28 from the various registers at the appropriate times during the execution of instructions. The Algorithm Execution Control Logic 30 includes a multiplicity of flip-flops and associated logic and receives inputs from the Control State Logic 42, the Instruction Decode Logic 40, the Timing Counter 66, the B-Register 20, the Control Counter 22, the Q-Register 32, the A-Register 26, the Adder 28, and the Gated Clock Amplifiers 64. These inputs are decoded by appropriate logic in the Algorithm Execution Control Logic 30 and are used to set and reset flip-flops internal thereto but not individually shown in the drawing. The output signals from the Algorithm Execution Control Logic which control the inputs to the Adder 28 are shown in FIGS. 10 and 12.

Figure 10:
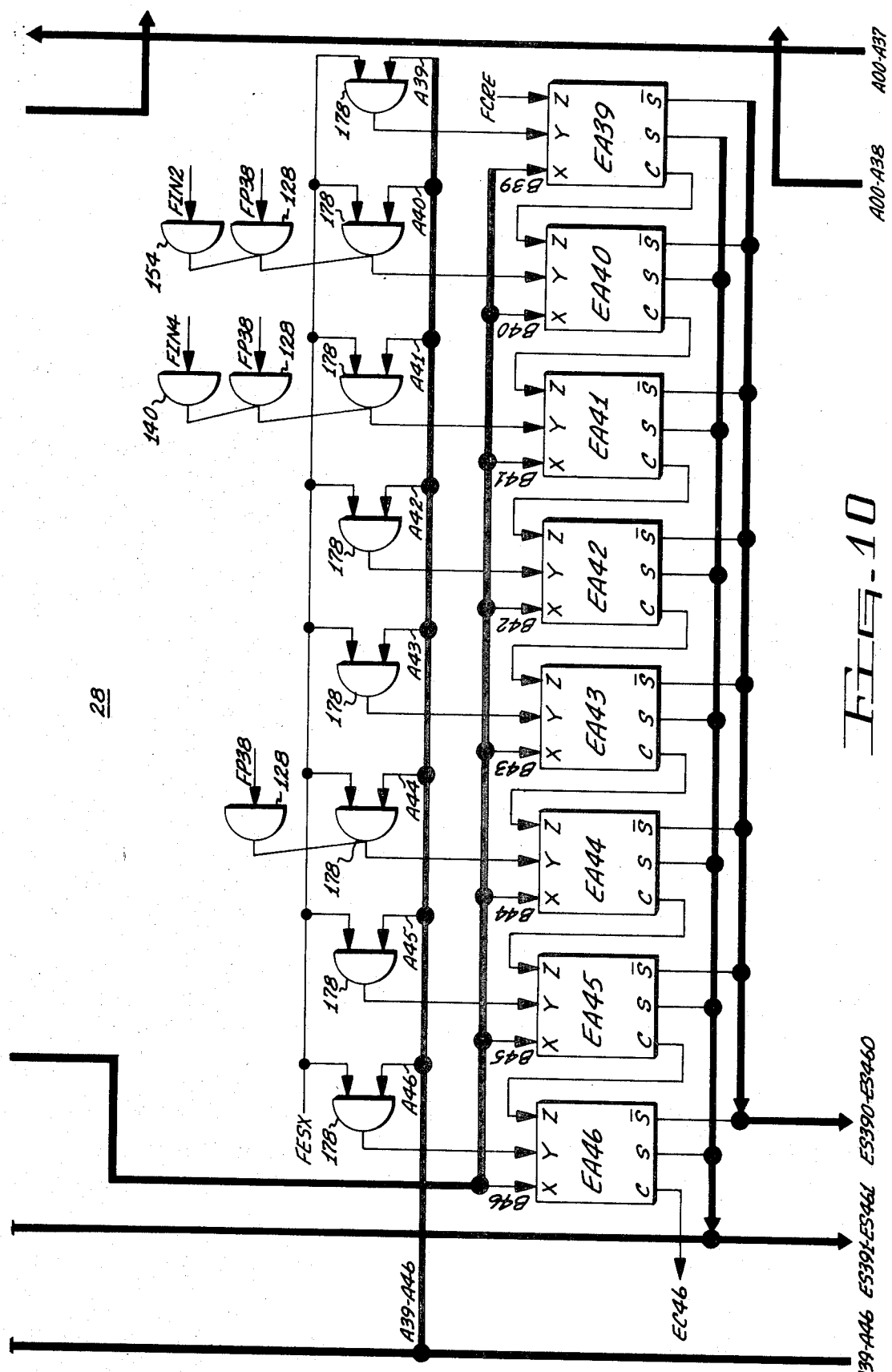

Referring now to FIG. 10, a signal FESX (A-Register exponent to Adder transfer) is shown which is used during exponent arithmetic calculations to transfer the A-Register exponent field into the Adder exponent field. A second signal FCRE (Initial Carry into Exponent Adder) is used to force a binary 1 into bit position 39 of the Adder 28 (EA39). The FCRE signal is also used in the incrementation of the Control Counter 22 which is performed by passing the contents of the Control Counter 22, bits 39–46 of the B-Register, through the Adder, bits 39–46. This incremented amount is then placed into the Control Counter 22 by the SCX signal previously described. The FCRE signal is additionally utilized to add a binary 1 to the one's complement of the B-Register exponent when forming the two's complement of the B-Register. In a manner similar to that just described the Control Counter 22 may be incremented by +2, +4, or +38 through the respective use of signals FIN2, FIN4, and FP38.

With reference to FIG. 12, a FASX signal (A-Register to mantissa Adder) serves to transfer the mantissa portion of the A-Register 26 into the mantissa portion of the Adder 28. A FBSX signal (B-Register to mantissa Adder transfer) transfers the mantissa portion of the B-Register 20 into the mantissa portion of the Adder 28. Similarly, the mantissa portion of the Q-Register 32 is transferred into the mantissa portion of the Adder 28 by a signal FQSX (A-Register to mantissa Adder transfer). A FACI signal (Adder Carry Inhibit) used to force early mantissa Adder settle out prior to transfer of shifting data through the Adder. When this signal is false (a binary 0) a "carry not" is forced into bits 4, 10, 16, 22, 28, 34, and 37 of the mantissa portion of the Adder. That is, a binary 0 is forced into these bits. During the execution of certain instructions it is necessary to force a binary 1 into bit position 00 (MA00) of the mantissa portion of the Adder 28. This is accomplished by a signal FCRM (Initial Carry into Mantissa Adder). This signal is used in a manner similar to the previously described FCRE signal in forming the two's complement of the mantissa.

The Adder 28, which is utilized in the majority of the instructions now to be described is basically a parallel adder of conventional design with its outputs reflecting the immediate state of its inputs. Two exceptions exist to this conventionality in that each Adder stage is provided with an extra output (designated $\bar{S}$ which reflects the inversion of the true output designated S) and the inclusion, at several stages of the mantissa portion of the Adder, of a "forced carry" feature both of which will be more fully discussed hereinafter.

Each Adder has three inputs, X, Y and Z, and three outputs, C, S and $\bar{S}$. The X and Y inputs are register and incrementing inputs and the Z input is the carry input, normally being connected to the C output of the previous stage. When the C output of a stage is true, this signifies the carrying of a binary 1 from that stage. The S output represents the binary sum of the inputs to that stage which the $\bar{S}$ output, as was previously stated, is the inversion of the S output. A truth table for the Adder 28 is:

| X | Y | Z | C | S | $\bar{S}$ |
|---|---|---|---|---|---|
| 0 | 0 | 0 | 0 | 0 | 1 |
| 0 | 0 | 1 | 0 | 1 | 0 |
| 0 | 1 | 0 | 0 | 1 | 0 |
| 0 | 1 | 1 | 1 | 0 | 1 |
| 1 | 0 | 0 | 0 | 1 | 0 |
| 1 | 0 | 1 | 1 | 0 | 1 |
| 1 | 1 | 0 | 1 | 0 | 1 |
| 1 | 1 | 1 | 1 | 1 | 0 |

Instruction Initiation

As was previously described, before the floating point unit can execute any instruction it must first receive an instruction word from the processing unit and then provide decoding of that instruction word. Referring now to FIGS. 9–13 (combined as is shown in FIG. 14), in conjunction with the flow chart of FIG. 15, two signals FIST1 and FEXC0 are applied to the B-Register transfer gates 18. It will be recalled that the floating point unit 16 must receive the instruction time signal ITS from the processing unit 12 to set the FIST flip-flop 98 (FIG. 8) which stores the fact that an instruction word is on the Information Item Lines II00–II23 and the Instruction Lines IL0–IL4 as shown in FIG. 9. The conditions for setting the FIST flip-flop 98 are shown in FIG. 15 where, upon receipt of the IST signal, the floating point unit tests to see if the FEXC flip-flop 112 (FIG. 8) is set. If the FEXC flip-flop is set, the floating point unit is still in the process of executing an instruction in which case the floating point unit enters into block 501 of FIG. 15. At this time the FIST flip-flop will be set providing the FTRP flip-flop 56 (FIG. 3) is not set and providing that none of the FOFH, FUFH, or FDCH flip-flops 50, 52, and 54 respectively are not set. If any of these conditions exist, an over-flow condition, under-flow condition, or divide check condition has occurred during the execution of the previous instruction and the floating point unit is requesting a trap condition.

At the termination of the test to determine if the FIST flip-flop 98 should be set, the FEXC flip-flop is again tested to see if it is in the set condition. If so, the floating point unit is still executing an instruction and the processing unit will idle until the floating point unit completes the instruction at which time the FEXC flip-flop will be reset. When the FEXC flip-flop resets, a test will again be made to determine if the FIST flip-flop is set (decision block "FIST set?" in FIG. 15). Providing none of the previously described error conditions have occurred, the FIST flip-flop is set at this time. If not, the operation just described will be repeated until such time that the FIST flip-flop is in its set condition. When the FIST flip-flop sets, the "Yes" path out of the "FIST Set?" block (FIG. 15) will be taken and block 503 of the flow chart entered. With the FIST flip-flop set and the FEXC flip-flop not set, the information on the Information Item Lines II00–II23 and Instruction Lines IL0–IL4 will be gated through the B-Register transfer gates 18 into bit positions 24–47 of the B-Register 20. The instruction word is now in the B-Register.

With the transfer of the instruction word into the B-Register, as shown by block 503 of FIG. 15, the FFDW flip-flop 100 (first data word flip-flop) is placed into the set condition thus preparing the floating point unit for the receipt of the first operand word. Since the instruction word is now in the B-Register, the FIST flip-flop is reset thus disabling the B-Register transfer gates 18. Simultaneously, the I-Register 24 is reset by the signal RST originating in the Gated Clock Amplifiers 64 (FIG. 3) and the Timing Counter 66 (FIG. 3) is set to the FTC0 output state in preparation for transferring the instruction word from the B-Register into the I-Register.

The floating point unit 16 now enters block 504 of FIG. 15 in the FFDW1 control state with the Timing Counter 66 at the FTC0 output state. At this time, referencing FIG. 9, bits 42–46 of the B-Register are transferred into I-Register bit positions 02–06 and bits 24 and 25 of the B-Register are transferred into the I-Register bit positions 00 and 01 via an AND-gate 118 by the gating signal BIX which originates in the Gated Clock Amplifiers 64. The I-Register contents are applied directly to the Instruction Decode Logic 40 where the operation code of the instruction is decoded. Since the instruction operation code is present in the I-Register 24 and is being decoded by the Instruction Decode Logic 40, it is no longer needed in the B-Register. Therefore, at this time bit positions 39–46 of the B-Register are reset to binary 0's by a signal RSC orignating in the Gated Clock Amplifiers 64. Also in block 504 of FIG. 15 at the termination of FTC0 time, the floating point unit Timing Counter 66 will be set to its FTC1 output state. At this time instruction decode is complete and the floating point unit will sequence to flow chart block 505 which is point 1 of FIG. 16.

Before proceeding to block 505, however, attention is specifically called to the left-hand "FEXC Set?" decision block of FIG. 15. It is there seen that the "No" branch takes the floating point unit into flow chart block 502. Block 502 is entered when the floating point unit is not executing an instruction and the FIST flip-flop 98 is set by the combination of signals ITS and I/DS. At this time the logic throughout the floating point unit will be cleared for receipt of the instruction to follow by the generation of the signals FQSX (Adder transfer signal) and FACI (Adder carry inhibit signal) both of which originate in Algorithm Execution Control Logic 30 (FIG. 3). Also during block 502, bit positions 39–46 of the B-Register 20 (FIG. 9) are reset by the signal RSC. In addition, bits 24–37 of the B-Register are reset by the RSB signal and bits 00–23 of the B-Register are reset by the RES signal. Both the RSB and RES signals have their origin in the Gated Clock Amplifiers 64. The Timing Counter 66 (FIG. 3) is completely reset at this time thus providing no Timing Counter output state to the floating point unit and the signals FASX, FBSX, FCRE, FESX, FIN2, FIN4, and FP38, all of which originate from the Algorithm Execution Control Logic 30, are disabled to condition the floating point unit for instruction execution. With the FIST flip-flop 98 set and the FEXC flip-flop 112 reset, the floating point unit will advance to the previously described flow chart block 503 and the operation will continue as previously described.

The operations described with respect to the flow chart of FIG. 15 are those necessary for the transfer of all instructions to the floating point unit and will be accomplished for each instruction to be executed. Therefore, in each of the ensuing explanations of instruction execution description will begin at flow chart block 505 of FIG. 16, it being assumed that the operations described with respect to FIG. 15 have been accomplished.

Referring now to block 505 of FIG. 16 in conjunction with FIGS. 9–13, it is shown that the FFDW flip-flop 100 (FIG. 8) is in its set state providing the FFDW1 output and that the Timing Counter is in its FTC1 output state. It will be recalled that these conditions were set in block 504 (FIG. 15) while the operation code portion instruction was being transferred from the B-Register 20 into the I-Register 24. In block 505 a multiplicity of operations take place depending upon the instruction to be executed. Certain operations which are common to nearly all instructions are listed in flow chart block 505 under the heading "All Instructions." At this time B-Register bits 38 and 47 are reset to binary 0's the FTC1 Timing Counter state is cleared, and the B-Register bits 24–37 are reset if the instruction being decoded is not a General Instruction. (Bits 24–37 of the B-Register are not reset at this time if the instruction being decoded is a General Instruction because these bits are used during the execution of this instruction.) It will be remembered from the discussion of block 502 (FIG. 15) that the signal FQSX was enabled. This was done at that time to prepare the Adder 28 for shifting the Q-Register 32 through the Adder if the instruction to be executed was an NRM (Normalize) instruction. However, if the instruction is not a Normalize instruction the signal FQSX will be disabled in block 505.

General Instructions

The execution of the General Instructions listed in the Instruction Repertoire is best understood with beginning reference to FIGS. 9 and 16 in combination. Assuming that the instruction loaded into the I-Register during flow chart block 504 (FIG. 15) is a Shift Left Binary instruction (SLB), the conditions necessary for the beginning of instruction execution are shown in block 505 under the heading "SLB or SRB." At this time the B-Register bits 24–30 are transferred via an AND-gate 122 (FIG. 9) into B-Register bits 39–45 by the BCX signal from the Gated Clock Amplifiers 64. Bit positions 39–46 of the B-Register 20 are designated the Control Counter 22 and the bits thus transferred represent the binary count of the number of bit positions the mantissa is to be shifted during the execution of this instruction. At this time, if the double precision flip-flop FDPR 48 (FIG. 3) is not set (the floating point unit is not in double precision mode), the Q-Register bits 00–38 are reset by the RSQ signal from the Gated Clock Amplifiers 64 as shown in FIG. 13. However, if the FDPR flip-flop is set, thus indicating that the floating point unit is in the double precision mode, the contents of the Q-Register will not be disturbed at this time since they will be used during the execution of this instruction. In this latter situation the A-Register sign bit 38 will be set to a binary 1 if the Q-Register sign bit 38 is a binary 1. Also at this time, since the instruction being executed does not require the transfer of operand data from the processing unit to the floating point unit, the FEXC flip-flop 112 (FIG. 8) is placed in the set condition. Since the mantissa is to be adjusted during the execution of this instruction, that is, the A-Register will be shifted if in single precision or the A- and Q-Registers will be shifted if in double precision mode, the FADJ flip-flop 104 (adjust mantissa control flip-flop) is placed in the set condition and the Timing Counter is set to its FTC0 output state.

The floating point unit tests, at the output of block 505, to determine if the floating point unit instruction being executed required the Timing Counter 66 to enter into the FTC2 output state. Since this is not the case in the execution of the present instruction, the floating point unit will take the "No" branch and then test to determine if this is a General Instruction. Since this is a General Instruction (SLB) requiring no transfer of data as previously described, the "Yes" branch from this decision block will be taken. Determination is then made as to whether or not the FEND flip-flop 116 (FIG. 8) is in the set condition. Since this instruction has not been completely executed at this time the FEND flip-flop will not be set and the "No" branch from that decision block will be taken. This branch in FIG. 16 references SLB of FIG. 18.

Referring now to FIG. 18 the floating point unit enters flow chart block 509 which represents the adjust mantissa control state with the FADJ flip-flop 104 being set. At FTC0 time the contents of B-Register bits 39–46 are complemented by a signal CBE (complement B exponent) which originates in the Gated Clock Amplifiers 64. As shown by FIG. 9, the CBE signal gates bits 39–46 of the B-Register into suitable logic designated Complement Control Counter Gates 124 which provides, at its output, the one's complement of its input. This output applied to the Control Counter 22 thus provides thereto the one's complement of the original contents of the Control Counter, that is, the one's complement of the number of shifts to be performed in the execution of the SLB instruction. It is significant to point out at this time that the Control Counter in the present embodiment can increment only. Therefore, by complementing the Control Counter contents, the number of shifts to be performed equals the count remaining before the Counter contains its highest count (all binary 1's). Therefore, the false side of the Control Counter output stages designates the number of shifts to be performed. Thus, with each shifting of the mantissa, the Control Counter is incremented by the number of shifts until it reaches its maximum count at which time the execution of the instruction is complete.

It will be remembered from the description of FIG. 3 that the Control Counter 22 provides inputs to the Algorithm Execution Control Logic 30. The Algorithm Execution Control Logic decodes the contents of the Control Counter 22 to control the shifting operation. This is represented in FIG. 18 by the decision block "$\bar{C}=0?$". That is, has the Control Counter reached its maximum count such that the false side of its outputs are binary 0's.

With specific reference now to FIGS. 12 and 18, it is shown that during block 509 the FASX signal (A-Register to Adder transfer) gates the mantissa portion of the A-Register 26 (bits 00–38) to the Adder 28 for shifting the mantissa through the Adder during the execution of this instruction. Also during block 509 the Timing Counter 66 is set to the FTC1 output state. At the output of block 509 a test is made to determine if the instruction being executed is an SLB instruction. If such is the case the "Yes" branch is taken from the decision block and a test is made to determine if the Control Counter false outputs are all binary 0's. Recalling at this time that the Control Counter 22 contains the one's complement of the number of bit positions to be shifted during the execution of this instruction, and assuming that the Control Counter contents do not equal zero, the "No" branch is taken from the "$\bar{C}=0?$" decision block and flow chart block 510 is entered. As can be seen in FIG. 18, the floating point unit 16 will cycle or loop in FADJ and FTC1 states (block 510) until the number of required bit positions has been shifted. While the floating point unit is looping through block 510 the contents of the A-Register 26, if the floating point unit is in single precision mode, or the contents of the A- and Q-Registers if the floating point unit is in double precision mode, will be shifted left one bit at a time and the contents of the Control Counter 22 constantly monitored to determine if the false outputs of the Control Counter are equal to zero. Each time the A-Register or the A- and Q-Registers are shifted left one bit, the Control Counter will be incremented by one. This amounts to decrementing the true magnitude of the shift count since the Control Counter at this time contains the one's complement of this true magnitude. Shifting left of the Q-Register is performed by shifting from bit position 37 of the Q-Register into bit position 00 of the A-Register. Shifting the A-Register left one bit position is accomplished by passing the A-Register through the Adder and gating the output of the Adder into the A-Register displaced left one bit position. If an over-flow condition occurs during the shift operation; i.e., a binary 1 is shifted from bit position 37 of the A-Register, the A-Register sign bit A38 is set to a binary 1. This fact is stored in the Algorithm Execution Control Logic as a temporary over-flow condition.

The manner in which the shifting operation of flow chart block 510 is accomplished is illustrated in FIGS. 9–13. As shown therein, A-Register bits 00–38 are supplied to the Y inputs of the Adder via input AND-gates 126. (While only three gates 126 have been shown, it is to be realized that those are representative and that a similar gate will exist for each of the thirty-nine stages of the mantissa portion of the Adder 28 of which only a representative portion has been shown.) The A-Register inputs to the Adder are enabled by the FASX signal applied to the second input of the gate 126. At this time the Adder sum output (S) represent the A00–A38 input binary bit structure. Since during the execution of the SLB instruction it is desirable to shift the counters of the A-Register left by one bit position, the Adder sum output lines designated MS00–MS36 are connected to an AND-gate 130 (FIG. 11) which receives an additional input gating signal designated SA1 (shift A mantissa left one bit). The SA1 signal which is present during flow chart block 510 (FADJ1 and FTC1) to gate the Adder bits MS00–MS36 back into the A-Register displaced left one bit into bits 01–37 as shown on the output of gate 130. Simultaneously, while shifting the A-Register left one bit the Q-Register (FIG. 13) is also shifted left one bit by the presence of a signal SQ1 (shift Q-Register left one bit) in cooperation with the SA1 signal. As seen in FIG. 13, the SQ1 signal is applied as one input to an AND-gate 132 as an enabling signal to shift the Q-Register bits QX0–Q36 respectively into Q-Register bit provisions QX1–Q37. Simultaneously, bit 37 of the Q-Register is connected to an AND-gate 134 which receives a second input FADJ1 (the true output from the FADJ flip-flop 104). The output of gate 134 forms one input to an AND-gate 135 which is enabled by the SA1 signal. The output of gate 135, bit 37 of the Q-Register, is applied to A-Register bit position 00. At this time the contents of the Q-Register have been shifted left one bit. (If this was a single precision operation, the SQ1 signal did not occur and the A-Register only was shifted.)

The incrementation of the contents of the Control Counter 22 as provided for in the present embodiment is best understood with reference to FIGS. 9 and 10. This is accomplished by applying the contents of the Control Counter 22 (bits 39–46 of the B-Register 20) to the X inputs of the exponent portion of the Adder 28 (EA39–EA46) simultaneously with the FCRE signal being applied to the Z input of Adder bit EA39. This application of the FCRE signal increments the existing contents of the Control Counter by one (decrementing its true magnitude by one) and the sum outputs of the EA39–EA46 stages of the Adder are delivered to the Control Counter via lines ES391–ES461 and an AND-gate 138 (FIG. 9) enabled by signal SCX derived from the Gated Clock Amplifiers 64. It is to be emphasized that this incrementing operation takes place simultaneously with the left shifting of the A- and/or Q-Registers and the storage of any over-flow condition. This incrementing operation will be repeated until the Control Counter contents are a maximum and the decision block "$\overline{C}=0$?" of FIG. 18 is satisfied. When this latter condition occurs, the shifting operation is complete and the "Yes" branch is taken from that decision block and block 511 (FIG. 18) is entered by the floating point unit. Upon entry into flow chart block 511, the FEND flip-flop 116 (FIG. 8) is set, the FCRE signal is enabled, and the FADJ flip-flop 104 is reset.

With the setting of the FEND flip-flop 116, instruction execution is essentially completed and, as is shown in FIG. 18, the floating point unit exits from flow chart block 511 and enters into the FEND control state shown in FIG. 17 (flow chart block 506). The FEND control state (block 506) is entered by all instructions upon completion of instruction execution and is a housekeeping period wherein the floating point unit is initialized for execution of the next instruction. Referencing now block 506 of FIG. 17, there are a number of operations which take place which are iterative for all instructions. If the floating point unit is not executing a FLD (Floating Load) instruction the A-Register sign bit A38 is reset (binary 0) if the contents of the A-Register mantissa (bits 00–37) are equal to zero. Also, if during the execution of instructions the Algorithm Execution Control logic 30 detected and stored the fact that an under-flow condition had occurred or if a divide check had occurred, the A-Register mantissa bits 00–38 are reset to binary 0's during the FEND control state. These bits are also reset at the end of the FLZ (Floating Load Zero) instruction. The detection of an under-flow or a divide check condition will also cause the Q-Register bits 00–38 to be reset at this time. The A-Register exponent bits 39–47 will be set to binary 1's during the FEND control state if an under-flow or a divide check operation was detected by the Algorithm Execution Control Logic during the instruction execution. If the floating point unit is not in the fixed point mode of operation, that is, FFIX flip-flop 58 (FIG. 3) is in the reset condition, the exponent portion of the A-Register (bits 39–47) are set equal to —255, the largest negative exponent. Bits 39–47 of the A-Register are also set to all binary 1's during execution of the FLZ (Floating Load Zero) instruction.

If upon entry into the FEND control state, FTRP flip-flop 56 of the Status Indicators 44 (FIG. 3) is set and if under-flow, over-flow, or divide check occurred during instruction execution, the FIST flip-flop 98 will be reset since it is desirable to abort the next instruction which is present on the Information Item Lines II00–II23 and the Instruction Lines IL0–IL4 at this time. The previously described FOFH flip-flop 50 (over-flow hold) of the Status Indicators 44 of FIG. 3 will be set during the FEND control state if during the execution of an instruction the Algorithm Execution Control Logic has detected a temporary over-flow condition. In addition, the FDCH flip-flop 54 (divide check hold) will also be set during the FEND control state if the divide check condition occurred during instruction execution. A temporary under-flow condition detected by the Algorithm Execution Control Logic 30 will cause the under-flow hold flip-flop FUFH 52 to be set during the FEND control state. The FUFH flip-flop 52 will also be set if the floating point unit is in the unnormalized mode, and the FUNR flip-flop 46 is set if the A-Register mantissa field bits 00–37 are not all binary 0's, or if the floating point unit is not executing a multiply, a divide, or divide inverse instruction.

In addition, during the time of the flow chart block 506, the floating point unit is cleared by resetting the FEXC and FEND flip-flops 112 and 116, the entire B-Register is reset to binary 0's, the Timing Counter 66 is reset to a non-active control state by resetting FTC0–FTC5 and the FFPB (floating point busy) flip-flop 114 (FIG. 8) is reset. The B-Register enable input signal to the Adder, FBSX, is disabled at this time as is the signal FASX, the A-Register to Adder enable input signal. The carry input signal FCRE into the bit position EA39 of the Adder 28 (FIG. 10) is also disabled at this time along with the FESX, FIN2, FIN4, and FP38 signals. Also during the execution of all appropriate instructions, if the Algorithm Execution Control Logic had detected any of the divide check, over-flow conditions, or under-flow conditions, the notation therein of the condition is disable.

In the preparation of the floating point unit for the execution of the next instruction, should this instruction be a NRM (Normalize) instruction the two signals FQSX and FACI are enabled as inputs to the Adder 28 at this time (FIG. 12). The function of these latter two signals will be explained in conjunction with the execution of those instructions during which are are used.

It will be noted from the flow chart block 506 that there are specific functions which take place during the FEND control state with respect to the execution of various instructions other than those iterative functions just described. Those functions which pertain to individual instructions will be described as the various instructions are executed in the explanations which follow. Still with reference to FIG. 17, upon exiting from block 506 a test is made to determine if the FIST flip-flop 98 is set. As previously stated, if the FIST flip-flop is not set, a trap condition exists and the instruction will be aborted as indicated by the "No" branch from the decision block "FIST set?" in FIG. 17. However, if the FIST flip-flop is in the set condition, this is an indication that block 501 of FIG. 15 has previously been executed and block 503 of that figure will be entered. With the exiting from the flow chart block 506 of FIG. 17, the execution of the Shift Left Binary instruction, as is the case with all instructions, is completed and the next instruction word from the processing unit 12 is present on the Information Item Lines II00–II23 and Instruction Lines IL0–IL4 for entry into the B-Register as previously described.

With reference once again to FIG. 16, if the instruction to be executed is a SRB (Shift Right Binary) instruction those operations which take place during the time of the flow chart block 505 and under the "All Instructions" heading are the same as previously described for the SLB instruction. Under the heading of "SLB or SRB" in block 505, the operations occurring are identical with those described for the SLB instruction except that the Q-Register bits 00–38 are not reset since the A- and Q-Registers will be shifted to the right simultaneously during the execution of this instruction. Additionally, during the execution of this instruction the sign bit of the A-Register, bit 38, is changed and the Q-Register sign bit 38 will be set to a binary 1 if bit 38 of the A-Register, the sign bit, is equal to a 1.

It will be remembered from the previous discussion of the SLB instruction that the control count specifying the number of shifts to be performed is now in the Control Counter 22 of B-Register 20 bit positions 39–45. Upon termination of the operations defined in block 505, the operations illustrated in FIG. 16 for the SRB instructions are the same as those discussed with respect to the SLB instruction. After testing to determine that the Timing Counter 66 is not in the FTC2 state (decision block "FTC2 Enabled?"), that this is a General Instruction, that the FEND flip-flop 116 (FIG. 8) is not set, and that the present instruction is the SRB instruction, the floating point unit will now proceed to flow chart block 509 of FIG. 18. During the time of block 509 the operations performed are the same as those described during the execution of the SLB instruction; i.e., Control Counter contents (bits 39–46) are complemented as before by the passage thereof through the Complement Control Counter gates 124 (FIG. 9), the FASX signal is generated thus placing the A-Register bits A00–A38 at the Y inputs to the Adder 28 (FIG. 12) via AND-gate 126, and the Timing Counter is set to its FTC1 output state. Upon exiting from block 509, inasmuch as this is an SRB instruction, the Algorithm Execution Control Logic 30 tests to determine if the count on the false side of the Control Counter is less than 3. This is illustrated by the decision block "$\bar{C}<3$?" and is similar to the "$\bar{C}=0$?" decision block discussed during the SLB instruction explanation. Assuming first a negative response to this test the "No" branch is taken from this decision block and flow chart block 512 is entered at which time the A-Register bits 00–37 and the Q-Register bits QX0–Q37 are shifted right four bit positions with binary 0's being placed into the vacated bit positions while bits shifted out of QX0 are lost. This is accomplished, as illustrated in FIGS. 9–13, by enabling signals SA4 and SQ4 which originate in the Algorithm Execution Control Logic 30. The SA4 signal is applied to the input of AND-gate 142 (FIG. 11) and the SQ4 signal forms one input to each of the AND-gates 144 and 146 (FIG. 13). Another signal, FIN4 (increment control counter by four) is, after passing through a gate 140, applied to the Y input of bit position EA41, the exponent portion of the Adder 28, to thus be added to the contents of the Control Counter being supplied to the X inputs of the Adder (inputs B39–B46). The incremented sum thus formed is placed into the Control Counter 22 via lines ES391–ES461 and AND-gate 138. As before, the enabling of AND-gate 138 is achieved by the SCX signal. The floating point unit 16 will cycle in block 512 (FIG. 18) with the shifting and incrementing operations being repeated until such time that the Control Counter contents are such that the false output thereof is less than 3. When this occurs the "Yes" branch will be taken from the decision block "$\bar{C}<3$?" and a test will be made to determine if the contents of the Control Counter 22, as viewed from its false side, is equal to two or one. This is illustrated in FIG. 18 by decision block "$\bar{C}=2$ or 1?"

If the false side of the Control Counter 22 is equal to 2 or 1, the "Yes" branch is taken, flow chart block 514 of FIG. 18 is entered and the FIN4 signal is disabled. During the time of this block the A- and Q-Registers are simultaneously shifted to the right by two bits and the Control Counter 22 contents will be incremented by two. This is accomplished in the embodiment illustrated in FIGS. 9–13 as follows. The A-Register will shift into the A- and Q-Registers by passing through the Adder 28. As shown, the contents of the A-Register are applied via bus A00–A38 to the AND-gates 126. The FASX signal which became true in flow chart block 509 (FIG. 18) enables the AND-gates 126 thus placing the A-Register contents on bus A00–A38 at the Y inputs of the respective Adder stages. Since at this time the false side of the Control Counter 22 represents 2 or 1, the signal SA2 from the Algorithm Execution Control Logic is present to enable an AND-gate 148 (FIG. 11) which has connected thereto bits MS02–MS37 from the Adder sum (S) outputs to thereby gate these bits into the A-Register 26 displaced right two places; i.e., into bits 00–35. Simultaneously, the SQ2 signal as shown in FIG. 13 is applied to AND-gates 150 and 152. The other input to AND-gate 150 is the Adder sum outputs MS00 and MS01 which thus place these two bits, originally bits 00 and 01 of the A-Register, into the Q-Register at bit positions 36 and 37. The enabling of AND-gate 152 by the SQ2 signal effects the shifting of the Q-Register bits 00–37 into Q-Register bit positions QX0–Q35.

The Control Counter incrementation is accomplished as is shown in FIG. 10 by enabling the FIN2 signal from the Algorithm Execution Control Logic 30 which is applied via gate 154 to the Y input of Adder bit EA40. This, in combination with the bits B39–B46 from the Control Counter 22 (FIG. 9) connected to the X inputs of the exponent portion of the Adder 28 will provide an incremented output from the sum (S) outputs of Adder bits EA39–EA46 which is fed back into the Control Counter via lines ES391–ES461 and the AND-gate 138 which is enabled by the SCX signal. Returning to FIG. 18, the floating point unit will cycle in the loop defined by the $\bar{C}=2$ or 1? and 514 flow chart blocks, continuing successive right shifts by two bit positions of the A- and Q-Registers until the Algorithm Execution Control Logic detects that the count in the Control Counter 22 is no longer equal to 2 or 1 at which time the "No" branch will be taken from the "$\bar{C}=2$ or 1?" decision block and entry will be made into block 513.

At entry into block 513 two possibilities exist. The first of these is that the correct number of shifts has been performed and that the contents of the Control Counter 22 are now equal to the one's complement of zero. In this case the FADJ flip-flop 104 is reset, the appropriate FIN2 or FIN4 signal is rendered false, the contents of the Control Counter are transferred through the Adder and back into the Control Counter without change and the FEND flip-flop 116 is set. With the setting of the FEND flip-flop exit is made from block 513 and the floating point unit enters the FEND control state previously described with respect to FIG. 17.

The second possibility which exists is that an over-shifting has occurred since previous shifting of the A- and Q-Registers has been by increments of either two or four. If over-shifting occurred, detection and correction is made in the time of flow chart block 513. If the contents of the Control Counter, as determined by the Algorithm Execution Control Logic, is 1 greater than the one's complement of zero, over-shifting by one bit has occurred. In this case the A- and Q-Register contents must be shifted left one bit position. Referring again to FIGS. 11, 12, and 13, the FASX signal enables gates 126 to gate A-Register bits A00–A38 into the mantissa portion, MA00–MA38 of the Adder 28. In a manner similar to that described with respect to the SLB instruction, the SA1 signal is generated to enable AND-gate 130 (FIG. 11) to thus gate the Adder outputs MS00–MS36 into the A-Register displaced one bit to the left. Simultaneously, with the shifting of the A-Register displaced one bit to the left, the Q-Register (FIG. 13) is shifted left one bit through AND-gate 132 by the enabling signal SQ1. Bit 37 of the Q-Register is transferred via gates 134 and 135 (FIG. 11) into bit position 00 of the A-Register as previously described. The A- and Q-Registers now have been shifted to the right the number of bit positions as originally specified by the instruction word which was loaded into the B-Register and the floating point unit moves from block 513 to the FEND block 506 of FIG. 17 as previously described.

A third General Instruction executed by the floating point unit is the NRM (Normalize) instruction. In this instruction the mantissa portion of the operand is adjusted until a binary 1 exists in its most significant bit position. As before, it will be assumed that the instruction has been delivered to the floating point unit 16 and decoding has been accomplished such that this explanation begins with flow chart block 505 of FIG. 16. Referencing block 505 it is seen, under the heading "All Instructions," that inasmuch as this is the NRM instruction the signal FQSX from the Algorithm Execution Control Logic 30 (FIG. 3) is not disabled. In FIG. 12 it may be seen that the FQSX signal forms an input to a plurality of AND-gates 156 (two of which are shown as representative of one such AND-gate for each of the MA00–MA37 stages of this portion of the Adder 28) which serve to gate, respectively, Q-Register bits 00–37 into the Y inputs of the mantissa portion MA00–MA37 of the Adder. Q-Register bits 00–37 are placed into the Adder for transfer through the Adder into the A-Register at a later time during the execution of the instruction if the A-Register mantissa field is zero. Also as shown in block 505 under the heading "NRM," if the floating point unit is not in the double precision mode (the FDPR flip-flop 48 of FIG. 3 is reset) the Q-Register bit positions 00–38 are reset to binary 0's. This is accomplished by a signal RSQ (FIG. 13).

It will be remembered during the previous explanation of normalization that the exponent of the mantissa must be decremented one for each binary 0 shifted left out of the most significant bit of the mantissa. The decrementation of the exponent of the mantissa being shifted is performed by passing the contents of the Control Counter 22 through the Adder 28. Therefore, the exponent of the operand, bits 39–46 of the A-Register 26 (FIG. 11) are transferred into the Control Counter 22, bit positions 39–46 of the B-Register 20 (FIG. 9), via an AND-gate 120 which has been enabled by an ECX signal from the Gated Clock Amplifiers 64. Also at this time the signal FP38 (+38 to Adder) from the Algorithm Execution Control Logic 30 comes true and is applied to three gates 128 (FIG. 10), the outputs of which are applied to the respective Y inputs of the EA40, EA41 and EA44 stages of the exponent portion of the Adder 28. If the floating point unit is in the double precision mode (FDPR set) the A-Register sign bit 38 will be set to a binary 1 if the Q-Register sign bit 38 is a binary 1. The FFDW control state flip-flop 100 will be reset, the Timing Counter will be set to the FTC0 output state and the FEXC (execution in process flip-flop) 112 will be set. Also, since this is the NRM instruction requiring normalization the FPNR flip-flop 108 (FIG. 8) will be set.

With the preceding conditions existing, the floating point unit leaves block 505 and tests to see if the Timing Counter 66 is in the FTC2 output state. Since it is not in the execution of an NRM instruction, the "No" branch is taken out of the "FTC2 Enabled?" decision block and the test is made to ascertain that this is a General Instruction. Since the FEND flip-flop 116 is in the reset condition, the floating point unit will take the "No" path from the "FEND Set?" decision block to exit from FIG. 16 and enter FIG. 19 at point NRM.

With reference now to FIG. 19, the floating point unit enters a decision block "AZR?" (is the A-Register 0?). If the contents of the A-Register 26 are not all zeros, the "No" path from this decision block is taken and block 515 is entered wherein the Control Counter contents (B-Register bits 39–46) are complemented if the sign bit A47 of the exponent portion of the A-Register is positive (a binary 0). The one's complement of the Control Counter contents is accomplished in the previously described manner by the passage thereof through the Complement Control Gates 124 by the enabling signal CBE (FIG. 9) and returning this complement to the Control Counter. If the exponent in the A-Register was negative, that is bit 47 was a binary 1, the exponent is in the one's complement form and, therefore, complementing is not done. Also during the time of block 515 (FIG. 19) the two signals FQSX and FP38 are disabled and the FASX signal is provided and applied to the AND-gates 126 (FIG. 12) to enable the A-Register bit positions 00–38 for shifting through the Adder 28 during execution of this instruction. The Timing Counter 66 is switched from the FTC0 to the FTC1 output state and the floating point unit, upon emerging from block 515, tests (decision block "A37 Set?") to see if the A-Register mantissa most significant bit, bit A37, is a binary 1. That is, is the binary number in the mantissa portion of the A-Register a normalized number?

If the results of the test block "A37 Set?" is "Yes," flow chart block 516 is entered since the number in the A-Register is already normalized. The FEND flip-flop 116 is now set thus placing the floating point unit in the FEND control state. The FPNR flip-flop 108 is reset thus taking the floating point unit out of the post normalization control state and the A-Register inputs into the Adder 28 are disabled by the disabling of the FASX signal at gates 126 (FIG. 12). Since the FEND flip-flop was placed in the set state in block 516, the floating point unit will, upon leaving block 516, go through the "FEND Set?" test block taking the "Yes" branch to the FEND control state block 506 as shown in the flow chart of FIG. 17. In block 506 those operations previously described under the heading "All Instructions" will be performed for the various stipulations as specified and for the particular instruction (NRM). Additionally, since under the second heading in block 506 there is included the NRM instruction, certain other operations must occur during the time of this block. During the explanation of FIG. 19 it was stipulated that the output of the decision block "A37 Set?" was "Yes" thus indicating that the mantissa of the A-Register was in the normalized state. As mentioned in block 515 the exponent sign (bit 47) was tested to determine if the exponent was either a positive (binary 0) or a negative (binary 1). If the sign of the exponent was positive, then it was necessary to complement the exponent. However, if the sign of the exponent was negative, it is not necessary to complement the exponent. Therefore, in order to restore the exponent now in the Control Counter 22 to its original form in the exponent field of the A-Register 26, if the exponent was complemented during the time of block 515 it is now complemented again to restore it to its original form when placed back into the exponent field of the A-Register 26.

Conditions for establishing the transfer of the one's complement of the exponent now in the B-Register back into the A-Register exponent in its proper form are shown in block 506. If A-Register bit 47 was a binary 0 and the signal ZMG (0 mantissa generated) from the Gated Clock Amplifiers 64 was not true, as is the situation here, the Control Counter 22 contents, which are continuously present at the X inputs of bits EA39–EA46 of the Adder 28, the present in the one's complement form at the $\bar{S}$ outputs of the Adder stages. The $\bar{S}$ outputs, via lines ES390–ES460, are applied to an AND-gate 158 with the second input to this gate being the SNE (sum not exponent to A-Register) signal. The output of gate 158 supplies input signals to bit positions 39–46 of the A-Register 26 to thus place therein the exponent in the form it was at the beginning of the instruction. However, if the exponent in the A-Register at the beginning of instruction execution was in its one's complement form, that is, A-Register bit 47 was a binary 1, complementing is not here necessary and the exponent in the Control Counter can be transferred to the exponent portion of the A-Register without change. This is accomplished by passing the Control Counter contents through the exponent Adder bits EA39–EA46 and gating the S outputs of the respective stages of the exponent Adder into the A-Register via the ES391–ES461 lines and AND-gate 160 enabled by the SEX signal (transfer Adder exponent to A-Register). At this time, under the conditions previously set forth, execution of the NRM instruction is complete and the FEND control state, block 506, will be exited.

Referring back to the left-hand decision block "A37 Set?" of FIG. 19, if the mantissa sign bit is not set indicating that the mantissa is not in the normalized form, the "No" branch will be taken. Since the mantissa is not in its normalized form the FEND flip-flop 116 is not set and the "No" branch will be taken from the "FEND Set?" decision block. A test will now be made to determine if the Control Counter contents equal zero (decision block "$\overline{C}=0$?"). If the results of this test are "No," flow chart block 517 is entered, the FIN2 signal if present is disabled and the A- and Q-Register mantissa fields are shifted to the left by one bit position with the A-Register shifting through the Adder 28. This is achieved referring to FIGS. 11–12 by the application of the FASX signal to the AND-gates 126 thus enabling the A00–A38 inputs into the mantissa portion of the Adder. The sum (S) outputs of Adder stages MA00–MA38 at this time reflect the A-Register input signals and these outputs, via lines MS00–MS36 are applied to the AND-gate 130 in conjunction with the SA1 signal (shift A-Register left 1). The output of gate 130 provides inputs to the A-Register bit positions 01–37, thus providing a left shift of the mantissa by one bit position. Simultaneously with the shifting of the A-Register, the SQ1 signal applied in conjunction with bits QX0–Q36 from the Q-Register to AND-gate 132 places these bits into QX1–Q37 of the Q-Register as shown in FIG. 13. The most significant mantissa bit of the Q-Register, bit 37, is transferred via AND-gates 134 and 135 into A-Register bit position 00. AND-gate 135 is enabled by the SA1 signal while AND-gate 134 is enabled at this time since the FPNR flip-flop 108 is set providing the FPNR1 signal and this is not a divide instruction such that the DVD0 signal is true.

During the time the A- and Q-Registers are shifting in block 517, the Control Counter 22 contents (FIG. 9), which are connected to the Adder stages EA39–EA46 (FIG. 10), are incremented by one by the enabling of the signal FCRE from the Algorithm Execution Control Logic. Simultaneously, the SCX signal enables AND-gate 138 (FIG. 9) to place the incremented contents, via lines ES391–ES461, into the Control Counter 22. The shifting and incrementing operations just described will continue and the floating point unit will loop through block 517, as is shown in FIG. 19, until the mantissa is normalized. A-Register bit 36 is monitored to determine if the mantissa in the A-Register is normalized. That is, the bit being transferred into A-Register bit 37 is monitored to determine if normalization will occur on the shift taking place at that time. When A-Register bit position 36 is a binary 1, indicating normalization of the mantissa, the FEND flip-flop 116 is placed in the set condition and the floating point unit is taken out of the post normalization control state by resetting the FPNR flip-flop 108 and disabling the FASX signal. With the setting of FEND flip-flop, the normalization operation is essentially complete and the floating point unit will exit from block 517 taking the "Yes" path from the "FEND Set?" decision block to the FEND control state of FIG. 17.

Still with reference to FIG. 19, it will now be assumed that the test made in the "$\overline{C}=0$?" decision block was true and the "Yes" branch is taken therefrom. A test is then made to see if the A-Register exponent sign bit, A47, is in the set condition, a binary 1. This is indicated by a second or right-hand decision block "A47 Set?". If the A-Register sign bit is a binary 0, flow chart block 518 of FIG. 19 will be entered and the contents of the A- and Q-Registers will simultaneously be shifted left one bit position as before. However, in block 518, since the exponent in the Control Counter is equal to zero, decrementation by one of the Control Counter at this time will result in the exponent going from a positive to a negative value. Therefore, incrementation by two is necessary in order to get the correct result. This is accomplished by disabling the FCRE signal and enabling the FIN2 signal which, when applied to stage EA40 of the Adder 28 via AND-gate 154 in conjunction with the contents of the Control Counter 22 being applied to stages EA39–EA46, provides the correct input to the Control Counter via lines ES391–ES461. This is more fully understood when it is realized that the one's complement of zero plus two is equal to the absolute magnitude of −1; e.g., 11111111+00000010=00000001. Since the control count has gone to a negative value, the exponent sign, bit A47, is made a binary 1. If the shift just performed during block 518 normalizes the mantissa, the FEND flip-flop 116 is set, the FPNR flip-flop 108 is reset, and the FASX signal is disabled. With the FEND flip-flop set, the floating point unit proceeds from block 518 via the "Yes" branch from the "FEND Set?" decision block to the FEND control state, flow chart block 506 of FIG. 17.

However, if the last shift did not normalize the mantissa, the FEND flip-flop will not be set, the "No" branch from the "FEND SET?" decision block will be taken and the floating point unit will enter block 517 and cycle therethrough until the mantissa is normalized and the FEND control state is entered.

If the "Yes" paths are taken from the "$\overline{C}=0$?" and the right-hand "A47 Set?" decision blocks, the floating point unit 16 now enters flow chart block 519 (FIG. 19). This occurs when the mantissa is not normalized and the exponent is equal to a −255 which will result in an exponent under-flow during the next shifting operation. The Algorithm Execution Control Logic will store the fact that an under-flow condition has been detected, indicated by "Enable UFL" in block 519, and the FEND flip-flop 116 (FIG. 8) will be set, thus terminating instruction execution. Also at this time the post normalization control flip-flop (FPNR) 108 will be reset and the FASX signal (FIG. 12) into the mantissa portion of the Adder bits MA00–MA38 will be disabled. Simultaneously with the disabling of the FASX signal, the SAX signal is applied to an AND-gate 162 (FIG. 11) to enable that gate, thus passing the sum (S) outputs MS00–MS37 into bit positions 00–37 of the A-Register. Since none of the inputs to the mantissa Adder portion (FIG. 12) are enabled at this time, the sum outputs will all reflect binary 0's and thus binary 0's will be placed into the entire mantissa portion of the A-Register 26.

Upon completion of the flow chart block 519, since the FEND flip-flop 16 is now set and the A-Register bit 37 contains a binary 0, the "Yes" path is taken from the "FEND Set?" decision block to the FEND control state of FIG. 17 for instruction termination as previously described.

The remaining possibility in the flow chart (FIG. 19) is the "Yes" branch from the decision block "AZR?" (is the A-Register 0?) which takes the floating point unit to flow chart block 520 if the A-Register contains all binary 0's. During the time of this block the B-Register bits 39–46 will be complemented if the A-Register exponent bit 47 is a binary 0 in the manner described for block 515. This is accomplished by the enabling of the CBE signal (complement B exponent) as shown in FIG. 9. Also at this time, the mantissa portion of the Adder 28, bits MA00–MA37, is transferred into A-Register bit positions 00–37 since the FQSX signal (FIG. 12) was enabled at the beginning of instruction execution, thus placing the Q-Register bits 00–37 at the Y inputs of the respective Adder stages through AND-gates 156. With no other inputs to the Adder input terminals at this time, the Adder sum (S) outputs will reflect the Q-Register inputs. Referring to FIG. 11 the S outputs of the Adder stages MS00–MS37 are applied to the AND-gate 162 in conjunction with the SAX signal thus placing the Q-Register contents into bit positions 00–37 of the A-Register. The Timing Counter is changed from the FTC0 to the FTC2 state in block 520 and simultaneously the FQSX signal is disabled, the FASX signal is enabled and applied to AND-gates 126 (FIG. 12) to enable these gates in preparation for shifting left through the Adder during the execution of this command.

Upon completion of the operations of block 520, block 521 is entered by the floating point unit in the FPNR1 and FTC2 control states at which time the least significant 38 bits of the mantissa (which were in the Q-Register 32) are now in the A-Register 26. The Control Counter 22 at this time contains the one's complement of the exponent if positive or the exponent magnitude if negative. Upon entry into block 521 two conditions can exist; the A-Register contents either are or are not equal to zero. If the A-Register contents are zero, the FP38 signal applied to gate 128 (FIG. 10) is disabled, the Q-Register bits 00–37 are reset to binary 0's by the signal RSQ (FIG. 13) and the Timing Counter 66 is changed from the FTC2 to the FTC3 output state. Flow chart block 522 is now entered wherein the Control Counter contents (B39–B46) are transferred through the Adder 28 back into the Control Counter via the lines ES391–ES461 an AND-gate 138, which is enabled by the SCX signal. (This transfer of the Control Counter contents is, at this time, insignificant since it was assumed in block 521 that the A-Register contents are zero.) The FEND flip-flop 116 is set at this time and the FPNR flip-flop 108 is reset. The Timing Counter 66 is switched from the FTC3 to the FTC1 output state and the FASX signal applied to AND-gates 126 (FIG. 12) is disabled. With the FEND flip-flop 116 in the set condition, the floating point unit leaves block 522 and goes via the "Yes" branch from a "FEND Set?" decision block to flow chart block 506 (FIG. 17) which is the FEND control state.

Referring now back to block 521, the second condition which can exist is the A-Register contents are not equal to zero necessitating the decrementation of the Control Counter by 38 (the Q-Register contents were transferred into the A-Register bit positions 00–37). This is accomplished, referring to FIGS. 9–10, by applying bits 39–46 of the B-Register to the X inputs of the Adder stages EA39–EA46 with the presence of the FP38 signal at gates 128. This decrements the Control Counter contents and the output of the Adder, the decremented control count, is supplied to the Control Counter via lines ES391–ES461 through AND-gate 138. For purposes of clarity, it is significant to point out at this time that passing the Control Counter contents through the exponent portion of the Adder during the presence of the signal FP38 will decrement the exponent by 38 unless the exponent is less than 38 and equal to or greater than zero. If the exponent is less than 38 and equal to or greater than zero, the exponent will go from a positive to a negative value and one must be added to obtain the correct absolute magnitude for the negative exponent. This is accomplished in the time of block 521 by enabling the FCRE signal if the A-Register exponent sign bit (bit 47) is a binary 0, if the EA46 bit position of the exponent Adder on a line designated EC46 (exponent carry) is a binary 1 and if, as was assumed, the A-Register contents are not zero. However, EC46 will also be true if the A-Register exponent sign bit is a binary 1 and a carry exists at the C output terminal of EA46 (FIG. 10). The true output signal on line EC46 and a binary 1 in A-Register bit position 47 along with the A-Register's 00 signal will cause a temporary under-flow condition to be stored in the Algorithm Execution Control Logic and the FCRE signal will not be enabled at this time. The storing of the temporary under-flow condition is an indication that the new exponent is less than −255. Also in block 521, Q-Register bits 00–37 are reset by the signal RSQ and the Timing Counter 66 is set to the FTC3 output state.

With these conditions prevailing in block 521, flow chart block 522 is entered and the Control Counter contents (bits 39–46 of the B-Register) are again transferred through the Adder and back into the B-Register via lines ES391–ES461 and AND-gate 138. Also in block 522 the A-Register exponent sign bit is set to a binary 1 if the signal FCRE was enabled in block 521. The FCRE signal, if enabled in block 521, is disabled in block 522 and the FEND and FPNR flip-flops 116 and 108 (FIG. 8) are set at this time if the A-Register contents are zero or if a temporary under-flow condition occurred in block 521. These same conditions will result in the disabling of the FASX signal applied to the AND-gates 126 (FIG. 12). Additionally, during the time of the flow chart block 522, the Timing Counter 66 is switched from its FTC3 to the FTC1 output state.

If the FEND flip-flop is set in block 522, upon exiting therefrom the floating point unit will be in the FEND control state (FIG. 17). However, if FEND flip-flop is not set during block 522 it is an indication that the mantissa in the A-Register 26 is not normalized at this time. Therefore, the "No" branch out of the "FEND Set?" decision block at the output of block 522 is taken and the floating point unit enters the decision block left-hand "A37 Set?" as shown in FIG. 19. The result of this decision will result in the appropriate "Yes" or "No" paths being taken for operations previously described.

As before, upon entering into the FEND control state block 506 (FIG. 17) the appropriate operations performed under the heading "All Instructions" are accomplished. Under the second heading which includes the NRM instruction the following additional operations are performed. If a zero mantissa was generated (bits 00–37 of the A-Register are all zeros) the ZMG signal from the Gated Clock Amplifiers comes true at this time and laces all binary 1's into bit positions 39–46 of the A-Register (FIG. 11) thus setting the A-Register exponent equal to a −255. The ZMG signal will also come true in block 506 if a temporary under-flow condition was detected by the Algorithm Execution Control Logic during instruction execution. However, if neither of these conditions exists, and the sign of the A-Register exponent is negative (binary 1), the contents of the Control Counter are transferred into the A-Register exponent portion, bit positions 39–46, via the Adder 28 and AND-gate 160, the latter receiving inputs ES391–XES461 and the enable signal SEX thus placing the sum (S) outputs of the Address stages EA39–46 into respective positions 39–46 of the A-Register. On the other hand, if neither of the conditions existed and the A-Register exponent sign bit 47 is a binary 0 the one's complement of the Control Counter is transferred into the exponent field of the A-Register via the Adder 28 and the AND-gate 158, receiving inputs ES390–ES460 and the enable signal SNE. The occurrence of these operations will terminate the NRM instruction execution and the floating point unit will leave block 506 and the next instruction execution will start as previously described.

The Three General Instructions SSP (Set Sign Plus), SSM (Set Sign Minus), and CHS (Change Signs) are executed entirely in the time of flow chart block 505 (FIG. 16) with normal housekeeping functions being performed in the FEND control state (FIG. 17). The execution of these three instructions will be explained simultanously since their operation is substantially identical. Assuming that one of these instructions has been loaded into the I-Register 24 and decoded by the Instruction Decode Logic 40 (FIG. 3), the Logic 40 will, via an OR-gate 170, provide a signal dependent upon the particular instruction involved to the A-Register mantissa sign bit 38 (FIG. 11). If the instruction being executed at this time is the SSP instruction an SSP signal will set the sign bit 38 to positive. If the instruction is SSM, an SSM signal will set the A-Register sign bit 38 to negative (binary 1), while if the instruction is the CHS instruction, a CHS signal will change the sign of the A-Register sign bit 38 from plus to minus or from minus to plus. Also shown in FIG. 16, in block 505 the FEND and FEXC flip-flops 116 and 112 and set and the FFDW flip-flop 100 is reset. Block 505 is now exited at which time a test (decision block "FTC2 Enabled?") is made to determine if the Timing Counter is in the FTC2 output state. In this case it is not. Therefore, the "No" branch is taken from this decision block and the decision block "Gen. Inst.?" is entered. As this is a General Instruction the "Yes" branch is taken from this decision block and, since the FEND flip-flop 116 was set in block 505, the "Yes" branch is taken from the "FEND Set?" decision block there following and the floating point unit enters the FEND control state block 506 in FIG. 17 for instruction termination under the "All Instructions" heading in block 506 as was previously described.

Another General Instruction, XAQ (Exchange A and Q), is also executed during the time of flow chart block 505 of FIG. 16. In this instruction the sign and magnitude of the mantissa portions of the A-Register 26 and the Q-Register 32 are interchanged. With the decoding by the Instruction Decode Logic 40 of the XAQ instruction, the A- and Q-Registers are exchanged by the enabling of an AND-gate 164 (FIG. 13) by the signal AQX from the Gated Clock Amplifiers 64 to thereby gate mantissa bits A00–A37 from the A-Register 26 into bit positions 00–37 of the Q-Register 32. The Q-Register bits Q00–Q37 are, at this time, present at the inputs to the mantissa portion of the Adder, stages MA00–MA37, because of the previously enabled FQSX signal applied to AND-gates 156. Therefore, the Adder sum (S) outputs on the lines MS00–MS37 reflect the Q-Register inputs and these are applied via AND-gate 162 (FIG. 11), enabled by the SAX signal, to the A-Register bit positions 00–37. If at this time the A-Register mantissa is zero and the sign bit it set, the A-Register sign bit 38 will be reset to a binry 0 by the signal SSP from the Algorithm Execution Control Logic via OR-gate 170. The FFDW flip-flop 100 is reset, the FEND flip-flop 116 is set, and the FEXC flip-flop 112 is set. At the termination of block 505 the floating point unit will again test to determine that FTC2 is not enabled and that this is a General Instruction. Since it is a General Instruction and the FEND flip-flop 116 is set, the "Yes" branch out of the "FEND SET?" test block will be taken to the FEND control state of flow chart block 506 of FIG. 17. The termination functions of the XAQ instruction are those previously described with respect to the heading "All Instructions" in block 506.

The General Instruction, FLZU (Load Zero into Upper A), is also executed in its entirety in the time of flow chart blocks 505 and 506. With respect to block 505, upon decoding of the FLZU instruction by the Instruction Decode Logis 40 (FIG. 3), the FFDW flip-flop 100 is reset and the FEND and FEXC flip-flops 116 and 112 are set. Also as shown in block 505, since this is the FLZU instruction, the FASX signal from the Algorithm Execution Control Logic is enabled at this time. With these conditions established, the floating point unit goes from block 505 and by way of the "No", "Yes", and "No" paths from the decision blocks "FTC2 Enabled?", "Gen. Inst.?", and "FEND Set?", respectively, to the FEND control state block 506 of FIG. 17. In this latter state the conditions specified under the heading "All Instructions" are satisfied. Additionally, as shown under the heading including the FLZU instruction, several other operations are performed during this period of time.

The first of these additional operations is the transferring of the B-Register exponent (bit 47) to the A-Register exponent bit position 47. Referring now to FIG. 11, this is accomplished by passing the exponent sign bit (B47) of the B-Register 20 through an AND-gate 174 which is enabled by the FEND1 output of the FEND flip-flop 116 and the output of an OR-gate 172, one input of which is the FLZU signal from the Instruction Decode Logic 40. At this time the entire contents of the Control Counter bits 39–47 are in the reset condition (binary 0's) and, therefore, bit 47 of the A-Register will be reset. A second operation occurring at this time is that the B-Register Control Counter contents are transferred through the Adder 28 and into the A-Register exponent positions 39–46 via lines ES391–ES461 and AND-gate 160 which is enabled by the SEX signal from the Gated Clock Amplifiers.

In addition, since this is the FLZU instruction, the B-Register mantissa sign bit, bit 38, is transferred into the A-Register mantissa sign bit position 38 via AND-gate 168 and OR-gate 170, AND-gate 168 further including the FEND1 signal as an input. Finally, in the FEND control state of the FLZU instruction, A-Register bits 24–37 are all reset to binary 0's. A signal resulting from an AND-gate 180, the inputs of which are the FLZU and FEND1 signals, serve to place binary 0's in positions 24–37 of the A-Register. With respect to bits 00–23 of the A-Register, it will be recalled that the FASX signal enabled the AND-gates 126 (block 505) thus providing A-Register bits 00–38 as inputs to the Adder stages MA00–MA38. The outputs of the mantissa portion of the Adder thus reflect the A-Register inputs. Adder stages MS00–MS23 are connected to an AND-gate 166 (FIG. 11) which is enabled by the FLZU and FEND1 signals to thus provide an output to bit positions 00–23 of the A-Register 26. This operation completes the execution of the FLZU instruction and block 506, the FEND control state, will be exited as previously described.

The last of the General Instructions is FLZ (Floating Load Zero) instruction. Again assuming that the instruction has been decoded by the Instruction Decode Logic 40 and with reference to block 505 of FIG. 16 it is again noted that the FFDW flip-flop 100 will be reset, and the FEND and FEXC flip-flops 116 and 112 will be set. As was the case with the immediately preceding instructions the floating point unit 16 goes from block 505 to the FEND control state by way of the three decision blocks "FTC2 Enabled?", "Gen. Inst.?", and "FEND Set?".

Referencing FIG. 17 under the heading "All Instructions," the A-Register exponent, bits 39–47, will be set to the largest negative exponent (−255) by the signal ZMG which is now generated (see FIG. 11). At this time, since all of the enable input signals to the Adder gating structure are disabled, the outputs of the Adder sum (S) outputs all reflect binary 0's. These outputs on lines MS00–MS37 are applied by AND-gate 162 which is enabled by the SAX signal to the A-Register to provide binary 0 inputs to bit positions 00–37. Also at this time the mantissa sign bit of the A-Register is set to a binary 0 via AND-gate 170 which has supplied as an input thereto a signal from AND-gate 168 which is receiving the FLZ decoded instruction signal in conjunction with the FEND1 signal and the B-Register mantissa sign bit input which is a binary 0. The A-Register exponent bits 39–47 now contain the largest negative exponent and the A-Register bits 00–38 contain binary 0's. This concludes the execution of the FLZ instruction and block 506, the FEND control state (FIG. 17), is exited as previously described.

FPO—Floating Point Operation

The Floating Point Operation instruction permits the status of specified ones of the floating point unit Status Indicators 44 (FIG. 3) to be stored at a location in the memory unit 10 or permits a status word in the memory unit 10 to modify specified ones of said Status Indicators. As will be remembered from the earlier brief description of this instruction and from the previous description of the word formats shown in FIGS. 4c, 4d, and 4e, the Floating Point Operation instruction has four variations as follows:

(1) Request Status
(2) Or From Stored Status Word to Floating Point Unit Indicators
(3) And From Stored Status Word to Floating Point Unit Indicators
(4) Set the Stored Word Into the Floating Point Unit Indicators As has been the practice, the instruction execution explanation will begin with the assumption that the Floating Point Operation (FPO) intruction has been placed into the I-Register 24 and decoded by the Instruction Decode Logic 40 (FIG. 3) wherein the type of Floting Point Operation instruction is determined. Beginning the present instruction execution with flow chart block 505 of FIG. 16, the operations which take place therein are, very briefly, the resetting of B-Register bits 24–37, 38 and 47, the clearing of the FTC1 state, and the disabling of the FQSX signal as was previously described and as is shown under the "All Instructions" heading. The floating point unit will then leave block 505. Again, the test "FTC2 Enable?" and "Gen. Inst.?" will be made and the "No" branches taken from these decision blocks. The floating point unit now tests to see if the first data signal has been received from the processing unit. If the firt data signal (I/DS) has not been received, the floating point unit will idle in the FFDW control state with no Timing Counter states enabled as shown by the "First Data Signal Rec'd. from PU?" decision block. Upon receipt of the first I/DS signal the floating point unit will enter into flow chart block 507 as shown in FIG. 20.

Entry into block 507 results from taking the "No" branch from a decision block "FXLD or FST & FFIX1?". The "No" branch is taken because the instruction being executed is not the FXLD instruction nor is it the FST instruction in the fixed point mode. Upon entering into block 507, the information on the Information Item Lines II00–II23 is transferred into the B-Register bit positions 24–27 via the B-Register transfer gates 18 by the simultaneous application thereto of the signals FFDW1, I/DS and ITS (FIG. 9). The information thus transferred into the B-Register is the status word whose format is shown in FIG. 4e and is at this time meaningless if the Floating Point Operation instruction is the Request Status variation.

Referencing FIG. 11, the existing condition of the Status Indicators 44 is now present on the Data Lines DL00–DL23 which go to the processing unit 12. This information is passed through the A-Register Transfer Logic 38 from the Status Indicators 44 by the signals FFDW1 and FPT (Floating Point Operation signal) from the Instruction Decode Logic 40. If this Floating Point Operation instruction is the Request Status variation, the contents of the Data Lines are taken at this time by the processing unit and this information is stored, as bit positions 2–8 of a status word as illustrated in FIG. 4e, at a specified location in the memory unit 10. If however, this Floating Point Operation instruction is one of the three other variations the processing unit does nothing with the information on the Data Lines at this time.

Figure 20:
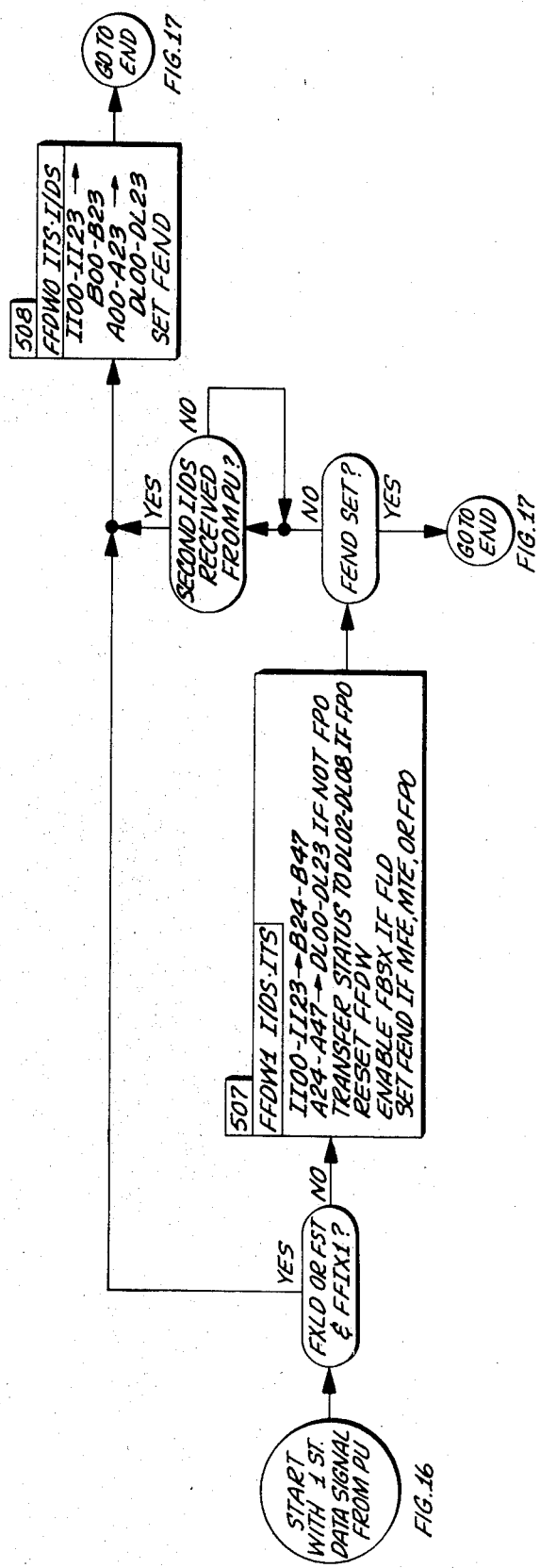

Referencing once again FIG. 20, it is seen that the remaining operations within the flow chart block 507 are the resetting of the FFDW flip-flop 100 and, since the instruction being executed in a floating point operation instruction, the setting of the FEND flip-flop. Upon completion of the operations of block 507, the floating point unit will go to the "FEND Set?" decision block. Since the FEND flip-flop 116 is in the set condition, the "Yes" branch will be taken and the floating point unit will enter into the FEND control state block shown by the flow chart of block 506 (FIG. 17).

If the Floating Point Operation instruction here being executed is one of the three variations which modifies the Status Indicators 44, execution of the instruction is accomplished during the FEND control state as is shown in FIG. 17.

During the execution of this instruction with the variation which serve to modify the condition of the Status indicators 44, those indicators which are affected are shown in FIG. 3 and are the flip-flops FUNR 46, FDPR 48, FOFH 50, FUFH 52, FDCH 54, FTRP 56, and FFIX 58. These seven flip-flops correspond, respectively, to bits 2–8 of the status word (FIG. 4e) which are now present in bit positions 27–33 of the B-Register. If the FPO instruction being executed is the "Or From Stored Status Word to Floating Point Unit Indicators" variation, the status bits of the status word, B-Register bits B27–B33, are delivered to the Status Indicators 44 by way of an AND-gate 182 which is enabled by the FPT signal. For each of the bits thus delivered to the Status Indicators which is a binary 1, the corresponding Status Indicator flip-flop is placed into its set state while those status word bits which are a binary 0 have no affect upon their respective Status Indicator flip-flops. If the Floating Point Operation instruction being executed is the "And From Stored Status Word to Floating Point Unit Indicators" the status word bits gated into the Status Indicators 44 via the gate 182 affect the condition of the several corresponding flip-flops as follows. For any of the bits which is a binary 1 there is no affect upon the corresponding Status Indicator flip-flop, while for any bit which is a binary 0 the corresponding flip-flop is placed into its reset state. The third alternative is that the FPO instruction here being executed is the "Set the Stored Word Into the Floating Point Unit Indicators" variation. With this variation, the flip-flops of the Status Indicators assume the condition of their corresponding bits in the status word. That is, the corresponding flip-flop is placed into its set state for a binary 1 and into its reset state for a binary 0.

With the completion of the appropriate action, and with the normal housekeeping functions being completed in the FEND control state, the execution of the FPO instruction is completed and the floating point unit will leave the FEND control state to allow execution of the next instruction.

Arithmetic Instructions

The first arithmetic instruction to be executed will be the FST (Floating Store instruction) which can be best understood with reference to FIGS. 9, 11, and the flow charts of FIGS. 16 and 20. In the flow chart block 505 of FIG. 16, in addition to those operations performed for "All Instructions," it is seen under the heading FST that the FFDW flip-flop 100 is reset if the floating point unit is in the fixed point mode, that is, the FFIX flip-flop 58 (FIG. 3) is in the set condition. However, the FST instruction is normally executed in the floating point mode and, therefore, the FFDW flip-flop will remain in the set condition. The floating point unit now leaves block 505, tests to see that the FTC2 signal is not enabled and that this is not a General Instruction, and enters the "First Data Signal Rec'd from PU?" decivsion block to await the arrival of the first data signal (I/DS) from the processing unit. Upon receipt of the first I/DS signal the "Yes" branch will be taken and flow chart block 507 entered via the decision block "FXLD or FST & FFIX1?" (FIG. 20). In block 507 the information on Information Item Lines II00–II23 is transferred into B-Register bit positions 24–47. This transfer is insignificant at this time for this instruction. However, it will be noted in FIG. 11 that the A-Register bits 24–47, applied to the A-Register Transfer Logic 38, are now present on the Data Lines DL00–DL23 to the processing unit due to the application of the FFDW1 signal. The processing unit will take this information from the Data Lines and store this information, the contents of A-Register bits 24–47, into memory at a location specified by the instruction. In completion of block 507 operations, the FFDW flip-flop 100 will be reset and upon leaving block 507 a test will be made to determine if FEND is set (decision block "FEND SET?" of FIG. 20). Since the FST instruction does not set the FEND flip-flop in block 507, the "No" branch is taken from this decision block to a "Second I/DS Rec'd from PU?" decision block. The floating point unit will, as is indicated in FIG. 20, loop through this latter decision block until the second data signal (I/DS) is received from the processing unit at which time the "Yes" branch from the block will be taken and block 508 will be entered. In block 508, since FFDW is in the reset condition and since the second signal I/DS has been received from the processing unit, the information on the Data Lines II00–II23 is transferred into the B-Register via the B-register transfer gates 18 by the signals FFDW0 and ITS and I/DS as shown in FIG. 9. This transfer is also meaningless in the present instruction. However, at this same time the A-Register bits 00–23 are transferred to the processing unit over Data Lines DL00–DL23 via the A-Register Transfer Logic 38 (FIG. 11) by the application thereto of the FFDW0 signal. The processing unit will take the information from the Data Lines and store it (the contents of the A-Register bit positions 00–23) into the memory unit at location $X+1$. The FEND flip-flop 116 is set in block 508 and the floating point unit leaves block 508 and enters into the FEND control state block 506 at FIG. 17. During the time of block 506 the floating point unit will perform the operations previously described under "All Instructions" heading after which the floating point unit will exit the FEND control state and the execution of the instruction is complete.

It will be remembered that, during the early part of the explanation of the FST instruction, reference was made to the state of the FFIX flip-flop 58 and that it was then assumed to be in its reset state. If the FFIX flip-flop was set by a previous instruction and the FST instruction now occurs, the result is that which was previously called the FXST (Fixed Store) instruction. It should be here clarified that the FXST instruction does not exist as a separate entity in the present embodiment but is the FST instruction in conjunction with the FFIX flip-flop in its set state, i.e., FST & FFIX1=FXST. In the execution of the so-called FXST instruction, during the time of flow chart block 505 (FIG. 16), in addition to the other operations previously described, the FFDW flip-flop 100 will be reset. After exiting from FIG. 16 the "Yes" branch is taken from the "FXLD or FST & FFIX1?" decision block (FIG. 20) to flow chart block 508 (FIG. 20). The data movements performed during the time of block 508 are identical to those previously described. It should be noted, however, that only the least significant half of the A-Register, bits 00–23, are transferred into the processing unit over the Data Lines DL00–DL23 via the A-Register Transfer Logic 38 (FIG. 11) by the presence of the FFDW0 signal. While the contents of the A-Register are on the Data Lines, the processing unit will take this information and store it into the memory location X specified by the instruction being executed. Upon completion of block 508 the floating point unit will exit therefrom and enter into the FEND control state for termination of instruction execution. Upon termination of bock 506 the FEND control state will be exited and the next instruction wil be executed if required.

The next instruction to be executed is the MFE (Move From Exponent) instruction in which the exponent in the A-Register 26 is stored in the memory unit 10. In the execution of the MFE instruction, upon entering into block 505 (FIG. 16), the only operations performed are the four previously described under the "All Instructions" heading. Upon completion of these operations, the floating point unit will leave block 505 and proceed by the path previously described to flow chart block 507 of FIG. 20. In block 507, Information Item Lines II00–II23 are transferred into B-Register bits 24–27 via the B-Register transfer gates 18 but this transfer is again meaningless since this instruction does not use the contents of the B-Register. However, since this instruction is MFE, the A-Register bits 24–47 are transferred to the processing unit over Data Lines DL00–DL23 via the A-Register Transfer Logic 38 as shown in FIG. 11 by the presence of the FFDW1 signal. The FFDW flip-flop 100 is now reset and the FEND flip-flop 116 is set. With the setting of the FEND flip-flop the floating point unit proceeds via the "Yes" path from the "FEND Set?" decision block to the FEND control state of block 506 (FIG. 17) where termination of the execution of this instruction is performed by the completion of the appropriate operations under the "All Instructions" heading.

Assuming now that the instruction being decoded by the Instruction Decode Logic 40 (FIG. 3) is the MTE (Move To Exponent) instruction which the contents of a memory location X are placed into the exponent portion of the A-Register 26 (bits 39–47), the operations which take place during the initiation of this instruction are the same as those described for the MFE instruction up to and including the entry of block 507 of FIG. 20. In block 507 time the Information Item Lines II00–II23 (FIG. 9) are again transferred into the B-Register bit positions 24–47 by the presence of the FFDW1, I/DS and ITS signals applied to the B-Register transfer gates 18. At this time the information in the B-Register bit positions 24–47 is the exponent to be loaded into the floating point unit A-Register 26 and the most significant half of the A-Register, bits 24–47, is present on the Data Lines DL00–DL23 to the processing unit. The Data Line information is, however, meaningless since the processing unit does not sample the Data Lines during the execution of this instruction. Also in block 507 the FFDW flip-flop 100 is reset and the FEND flip-flop 116 (FIG. 8) is set since the present instruction being executed is MTE. At completion of block 507, block 507 is exited and since the FEND flip-flop is set, the "Yes" branch is taken and the FEND control state, as shown by the flow chart block 506 in FIG. 17, is entered.

Referring to the "FLD, MTE, FXLD or FLZU" heading in block 506, it is seen that included within the operations performed during this period is the transferring of B-Register bit 47 into the A-Register bit position 47. This is accomplished (FIG. 11) by the presence of the MTE signal, the Move To Exponent decode instruction signal from the Instruction Decode Logic, passing through OR-gate 172 and enabling, in conjunction with the FEND1 signal, an AND-gate 174, the third input of which is bit 47 of the B-Register.

The B-Register exponent is also transferred into the exponent portion of the A-Register at this time. Referring to FIGS. 9, 10, and 11, the Control Counter 22 contents are applied directly to the X input terminals of Adder stages EA39–EA46. Since no other inputs to these stages are enabled at this time, the S outputs therefrom reflect the B-Register input. The S output lines ES391–ES461 are applied to an AND-gate 160 in conjunction with the SEX signal from the Gated Clock Amplifiers thus transferring the exponent of the B-Register 20 through the Adder 28 into the exponent field (bits 39–46) of the A-Register 26. The exponent operand transferred from the processing unit into the floating point unit is now contained in its proper location in the A-Register and execution of this instruction is complete.

With reference once again to flow chart block 505 of FIG. 16 and assuming that the instruction now being decoded by the Instruction Decode Logic 40 (FIG. 3) is the FLD instruction (Floating Load), it will be noted, under the heading "FLD," that the FFIX flip-flop 58 is reset by this instruction. All other operations in block 505 are as previously described under the "All Instructions" heading. At completion of these operations block 505 is exited. Again, the decision block "FTC2 Enabled?" is utilized to determine if the Timing Counter is in the FTC2 output state. Since it is not, the "No" branch is taken. The test in the "Gen. Inst.?" test block results in the "No" branch being taken therefrom and the floating point unit enters the "First Data Signal Rec'd from PU?" decision block. Upon receipt of the first data signal I/DS from the processing unit, the floating block unit will enter block 507 (FIG. 20) via the decision block "FXLD or FST & FFIX?". In block 507, the first half of the data word operand from the processing unit is transferred into B-Register bit positions 24–47 via the B-Register transfer gates 18 which are enabled by the signals FFDW1 and I/DS and ITS as shown in FIG. 9. Also, in block 507, bit positions 24–47 of the A-Register are transferred to the Data Lines DL00–DL23. This latter transfer is insignificant at this time since the processing unit does not use this Data Line information during the execution of this instruction. Also at this time the B-Register mantissa bits 00–38 are gated into the Adder stages MA00–MA38 by the enabling of the signal FBSX which is applied to AND-gates 176 (FIG. 12). This is done in preparation for transferring the mantissa field into the A-Register during the execution of this instruction. The FFDW flip-flop 100 (FIG. 8) is reset at this time to prepare the floating point unit for receiving the second data word from the processing unit.

At the completion of block 507, the "No" branch is taken from the "FEND Set?" decision block and the floating point unit will await the second I/DS signal by looping through a "Second I/DS Rec'd from PU?" decision block. Upon receipt of the second I/DS signal indicating that the second half of the operand is present on the II00–II23 lines, block 508 will be entered.

The second half of the data word operand from the processing unit is entered into the B-Register bit positions 00–23 from the II00–II23 lines via the B-Register transfer gates 18 which are now enabled by signals FFDW0, ITS and I/DS. The transfer of A-Register bits 00–23 to the Data Lines DL00–DL23 is again insignificant and the FEND flip-flop 116 is set to complete the operation of block 508 after which the floating point unit enters the FEND control state of block 506 (FIG. 17).

In the FEND control state the appropriate functions listed under the "All Instructions" heading are performed. In addition, with reference to the listing under the heading including FLD, the exponent sign bit (B47) is transferred into the A-Register sign bit position A(47—See FIG. 11) via the AND-gate 174 receiving, in addition to the B47 exponent sign bit input, the FEND1 signal and a third input from OR-gate 172 which is receiving the FLD decoding instruction signal from the Instruction Decode Logic 40. The Control Counter contents, B-Register bits 39–46, are transferred into the A-Register via the Adder and AND-gate 160 on the lines ES391–ES461. The mantissa sign bit (B38) from the B-Register 20 (FIG. 9) is transferred into the A-Register sign bit position (A38) in block 506 via the OR–gate 170 and the AND–gate 168, the latter receiving the B38, FEND1, and FLD instruction signal inputs. The completion of mantissa transfer moves bits 00–37 of the B-Register 20 into the Adder 28 by way of AND-gates 176. The S outputs of the Adder stages MS00–MS37 are transferred into the A-Register mantissa portion (00–37) via lines MS00–MS37 and the AND-gate 162 enabled by the SAX signal. The complete data word now existing in the A-Register, the execution of the FLD instruction is complete.

The next instruction to be explained is the FXLD (Fixed Load) instruction. Again beginning the explanation with flow chart block 505 of FIG. 16 it is noted, under the heading "FXLD", that the decode of this instruction will cause the FFIX flip-flop 58 (FIG. 3) to set and the Timing Counter to step to the FTC2 output state. In addition, the four operations as previously described under the "All Instructions" heading are accomplished. Upon completion of block 505 the floating point unit will then enter the "FTC2 Enabled?" decision block. Since this instruction did set the Timing Counter to the FTC2 output state, the "Yes" branch out of the "FTC2 Enabled?" decision block will be taken and block 529 (FIG. 16) will be entered. In block 529, as shown under the "All Instructions" heading, the FFDW flip-flop 100 will be placed in the reset condition and the Timing Counter FTC2 state will be cleared such that there is no output from the Timing Counter. Under a "FXLD" heading, the FBSX signal from the Algorithm Execution Control Logic is enabled at this time in preparation to shifting the least significant bits 00–37 of the B-Register through the Adder into the A-Register mantissa field. Upon completion of these operations, the floating point unit will leave block 529 and the test for General Instructions will be made. Since this is not a General Instruction the "First Data Signal Rec'd. from PU?" decision block will be entered.

Upon receipt of the first data signal (I/DS) from the processing unit, the floating point unit will test to see if the instruction is either FXLD or FST & FFIX1 (FIG. 20). Since the present instruction is FXLD, block 508 will be entered at which time the data word operand from the processing unit now present on Information Item Lines II00–II23 will be transferred into the B-Register into bits 00–23 via the B-Register transfer gates 18 by the enable signals FFDW0, ITS and I/DS. The FEND flip-flop will be placed in the set state and A-Register bits 00–23 will be transferred to the Data Lines DL00–DL23, this transfer being insignificant. Block 508 will then be exited and the FEND control state block 506 (FIG. 17) will be entered. With block 506 in the FEND control state the operations as previously described under the "All Instructions" heading will be accomplished to complete instruction execution.

In the ADE (Add to Exponent) instruction the contents of a specified memory location are added to the exponent field of the A-Register 26. Again beginning the explanation with the flow chart of FIG. 16, during the time of block 505 those operations under the "All Instructions" heading are performed. Since this instruction does not enable the FTC2 signal and is not a General Instruction, the floating point unit goes to the "First Data Signal Rec'd. from PU?" decision block where it cycles until the receipt of the first data signal (I/DS) from the processing unit. Upon receipt of the first data signal, the floating point unit will take the "Yes" branch from this decision block and enter into flow chart block 557 of FIG. 21. In the time of block 557, the contents on the Information Item Lines II00–II23, which at this time contain a data word, are transferred into the B-Register 20 via the B-Register transfer gates 18 which are enabled by the combination of the signals FFDW1, I/DS and ITS as shown in FIG. 9. Simultaneously, as shown by FIG. 10, the FESX signal is enabled thus preparing the exponent portion of the Adder, stages EA39–EA46, for exponent calculation. The FESX signal is applied as one input of each of 8 two input AND-gates 178, the second input to each gate being one of the A-Register bits A39–A46. The output of each of the AND-gates 178 is applied to the Y input terminal, respectively, of the Adder stages EA39–EA46. At this time, the FFDW flip-flop 100 is reset, the FEXP flip-flop 102 is set, thus placing the floating point unit in the exponent calculation control state, and the Timing Counter is set to the FTCO output state.

With the above conditions established, the floating point unit tests to see if the A-Register exponent is equal to the B-Register exponent. This is accomplished in the decision block "A47=B47?" at the output of block 557. If the exponent signs are equal, exponent calculation will consist of the addition of the A- and B-Register exponents. In this case the "Yes" path is taken from the "A47=B47?" decision block and flow chart block 58 is entered wherein the Timing Counter is changed to the FTC1 state. Block 558 is exited and block 560 is entered wherein the Timing Counter state is advanced to the FTC2 output state and block 540 is now entered.

The exponent addition which occurs in the time of block 540 is best understood with reference to FIGS. 10 and 11. As previously stated, A-Register bits 39–46 are applied via AND-gates 178 to the Y inputs of Adder stages EA39–EA46. Simultaneously, the B-register control Counter bits B39–B46 are being applied to the X inputs of the Address stages EA39–EA46. The resultant sum of these inputs forms the outputs of these same Adder stages and is applied via lines ES391–ES461 and AND-gate 160, enabled by the signal SEX from the Gated Clock Amplifiers, to the A-Register 26. These signals to the A-Register represent the sum of the two exponents and are placed into the A-Register in bit positions 39–46. As shown in block 540 (FIG. 21), if the sum of the A- and B-Register exponents is greater than 255 and, if the sign of the original A exponent was positive (a binary 0), a temporary over-flow condition will be stored in the Algorithm Execution Control Logic. This over-flow condition is detected by the Algorithm Execution Control Logic by monitoring to determine if the A-Register 47 bit is a binary 0 and if the EC46 line (FIG. 10) is a binary 1. In a similar manner, if the sum of the A- and B-Register exponents is greater than 255 and the sign of the original A exponent was negative (a binary 1), the Algorithm Execution Control Logic will store a temporary under-flow condition. At the termination of block 540, the FESX signal is disabled, the Timing Counter FTC2 is cleared, and the Timing Counter is set to the FTC3 output state.

Upon leaving block 540, the floating point unit will enter block 543 wherein the A-Register exponent sign bit (A47) is reset if the exponent addition results in a zero exponent in the A-Register as indicated by the term EZR1 in block 543, and if neither an over-flow condition nor an under-flow condition was detected by the Algorithm Execution Control Logic. At the completion of block 543 the FTC3 Timing Counter state is set to the FTC4 output state and upon leaving block 543 a determination is made as to whether or not this is the ADE instruction ("ADE Inst.?" test block). Since this is the ADE instruction the "Yes" branch is taken and block 544 is entered.

In block 544 the FEND flip-flop 116 is set, the FEXP flip-flop 102 is reset, the Timing Counter is cleared from the FTC4 state and set to the FTC5 output state. The floating point unit now leaves block 544 and enters the FEND control state block 506 of FIG. 17. As shown in FIG. 17 under the "All Instructions" heading, the final instruction housekeeping tasks are performed as previously described at which time the FEND control state will be exited and the floating point unit is in proper condition for receipt of the next instruction.

Figure 21:
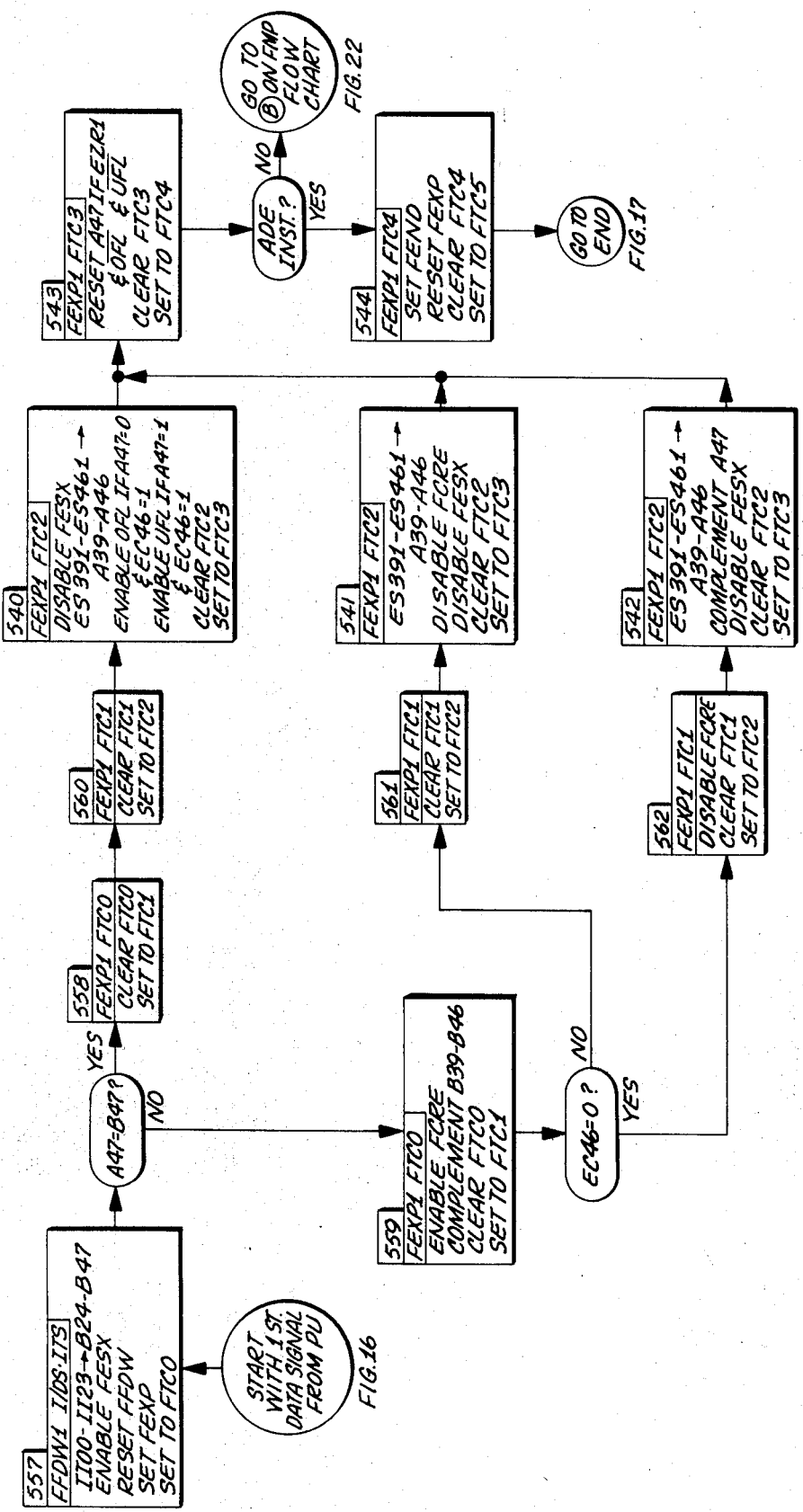

With reference once again to the decision block "A47=B47?" of FIG. 21, if the exponent sign bits of the A- and B-Registers are not equal, the "No" branch is taken and block 559 is entered. At this time the FCRE signal is enabled thus forcing a carry (a binary 1) into the EA39 stage of the Adder (FIG. 10). The one's complement of the Control Counter bits 39–46 is taken as shown in FIG. 9 by the enabling of the CBE signal to the Complement Control Counter Gates in the manner as previously described to form the two's complement of the B-Register exponent. By complementing in this manner, the exponent calculation to be performed will be the subtraction of the B-Register exponent from the A-Register exponent. It will be noted in FIG. 10 that since the A-Register exponent bits are present at the respective Y inputs of the exponent portion of the Adder 28 due to the presence of the FESX signal, and the B-Register exponent is an ungated input to the Adder, the subtraction of the B exponent from the A exponent will occur immediately. At the termination of block 559 the FTC0 Timing Counter state is cleared and the Timing Counter is set to the FTC1 state. A test is then made by the floating point unit to determine if the exponent carry line EC46 (FIG. 10) is a binary 0 (decision block "EC46=0?"). If the results of the "EC46=0?" test block are "No" it is an indication that the A-Register exponent was equal to or greater than the B-Register exponent and that the true magnitude of result is present at the S outputs of the Adder stages. Therefore, no correction of the resultant exponent is necessary and block 561 is entered wherein the FTC1 Timing Counter state is cleared and the Timing Counter is set to the FTC2 output state.

Flow chart block 541 is now entered. In block 541 the result of the subtraction is transferred from the Adder into A-Register bit positions 39–46 via the ES391–ES461 lines and AND-gate 160. The FCRE and FESX signals are disabled and the Timing Counter is changed to the FTC3 output state. Upon exiting from block 541 of FIG. 21 block 543 is entered and the instruction execution from this point continues as was described previously.

Referring once again to the decision block "EC46=0?", if the EC46 line did equal zero, indicating that the A-Register exponent was less than the B-Register exponent and that the result of the computation is in the two's complemented form, the "Yes" path is taken and block 562 is entered. In block 562 the Timing Counter is set to the FTC2 state and the FCRE signal is disabled in preparation for taking the two's complement of the result from the Adder. At the completion of block 562 operations, block 542 is entered and the two's complement of the result of the computation will be next taken. Recalling that the FCRE signal was disabled in block 562, that the B-Register inputs to the Adder are still in the one's complement form and that the A-Register inputs are in absolute magnitude form, the two's complement of the resultant exponent is present at the $\overline{S}$ ouputs of the Adder stages EA39–EA46. This result is placed into the A-Register by passing the $\overline{S}$ outputs of Adder stages EA39–EA46 on the lines ES390–ES460 through the AND-gate 158 by the SNE enable signal. Also during the time of block 542, the A-Register exponent sign bit 47 is complemented (set equal to the B-Register exponent sign bit), the FESX and SNE signals are disabled and the Timing Counter is set to the FTC3 output state. Upon exiting from block 542 the floating point unit enters block 543 for subsequent operations including termination of execution, all in the manner previously described.

The SBE (Subtract From Exponent) instruction is executed in a manner identical to that just described for the ADE instruction with one minor distinction. The nature of this distinction may be ascertained by a comparison of the flow chart of FIG. 21 (ADE) to the flow chart for the SBE instruction, FIG. 28. Referencing specifically the decision block "A47=B47?" in each of the figures, it is seen that in the case of the ADE instruction (FIG. 21) when the A-Register exponent sign bit does not equal the B-Register exponent sign bit the "No" branch is taken to flow chart block 559 whereas if the instruction is the SBE instruction (FIG. 28), if the A-Register bit 47 does not equal the B-Register bit 47, the "Yes" branch is taken to a flow chart block 548 which defines the same operations as block 559. Similarly, if the exponent sign bits are equal, the "Yes" branch taken for the ADE instruction defines operations, starting with block 558, which are identical with those operations in the "No" branch, starting with block 547, for the SBE instruction. Therefore, the only difference existing between the executions of the SBE and the ADE instructions is that in the SBE instruction, when the signs of the exponents are equal the B-Register exponent must be complemented whereas in the ADE instruction when the signs of the exponents are unequal, the B-Register exponent is complemented. That this should be true becomes evident when it is realized that the addition of a negative number to a positive number is really a subtraction type operation and that in the present embodiment to subtract X from Y the two's complement of X is added to Y. For convenience of comparison, the following table lists the comparable flow chart blocks in FIGS. 21 and 28.

| FIG. 21 (Block No.): | FIG. 28 (Block No.) |
|---|---|
| 557 | 546 |
| 559 | 548 |
| 558 | 547 |
| 560 | 549 |
| 561 | 550 |
| 562 | 551 |
| 540 | 552 |
| 541 | 553 |
| 542 | 554 |
| 543 | 555 |
| 544 | 556 |

When making the above comparison, those operations specified in several of the blocks of FIG. 28 which relate to the FDI instruction should be ignored as they do not affect the operation of the floating point during the execution of the SBE instruction.

The next instruction execution to be described is the FAD (Floating Add) instruction. This instruction has two variations, both using the same instruction operation code, as follows. The first of these varations is when the floating point unit is not in the fixed point mode (the FFIX flip-flop is not set) and the instruction is executed as the FAD instruction which performs the add function on the complete floating point data word of 48 bits. The other variation of this instruction is when the floating point unit is in the fixed point mode of operation (the FFIX flip-flop is in the set condition) and the instruction is executed as an FXAD instruction performing the add function only on the least significant half (bits 00–23) of the data in the floating point unit registers.

The execution of this instruction, first in the FAD variation (FFIX flip-flop is not set) may be best understood with reference to the flow charts of FIGS. 16, 17, and 32–37 taken in conjunction with FIGS. 9–13 in combination. Again, as has been the practice, it will be assumed that the instruction operation code has been loaded into the I-Register 24, decoded by the Instruction Decode Logic 40 and that the A-Register 26 presently contains an operand. Referring now to block 505 of FIG. 16, under the heading which lists the FAD instruction, it is seen that the contents of the Q-Register, bits QX0–38 (FIG. 13), are reset to binary 0's by the RSQ signal (FIG. 13). At the completion of this operation and the four operations previously described under the "All Instructions" heading, the floating point unit leaves block 505 and enters the "First Data Signal Rec'd. Form PU?" decision block via the "No" branches of the preceding "FTC2 Enabled?" and "Gen. Inst.?" decision blocks. The floating point unit will loop in this test block as previously described until receipt of the first data signal (I/DS) at which time the floating point unit enters block 563 of the flow chart of FIG. 32 via the input "Start With 1st Data Signal & FFIX0." At the occurrence of the first data signal I/DS with the FFDW flip-flop 100 being set and the ITS signal being false signifying that this is not an instruction word, the operand word contained on the Information Item Lines II00–II23 is transferred through the B-Register transfer gates 18 into bit positions 24–47 of the B-Register 20 as shown in FIG. 9. The B-Register now contains the signed exponent, the sign of the mantissa, and the 14 most significant bits of the mantissa of an operand word. The FFDW flip-flop 100 is now reset, the FEXP flip-flop 102 is set, the FBSX signal is enabled and applied to AND-gates 176 (FIG. 12), and the Timing Counter 66 is set to its FTC0 output state. Additionally, the FESX signal is generated in preparation for exponent calculation. In FIG. 10, the FESX signal is applied simultaneously to eight AND-gates 178 the other input to each being, respectively, one of the bit positions 39–46 from the A-Register to thus gate the contents of the portion of the A-Register 26 into the eight stages EA39–EA46 of the Adder 28. The inputs from the A-Register are applied to the Y inputs of the several stages of the Adder 28, while the X input to each of the Adder stages EA39–EA46 are, respectively, from bit positions 39–46 of the B-Register via lines B39–B46. The B-Register inputs are ungated and hence are supplied to this portion of the Adder at all times.

Again, with respect to FIG. 32, upon completion of the operations in block 563 the next operation accomplished is the determination of whether or not mantissa adjustment is required and, if so, which mantissa is to be adjusted and by what amount. This is performed by a subtraction operation between the exponents of the two numbers here in question. From the decision block (A47=B47?) immediately following block 563, it is seen that bit 47 of the A-Register is compared with bit 47 of the B-Register to determine whether or not the signs of the exponents are the same. This is necessary because the signs must be different to perform the subtraction necessary to determine the number of shifts; i.e., the amount of adjustment. If the signs are the same, the "Yes" branch is taken from the "A47=B47?" block and the floating point unit of the present invention will progress to block 564 at which time the two's complement is taken of the exponent maintained in the B-Register. This is done by transferring bits 39–46 of the B-Register 20 through the Complement Control Counter Gates 124 (FIG. 9) which has been enabled by the CBE signal, the output of which is the one's complement of the original contents of the B-Register and which is applied to bit positions 39–46 of the B-Register. This one's complemented exponent is applied to the respective X inputs of the EA39–EA46 stages of the Adder 28 (FIG. 10) which also has applied thereto at the Z input terminal of stage EA39 the FCRE signal to thus provide the two's complement of this exponent. It will be remembered that the FESX signal is also present at this time thus supplying the exponent of the operand in the A-Register to the Adder. With these inputs to the Adder 28, the B-Register exponent is subtracted from the A-Register exponent with the resultant appearing at the S outputs of the several stages of the Adder. Upon the occurrence of the SCX signal applied to gate 138 this resultant is placed into bit positions 39–46, the Control Counter 22, of the B-Register.

Additionally, as shown in block 564 of FIG. 32, the A- and B-Register mantissas, bits 00–37 of each, are exchanged thus placing the mantissa of the operand word originally in the A-Register in the B-Register and placing the mantissa originally in the B-Register in the A-Register. It should be recalled at this time that the information being transferred from the B-Register into the A-Register will only be information bits 23–37 of the first operand word which is the most significant part of the mantissa portion of the word in the B-Register as the second operand word has not been transferred into the floating point unit B-Register at this time. Therefore, after this transfer bit positions 00–23 of the A-Register will contain zeros due to the resetting of the B-Register during the FEND control state of the previous instruction. The A-Register to B-Register mantissa transfer is accomplished, FIGS. 9–12, by the application of an enabling signal ABX from the Gated Clock Amplifiers applied to an AND-gate 184 (FIG. 9) the other inputs to which are the A00–A37 lines and the outputs of which form the inputs to bits 00–37 of the B-Register. The B-Register to A-Register mantissa transfer is performed by transferring the B-Register mantissa through the Adder 28, via gates 176, and applying the S Adder outputs of stages MA00–MA37 via lines MS00–MS37 and AND-gate 162, enabled by the SAX signal, to bit positions 00–37 of the A-Register. In completion of block 564 operations, the Timing Counter is set to the FTC1 output state and the FACI signal is applied from the applied Algorithm Execution Control Logic 30 to AND-gates 186 is disabled. (The FACI signal was enabled during the FEND control state of the previous instruction.)

At the termination of block 564 a test is made to determine if the A exponent was less than the B exponent. This is done by detecting a carry out of the exponent adder bit position EA46 on the line EC46 as shown in FIG. 10, and as shown in FIG. 32 by a decision block "EC46=0?". If the EC46 line is a binary 0 the floating point unit will enter block 566, signifying that the A-Register exponent was less than the B-Register exponent, and the exponent resultant is in the two's complement form. In this case it is necessary to correct the resultant by the taking of the two's complement thereof. In preparaion for this action which occurs at a later time, the FCRE signal at Adder state EA39 is disabled (FIG. 10).

Also in block 566 as shown in FIG. 32, the B-Register mantissa is complemented, since this is the FAD instruction, if the A-Register sign bit A38 is not equal to the B-Register sign bit B38. If this condition exists, the CBM signal from the Gated Clock Amplifiers is generated and applied to the complement mantissa gates 188 as shown in FIG. 9. The complement mantissa gates 188, receiving inputs 00–37 from the B-Register mantissa portion, will provide the one's complement output to the B-Register bit positions 00–37. Simultaneously, the FCRM signal from the Algorithm Execution Control Logic 30 is enabled and supplied to the Z input of the MA00 stage of the Adder (FIG. 12) thus placing a binary 1 into the least significant bit position of the Adder. The FCRM signal in conjunction with the one's complemented mantissa now in the B-Register as applied to the Adder through gates 176 will provide at the S outputs of the Adder the two's complement of that mantissa. This mantissa, it should be noted, is that which was contained in the A-Register at the beginning of instruction execution.

Also in the time of block 566 the Algorithm Execution Control Logic tests to see if the contents of the B-Register bits 00–37 (the mantissa) are zero. If so, the Algorithm Execution Control Logic enables a signal internal to itself, the logic of which is not shown, called INA (Inhibit Negative Answer). This fact is stored by the Algorithm Execution Control Logic and it will be used at a later time to inhibit false detection of a negative result due to taking the two's complement of a zero mantissa. Prior to leaving block 566 FTC1 will be cleared and the Timing Counter 66 will be set to the FTC2 output state. Upon exiting block 566 the floating point unit tests to determine if the A-Register exponent sign bit A47 and the B-Register exponent sign bit B47 are both binary 1's (decision block "A47 & B47=1?"). If this condition is true, block 571 (FIG. 32) is entered.

Referencing FIGS. 10 and 11, S and S̄ outputs of the EA39–EA46 Adder stages are connected to bit positions 39–46 of the A-Register 26. The S outputs are connected via lines ES391–ES461 and AND-gate 160 while the S̄ outputs are connected by the lines ES390–ES460 and AND-gate 158. Realizing that the S̄ output is the one's complement of the S output, the absolute value of the number in Adder stages EA39–EA46, which is now in one's complemented form, can be formed very rapidly by taking the one's complement of that number at the S̄ outputs of the Adder and placing them in the A-Register. Therefore, the true value of a one's complemented number in the Adder may be placed into the A-Register 26 of the present embodiment by enabling the AND-gate 158 by the SNE signal to gate the S̄ Adder outputs via lines ES390–ES460 into the A-Register. In completion of the operations of block 571, the smaller exponent (A-Register exponent) is transferred into the B-Register exponent field (bits 39–46) for temporary storage via AND-gate 120 (FIG. 9) by the enable signal ECX. Also in block 571, while the transferring operations just described are being performed, the FESX signal is disabled (FIG. 10) thus disabling the A-Register inputs into the Adder 28, FTC2 of the Timing Counter is cleared and the Timing Counter is set to its FTC3 output state.

In completion of the operations set forth in block 571 a signal AJB is generated and retained for future use in the Algorithm Execution Control Logic. This signal designates that the original B-Register exponent was smaller than the original A-Register exponent and hence B-Register mantissa adjustment will be necessary to make them equal.

Referring again to FIG. 32, if bits A47 and B47 (the exponent signs) are both binary 0's upon exiting from block 566, block 572 is entered signifying that the B-Register exponent was greater than the A-Register exponent and that both exponent signs are positive. In this case the one's complement of the calculated difference of the exponents is transferred from the Adder to the A-Register into bits 39–46 via AND-gate 158 by the SNE signal (FIG. 11) as previously described. The exponent in the B-Register (which has been determined to be the larger of the two exponents) is complemented back to its original form as it was previously complemented in preparation for subtracting the A exponent minus the B exponent by the CBE signal applied to the Complement Control Counter Gates 124 in FIG. 9. Also during block 572 the FESX signal is disabled, FTC2 cleared, and the Timing Counter set to its FTC3 output state as previously described for block 571.

Referring again to the decision block "EC46=0?" at the output of block 564, a negative answer to the question posed results in entry into block 565. The operations performed in this block are identical to those described with respect to block 566, except that the FCRE signal applied to stage EA39 of the Adder (FIG. 10) is not disabled. Upon exiting from block 565 a test is made to determine if the A- and B-Register exponent sign bits are binary 1's. This is done by another decision block "A47 & B47=1?".

Block 569 is entered through the "No" branch from the above decision block, the resultant exponent of the exponent calculation (A exponent—B exponent) is transferred to the B-Register. This transfer is from the Adder 28 (FIG. 10) on lines ES391–ES461 via AND-gate 138 which is enabled by the SCX signal. The larger exponent, which in this case was in the A-Register, is left unchanged. Also at this time the signals FCRE and FESX are disabled, the Timing Counter is set to its FTC3 output state, and the AJB signal is provided for the reasons set forth above.

If at the end of block 565 bits 47 of the A- and B-Registers are binary 1's, the "Yes" path is taken from the decision block "A47 and B47=1?" and block 570 is entered. In this situation the result of the calculation of the exponent difference (A exponent—B exponent) is transferred from the Adder 28 into the A-Register 26 via AND-gate 160 and lines ES391–ES461 (FIG. 11). Also during block 570 the signal CBE will enable the Complement Control Counter Gates 124 (FIG. 9) to complement the B-Register back into its original form as it was prior to being complemented in block 564 in preparation for subtracting the exponents. The B-Register exponent at this time contains the larger exponent (absolute magnitude). In completion of block 570 operations, the FESX and FCRE signals are disabled and the Timing Counter is set to its FTC3 output state.

Referring once again to FIG. 32 at the output of block 563 where the exponent sign bits of the A- and B-Registers are compared ("A47=B47?" decision block), if the A- and B-Register exponent signs are not equal, indicating that the difference between the exponents will be calculated by the addition of the A- and B-Register exponents, block 567 is entered. In block 567 the A- and B-Register exponents are added forming the adjust count exponent (the difference). The A- and B-Register mantissas are exchanged in the same manner as was described with respect to block 564, the Timing Counter is set to the FTC1 output state, and the FACI signal is disabled. Block 568 is then entered wherein the operations performed are exactly the same as those previously explained for block 565.

At the output of block 568 a test is made, shown by decision block "A47=1?", to determine if the sign bit A47 of the A-Register is a binary 1 or a binary 0. If A-Register bit 47 is a binary 0 (positive), block 573 is entered. When block 573 is entered the temporary over-flow condition indicated by line EC46 being true is stored (OFL) in the Algorithm Execution Control Logic if the sum of the A and B exponents is greater than 255. This over-flow condition is a temporary indication that the adjust count (the sum) is greater than the size of the exponent register, and this fact will later result in resetting the adjust count to zero. Also during block 573 the adjust count is transferred from the Adder on lines ES391–ES461 to the Control Counter 22 (FIGS. 10 and 9) via AND-gate 138. The A-Register now contains the larger exponent and this will be used to form the exponent portion of the sum of the addition operation at the end of instruction execution. The A-Register inputs to the exponent portion of the Adder are also disabled at this time by disabling the FESX signal, the AJB signal is generated and the Timing Counter is set to the FTC3 output state.

The "Yes" path from the "A47=1?" decision block leads to flow chart block 574 and is taken when the A-Register exponent sign bit 47 is negative (binary 1). In block 574 a temporary under-flow condition indicated by the EC46 line being true is stored in the Algorithm Execution Control Logic 30 for the same reasons as given for OFL in block 573, the FESX signal is disabled, and the Timing Counter 66 is set to the FTC3 output state. In this case, mantissa adjustment is to be performed subsequently in the performance of the instruction and, therefore, the adjust count is transferred from the Adder into bit positions 39–46 of the A-Register via AND-gate 160 in preparation for exchanging the contents of the A- and B-Registers in block 578 of FIG. 33.

Block 569 of FIG. 32 was entered because the sign of the A exponent equals the sign of the B exponent, and the A exponent is equal to or greater than the B exponent. Upon exiting from block 569, flow chart block 575 of FIG. 33 is entered at which time the Timing Counter is set to the FTC4 output state. Block 575 is exited and a test is made in the Algorithm Execution Control Logic to see if the calculated difference between the exponents is equal to or greater than 76 (test block "C≥76?"). If the result of this test is "No," block 579 is entered, the Timing Counter is set to the FTC 5 output states after which the floating point unit advances to block 582.

Referring now to the flow chart block 582 of FIG. 33 and to FIGS. 9–12, it is seen that the mantissa of the B-Register (bits 00–37) is transferred into the A-Register via the Adder 28 and the mantissa of the A-Register is transferred into the mantissa field of the B-Register. Simultaneous application of the proper enable signals will cause this exchange with the FBSX signal gating the B-Register mantissa through the Adder 28 with the Adder outputs being delivered to the A-Register via the MS00–MS37 lines and AND-gate 162 which is enabled by the SAX signal. The transfer of the A-Register mantissa bits 00–37 into the B-Register bit positions 00–37 is accomplished via AND-gate 184 receiving the enable input ABX in conjunction with the lines A00–A37.

To finish block 582 of FIG. 33, the FACI signal is disabled at this time, the purpose of which is to be described hereinafter. The initial carry input, FCRM, into stage MA00 of the Adder 28 (FIG. 12) is also disabled and the Timing Counter FTC5 output state is cleared thus placing the Timing Counter in a no active state at this time.

Referring again to the decision block "C≥76?" if the calculated difference between exponents, the adjust count in the Control Counter 22, is equal to or greater than 76, block 580 is entered. An adjust count of 76 or more would result, when adjusting the mantissa of the smaller exponent with a shifting out of the lower end of the Q-Register, as will be more fully understood as this description proceeds. In this situation, therefore, during block 580 the over-flow condition (OFL) is stored in the Algorithm Execution Control Logic and the Timing Counter is set to FTC5.

The floating point unit now advances to block 583, wherein the operations performed are exactly the same as those described for block 582, except that the Control Counter 22 (B-Register bits 39–46) is reset to all binary 0's by the RSC signal (FIG. 9). The Control Counter is reset to binary 0's at this time because in calculating the exponent difference either under-flow or over-flow was detected and stored. As a result no mantissa adjustment will be made, and the adjust control count in the Control Counter 22 is not needed.

Referring briefly to FIG. 32, it is seen that each of blocks 570, 571, and 572 are connected to a point 18 which corresponds to point 18 of FIG. 33 which connects to flow chart block 576. Therefore, upon exiting from any of the block 570–572, block 576 is entered at which time the A- and B-Register exponents are interchanged, with the larger original exponent being transferred to the A-Register exponent field, and the calculated difference being transferred to the B-Register exponent field. This exchange is accomplished (FIGS. 9, 10, and 11) by the continuous presence of bits 39–46 from the B-Register 20 at the X inputs to the Adder stages EA39–EA46 whose S outputs reflect the B-Register input bit structure which is applied to the A-Register over lines ES391–ES461 and AND-gate 160. Bits 39–46 of the A-Register are gated into the B-Register bit positions 39–46 via AND-gate 120 by the enabling signal ECX. The Timing Counter is changed from the FTC3 to the FTC4 output state.

Block 573 of the flow chart of FIG. 32 was entered because the A-Register exponent sign was positive and the B-Register exponent sign was negative and a temporary over-flow condition was established in the Algorithm Execution Control Logic if the sum of the A-Register exponent and the B-Register exponent was greater than +255. It should also be recalled that in block 573 the sum of the A- and B-Register exponents was transferred into the B-Register exponent portion which now contains the calculated difference between the exponents. Upon completion of the operations in block 573, the floating point unit will exit to point 19 of FIG. 32 which corresponds to point 19 of FIG. 33, from which point block 577 is entered. In block 577 the Timing Counter is set to the FTC4 output state. Upon leaving block 577 a "OFL or UFL?" decision block is entered where a determination is made as to whether the calculated difference between exponents resulted in either an over-flow or an under-flow condition being stored in the Algorithm Execution Control Logic. The "Yes" branch from this decision block leads to block 581 wherein the Timing Counter is set to the FTC5 output state. After block 581, the floating point unit enters block 583 to perform the operations specified therein as were previously described. Referring back to the "OFL or UFL?" decision block, if neither of these conditions exists, the "No" branch is taken and the floating point unit enters into the decision block "C≥76?" the "No" and "Yes" paths from which connect to blocks 579 and 580 respecively.

Block 574 of FIG. 32 was entered because the B-Register exponent sign was positive and the A-Register exponent sign was negative. In block 574 an under-flow condition was established in the Algorithm Execution Control Logic if the sum of the A-Register and B-Register exponents was greater than 255. Additionally, during block 574, the calculated difference between the exponents was transferred into the exponent portion of the A-Register. Point 20 at the output of block 574 corresponds to point 20 of FIG. 33 from which point flow chart block 578 is entered. In block 578 the contents of the exponent portion of the A-Register and the contents of the exponent portion of the B-Register are exchanged with the larger exponent being transferred to the A-Register and the calculated difference being transferred into the exponent portion of the B-Register. This is accomplished as shown in FIGS. 9, 10, and 11, by the simultaneous enabling of AND-gates 160 and 120 by the respective signals SEX and ECX from the Gated Clock Amplifiers. Prior to leaving block 578 the FTC3 output state is cleared and the Timing Counter is set to the FTC4 output state. The floating point unit will again enter the "OFL or UFL?" decision block and take therefrom the appropriate "Yes" or "No" branch to block 581 or the "C≥76?" decision block.

All of the paths thus far described with respect to FIG. 33 lead to either block 582 or 583. Upon completion of the operations of either of these two blocks, the floating point unit enters a "Second Data Signal Rec'd. from PU?" decision block through which the floating point unit will loop until receipt of the second data signal I/DS from the processing unit. Upon receipt of this I/DS signal, the floating point unit will enter block 592. The B-Register will now receive into the mantissa portion bits 00–23, the second operand word from the processing unit from II00–II23 lines via the B-Register transfer gates 18 (FIG. 9) which are enabled by the signals FFDW0, ITS and I/DS. Also in block 592, the FEXP flip-flop 102 (FIG. 8) is reset and the FADJ (adjust mantissa control state flip-flop 104) is set as is the FEXC flip-flop 112. The Timing Counter 66 is set to the FTC0 output state. Upon completion of the block 592 operations, the floating point unit enters into block 593 wherein the following operations simultaneously take place. The contents of the Control Counter 22, B-Register bits 39–46, are one's complemented (Complement Control Counter Gates 124 enabled by the CBE signal) and the one's complement is placed into the Control Counter (FIG. 9). This complementation is performed in preparation for decrementing the exponent difference to zero during mantissa adjustment by adding to the contents of the Control Counter to be described hereinafter. If the Control Counter contents do not equal zero, the FBSX signal applied to AND-gates 176 (FIG. 12) is disabled. On the other hand, if the Algorithm Execution Control Logic detects that the Control Counter is equal to zero, the FBSX signal remains enabled and applied to AND-gates 176. The FASX signal is enabled if neither an over-flow nor an under-flow condition exists. If the B-Register mantissa field is to be adjusted, that is, if the signal AJB was enabled and this fact stored in the Algorithm Execution Control Logic, and neither an under-flow nor an over-flow condition exists, the B-Register mantissa (bits 00–37) is transferred via Adder stages MA00–MA37, lines MS00–MS37 and AND-gate 160 into the A-Register. Since it is necessary to save the contents of the A-Register, bits 00–37 thereof are transferred into B-Register bit positions 00–37 over the lines A00–A37 and through AND-gate 184 receiving thereto the enable signal ABX (FIG. 9). In addition, if the signal AJB was not enabled, the exponent sign bit B47 is transferred into the A-Register sign bit 47. (AJB not being enabled is an indication that the A-Register mantissa is to be adjusted instead of adjusting the B-Register mantissa.)

Also during the time of block 593, if the magnitude of the Control Counter 22 is equal to one and there is no under-flow nor over-flow condition, the FACI signal applied to AND-gates 186 is disabled. In the Algorithm Execution Control Logic a signal INA (inhibit negative answer) is enabled and this fact stored if the AJB signal is not enabled and if neither an over-flow or an under-flow condition. The storage of the INA signal is to inhibit the detection of the formation of the two's complement of the result if the original contents of the A-Register would be adjusted out of the Q-Register during mantissa adjustment. Also, since in block 593 all exponent corrections have been made, the two signals OFL and UFL are disabled, the Timing Counter is set to the FTC1 output state, and FTC0 is cleared.

At this time if mantissa adjustment is not required, that is, the contents of the Control Counter are equal to zero, the two signals FBSX supplied to the AND-gates 176 and FASX supplied to AND-gates 126 are enabled thus providing inputs to the X and Y terminals of the mantissa Adder stages MA00–MA38 and an add cycle is initiated. The results of the addition are transferred out of the sum (S) output terminals of the respective Adder stages via lines MS00–MS37 into the A-Register through AND-gate 162 which is enabled by the SAX signal. Under these conditions the FACI (adder carry inhibit signal) signal to AND-gates 186 is enabled, since the contents of the Control Counter are equal to zero and not equal to one. The FACI signal is disabled to inhibit the transfer of a true carry signal and to force a "carry not" signal into the succeeding stage via AND-gates 186.

In FIG. 12, only an illustrative portion of the 39 bit mantissa Adder 28 is shown. Two AND-gates 186, the first first providing an input to the Z input terminal of stage MA04 and the second providing an input to the Z input terminal of stage MA37, are representative of a total of seven such gates. The five gates not shown are identical to the two shown and provide "carry not" inputs to the Z terminals of Adder stages MA10, MA16, MA22, MA28 and MA34. The part that these gates play in the operation of the mantissa portion of the Adder may be summarized as follows. To those knowledgeable in the art, it is readily apparent that the Adder used in the present embodiment is, excepting those portions directly associated with the AND-gates 186, of the type which requires a certain finite amount of time for a carry or carries to propagate the length thereof. Viewed in FIG. 12, propagation progresses from the least significant stage, MA00, of the Adder to the most significant stage, MA38, when an add function is being performed by the application of the various combinations of the inputs. Because of this characteristic, it is necessary to allow any adder of this type to settle out; that is, for all carries to propagate through the adder and for the adder to reach a static state or a stable condition prior to shifting information from the adder (in the present embodiment, into the A-Register). It also must be realized that because of the electronic circuitry involved in adders of this nature, any change in voltage level applied to an input terminal is in effect a signal. As such, even though a true carry is not being propagated at this time, time must be allowed for the "carry not" to propagate. This may be illustrated using the Adder 28 (assuming gates 186 are absent) of the present embodiment as an example, by first assuming A- and B-Register inputs to the Adder resulting in carry signals from the C output of one stage to the Z input of the succeeding stage. If the B-Register input is now turned off, leaving only the A-Register inputs, there is no possibility of a true carry. However, because of the existence of previous carry signals there is a voltage level change at certain Z inputs and these changes will be propagated through the Adder. This is referred to as a "carry not" signal. Because the propagation time for a "carry not" signal is the same as that for a carry signal, and because in the single input situation there is no possibility of a carry, time allocated for Adder settle out in this situation is wasted.

By way of further example, assume that three time periods; e.g., three successive FTC periods, are required for the Adder to normally settle out; that is, for a carry to propagate the entire length of the Adder. This imposes the restriction on the operation of the Adder that the first transfer signal immediately following an add cycle would not be allowed to occur until after three FTC times. However, in the situation where there is no possibility of a true carry, this period can be reduced by forcing the Adder to settle out early. This is accomplished in the present system by the inclusion of the AND-gates 186.

The FACI signal in its false estate as applied to AND-gates 186 is used to force a "carry not" signal into the Z input of the Adder stage immediately there following. When the signal FACI is in the true condition, the AND-gates 186 function as normal AND-gates, thus allowing the true carries out of the respective carry (C) outputs of the Adder stages to which they are connected to propagate to the Z or carry input of the next succeeding stage. When the FACI signal is false, the AND-gates 186 are disabled and the transfer of a signal from the carry output of the preceding stage is inhibited. Additionally, the false FACI signal is immediately applied to the following Adder stage and places a "carry not" signal at the Z input of that stage.

Again, by way of example, assume that in FIG. 12 it takes three FTC times for the Adder 28 to settle out under normal conditions. Also assume that the FCRM signal is disabled and that, simultaneously, the three sets of AND-gates 176, 126, and 156 change states with FASX and FBSX being disabled and FQSX being enabled. With this operation taking place, with inputs from gates 156 only, there cannot be a true carry to propagate the length of the Adder. Therefore, in order to reduce Adder settle out time, the signal FACI is disabled simultaneously with the changing of the input states to the AND-gates 176, 126, and 156, and a "carry not" signal is forced into the respective Z inputs at the outputs of each of the AND-gates 186. This, in essence, allows the "carry not" signal to propagate the entire length of the Adder. However, the "carry not" signal must not propagate the number of stages between adjacent AND-gates 186, therefore decreasing the entire propagation time for Adder settle out. In the present embodiment, the maximum number of Adder stages between adjacent AND-gates 186 is six. Therefore, Adder settle out time may be reduced to one FTC clock period thereby saving two FTC clock periods.

As an example of the forced settle out time, consider the execution of the following sequence first without and then with "forced adder settle out." The sequence to be executed will be: (1) add A-Register to B-Register and place the sum in the A-Register, and (2) exchange A- and Q-Registers. The clock-by-clock procedure without forced settle out is as follows allowing, as previously assumed, three clock periods for adder settle out. The clock periods listed below are representative of FTC Timing Counter output states such as FTC1, FTC2, etc.

Clock period 1.—Turn on the A- and B-Register inputs into the Adder. This is accomplished by enabling the signal FASX into AND-gates 126 and AND-gates 176 receiving thereto the signal FBSX. At this time the Adder is performing the addition of the A- and B-Register input bit configurations.

Clock period 2—Adder settle out time.
Clock period 3—Adder settle out time.
Clock period 4—Gate the Adder outputs into the A-Register via AND-gate 162 (FIG. 11) receiving thereto Adder inputs MS00–MS37 and the enable signal SAX. Also at this time turn off the A- and B-Register inputs into the Adder, thus disabilng the signals FASX and FBSX applied to AND-gates 126 and 176, respectively, and simultaneously turn on the Q-Register input into the Adder by enabling the signal FQSX applied to AND-gate 156.

Clock period 5—Adder settle out time.
Clock period 6—Adder settle out time.
Clock period 7—Gate the Adder output into the A-Register via AND-gate 162 as previously described; that is, place the Q-Register into the A-Register and simultaneously gate the A-Register into the Q-Register via AND-gate 164 receiving thereto the signal AQX, as shown in FIG. 13.

Now consider the clock-by-clock procedure with forced settle out as follows:

Clock period 1—Apply A- and B-Register inputs into the Adder.
Clock period 2—Adder settle out time.
Clock period 3—Adder settle out time.
Clock period 4—Gate the Adder outputs into the A-Register via AND-gate 162 with the enable signal SAX, as previously described. Simultaneously, turn off the A- and B-Register inputs to the Adder by disabling FBSX and FASX signals, turn on the Q-Register input into the Adder by enabling the signal FQSX to AND-gate 156 and disable the FACI signal to force Adder settle out.

Clock period 5—Gate the Adder output into the A-Register via AND-gate 162 and gate the A-Register into the Q-Register via AND-gate 164.

This comparison illustrates the time which can be saved by anticipating the impossibility of a true carry and by forcing a "carry not" signal for forced adder settle out.

Because of the above described forced adder settle out, it is possible to perform add/shift functions in a rapid reiterative manner which is extremely valuable, time-wise, in everyday data processing operations. Referencing once again FIGS. 11–13, it is possible to transfer a register through the Adder 28 or to perform an add function with the contents of two registers and take the Adder output directly into the A-Register or into the A-Register shifted left one bit or shifted right two bits. In FIG. 11, the straight through transfer from the mantissa portion of the Adder into the A-Register is via AND-gate 162 on lines MS00–MS37. The Adder outputs may be placed into the A-Register shifted left by one bit via AND-gate 130 having applied thereto the MS00–MS36 lines from the Adder and the enable signal SA1. The shift right by two is performed by passing information through the Adder and taking the resultant output from the Adder through AND-gate 148. AND-gate 148 has as its inputs the MS02–MS37 lines and the signal SA2, and the output of AND-gate 148 places the Adder inputs into bits 00–35 of the A-Register. A shift left by one into the A-Register or a shift right by two into the A-Register can be executed at the same time as the A- and B-Registers are being added together. For example, with the enable signals FBSX applied to AND-gates 176 and FASX applied to AND-gates 126, applying input data from the respective registers to the mantissa portion of the Adder, an add function will take place. The sum (S) outputs of the Adder reflect the sum of the A- and B-Registers and, as soon as the Adder settles out, this sum can be transferred into the A-Register via gate 130 displaced left one bit or it can be transferred in displaced right two bits via AND-gate 148 (FIG. 11). This operation is referred to as an add/shift cycle and is executed in the same time as a normal add cycle.

As can be seen from the preceding description, in operations requiring transfer of data into registers in a shifted position, the present system is extremely rapid since it eliminates the customary shift matrix between registers. In those cases where information is transferred into the register and then shifted, it eliminates the time required to perform this function.

At the completion of the operations of block 593, the following point unit then enters the "FDSX Enabled?" test block at point L, FIG. 34. If FBSX was not disabled in block 593 (FIG. 33) thus indicating that the mantissa binary points in the A- and B-Registers are aligned, block 594 is entered through the "Yes" branch of the "FBSX Enabled?" decision block. It will be recalled in block 593 that if FBSX was not disabled at that time, an add cycle was initiated by transferring the resultant mantissa into the A-Register via AND-gate 162 (FIG. 11).

In block 594 the resultant exponent in the A-Register is now transferred into the B-Register via lines A39–A46 and AND-gate 120 which is enabled by the signal ECX, as shown in FIGS. 9, 10, and 11. This operation is performed to place the resultant exponent in the Control Counter in preparation for normalizing the resultant mantissa now in the A-Register. Also in block 594, the FP38 signal coming into gate 128 as shown in FIG. 10, is enabled at this time thus supplying +38 to the exponent portion of the Adder in preparation for decrementing the resultant exponent by 38 if the A-Register is zero and the Q-Register is non-zero. It should be noted, however, that FP38 is enabled in block 594 only if the floating point unit is in the normalized mode (FUNR flip-flop reset) and not in the fixed point mode (FFIX flip-flop reset). The remaining operations which take place in block 594 will not be explained at this time since they are not pertinent to the operation of the floating point under the present conditions.

Upon completion of the operations of block 594, the floating point unit enters test block "AS2=1?", the operation of which will be described later. It will be noted in FIG. 34 that the outputs of flow chart blocks 595, 596, and 597 are all connected to the input of the "FBSX Enabled?" decision block indicating that after completion of the operations in the latter three blocks, the floating point unit always enters into block 594 through the "Yes" branch from the "FBSX Enabled?" decision block. Therefore, blocks 595, 596, and 597 will be explained in preparation to entering into the previously mentioned "AS2=1" decision block.

Referring now back to the "FBSX Enabled?" decision block, if FBSX was disabled in block 593 due to the contents of the Control Counter not being zero, the "No" branch is taken and the floating point unit tests in a "$\overline{C} \leqq 3$?" decision block to determine if the contents of the Control Counter are equal to or less than 3. If the result of this test is negative, indicating that the mantissa must still be adjusted by three or more bit positions, block 595 is entered. While in block 595 the A-Register and Q-Register mantissas, bits 00–37 of each, are simultaneously shifted right four bit positions. The A-Register is shifted by the application of the signal SA4 to AND-gate 142, receiving also bits 04–37 of the A-Register to transfer this information into bit positions 00–33 of the A-Register (FIG. 11) and as shown in FIG. 13 bits A00–A03 are transferred through AND-gate 144, enabled by the enabling signal SQ4, into Q-Register bit positions 34–37. The same signal SQ4 is also applied to AND-gate 146 to shift the Q-Register bits 02–37 into Q-Register bit positions QX0–Q33. Also at this time, if the two's complement of the mantissa being adjusted has been previously formed the mantissa is negative, binary 1's are placed into bit positions 34–37 of the A-Register mantissa from an AND-gate 190 which is enabled by the signals SA4 and ASM from the Gated Clock Amplifiers. The FIN4 signal is enabled and applied to AND-gate 140 (FIG. 10) thus adding four to the contents of the Control Counter which are presently available at Adder stages EA39–EA46. The SCX signal enables AND-gate 138 to thus gate the updated control count back into the Control Counter. If, at the entry to block 595, the contents of the Control Counter are equal to four, $\overline{C}=4$, such that the above shifting operation will align the binary points, the FBSX signal is enabled thus turning on the B-Register inputs to the mantissa portion of the Adder as shown in FIG. 12 at AND-gates 176. Also in block 595, if the Control Counter contents equal four, the FACI signal is enabled at AND-gates 186 as shown in FIG. 12 since this is an indication that the mantissas are aligned and an add function with A- and B-Register contents will be initiated. (The signal FASX applied to AND-gates 126 was previously enabled in block 593.) Also during the shifting operation in block 595, if a binary 1 was shifted into the QX0, QX1, Q00, or Q01 bit positions, the Q-Register sign bit Q38 is set to a binary 1. At the completion of these operations, block 595 is exited and the floating point unit re-enters the "FBSX Enabled?" decision block of FIG. 34 for further action in accordance with the conditions then prevailing.

When the contents of the Control Counter equal 3 or less, the "Yes" branch is taken from the "$\overline{C}<3$?" decision block to a decision block "$\overline{C}=2$ or 1?". The "Yes" path from this decision block to flow chart block 596 indicates that there are one or two bit positions still remaining to be adjusted in the mantissa. During the time of block 596 the A- and Q-Register mantissas, bits 00–37 of each, are shifted right two bit positions. Recalling that the FASX signal applied to AND-gates 126 of FIG. 12 is still enabled thus providing A-Register inputs A00–A38 to the mantissa portion of the Adder, the sum outputs thereof reflect the A-Register inputs. Shifting the A-Register right two bit positions is achieved via AND-gate 148 receiving the MS02–MS37 inputs from the Adder and the enable input SA2 (shift A-Register right two). The output of AND-gate 148 is placed into A-Register bit positions 00–35. Adder stages MA00–MA01 are transferred into Q-Register bit positions 36–37, as shown in FIG. 13, via AND-gate 150 which receives the MA00–MS01 Adder outputs in conjunction with the SQ2 signal. The SQ2 signal is also applied to AND-gate 152 thus enabling this gate to shift Q-Register bits 00–37 right two places into Q-Register bits QX0–Q35. The Control Counter 22 is incremented by two at this time by disabling the FIN4 signal and enabling the FIN2 signal applied to gate 154 (FIG. 10).

The constantly available B-Register outputs B39–B46 applied to the X inputs of the respective stages of the exponent portion of the Adder are now added to the FIN2 signal thus providing an incremented control count at the output of the Adder which is placed into the Control Counter 22 via AND-gate 138 enabled by the SCX signal. If at this time the Control Counter is equal to 2, the FBSX signal is again enabled thus providing the B-Register bits 00–38 inputs into the Adder, the FACI signal is enabled and an add cycle is initiated adding the B- and A-Register mantissas. During the shifting operation of block 596, if the mantissa was determined to be in the two's complement form, the mantissa bits 36 and 37 of the A-Register are set to binary 1's. Bit 37 is set via AND-gate 192 having input signals SA2 and ASM and bit 36 is set to a binary 1 via AND-gate 194 having input signals SA2 and SA36. Finally, in block 596, if during the shifting operation a binary 1 shifted into QX0 or QX1, the Q-Register sign bit Q38 is placed in the set condition (binary 1). Block 597 is now terminated and the floating point unit enters "FBSX Enabled?" decision block once again.

If the shifting operations of either of the blocks 595 or 596 resulted in an over-shift by one bit, the "No" path from the "$\overline{C}=2$ or 1?" decision block will be taken and block 597 will be entered. As entry into block 597 is an indication that an over-shift of one bit has been executed, the A- and Q-Registers must be shifted left one bit position to align the binary points in the mantissa portions of the A- and B-Registers. Since this left shifting operation will align the mantissas, it is possible at this time to perform an add/shift function. This is accomplished by enabling the FACI signal to permit the Adder to function as a normal adder and by enabling the FBSX signal (FIG. 12) to AND-gates 176 thereby placing the B-Register contents at the Adder inputs. Inasmuch as the FASX signal applied to AND-gates 126 is also enabled, the addition of the A- and B-Register mantissas takes place and the sum outputs from the Adder are transferred into the A-Register displaced left one bit position via AND-gate 130 which receives inputs MS00–MS36 and the presently available signal SA1.

The SA1 signal is also applied to AND-gate 135 whose other input is from AND-gate 134 which in turn receives an input from the Q-Register bit Q37. Since the floating point unit at this time is in the FADJ1 control state, AND-gate 134 is enabled and bit Q37 is transferred into bit position 00 of the A-Register. Simultaneously (FIG. 13), the Q-Register is shifted left one bit position via AND-gate 132 which is enabled by the SQ1 signal. Since the shift function is now over, the signals FIN4 and FIN2, if previously enabled, are disabled. Also, if QX01 was a binary 1 during this shift operation, the Q-Register sign bit 38 is made a binary 1. That is, if a binary 1 shifted out of the QX0 position into the QX1 position, bit Q38 is set.

At the completion of these operations, block 597 is exited and the floating point unit again enters into the "FBSX Enabled?" decision block. Since the FBSX signal is enabled, the "Yes" branch is taken to block 594. At this time, if either of the two signals FIN2 or FIN4 is enabled, it is disabled. As previously described, the resultant exponent in A-Register bit positions 39–46 is transferred into the B-Register via AND-gate 120 and if the floating point unit is in the normalized mode and not in the fixed point mode of operation, the FP38 signal to gates 128 (FIG. 10) is enabled in preparation for decrementing the resultant exponent by 38, if the A-Register is zero and the Q-Register other than zero. Q-Register bit 38 is set to a binary 1 if a binary 1 exists in either of the bit positions QX0 or QX1. Upon completion of these operations block 594 is exited and the "AS2=1?" decision block is entered.

Before proceeding further with the description of the execution of the FAD instruction, it is believed advantageous to fully define the manner in which the floating point unit logic functions with regard to the "AS2=1?" decision block. In the present embodiment a variable Adder settle out time is used for the mantissa portion of the Adder when the floating point unit is operating in the FADJ control state, when in the floating point mode FAD, FSD, or FSI instructions, and when the floating point unit is in the FALG control state during execution of the FMP, FDV, or FDI instructions. Prior art systems of the basic type exemplified in the illustrated embodiment utilize an adder settle out time allowing for "worst case" carry propagations through the Adder. If additional (faster) performance is required, a more elaborate Adder is provided in which the input bit configurations are examined by suitable logic and a predetermined carry is inserted into various positions of the Adder. Both of these methods are quite expensive and the latter requires that a significant number of additional gates be added to the system. In the present embodiment, however, an economical method is presented which gives absolute prediction of early adder settle out for an extremely high percentage of the various possible Adder input configurations to give the Adder an average settle out time significantly less than that required for the "worst case" condition. The manner in which the variable adder settle out time functions in the present embodiment can best be understood with beginning reference to the following truth table for one stage of the mantissa adder.

| Condition | X Input | Y Input | Z Input | C Output |
|---|---|---|---|---|
| a | 0 | 0 | Unknown | 0 |
| b | 0 | 1 | do | Unknown |
| c | 1 | 0 | do | Unknown |
| d | 1 | 1 | do | 1 |

Variable settle out time in the present embodiment is dependent upon detecting the origin of carry strings in the Adder other than at bit position 00 termination of a string at some point other than bit position 37 of the mantissa portion of the Adder. The origination or termination of a carry string in the Adder is dependent upon its inputs as shown by the truth table above. It will be noted that the two register inputs to the Adder stage, inputs X and Y, are examined with the carry input from the preceding stage, the Z input, being considered an unknown. As can be seen from the above table, in condition $a$ a carry string must terminate at that stage of the Adder since it cannot be propagated if the X and Y inputs are zero. With input conditions $b$ or $c$, a carry will initiate at that stage of the Adder if a carry is present at the Z input. Input configuration $d$ will originate a carry string independently of the output of the preceding Adder stages.

Figure 35B:
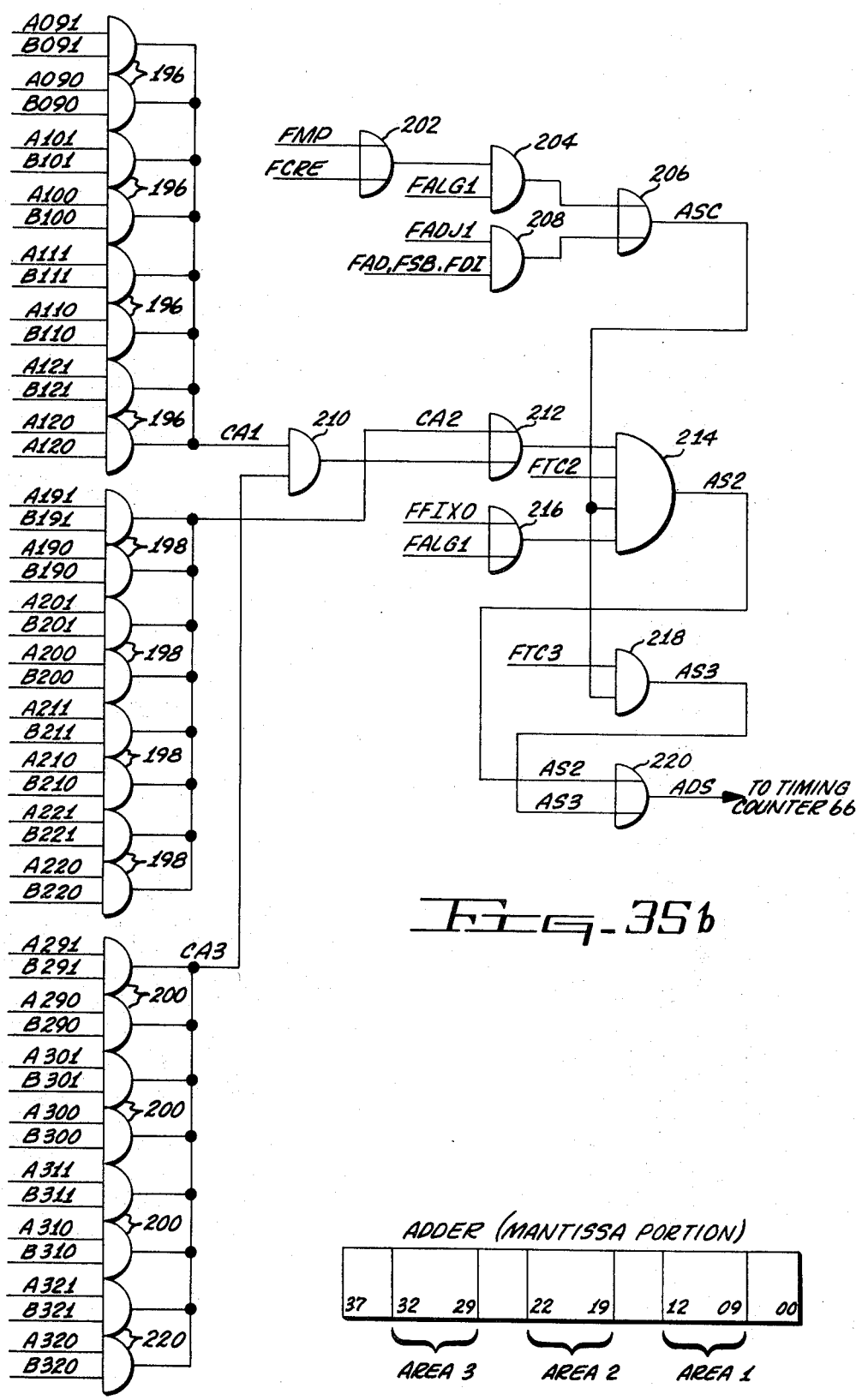
Figure 35A:
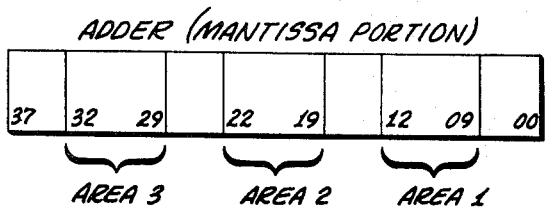

The implementation to achieve variable adder settle out time is shown in FIGS. 35a and 35b. Referencing first FIG. 35a, there is shown the mantissa portion of the Adder in block form divided into seven parts. Three of these parts are of particular significance to the instant description and have been designated as Area 1, Area 2 and Area 3. Each of these areas consist of four stages of the Adder with Area 1 including Adder stages MA09–MA12, Area 2 including Adder stages MA19–MA22 and Area 3 including Adder stages MA29–MA32.

The anticipated variable adder settle out time is accomplished by suitable logic which examines for the existence of either condition $a$ or $d$, as set forth in the above truth table, at a stage of the mantissa Adder. However, before proceeding with a description of the actual logic implementation for the variable adder settle out time feature, it is believed advantageous to make the following observations which are used to determine the method of predicting the variable adder settle out time. If either of the input conditions $a$ or $d$ is detected in Areas 1, 2, and 3, as shown in FIG. 35a, it is necessary to allow sufficient time for a carry to propagate from the least significant bit of one area to the most significant bit of the next highest area; e.g., from stage MA09 to stage MA22. If either of the input conditions $a$ or $d$ is detected in Area 1 or Area 2 and in Area 3 it is necessary to allow time for a carry to propagate from the least significant bit area of Area 2 (stage MA19) to the most significant bit of the Adder (stage MA37). If either of the input conditions $a$ or $d$ is detected in only one of the three Areas, it is necessary to allow time for a carry to propagate from the least significant bit Area 1 (stage MA09) to the most significant bit of the Adder (stage MA37). If condition $a$ or $b$ is not detected in any of the three Areas, time must be allowed for a carry to propagate the full length of the Adder. This, of course, is the "worst case" condition.

With specific reference now to FIGS. 35a and 35b, it is seen that Area 1 in FIG. 35a, which encompasses mantissa Adder stages MA09–MA12, has its corresponding logic shown in FIG. 35b by eight AND-gates 196. The collective outputs of the AND-gates are designated as signal CA1 (carry anticipation 1). Similarly, eight AND-gates 198 whose output is a signal CA2 (carry anticipation 2) correspond to Area 2 (Adder stages MA19–MA22) and eight AND-gates 200 correspond to Area 3 (Adder stages MA29–MA32). The collective output of AND-gates 200 is designated as signal CA3 (carry anticipation 3). Each of the AND-gates 196, 198 and 200 is a two input gate and receives one input from the A-Register 26 and the second input from the B-Register 20. For example, the uppermost AND-gate 196 has inputs A091 and B091 which are, respectively, outputs from the true sides of bit positions 9 of the A- and B-Registers. The second AND-gate 196 has inputs A090 and B090 indicating that these inputs are from the false sides of A- and B-Registers bit positions 9. In a like manner, each of the other AND-gates 196, 198 and 200 are connected to the true or false sides of coresponding bit positions in the A- and B-Registers.

Referencing again the uppermost AND-gate 196 which receives the true outputs of bit positions 9 and the A- and B-Registers, it may be seen that if binary 1's exist in both the A- and B-Registers at bit position 9, the CA1 signal will be generated. During an addition operation, this same condition will result in a carry from Adder stage MA09, i.e., its C output will be true. Assume also that at this same time a condition $a$, as defined in the above table, appears at any one of the Adder stages in Area 2.

For example, assume that bits 22 of the A- and B-Registers are both binary 0's. In this case the bottom AND-gate 198 will be enabled to provide the signal CA2 which forms an input to an OR-gate 212 the output of which forms one of four inputs to an AND-gate 214. From the previous description the carry out of Area 1, Adder stage MA09, cannot propagate beyond Adder stage MA22 in Area 2. Therefore, the maximum distance the carry can propagate is one-half of the length of the Adder. Since it is certain at this time that the carry only has to propagate no more than half-way through the Adder, a signal AS2 is generated. The AS2 signal is the output of an AND-gate 214. The other inputs are a signal ASC, to be described hereinafter, the FTC2 signal from the Timing Counter 66, and the output of an OR-gate 216 whose inputs are the FFIX0 and the FALG1 signals (FIG. 8). The AS2 signal from AND-gate 214 is applied to an OR-gate 220 the output of which is a signal ADS (Adder settled). The ADS signal is applied to the Timing Counter 66 to place the Timing Counter into the proper Timing Counter state to reduce the number of FTC times required for an add operation. The manner in which this is done will be described in more detail.

As a further example, assume that the outputs from the AND-gates groups 196 and 200, signals CA1 and CA3 respectively, are true by the presence of conditions *a* or *d* in Areas 1 and 3. If, as before, Adder stage MS09 provides a carry signal, this carry will propagate from stage MS09 to the most significant portion of the Adder. If it is now assumed that binary 1's are present at the upper AND-gate 200 which corresponds to Adder stage MS29, a carry will also propagate from this stage toward the most significant bit of the Adder. From this it is seen that it is only necesary to allow time for the carry to progress from Area 1 (stage MS09) to stage MS22 in Area 2 since it was possible to predict a carry would exist out of stage MS29 of Area 3. Since the carry which propagates from Area 3 would have propagated out the end of Adder in any case, there is no need to wait for the carry which would eventually propagate from bit position 9 in Area 1. Therefore, it is only necessary to wait one-half the full time for the Adder to settle out.

Under these conditions the two signals CA1 and CA3 applied to an AND-gate 210 enable that gate providing a signal through OR-gate 212 into the previously described AND-gate 214. It also may be seen in FIG. 35 that if neither of the conditions *a* or *d* exists at the inputs to Areas, 1 2, and 3 it is necessary to allow any carries generated to propagate from the least significant bit of the Adder (stage 00) to the most significant bit of the Adder (stage 37). In this case, none of the signals CA1, CA2, or CA3 would bet true and it is necessary to force the Timing Counter to step through an additional FTC time to allow for the propagation of the carries through the Adder.

As shown in FIG. 35*b*, the signal ASC (adder settle check group) comes true when OR-gate 206 receives an input from either of two AND-gates 204 or 208. AND-gate 204 is enabled when the floating point unit is in the Algorithm Execution Control State (signal FALG1) and either this is a Floating Multiply instruction or the signal FCRE is true (OR-gate 202). AND-gate 208 provides a signal to gate 206 when the floating point unit is in the Adjust Mantissa Control State and the floating point unit is executing either an FAD, an FSB, or an FDI instruction. In addition to forming an input to the AND-gate 214, the output of OR-gate 206 forms one input to an AND-gate 218 the second input to which is the FTC3 signal from the Timing Counter. The output of gate 218 is a signal AS3 (Adder settled in three clocks) which is gated through OR-gate 220 to provide the ADS signal to the Timing Counter 66.

The two input signals AS2 and AS3 to OR-gate 220 are used by the Timing Counter to cause it to cycle from either FTC2 to FTC0, which is done when early mantissa settle out time is predicted, or to cause the Timing Counter to FTC0 from FTC3 when normal adder settle out time is required. In clarification, while both the AS2 and AS3 signals generate the ADS signal, it is to be realized that they occur at different times. The AS2 signal occurs at FTC2 time while the AS3 signal is generated at FTC3 time. It is, therefore, the time at which the ADS signal is applied to the Timing Counter 66 which governs its action. If the AS2 signal occurs the Timing Counter is set to the FTC0 state without reaching the FTC3 output state.

Referring once again to the decision block "AS2=1?" of FIG. 34, a determination is made to see whether the Adder will settle in either two or three clock periods. Recalling that the add cycle started in block 594 in the FTC1 time, if the input conditions to AND-gates 196, 198, and 200, as shown in FIG. 35*b* and as previously described, are satisfied, the Adder will be settled in two clock periods and the "Yes" branch wil be taken from the "AS2=1?" decision block to block 509 where the addition is completed. The resultant output is transferred from the Adder via lines MS00–MS37 through AND-gate 162 into the A-Register. Also in block 599 the FACI signal is disabled, the two signals FBSX and FASX to the inputs of the Adder are disabled, and the FQSX signal is enabled in preparation for shifting the Q-Register through the Adder. Also, if as detected by the Algorithm Execution Control Logic, the resultant mantissa is in the two's complement form, the signal NEG, internal to the Algorithm Execution Control Logic, is enabled and this fact is stored for use at a later time. If mantissa over-flow occurs during the add function, the OFL signal is enabled and stored in the Algorithm Execution Control Logic. The A-Register sign bit A38 is complemented during the execution of the FAD instruction in block 599 if the A-Register sign bit A38 is not equal to the B-Register sign bit 38. The FADJ flip-flop 104 is reset, the Timing Counter is set to the FTC0 output state, the FPNR flip-flop 108 is placed in the set condition, and the resultant exponent in the Control Counter is complemented if the A-Register exponent sign bit is positive (a binary 0) in preparation for normalizing the resultant mantissa. Complementing of the Control Counter contents is accomplished via the Complement Control Counter Gates 124 of the floating point unit.

If the Adder is not going to settle in two clock periods, the "No" path from block" "AS2=1? is taken and block 598 is entered. In this block the Control Counter contents are complemented if the Control Counter is positive as described for block 599 and the Timing Counter is set to the FTC3 output state to complete block 598 operations at which time the floating point unit enters flow chart block 600. Upon entry into block 600, the Adder outputs are transferred into the A-Register via AND-gate 162 and the FACI and FBSX signals are disabled. In addition, at this time the FCRM signal applied to stage MA00 to the Adder is also disabled. Simultaneously, the FASX signal applied to AND-gate 126 (FIG. 12) is disabled and the Q-Register is gated to the Adder 28 by the enabling of the FQSX signal applied to AND-gates 156. Also in block 600 as was the case in block 599, the NEG signal is enabled in the Algorithm Execution Control Logic if the resultant output of the mantissa portion of the Adder was in the two's complement form and if mantissa over-flow occurred the OFL signal is enabled. The A-Register sign bit 38 is complemented if it does not equal the B-Register sign bit 38. The FADJ flip-flop 104 (FIG. 8) is reset, the FPNR flip-flop 108 is set and the Timing Counter is set to the FTC0 output state.

At the completion of the operations described for blocks 599 and 600 of FIG. 34, the floating point unit exits at point M and enters at point M in FIG. 36 into a decision block "NEG Enabled?." If NEG is enabled, the "Yes" branch is taken and block 601 is entered which is an indication that the two's complement of the resultant mantissa magnitude was previously formed. In block 601 the contents of the Q-Register are transferred through the Adder into the A-Register and the A-Register contents are transferred into the B-Register in preparation for forming the two's complement of the 76 bit mantissa. To accomplish this transfer (FIGS. 9–13), the outputs of the Adder MS00–MS37 are transferred into the A-Register via AND-gate 162 and the A-Register mantissa bits 00–37 are transferred into the B-Register mantissa bits 00–37 via AND-gate 184. In addition, the Q-Register input to the Adder is removed by disabling the FQSX signal and the B-Register contents are gated into the Adder by enabling the FBSX signal to AND-gates 176. Also at this time the A-Register mantissa sign bit A38 is complemented since it was correct if the absolute magnitude had been generated. At this point in time, the floating point unit is removed from the post normalization control state by the resetting of the FPNR flip-flop 108 and is placed in the absolute magnitude control state by the setting of the FABM flip-flop 110. Upon completion of these operations, the floating point unit exits block 601 and enters into the "AZR=1?" decision block. If, as detected by the Algorithm Execution Control Logis, the AZR (A-Register 0) signal is not true that is, the A-Register is not zero, block 602 is entered wherein the B-Register mantissa field bits 00–37 are complemented as shown in FIG. 9 by the signal CBM applied to the Complement Mantissa Gates 188. The B-Register mantissa is complemented at this time since the most significant 38 bits of the absolute magnitude will be the one's complement of the result previously formed and thus a carry will not propagate out of the least significant 38 bits. In addition, in block 602 the Timing Counter 66 is set to its FTC1 output state and flow chart block 604 is entered.

During the time of block 604 the absolute magnitude of the 38 most significant bits of the result are transferred from the B-Register through the Adder 28 into the A-Register mantissa field and the least significant 38 bits of the two's complement of the result is transferred from the A-Register into the B-Register. This is accomplished, FIGS. 9–13, by the signal FBSX which transfers the B-Register into the Adder via AND-gates 176, the outputs of which are placed into the A-Register via AND-gate 162. The A-Register is transferred into B-Register bit positions 00–37 via AND-gate 184 over lines A00–A37. The NEG signal in the Algorithm Execution Control Logic is disabled, the Control Counter FTC1 output state is cleared aid the Control Counter is set to the FTC⁰ output state.

The floating point unit now enters flow chart block 605 at which time the B-Register mantissa is complemented by passing the B-Register mantissa through the Complement Mantissa Gates 188 with the presently available (CBM signal as shown in FIG. 9. The FCRM signal (initial carry into the mantissa adder) is enabled at this time and applied to stage MA00 of the Adder. This is done at this time since the absolute magnitude of the least significant 38 bits will be the two's complement of the result that was previously formed unless a bit was shifted out of the Q-Register 32 during mantissa adjustment, that is, out of Q38. The two's complement of the B-Register mantissa is, at this time, being formed in the Adder wtih the FACI signal enabled thus allowing carries to propagate through the Adder in the normal fashion. Prior to exiting block 605 the FTC0 output state is cleared and the Timing Counter is set to FTC1 at which time block 606 is entered. In blocks 606, 607, and 613 the Timing Counter steps through from FTC1, FTC2 and FTC3 output states to allow normal Adder settle out time. At the end of the FCT3 output state in block 613, the Timing Counter is set to FTC4 and the floating point unit now enters flow chart block 614. As shown in FIG. 36, in block 614 the absolute magnitude of the least significant 38 bits of the result is transferred into the A-Regiser mantissa field and the most significant 38 bits are transferred from the A-Register into the Q-Register. As to the actual performance of these transfers, as shown in FIGS. 11, 12 and 13 the Adder sum outputs MS00–MS37 are transferred into the A-Register via AND-gate 162 and the least significant 38 bits of the mantissa are transferred from the A-Register bit positions 00–37 into the Q-Register bit positions 00–37 via AND-gate 164 which is enabled by the AQX signal. Also in block 614 the Q-Register is gated to the mantissa portion of the Adder (FIG. 12) by the enabling signal FQSX applied to gates 156 and the B-Register is turned off at this time by disabling the FBSX signal. In preparation to shifting the Q-Register contents through the Adder, the FACI signal applied to AND-gates 186 is disabled as is the FCRM signal at he MA00 stage of the Adder. The Timing Counter FTC4 state is cleared, the Timing Counter output is set to the FTC5 output state and block 615 is entered.

While the floating point unit is in the time represented by block 615, the A- and Q-Register mantissa fields are exchanged with the Q-Register transfer into the A-Register being through the mantissa portion of the Adder 28. This operation places the absolute magnitude of the result in the proper position in the A- and Q-Registers and is performed, at this time, by the previously enabled FQSX signal applying the Q-Register inputs 00–37 to the Adder via AND-gates 156. The sum output from the Adder reflects the Q-Register inputs and is transferred into the A-Register via AND-gate 162. Simultaneously, A-Register bits 00–37 are transferred into the Q-Register via AND-gate 1(). Prior to existing block 615 the floating point unit is removed from the FABM control state by resetting of the FAMB flip-flop 110 (FIG. 8) and is placed in the post normalization control state by setting FPNR flip-flop 108. The Timing Counter is set to the FTC0 output state and the floating point unit once again enters the "NEG Enabled?" decision block. Since the NEG signal was disabled in block 612, the "No" branch will be taken and the floating point unit will enter into the "OFL Enabled & FFIX Reset?" decision block.

It is significant to point out at this time that the "OFL Enabled & FFIX Reset?" decision block could have been entered directly from the "NEG Enabled?" decision block after completion of FIG. 34 operations if the absolute magnitude of the result had been generated in FIG. 34.

If mantissa over-flow occurred when the result was formed in the A-Register as described in FIG. 34, the "Yes" branch from the "OFL Enabled & FFIX Reset?" block will be taken and flow chart 616 will be entered. At this time the FQSX signal is disabled and the FASX signal applied to AND-gates 126 (FIG. 12) is enabled in preparation for shifting the A-Register through the Adder. Also in block 616 the FP38 signal to gate 128 in FIG. 10 is disabled and the Control Counter contents B39–B46 are two's complemented by the enabling of the enabling of the CBE signal to the Complement Control Counter Gates 124 (FIG 9) and the FCRE signal at Adder stage EA39 and by passing the contents of the Control Counter through the exponent portion of the Adder (stages EA39–EA46) thus forming the two's complement of the Control Counter contents which are placed into the Control Counter via AND-gate 138 enabled by the enable signal, SCX. After this complementation, the Control Counter contains the absolute magnitude of he resultant exponent if positive, or the one's complement if negative.

Upon clearing the FTC0 output state and setting the Timing Counter to the FTC4 output state, block 617 is entered by the floating point unit. Here, the A- and Q-Registers are shifted right two bit positions with the A-Register shifting through the mantissa portion of the Adder. This is accomplished, as can be seen in FIGS. 11, 12, and 13, by gating lines A00–A38 into the Adder through the AND-gates 126 which are enabled by the FASX signal. The Adder S outputs now reflect the A-

Register inputs and are transferred into the A-Register displaced right two bits via lines MS02–MS37 and AND-gate 148 which is enabled by the signal SA2. Simultaneously, to complete the recovery from mantissa over-flow, a binary 1 is placed into A-Register bit position 36 via AND-gate 194 receiving thereto the SA36 and SA2 signals. The Q-Register is shifted right two bits as shown in FIG. 13 by the enabling of the SQ2 signal to AND-gate 150 thus feeding the MS00–MS01 Adder inputs into bits 36 and 37 of the Q-Register. AND-gate 152 is enabled to shift bits 00–37 of the Q-Register right into bits QX0–Q35. In block 617 the resultant exponent is incremented by one by transferring the exponent portion of the Adder back into the Control Counter via AND-gate 138 as previously described. At this time the initial carry signal FCRE into the exponent Adder stage EA39 is disabled unless the original resultant exponent must be complemented to obtain the absolute magnitude of zero; that is, if $\overline{C}=0$. Also at this time the temporary over-flow condition (OFL) is disabled unless the incrementation by one caused exponent over-flow $\overline{C}\neq 0$, thus indicating that the resultant exponent is equal to +255. The Timing Counter is set to the FTC5 output state and block 618 is entered.

In block 618, the resultant exponent which is now in the B-Register is complemented if it does now contain the one's complement of zero; that is, if the FCRE signal is disabled, such that the floating point unit enters the FEND control state with the exponent in absolute magnitude state if negative and in the one's complement if positive. This is accomplished, at this time, in the customary manner (FIG. 9) by the application of the signal CBE to the Complement Control Counter Gates 124. Also at this time, the A- and Q-Register mantissas are shifted left one bit. The shift left by one is accomplished, with reference to FIGS. 11, 12, and 13, by passing the A-Register bits A00–A37 through the Adder via AND-gates 126 and back into the A-Register through AND-gate 130 which is enabled by the SA1 signal. The SA1 signal is also applied to AND-gate 135 which additionally receives the output from AND-gate 134 which in turn has as an input the Q37 bit from the Q-Register. Since the floating point unit is now in the FPNR control state and is not executing a divide instruction, Q-Register bit 37 is transferred via AND-gates 134 and 135 in A-Register bit position 00. The Q-Register is shifted left one bit, as shown in FIG. 13, by the application of the signal SQ1 to AND-gate 132. Also in block 618 the A-Register sign bit is reset to a binary 0 if the new resultant exponent is zero; that is, if the signal FCRE is in the enabled state upon entry into block 618. The FCRE and FASX signals are now disabled, the FEND flip-flop 116 is set, the floating point unit is removed from the post normalization control state by resetting the FPNR flip-flop 108, the Timing Counter FTC5 output state is cleared thus placing the Timing Counter in a no active condition. Block 618 is now exited and the FEND control state of FIG. 17 is entered.

Again referencing the "AZR=1?" decision block of FIG. 36, if the contents of the A-Register are zero at the time block 601 is exited, the "Yes" branch is taken and block 603 is entered wherein the B-Register mantissa bits 00–37 are complemented and the initial carry into the mantissa portion of the Adder, the signal FCRM, is enabled. This operation is performed, as previously described, by applying the signal CBM to the Complement Mantissa Gates 188 and applying the B-Register mantissa one's complement outputs B00–B38 into the mantissa Adder through AND-gates 186 by the previously enabled signal FBSX. This in combination with FCRM performs a two's complement of the B-Register. This operation is performed since the most significant 38 bits of the absolute magnitude will be the two's complement of the result that was formed. Also at this time, if as detected by the Algorithm Execution Control Logic the least significant four bits of the B-Register, bits 00–03, are not binary 0's after complementation, the Adder is forced to settle out in one clock period. However, if the contents of the four least significant bits of the B-Register, bits 00–03, are zeros, the FACI signal is enabled allowing a normal add function to be performed when passing the B-Register through the Adder. Upon clearing the FTC0 output state of the Timing Counter and setting the Timing Counter to the FTC1 output state, the floating point unit enters a "FACI Disabled?" decision block where a determination is made to see if FACI remained disabled in block 603.

If the above condition is true, the "Yes" branch is taken and block 609 is entered (FIG.36). Block 609 is entered if the Adder was forced to settle in one clock period during formation of the two's complement (absolute magnitude) of the most significant 38 bits of the mantissa. In block 609, the two's complement of the B-Register mantissa, bits 00–37, are transferred via the Adder 28 into the A-Register by lines MS00–MS37 and AND-gate 162. This operation can be performed at this time since the carry will not propagate past bit 03 of the B-Register mantissa. Also in block 609, the FCRM is disabled, the B-Register is turned off from the Adder by disabling the FBSX signal, the previously enabled NEG signal is disabled, the FABM flip-flop 110 is reset thus removing the floating point unit from the absolute binary control state, and the FPNR flip-flop 108 is set to place the floating point unit into the post normalization control state. The Timing Counter is set to the FTC0 output state and the floating point unit once again enters the "NEG Enabled?" decision block.

Referring now to the "FACI Disabled?" decision block in FIG. 36, if it was necessary for the floating point unit to go through the wait add cycle the "No" branch out of this decision block is taken and flow chart blocks 608, 610 and 611 are successively performed to step the Timing Counter through the FTC2 and FTC3 and into the FTC4 output states to provide adder settle out time. Upon exiting block 611, flow chart block 612 is entered wherein the absolute magnitude of the most significant 38 bits of the result is transferred into the A-Register mantissa field. This information is now the two's complement of the B-Register mantissa. This transfer is accomplished, again as seen in FIGS. 11, 12, and 13, by transferring the B-Register contents, bits 00–38, through the Adder and out of the Adder via lines MS00–MS37 and AND-gate 162 into the A-Register. At this time the FACI signal applied to AND-gates 186 (FIG. 12) is disabled, the B-Register input to the Adder is removed by the disabling of signal FBSX. The O-Register is gated to the Adder by enabling the FQSX signal and the initial carry input into mantissa stage MA00, FCRM, is disabled. The previously enabled NEG signal in the Algorithm Execution Control Logic is disabled, the FABM flip-flop is reset, the FPNR flip-flop is set and the Timing Counter is changed to the FTC0 state. Upon completion of these operations block 612 is extied and again the floating point unit enters into the "NEG Enabled?" decision block.

The remaining undescribed part of FIG. 36 begins with the "No" path from the "OFL Enabled & FFIX Reset?" decision block. If an over-flow condition did not occur and the result was formed in the A-Register as previously described in FIG. 34, the "No" branch out of this decision block will be taken and decision block "FUNR or FFIX Set?" will be entered. Assuming at this time that the floating point unit is in the unnormalized mode such that the FUNR flip-flop 46 (FIG. 3) is in the set condition, the "Yes" branch will be taken and block 619 will be entered. In block 619 the FEND flip-flop will be set and the Q-Register inputs to the Adder removed by disabling the signal FQSX. The FPNR flip-flop 108 is reset thus removing the floating point unit from the post normalization control state and the floating point unit will enter the FEND control state (FIG. 17). However, if the floating point unit is in the unnormalized control state (the FUNR flip-flop 108 is reset) when decision block "FUNR or FFIX Set?" is entered, the "No" branch will be taken and the floating point unit will enter FIG. 37 at point N.

In FIG. 37, the floating point unit first enters a "AZR=1?" decision block to determine if the contents (mantissa field) of the A-Register are zero. If the A-Register mantissa field is not zero, the "No" branch will be taken and block 620 will be entered and the A-Register is turned on to the mantissa portion of the Adder by the enabling of the FASX signal in preparation for shifting through the Adder. The Q-Register contents are removed from the mantissa Adder by disabling the FQSX signal applied to AND-gates 156. Simultaneously, the FP38 signal to Adder stages EA40 and EA41 is disabled. The Timing Counter is set to its FTC1 state.

Upon completion of the operations in block 620, the floating point unit enters into a "A37=1?" decision block. If bit 37 of the A-Register is set indicating that the A-Register is already normalized, the "Yes" branch is taken and the floating point unit enters in block 621. In block 621 the FEND flip-flop 116 is set, the FPNR flip-flop is reset, and the FASX signal is disabled.

An "FEND Set?" decision block shown in FIG. 37 at the output of block 621 many be entered from block 621, in which case the "Yes" branch will be taken therefrom to FIG. 17 and the FEND control state. This decision block also may be reached by the "No" path from the decision block "A37 Set?". The "No" path from the decision block "FEND=1?" leads to a "C̄=0?" decision block where the floating point unit tests to see if the contents of the Control Counter equal zero. If the contents of the Control Counter are not equal to zero, the "No" branch is taken to block 623 indicating that the mantissa is not yet normalized and the exponent is equal to or less than +255 but greater than zero, or that the exponent is equal to or less than a minus one but greater than a −255. In block 623 the A- and Q-Register mantissa fields are shifted left one bit position with the A-Register shifting through the Adder while one is added to the Control Counter contents which, if while one is added to the Control Counter contents which, if positive (one's complement), decrements the exponent magnitude or, if negative (absolute magnitude), increments the exponent magnitude. If this shift normalizes the mantissa (A36 is a binary 1), the FEND flip-flop 116 is set. These operations are performed (FIGS. 9–13) by transferring the A-Register through the Adder and back into itself displaced one bit to the left via AND-gate 130 which is enabled by the SA1 signal. Q-Register bit 37 is transferred into the A-Register bit 00 via AND-gate 135 and 134 and the remaining Q-Register bits QX0–Q36 are shifted left by one through AND-gate 132. One is added to the Control Counter contents (FIGS. 9 and 10) by the presence of the FCRE signal at the Adder 28. Upon exiting block 623 the "FEND Set?" test is again made and if the mantissa was normalized during the operations in block 623, and A36 is a binary 1, the floating point unit takes the "Yes" branch and enters into the FEND control state.

However, if the mantissa did not normalize during block 623, the "No" branch is taken out of the "FEND Set?" decision block and the test is made to determine if the contents of the Control Counter are equal to zero. If the contents of the Control Counter are equal to zero, realizing that the mantissa is not yet normalized, the "Yes" branch out of the "C̄=0?" decision block is taken to a decision block "A47=1?". If the A-register exponent sign is set (negative) at this time the "No" branch is taken and block 624 will be entered. Here the A- and Q-Register mantissas will be shifted left one bit and one will be added to the B-Register exponent in the same manner as described in block 623. The A-Register exponent sign (bit 47) will be set and as in block 623 under the same conditions the FEND flip-flop 116 will be set, the FPNR flip-flop 108 will be rest, the FASX signal transferring A-Register into the Adder will be disabled and block 624 will be exited to return to the "FEND Set?" decision block. If the FEND flip-flop was set in block 624 the floating point unit enters into the FEND control state (FIG. 17).

The "Yes" branch from the "A47=1?" decision block leads to flow chart block 625 which is entered since the mantissa is not yet normalized and the exponent is equal to zero or −255. In block 625 the FEND control state flip-flop is set and since the exponent A-Register bit 47 was set prior to entering block 625 it is an indication that the next shift will cause the exponent under-flow resulting in resetting the mantissa field and forcing the largest negative exponent into the exponent field. Therefore, the signal UFL is enabled in the Algorithm Execution Control Logic to store a temporary under-flow condition. Simultaneously, in block 625 the A-Register inputs to the Adder are disabled by disabling the FASX signal and the FPNR flip-flop 108 is reset. Upon completion of these conditions, block 625 is exited, the floating point unit then again returns to the "FEND Set? " decision block where this time the mantissa is normalized and the "Yes" branch will be taken to the FEND control state (FIG. 17).

The preceding description of FIG. 37 concerned only the actions taken from the "No" branch from the "AZR=1?" decision block. If the contents of the A-Register are zero upon entry into this flow chart the "Yes" branch is taken from this decision block and flow chart block 626 is entered. The Q-Register mantissa bits 00–37 are now transferred through the Adder and into A-Register bits 00–37. With the transfer of the Q-Register into the Adder, the FQS signal is disabled an dthe FASX signal to AND-gates 126 is enabled. The Timing Counter is set to the FTC2 output state and proceeds to block 627. Block 627 is entered with the least significant 38 bits of the mantissa in the A-Register. The Control Counter now contains the one's complement of the exponent if positive and the absolute magnitude if negative. In this block, if the A-Register mantissa field is zero, the entire 76 bit mantissa is zero and the largest negative exponent (−255) will be forced into the exponent field. If the A-Register mantissa field is not zero, the Adder sum outputs (lines ES391–ES461) are transferred into the B-Register via AND-gate 138. The FP38 signal to AND-gates 128 (FIG. 10) was enabled prior to this time and, therefore, by passing the Control Counter contents through the Adder the exponent will be decremented by 38 unless the exponent is less than 38 but equal to or greater than zero. If the exponent is less than 38 but equal to or greater than zero, the exponent will pass through zero and one must be added to obtain the correct absolute magnitude for the negative exponent. If, on the other hand, the A-Register mantissa field is other than zero, the contents of the Control Counter are passed through the exponent Adder and the initial carry signal, FCRE, into the exponent Adder bit EA39, is enabled. Also during block 627, the FP38 signal is disabled, the Q-Register bits 00–37 are reset to binary 0's by the signal RSQ (FIG. 13). The Algorithm Execution Control Logic will store a temporary under-flow condition (UFL enabled) if A-Register bit 47 equals one, the exponent carry EC46 from the Adder equals one, and if the A-Register mantissa field is not zero. To complete block 627 the Timing Counter is set to the FTC3 state and block 628 is entered.

In block 628 the exponent Adder sum outputs from stages ES39–ES46 will be transferred back into B-Register bit positions 39–46 if, in block 627, the exponent passed through zero when +38 was being added. Since upon entering into block 628 the signal FCRE is enabled, the transfer of this information will add one to the contents of the Control Counter thus placing the correct absolute magnitude for the negative exponent into the Control Counter 22. Also, A-Register exponent sign bit 47 is set if FCRE is enabled. The FCRE signal is now disabled, the FEND flip-flop 116 is set if the A-Register is equal to zero or if an under-flow condition exists. The FPNR flip-flop 108 is reset if the A-Register is equal to one or if the underflow condition exists. The A-Register inputs to the Adder are disabled by disabling the FASX signal if the A-Register is equal to one or if an under-flow condition exists. The Timing Counter FTC3 output is cleared and the Timing Counter is set to FTC1 at which time the floating point unit will exit block 628 entering into the lower "FEND Set?" decision block of FIG. 37.

If the FEND flip-flop 116 is not set at this time, the "No" branch is taken from this decision block to the "A37=1?" decision block (FIG. 37) and the operations previously described will be repeated as required.

When the floating point unit enters the FEND control state for the FAD instruction and, therefore, enters block 506 of FIG. 17, the appropriate actions previously described, referencing now FIG. 17, under the "All Instructions" heading will be achieved. Additionally, as set forth under the heading including the FAD instruction, the largest negative exponent (−255) is forced into the A-Register exponent field (bits 39–47) as shown in FIG. 11 by the signal ZMG now present from the Gated Clock Amplifiers, if a zero mantissa was generated during mantissa normalization. The A-Register mantissa sign bit A38 is transferred to the Q-Register bit position 38 if an under-flow condition did not exist in the execution of the instruction. Also, the contents of Control Counter bits 39–46 are transferred into the A-Register via the Adder and AND-gate 160 if the Control Counter contains the resultant negative exponent and the largest negative exponent is not being forced into A-Register bits 39–46; that is, if the A-Register bit 47 is a binary 1, and the signal ZMG is not true. However, if the Control Counter contains the one's complement of the resultant positive exponent, and the largest negative exponent is not being forced into the A-Register bits 39–46, the one's complement of the B-Register is transferred via the Adder into the A-Register through AND-gate 158. This completes the execution of the FAD instruction and the floating point unit will now exit block 506, the FEND control state, and proceed to the execution of the next instruction.

At the beginning of the explanation of the FAD instruction it was pointed out that this instruction has two basic variations both utilizing the same operation code. When the floating point unit is not in the fixed point mode (the FFIX flip-flop 58 of FIG. 3 is reset) the FAD instruction is executed as just described. However, if the floating point unit is in the fixed point mode (the FFIX flip-flop is in the set condition) the FAD instruction is executed as an FXAD (fixed add instruction). With reference now to flow chart block 505 of FIG. 16, under the heading including the FAD instruction, if the FFIX flip-flop is set, the Timing Counter is set to the FTC2 output state and as was the case for the FAD instruction the Q-Register bits QX0–Q38 are placed in the reset condition by the signal RSQ (FIG. 13). All other operations in block 505 being identical as for the FAD instruction, in the execution of the FXAD instruction the floating point unit leaves block 505 and proceeds via the "Yes" path from the "FTC2 Enabled?" decision block to block 529. Here the FFDW flip-flop 100 is reset and the Timing Counter FTC2 output state is cleared and because the operation code for FXAD is the same as that for FAD the FBSX signal applied to AND-gate 176 (FIG. 12) is enabled and the exponent calculation control state flip-flop 102 (FEXP) is placed into its set condition. Upon completion of the operations of block 529 the floating point unit tests at the "Gen. Inst.?" decision block to determine that the instruction is not a General Instruction. The floating point unit then tests to see if the first data signal has been received from the processing unit ("First Data Signal Rec'd. From PU?" decision block). Upon receipt of the data signal the floating point unit will take the "Yes" branch out of the decision block and enter block 592 of FIG. 33. It will be remembered from the description of flow chart block 529 that the FFDW flip-flop was reset. Therefore, upon entry into block 592 the contents of Information Item Lines II00–II23 are transferred into B-Register bit positions 00–23 via the B-Register transfer gates 18 (FIG. 9). To the floating point unit this is the same as the transfer of the second portion of the operand word from the processing unit in the FAD instruction. All other operations in block 592 are identical to those of the FAD instruction and upon entry into block 593 the contents of the B-Register, bit 00–37, are transferred through the Adder into A-Register bits 00–37 via AND-gate 162, FIG. 11. Simultaneously, the contents of the A-Register mantissa bits 00–37 are transferred to the B-Register bit positions 00–37, AND-gate 184 receiving thereto the ABX signal from the Gated Clock Amplifiers. All other operations in block 593 are exactly the same as previously described for FAD. The floating point unit now exits block 593 and enters into block 594 (FIG. 34) via the decision block "FBSX Enabled?" if the FBSX signal is enabled at this time. Block 594 operations are identical to those for the FAD instruction and the floating point unit now will enter into the "AS2=1?" decision block. Assuming that the contents of the A-Register mantissa field are not zero, block 598 is entered where the only exception to the previous description is that because the FFIX flip-flop is now set, the B-Register bits 24–37 are reset to binary 0's by the RSB signal from the Gated Clock Amplifiers 64 (FIG. 9). Upon completion of these operations, block 600 is entered by the floating point unit where the only exception to the FAD instruction execution is that if a mantissa overflow occurred it is here defined as fixed point over-flow. Referring now back to the decision block "AS2=1?" FIG. 34, if it is determined that the Adder is going to settle in two clocks the "Yes" branch is taken and block 599 is entered wherein all operations are the same as those described for the FAD instruction.

Upon existing from either of the blocks 599 or 600 the floating point unit enters the "NEG Enabled " decision block at point M in FIG. 36. If the NEG signal is enabled at this time the "Yes" branch will be taken and the rest of the execution of this instruction is exactly the same as that of the FAD instruction. If the "No" branch is taken from this decision block, the "OFL Enabled & FFIX Reset" decision block is entered. Since this instruction is executed with the FFIX flip-flop 58 in the set condition, if no over-flow condition has been detected, the "No" branch will be taken to the "FUNR or FFIX Set" decision block. If an over-flow condition did exist; that is, OFL was enabled, the "Yes" branch is taken and the execution of this instruction will proceed as did the FAD instruction description. At the "FUNR or FFIX Set?" decision block, since the FFIX flip-flop is set, the "Yes" branch will be taken and the rest of the execution of the FXAD instruction will proceed as did the instruction execution of FAD. Upon the completion of the FEND control state operations (FIG. 17) the execution of the FXAD instruction is done and the floating point unit will exit from block 506 in preparation for execution of the next instruction.

The next instruction to be explained is the FSB (Floating Subtract) instruction. With reference to block 505 of FIG 16, under the heading containing the FSB instruction, it is seen that the operations performed in this block are identical to those performed with respect to the FAD instruction. As was the case with the FAD instruction, the FSB instruction has a second variation. When the floating point unit is not in the fixed point mode (FFIX flip-flop is reset) it is the FSB instruction which utilizes a full 48 bit floating point word. However, if the instruction is executed in the fixed point mode with the FFIX flip flop set, the instruction is executed utilizing only bits 00–23 of the mantissa portion of the floating point word and is called FXSB (Fixed Subtract).

The FSB instruction is executed through the floating point unit in exactly the same manner in which the FAD instruction is executed with the exception of the one operation which takes place in blocks 599 and 600 as in FIG. 34. As shown in blocks 599 and 600 during the FSB instruction execution the A-Register mantissa bit A39 is complemented if the instruction being executed is an FSB and if the A-Register sign bit A38 equals the B-Register sign bit, bit 38. This same operation took place during the execution of the FAD instruction excepting that bit A38 of the A-Register was complemented if the sign bits were not equal.

As previously stated, when the FSB instruction is executed in the fixed point mode it is defined as FXSB. The FXSB instruction is executed in exactly the same manner as is the previously described FXAD instruction with one exception as shown in block 594 in FIG. 34. During the time of block 594 in the execution of the FXSB instruction the B-Register mantissa bits 00–37 are one's complemented, as shown in FIG. 9, by the application of the CBM signal to the Complement Mantissa Gates 188. The one's complement of the Control Counter is fed through the Adder and the FCRM signal which was previously enabled is added to the one's complement thus providing the two's complement of the original mantissa at the outputs of the Adder which is placed into the B-Register mantissa portion.

The FSI (Floating Subtract Inverse) instruction, like the FAD and FSB instructions, is executed in one of two ways and again with the use of the same operation code loaded into the I-Register and decoded by the Instruction Decode Logic. When the floating point unit is in the floating point mode, the instruction is executed as an FSI instruction and uses the entire 48 bit floating point word for instruction execution. When the instruction is executed in the fixed point mode, it is called the FXSI (Fixed Subtract Inverse) instruction and execution is performed only on bits 00–23 of the mantissa portion of the floating point data word.

The FSI instruction is executed in the exact manner as the FAD instruction as may be seen by a review of the appropriate flow charts. When the FSI instruction is executed in the fixed point mode as the FXSI instruction, all operations are identical to those for the FXSB instruction with the exceptions shown in block 593 of FIG. 33. During block 593 of the FXSI instruction the A- and B-Register mantissas are exchanged. The B-Register mantissa (bits 00–37) are transferred into the A-Register mantissa via AND-gate 162, and the A-Register mantissa (bits 00–37) is transferred to the B-Register via AND-gate 184 enabled by the signal ABX as shown in FIG. 9.

Prior to proceeding with a detailed description of the Floating Multiply instruction (FMP), it is believed advantageous to briefly consider the type of multiply algorithm utilized in the floating point unit of the present embodiment. The multiply algorithm basically utilizes the string concept of multiplication; that is, when the multiplier has a string of binary 1's contained therein, it is not necessary to form the partial product of each unit.

This method of multiplication depends basically upon the three following observations. First, the binary number 00100100 can be written as $2^5+2^2$. Therefore, it can be seen to form the product (00100100)N. It is only necessary to add $2^5 \times N + 2^2 \times N$. Secondly, the binary number 0011111 can be written as $2^5-2^0$; that is, $0100000-1=0011111$. From this second example, when a multiplier has a string of 1's it is not necessary to form the partial product for each 1 but merely subtract ($2^0$) (multiplicand) from ($2^5$) (multiplicand). In the third observation consider the binary number 0011011. This number can be written in the form $2^5-2^2-2^0$ since it is the same as 0011111 reduced by $2^2$. This number is said to have a string of 1's with an included 0. Note that the effect of an included 0 is a subtraction of the corresponding power of two. This rule also holds for more than one included 0. For example, a string of 1's from positions A to D has included 0's in positions B and C, then it can be written as $2^{D+1}-2^C-2^B-2^A$.

When the above three observations are combined, it is possible to write any binary number in terms of powers of two where the object is to have the least number of powers of two in the number representation. This is illustrated in the following example.

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 1 | 0 | 1 | 1 | 1 | 0 | 0 | 1 | 0 | 0 | 1 | 1 | 1 | 1 |

$$=2^{15}-2^{12}-2^9+2^6+2^4-2^0$$

It is seen that various problems can arise when choosing the appropriate powers of two for multiply reduction. The major problem is to determine when to add the multiplicand to the partial product, when to subtract the multiplicand from the partial product and when to just shift the partial product. The following example used as an aid in the present discussion uses notations above the one and zero bit positions rather than showing the explicit powers of two where a plus sign above a bit position of the multiplier indicates the fact that the multiplicand should be added to the partial product from that position, a minus sign above a bit position indicates a subtraction from that position, and a P above a bit position indicates shift only. Utilizing this notation the multiplier of the previous example becomes:

| + |   | P | P | − |   | P | P | − |   | P | P | + | P | + | P | P | P | − |
|---|---|---|---|---|---|---|---|---|---|---|---|---|---|---|---|---|---|---|
| 0 |   | 1 | 1 | 0 |   | 1 | 1 | 1 |   | 0 | 0 | 1 | 0 | 0 | 1 | 1 | 1 | 1 |

When performing the multiply algorithm, as the multiplier is shifted right from the least toward the most significant bit, each bit must be examined and a decision made whether to add, subtract, or shift. The above described observation can be summarized in terms of the previously mentioned concept of string 1's as follows. Two or more adjacent 1's constitute a string of 1's and the least significant 1 of a string is always interpreted as $\bar{1}$. A 0 to the left of the most significant 1 in a string is interpreted as a $$+ \qquad\qquad P+PPPP-$$
0, for example as in the binary number 0 0 1 1 1 1 1

The string of 1's may include isolated 0's; that is, 0's each of which are flanked by 1's. Such 0's are interpreted as $\bar{0}$;

$$P+PP-P-P-$$
e.g., 0 0 1 1 0 1 0 1 1

Isolated 1's can also exist. These are 1's which are flanked by 0's and they are interpreted as $$+ \qquad PP+P+PP$$
1; e.g., 0 0 1 0 1 0 0

It can be seen from the above examples when working from right to left as a string of 1's is met a subtraction must take place, and only subtraction can take place within a string of 1's. In exiting from a string, an addition takes place, and only additions can take place outside a string. Finally, it should be noted from the previous discussion that when working from right to left a string is not initiated until at least two adjacent 1's occur, and a string does not stop until at least two adjacent 0's occur.

For a more complete description of the string concept of multiplication, reference is made to The Logic of Computer Arithmetic by Ivan Flores, Prentice-Hall, 1963.

With the preceding in mind the description of the execution of the FMP (Floating Multiply) instruction will begin with reference to flow chart block 505 of FIG. 16. At this time the FMP instruction is being decoded by the Instruction Decode Logic 40 and the multiplier exists in the A-Register. During block 505 the "All Instructions" operations are performed and, as may be seen under the heading including FMP, the Q-Register is reset.

The floating point unit will now leave block 505 and enter into the "FTC2 Enabled?" decision block. Since it is assumed at this time that the FMP instruction is not being executed in the fixed point mode, the "No" branch will be taken from the "Gen. Inst.?" decision blocks to the "First Datat Signal Rec'd. From PU?" decision block. Upon receipt of the first I/DS signal the floating point unit proceeds to the indicated starting points of FIGS. 21 and 22 (Start with First Data Signal From PU). It should be noted that the operations of blocks 768–772 (FIG. 22) are executed in parallel with the operations of blocks 557, 558, 560, 540 and 543 shown in FIG. 21. The operations which take place with respect to FMP in FIG. 21 are the same as those previously described for the ADE instruction, where for the execution of the present instruction the exponent calculation performed is between the multiplier and the multiplicand. At the "ADE Inst.?" decision block of FIG. 21, the "No" branch is taken and the floating point unit will enter FIG. 22 at point B.

Figure 22:
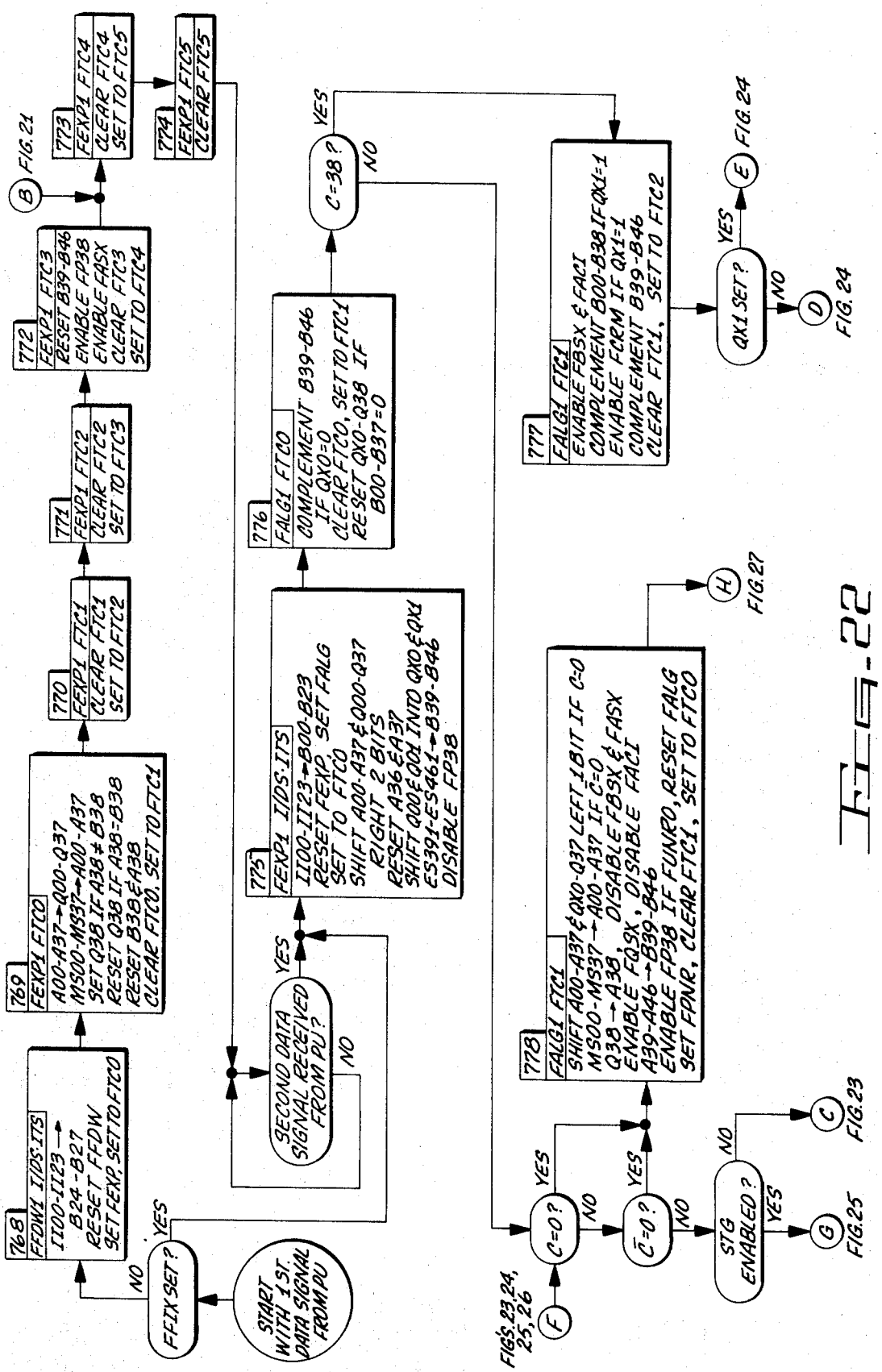

Referring now to FIG. 22, upon receipt of the first data signal from the processing unit, the floating point unit tests to determine if the FFIX flip-flop 58 (FIG. 3) is set. Since it was previously assumed that it is not set, block 768 is entered, which is the same as block 557 in FIG. 21. At this time the first operand word in the processing unit is transferred into the B-Register. Block 769 is then entered by the floating point unit wherein the multiplier in the mantissa portion of the A-Register is transferred into the Q-Register from bits 00–37 into bits 00–37, and the A-Register mantissa field bits 00–37 are reset by transferring the Adder contents into the A-Register with all Adder inputs turned off. The product mantissa sign is calculated and stored in the Q-Register sign bit position 38 by setting Q38 to a binary 1 if A-Register mantissa bit 38 is not equal to the B-Register mantissa bit 38. Bit Q38 is reset if A38 equals B38. Also, in block 769 the B-Register bit 38 and A-Register bit 38 are reset and the Timing Counter is set to FTC1. Upon completion of these operations, blocks 770 and 771 are entered to step the Timing Counter from FTC1 to FTC3, at which time block 772 is entered. In block 772, the Control Counter is reset in preparation for the initial control count of +38 to be loaded by the FP38 signal into the exponent Adder.

Upon clearing of the FTC3 state and the setting of the Timing Counter to FTC4, block 773 is entered by the floating point unit. It should be noted that the exponent calculations which were taking place in FIG. 21, as previously described by the ADE instruction, are completed at the time of entry into block 773. In block 773 the Timing Counter is stepped from FTC4 to FTC5, and in block 774 the FTC5 state is cleared and the floating point unit enters into a "Second Data Signal Rec'd from PU?" decision block. Upon erceipt of the second data signal, the "Yes" branch is taken to block 775, wherein the second data word is transferred from the Information Item Lines II00–II23 into B-Register bits 99–23. The A- and Q-Register mantissas are each shifted right two bits, with the A-Register shifting through the Adder, and binary 0's are inserted into the two vacated A-Register bit positions. The two least significant multiplier bits are shifted into the Q-Register extension bits QX0 and QX1.

It is significant to point out at this time that binary 0's are also inserted into bits 36 and 37 of the Q-Register. The insertion of these two zeros in bits 36 and 37 which will remain between the most significant multiplier bit and the least significant partial product bit is done at this time in order to force exit from a string of 1's if such are present in the high order bits of the multiplier at the completion of the multiply algorithm. In addition, in block 775 +38 is loaded into the Control Counter by transferring the exponent portion of the Adder into the Control Counter with the previously enabled FP38 signal applied to the input stages EA40 and EA41. The FEXP flip-flop 102 is now reset, the FALG flip-flop 106 is set, the Timing Counter is set to the FTC0 output state, and the floating point unit moves to flow chart block 776.

In block 776 if, as detected by the Algorithm Execution Control Logic, the least significant multiplier bit (QX0) of the Q-Register equals zero, the Control Counter contents (FIG. 9) are complemented. The Control Counter at this time contains the one's complement of the number of multiplier bits to be examined during the execution of the multiply algorithm. Also it should be pointed out that during the execution of the multiply algorithm the bits shift into the two extension bits of the Q-Register; that is, QX1 and QX0, determine the action to be initiated. The Algorithm Execution Control Logic always monitors the conditions of these two stages to effect this determination. The Control Counter is not complemented at this time if the least significant multiplier bit (QX0) is in the set condition, and the Control Counter contents which now contain +38 will force the Algorithm Execution Control Logic to initiate an action, depending on the present contents of the Q extension bits. In addition, in block 776 if the multiplicand now located in the B-Register (bits 00–37) is zero, the multiplier which is in the Q-Register is reset to all binary 1's. (This is done because the product will be zero if the multiplicand is zero.) Upon setting the Timing Counter to the FTC1 output state, the floating point unit enters a decision block "C=38?". If "C=38?" is true, it is an indication that the Control Counter was not complemented and the "Yes" branch will be taken to block 777.

Entry into block 777 is an indication that the least significant multiplier bit QX0 was in a set condition in block 776. An add or subtract cycle is initiated in block 776 depending upon the present contents of the Q extension bits QX0 and QX1. The FBSX signal is here enabled thus providing the B-Register inputs into the mantissa portion of the Adder. If QX1 is in the set condition (QX0 is a binary 1 at entry into block 777), the first two low order multiplier bits located in QX1 and QX0 are binary 1's and a string of one's has begun. Therefore, the B-Register mantissa bits 00–38 are complemented and the initial carry FCRM into the mantissa portion of the Adder is enabled. These conditions establish the first step in executing the multiply algorithm which will be a subtraction of the multiplicand from the contents of the A-Register which at this point are zero. On the other hand, if upon entry into block 777, bit QX1 is not in the set condition, the multiplicand (B-Register mantissa) is not complemented in that the least significant multiplier bit QX0 is an isolated 1. Thus, with the FBSX signal enabled the first step in this situation will be an addition of the multiplicand to the contents of the A-Register bits 00–23. In completion of block 777 operations, the B-Register Control Counter bits 39–46 are complemented and the Timing Counter is set to the FTC1 output state.

Upon leaving block 777, the floating point unit enters a "QX1 Set?" decision block, at which time the Algorithm Execution Control Logic tests to determine if bit QX1 (second low order multiplier bit) is a binary 1. If QX1 is a binary 1 the floating point unit exits through the "Yes" branch and enters the flow chart of FIG. 24 at point E to block 796 wherein the Algorithm Execution Control Logic detects the fact that a string of 1's in the multiplier has been detected and stores this fact, as shown in FIG. 796, by enabling a signal STG (string detector signal). In addition, the Adder inputs are checked for early adder settle out time configurations and if AS2 is not true, the Timing Counter is set to FTC3. If AS2 is true, the Timing Counter is set to FTC1. Upon completion of these operations, the floating point unit tests to see if FTC1 is set (true). If FTC1 is not set, the Adder will not be settled in the next clock period and block 797 is entered wherein the Timing Counter is then set to the FTC1 output state. The floating point unit now proceeds to point F of FIG. 22. If, however, the FTC1 output is in the set condition, indicating that the Adder will settle out on the next clock, the floating point unit exits the "FTC1 Set?" decision block hrough the "Yes" branch to enter FIG. 22 at point F and a "C=0?" decision block.

If "C=0?" is not true, indicating that all 38 multiplier bits have not been examined, the "No" branch is taken and the "$\overline{C}$=0?" decision block is entered and the Algorithm Execution Control Logic tests to see if all 38 multiplier bits have been properly treated and that an overshift of one has not occurred. Assuming that "$\overline{C}$=0?" is not true, the "No" branch will be taken and the decision block "STG Enabled?" will be entered by the floating point unit. Assuming that a string of 1's has not been detected by the floating point unit, the "No" branch will be taken and the floating point unit will enter FIG. 23 at point C and a "SHL Enabled?" decision block. SHL is a signal internal to the Algorithm Execution Control Logic which comes true when the Algorithm Execution Control Logic detects the fact that a mulliplier bit has been overshifted. When this signal is enabled it is an indication that the partial product and the multiplier in the A- and Q-Registers are to be shifted left one bit which properly positions the multiplier and the partial product in the A- and Q-Registers with the multiplier action bit being positions in QX0. This is required before executing the required addition of the multiplicand to the partial product. A more detailed description of the enabling of the SHL signal in the Algorithm Execution Control Logic will be more fully described later in the present specification.

Assuming now that the SHL signal is enabled, the "Yes" branch will be taken from the decision block to a decision block "QX0 Set?". Assuming as detected by the Algorithm Execution Control Logic that QX0 is not set (it is a binary 0), block 779 will be entered thus indicating that the floating point unit is not in a string and that an isolated 1 in the multiplier has been over-shifted. Therefore the A- and Q-Registers are shifted left one bit position which properly positions the multiplier in the Q-Register and the partial product in the A-Register. The addition of the multiplicand to the partial product is initiated by turning on the B-Register inputs to the Adder, by enabling the signal FBSX, enabling the signal FACI, and setting a binary 1 into bit position QX0 by the signal Set QX0 as shown in FIG. 13. The exponent portion of the Adder, stages EA39–EA46, is transferred back into the B-Register thus completing the previous control count incrementation by two and an incrementation by one is initiated by enabling the signal FCRE while simultaneously disabling the signal FIN2. The one's complement of the Control Counter plus the exponent Adder inputs now reflect the multiplier bit being positioned into QX0. In completion of the operations described in block 779, wherein the addition of the multiplicand to the partial product takes place, the SHL signal is disabled, the Timing Counter is set to the FTC2 output state and block 780 is entered. In block 780, the multiplier bit QX0 is reset to a binary 0. Since the required action has now been initiated, the Timing Counter FTC2 output state is cleared and the Adder inputs again are checked for early adder settle out configurations as previously described with the appropriate setting of the Timing Counter. Upon completion of block 780, the floating point unit proceeds to point 8 of FIG. 24 to enter the "FTC1 Set?" decision block for subsequent operations as previously described.

Figure 23:
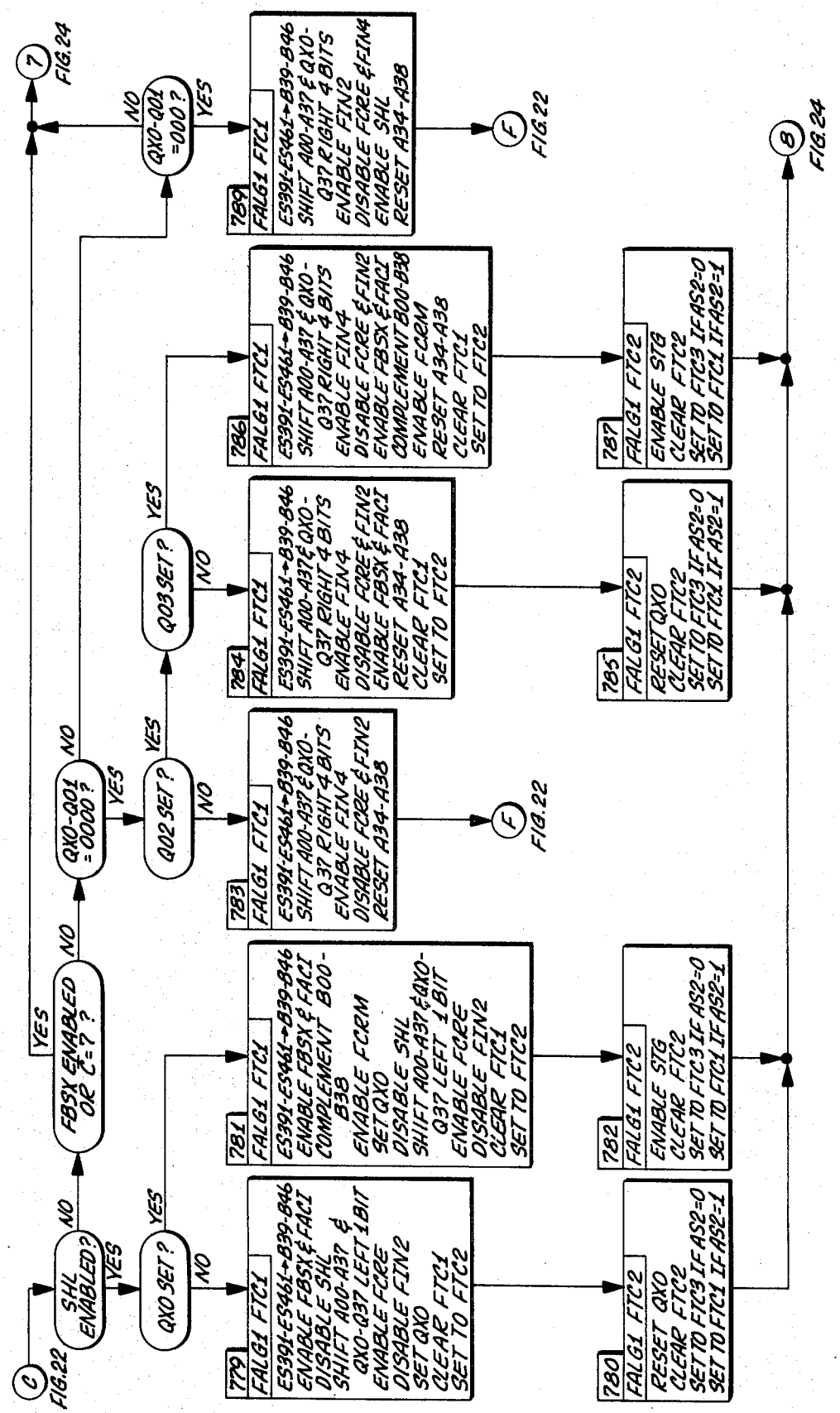

Referring again to the decision block "QX0 Set?" in FIG. 23, and assuming that the QX0 bit is set, the "Yes" branch will be taken and block 781 will be entered. In block 781 the operations which take place are exactly the same as just described in block 779 with the exception that bit QX0 was set prior to the left shift. Therefore, bits QX1 and QX0 are both set which is the condition for initiating the string. As such, in block 781 it is necessary to two's complement the B-Register in preparation for performing a subtraction operation, the first step upon entering into a string. The floating point unit now enters into block 782 wherein the STG signal is enabled in the Algorithm Execution Control Logic since a string of one's in the multiplier has been detected. The remaining operations of block 782 are identical to those described for block 780 and upon the completion thereof the floating point unit will go to point 8 and the "FTC1 Set?" decision block of FIG. 24. Again referring to the "SHL Enabled?" decision block in FIG. 23, this time assuming that a left shift by one is not to be executed, the "No" branch will be taken and the floating point unit will test in the "FBSX Enabled or $\overline{C}$=7?" decision block to determine if the B-Register to Adder transfer enable signal is true, or if the number of multiplier bits left is less than seven. Assuming at this time that neither of these conditions exists, the "No" branch will be taken and the decision block "Q00–QX1=0000?" will be entered. A positive response to this inquiry results in the taking of the "Yes" branch to a decision block "Q02 Set?". If, as determined by the Algorithm Execution Control Logic, bit Q02 is not set, the "No" branch will be taken from the latter decision block and block 783 will be entered. Entering block 783 is an indication that the floating point unit has not detected a string of 1's and that conditions are satisfactory for executing a shift right by four; that is, the five low order bits of the multiplier are all binary 0's. The A- and Q-Register mantissas are shifted right four bit positions with the multiplier bit Q02 shifting into QX0. Since this bit is a binary 0 and the floating point unit is not in a string, it is not an action bit. Simultaneously with the shifting of the A- and Q-Registers, A-Register bits 34–38 are reset to binary 0's. The previous Control Counter incrementation is completed and an incrementation by four is initiated by enabling of FIN4 and the disabling of FIN2. Also at this time the FCRE signal is disabled. At the completion of these operations the floating point unit proceeds to point F of FIG. 22 and the decision block "C=0?", the "No" branch from which has been previously described.

If the "Yes" branch is taken from the "Q02 Set?" decision block, a "Q03 Set?" decision block is entered. If Q03 is a binary 0 (not set) the "No" branch is taken and block 784 is entered. At this time it has been determined that the low order four bits of the multiplier are all binary 0's which permits the right shifting of the A- and Q-Registers. Also, it is known that the fifth lowest bit (Q02) is a binary 1 followed by a binary 0 in bit position 6 (Q03). As such, the next step after the shift will be an addition of the multiplicand to the partial product. Therefore, in block 784 the signal FBSX to the mantissa adder inputs in enabled in preparation for performing the addition. All other operations in block 784 are the same as those previously described for block 783 with the exception that the Timing Counter is set to the FTC2 output state and FTC1 is cleared. Upon completion of these operations, block 785 is entered wherein the Q-Register extension bit QX0 is reset to a binary 0, the Timing Counter FTC2 output is cleared and the Adder inputs are again checked for early adder settle out configurations as previously described in block 780. Upon completion of the operations of block 785 the floating point unit will again proceed to point 8 of FIG. 24 and the "FTC1 Set?" decision block.

Still with reference to FIG. 23, the "Yes" branch from the decision block "Q03 Set?" is taken to flow chart block 786 if bit Q03 is set (a binary 1). Prior to entering block 786 the four low order bits QX0–Q01 have all been detected as binary 0's. Therefore the A- and Q-Registers can be shifted right by four. The fifth and sixth lower bits of the Q-Register (Q02 and Q03) are known to be binary 1's. Bits 5 and 6 will, therefore, begin a string of 1's after the right shift of the A- and Q-Registers by four. Since the first step on entering a string in a subtraction of the multiplicand from the partial product, the multiplicand in the B-Register will be two's complemented in preparation for the subtraction. This is accomplished (FIGS.

9–13) by providing the one's complement of the B-Register mantissa and the FCRM signal to the mantissa portion of the Adder 28. The remaining operations of block 786 are the same as those described for block 784. Upon completion of the block 786 operations, block 787 is entered wherein the Algorithm Execution Control Logic detects the fact that a string condition does exist and enables the STG signal. The FTC2 signal is disabled and again the Adder inputs are checked for early adder settle out time confiurations. Upon setting the Timing Counter to either FTC3 or FTC1 output states in accordance with the settle out time required, the floating point unit will again enter FIG. 24 at point 8 and the "FTC1?" decision block.

Referring again to the "QX0–Q01=0000?" decision block of FIG. 23, the "No" path therefrom leads to a "QX0–Q01=1000?" decision block. If the result of this decision is "Yes," block 789 will be entered thus indicating that the floating point unit has not detected a string of 1's and the low order four bits of the multiplier are 1000 which allows for a shift right by four which must then be followed by a shift left by one. The A- and Q-Register mantissas are, therefore, shifted right four bits, and because a shift left by one is required, the signal SHL internal to the Algorithm Execution Control Logic is enabled. The FIN4 signal is disabled and the Control Counter bits 39–46 are incremented by two by the enabling of the FIN2 signal and the passing of the Control Counter contents through the Adder and back into the B-Register. The FCRE signal into the exponent Adder is now disabled. In addition, as previously described, A-Register bits 34–38 are reset to binary 0's. At the completion of these operations the floating point unit will again enter FIG. 22 at point F and the "C=0?" decision block.

Figure 24:
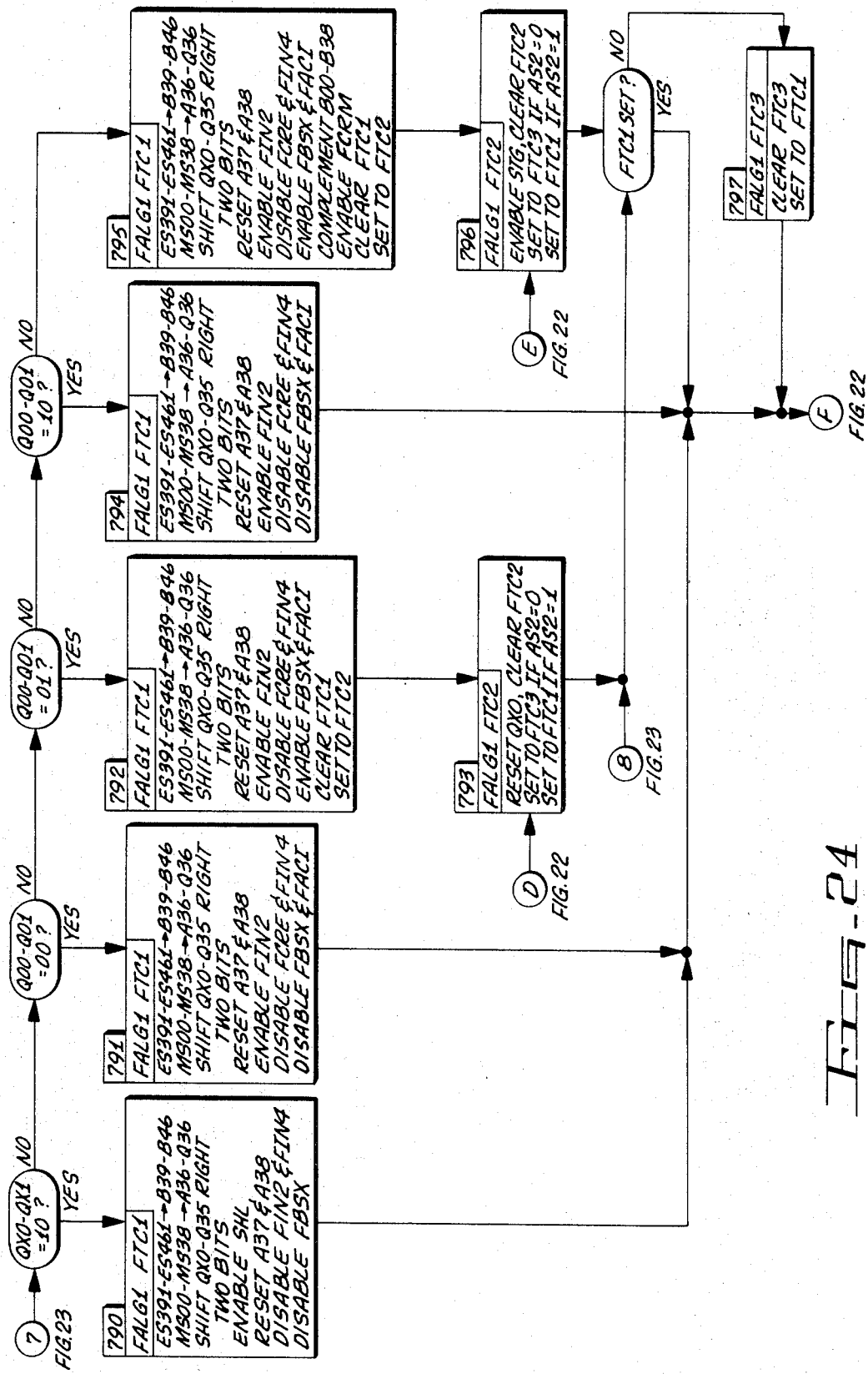

In completion of FIG. 23, the "Yes" path from the "FBSX Enabled or $\bar{C}$=7?" decision block and the "No" path from the "QX0–QX1=1000?" decision block both lead to point 7 and a decision block "QX0–QX1=10?" shown in FIG. 24.

The "Yes" path from the QX0–QX1=10?" decision block directs the floating point unit to flow chart block 790 which is entered indicating that the floating point unit has not detected a string of 1's and a shift right by two will be followed by a shift left by one, the latter to be executed in order to position the proper action bit in the QX0 position. The shift right by two operations is performed, FIGS. 11 and 12, by the enabling of the A-Register to the Adder by the FASX signal. Thus, Adder bits MA00–MA38 reflect the A-Register inputs. The two signals SA2 and FALG1 are applied to AND-gate 222 (FIG. 11) which will not transfer bits MS02–MS38 into the A-Register displaced right two bits into bit positions A00–A36. Simultaneously, A-Register bits 37 and 38 are reset to binary 0's by the reset signal A37 & A38 originating in the Algorithm Execution Control Logic. Simultaneously with this shifting operation, as shown in FIG. 13, bits MS00 and MS01 from the Adder are transferred into bit positions 36 and 37 of the Q-Register via AND-gate 150 by the now enabled signal SQ2 while the Q-Register is being shifted right two bits through AND-gate 152. At this time the A-Register contents are transferred through the Adder, the contents of the B-Register are added thereto such that this becomes an add/shift operation, if the FBSX signal was enabled prior to entry into block 790. Since it is necessary to perform a left shift of the Q-Register, the SHL signal in the Algorithm Execution Control Logic is also enabled at this time. Also in block 790 the exponent Adder sum (S) outputs are transferred to the Control Counter thus completing the control count incrementation and the two signals FIN2 and FIN4 will be disabled if enabled at this time, since no further incrementation is required at this time. Upon completion of the block 790, the floating point unit moves to point F and the "C=0?" decision block of FIG. 22. Referring again to FIG. 24, the "No" branch from the "QX0–QX1=10?" decision block leads to a decision block "Q00–Q01=00?". If, as detected by the Algorithm Execution Control Logic these two register stages both contain binary 0's, the "Yes" branch will be taken and block 791 will be entered. In block 791 an addition of the multiplicand to the partial product in the A-Register may be completed. The A- and Q-Registers are shifted right two bits with the A-Register shifting through the Adder and possibly being added to the contents of the B-Register as previously described in block 790. If an add function is also being performed in block 791, the B-Register inputs to the Adder will be enabled by the FBSX signal. After the transfer, the FBSX signal, if enabled, is disabled. The signals FIN4, FCRE, and FACI are disabled. The Control Counter incrementation by two is initiated at this time by enabling the FIN2 signal and by passing the contents of the Control Counter through the exponent portion of the Adder and placing the incremented count into the Control Counter. At the completion of these operations, block 791 is exited and the floating point unit again enters FIG. 22 at point F.

Referring now back to the decision block "Q00–Q01=00?" in FIG. 24, if the "No" branch is taken, a "Q00–Q01=10?" decision block is entered. Assuming that the result of this decision block is true, the "Yes" branch is taken and block 792 is entered thus indicating that the floating point unit did not detect a string and a shift right by two will position the action bit in QX0 thus requiring an addition of the multiplicand to the partial product. An addition of the multiplicand to the partial product may be completed at this time due to an isolated 1 to a string of 1's in the multiplier. All operations in block 792 are identical to those described for block 791 with the exception that the Timing Counter FTC1 output is cleared and the Timing Counter is set to the FTC2 output state. Upon leaving block 792 the floating point unit will enter into block 793 and the QX0 stage of the Q-register will be reset. The Timing Counter FTC2 output will be cleared and the Algorithm Execution Control Logic checks the Adder inputs to determine if early adder settle out of the mantissa addition is going to be performed. Upon completion of these operations the floating point unit will exit block 793 and again enter into "FTC1 Set?" decision block for entry into FIG. 22 at point F either directly or via block 797 as previously described.

Again with reference to the decision block "Q00–Q01=01?" in FIG. 24, if this condition is not true the "No" branch will be taken to a decision block "Q00–Q01=10?". If this condition is true, the "Yes" branch will be taken to block 794 thus indicating that the floating point unit has not detected a string of 1's and a shift right by two by the A- and Q-Registers will be performed with the A-Register shifting through the Adder and possibly being added to the B-Register as previously described. The remaining operations of block 794 are as exactly as described and performed in block 791 except that the output of the Timing Counter is not changed. Upon leaving block 794, the floating point unit progresses to point F of FIG. 22.

Referring once again to the decision block "Q00–Q01=10?" in FIG. 24, the "No" branch will be taken to block 795 when the floating point unit has not detected a string of 1's thus indicating that a shift right by two is required in order to position the action bit into position QX0 of the Q-Register. This requires the subtraction of a multiplicand from the partial product. The operations which will take place in block 795 are exactly the same as previously described for flow chart block 792 with the exception that in order to prepare for the subtraction the B-Register is two's complemented which also requires the enabling of the FCRM signal. At the completion of block 795, block 796 is entered wherein the STG signal is enabled in the Algorithm Execution Control Logic since the floating point unit now has a one bit in QX0. The remaining operations of block 796 are as previously described for block 787 in FIG. 23 and are the clearing of the FTC2 output state and the determination of whether or not early adder settle out time will be employed. Upon exiting block 796 the "FTC1 Set?" decision block is again entered.

Figure 25:
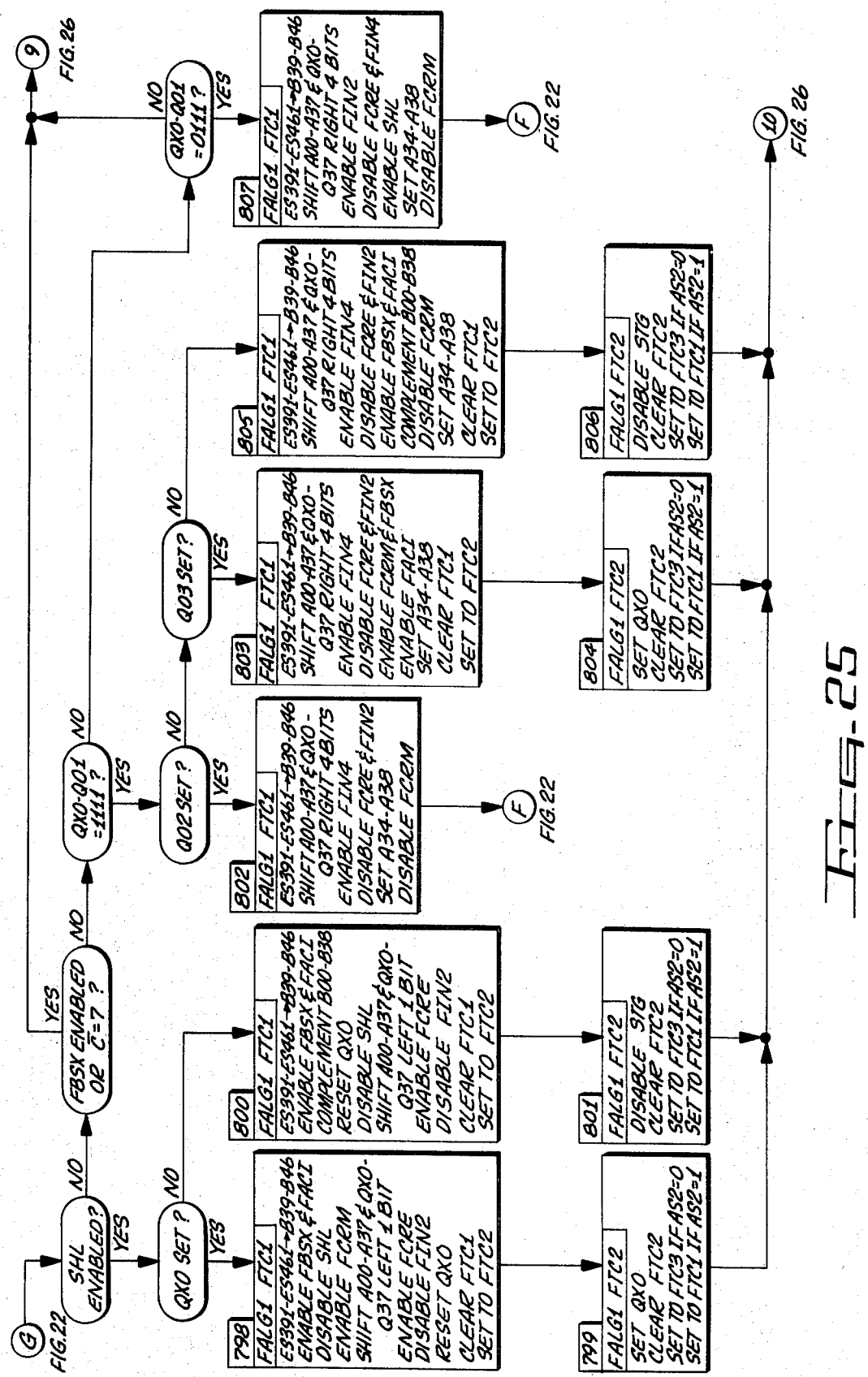

Referring once again to FIG. 22 and the "STG Enabled?" decision block, if the Algorithm Execution Control Logic here detects that a string of binary 1's exits in the low order bits of the Q-Register, the "Yes" branch is taken and the floating point unit will enter into a "SHL Enabled?" decision block at point G, FIG. 25. Assuming now that the SHL signal is enabled indicating that the least significant bits of the Q-Register were over-shifted by one from the previous operation, the "Yes" branch is taken from this decision block and a "QX0 Set?" decision block is entered. If QX0 is set (a binary 1) the "Yes" branch is taken and block 798 is entered because the floating point unit has detected a string condition with an isolated zero in the multiplier being shifted. The multiplier action bit must, therefore, be positioned in position QX0 before executing the required action of subtracting the multiplicand from the partial product. The A- and Q-Registers are shifted left one bit which properly positions the multiplier in the Q-Register and the partial product in the A-Register. A subtraction of the multiplicand from the partial product is intitiated by enabling FBSX, thus enabling the B-Register bits into the Adder and enabling the initial carry signal, FCRM, into the least significant bit position of the mantissa adder. These inputs, in combination with the A-Register Adder inputs which are enabled by the FASX signal will initiate the add cycle. In addition, the previous Control Counter incrementation is completed and FIN2 is disabled. The two's complement of the Control Counter is taken at this time by enabling the signal FCRE. In addition, since the shift left operation is completed in block 798, the SHL signal is disabled in the Algorithm Execution Control Logic and QX0 is reset thus placing a zero in the QX0 position. The Timing Counter is set to the FTC2 output and block 799 is entered. In block 799 the multiplier bit in QX0 is set to a binary 1 since the action required has now been initiated. In the manner previously described, the Adder inputs are checked for early adder settle out configurations and the FTC2 Timing Counter output is cleared. The floating point unit now exits from block 799 and enters into point 10 in FIG. 26 to a "FTC1 Set?" decision block. The operations of this decision block which provide a "Yes" output to point F in FIG. 22 and a "No" output to block 815 are exactly as previously described for block 797 in FIG. 24.

Referring once again to FIG. 25 and the "QX0 Set?" decision block, and assuming that QX0 is not set, the "No" branch is taken and block 800 is entered. Block 800 is entered since a string of 0's in the multiplier has been detected and, therefore, the SHL signal in the Algorithm Execution Control Logic is disabled. In addition to the string being detected by the Algorithm Execution Control Logic, it has also been detected that the first 0 in the string of 0's in the multiplier has been over-shifted and the multiplier action bit must be positioned (a shift left by one) in QX0 before executing the required action of adding the multiplicand to the partial product. The operations which are performed in block 800 are exactly the same as those performed in flow chart block 798 with the exception that the B-Register bits 00–38 are two's complemented. After the shift, the two low order bits of the multiplier QX1 and QX0 will be 0's. This means that that which will follow will be an exiting from a string and addition of multiplicand to the partial product.

Upon completion of block 800 operations, block 801 is entered wherein the STG string detection signal in the Algorithm Execution Control Logic is disabled and the Timing Counter FTC2 output is cleared. Again, the Adder inputs are checked to see if the Adder will settle on the next clock. Block 801 is exited and the floating point unit will again go to point 10 of FIG. 26.

If at the "SHL Enabled?" decision block of FIG. 25 the SHL signal is not enabled, the "No" branch will be taken to the "FBSX Enabled or $\overline{CI}=7$?" decision block. If neither of these conditions is true, the "No" branch will be taken and the "QX0–Q01=1111?" decision block will be entered. Assuming that the conditions in this block are true, the "Yes" branch will be taken, indicating that the floating point unit has detected a strong of binary 1's, and the "Q02 Set?" decision block will be entered. If Q02 is set (a binary 1), the "Yes" branch will be taken indicating that the five low order bits of the multiplier in the Q-Register are all binary 1's. This means that the floating point unit is going to stay in a string and, therefore, a shift of the A- and Q-Registers right by four bit positions will be executed with the multiplier in Q02 shifting into QX0. Since this bit is a 1 in a string, it is not considered as an action bit. In addition, since the partial product is negative, bits 34–38 of the A-Register mantissa will be set to binary 1's at the time the shift right by four is executed. The setting of bits 34–37 of the A-Register is accomplished via AND-gate 190 (FIG. 11) receiving thereto the signals SA4 and ASM. Bit 38 is set by the SSM signal at AND-gate 170, the output of which is connected to bit 38 of the A-Register. The FCRE and FIN2 signals are disabled and the Control Counter is incremented by four by enabling the signal FIN4 and transferring the contents of the B-Register through the Adder back into the B-Register. In addition, the FCRM signal applied to the mantissa Adder stage MA00 is disabled and the floating point unit will exit from block 802 and proceed to point F of FIG. 22.

At the "Q02 Set?" decision block, if Q02 is a binary 0, the "No" branch is taken to a "Q03 Set?" decision block. A true response to this inquiry effects entry into block 803 as the low order six bits of the multiplier in the Q-Register are 101111. Note that there is an isolated 0 in bit position five. This allows for shift right by four since the floating point unit has detected a string condition. As the partial product is negative, bits 34–38 of the A-Register are to be set to binary 1's at the time of the shift right by four. The bit to be shifted into QX0 is an isolated zero, requiring subtraction of the multiplicand from the partial product. The shift right by four and the subtraction of the multiplicand from the partial product are simultaneously performed by enabling the B-Register to the Adder (FBSX signal) and enabling the FCRM and FACI signals. In addition, the previous Control Counter incrementation being completed, the FCRE signal is disabled and an incrementation by four is initiated by enabling FIN4 and transferring the complemented control count from the Adder back into the B-Register bits 39–46. Upon completion of clearing the FTC1 output and setting the Timing Counter to FTC2, block 804 is entered wherein QX0 is set to a binary 1 since the required action has now been initiated and again the Adder inputs are checked for early adder settle out configurations. At the completion of these operations, the floating point unit again proceeds to point 10 of FIG. 26.

When the "No" branch is taken from the "Q03 Set?" decision block, the floating point unit enters into block 805 as the conditions are again satisfied to execute a shift right by four. The bit shifted into QX0 is the first 0 in a string of 0's in a multiplier requiring addition of the multiplicand to the partial product. Since the floating point unit has detected a string condition and the partial product is negative bits 34–38 of the A-Register are set to binary 1's and the B-Register bits 00–38 are two's complemented. All other operations are exactly the same as those described previously for block 803. Upon exiting block 805 the floating point unit enters into block 806 wherein the operations are exactly the same as previously described in block 801. From block 806, the floating point unit again enters FIG. 26 at point 10.

Still with reference to FIG. 25, the "No" path from the "QX0–Q01=1111?" decision block is taken when the four lower bits of the Q-Register are not all binary 1's and a decision block "QX0–Q01≡0111?" will be entered. If the results of this decision block are "Yes," block 807 is entered thus indicating that the floating point unit has detected a string condition and that a shift right by four followed by a shift left by one must be executed to position the action bit in QX0 position. At this initiation of the shift right, the SHL signal in the Algorithm Execution Control Logic is enabled. The Control Counter contents are two's complemented and incremented by two by enabling the FIN2 signal and disabling the FIN4 and FCRE signals. Also, since the partial product is negative, bits 34–38 of the A-Register will be set to binary 1's. The FCRM signal is disabled and the floating point unit goes to point F of FIG. 22.

Figure 26:
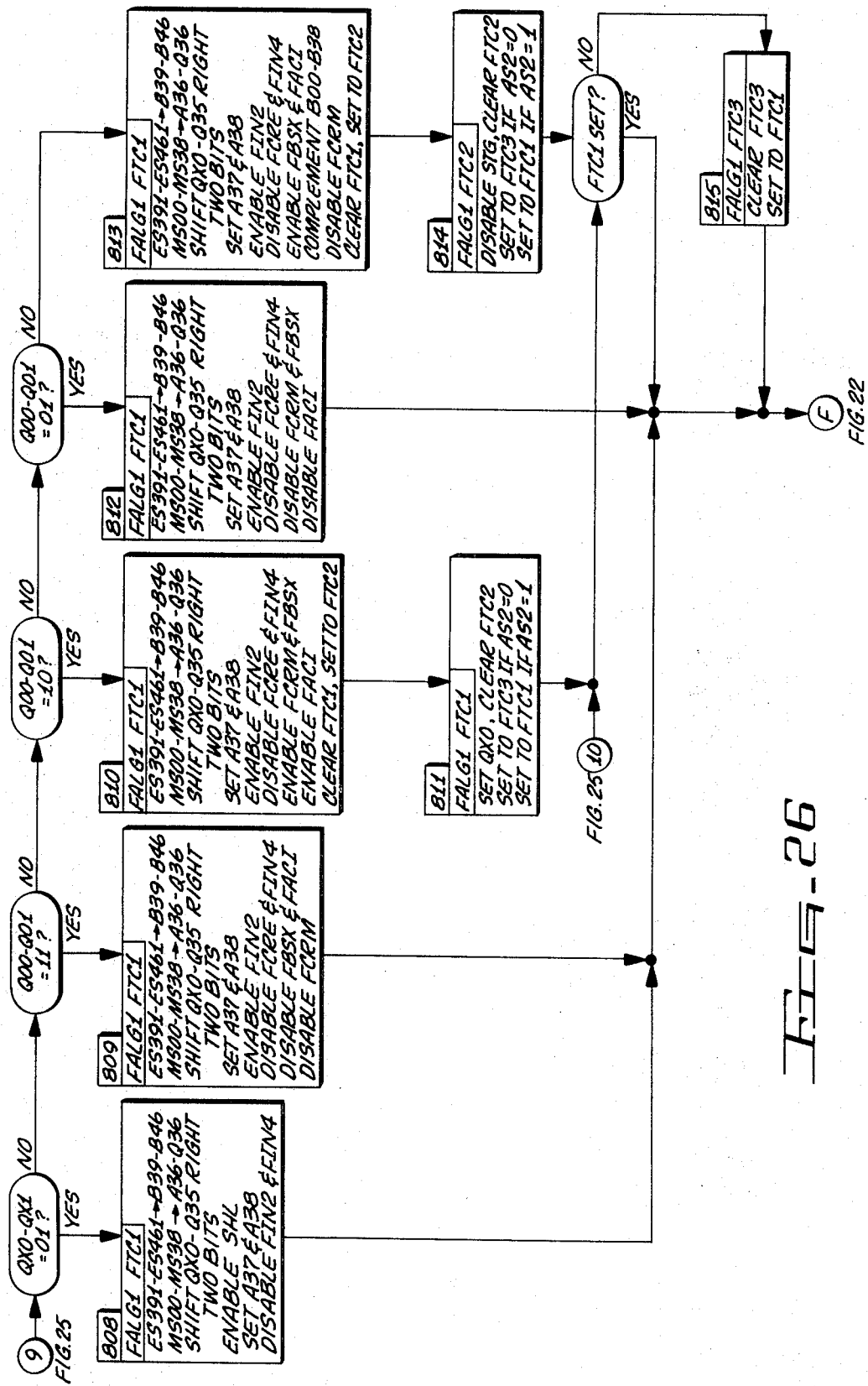

Assuming that neither of the conditions questioned in the "FBSX Enabled or $\overline{C0}$=7?" are true, the floating point unit proceeds to point 9 of FIG. 26. This same point is reached via the "No" branch from the "QX0–QX1= 0111?" decision block of FIG. 25.

At point 9 of FIG. 26 is a decision block "QX0–QX1= 01?". The "Yes" branch from this block indicates that the floating point unit is in a string condition and block 808 is entered where a shift right by two followed by shift left of one must be executed to position an action bit in QX0. The A- and Q-Registers are shifted right two bits and the SHL signal is enabled in the Algorithm Execution Control Logic for shifting left at a later time. In addition, the previous Control Counter incrementation being completed, the FIN2 and FIN4 signals are disabled since no incrementation is to be initiated at this time. The A-Register bits 37 and 38 are set to binary 1's since the partial product is negative. The floating point unit now leaves block 808 and enters FIG. 22 at point F.

Referencing again the decision block "QX0–QX1=01?" in FIG. 26, if the result of the decision is negative, the "No" branch is taken to decision block "Q01–Q01=11?". If, as detected by the Algorithm Execution Control Logic, the condition of this block is true, the "Yes" branch is taken into block 809. The condition here is that the floating point unit has detected a string condition. Hence, the A- and Q-Registers are shifted right by two bits and the multiplicand is subtracted from the partial product being shifted if the B-Register inputs to the Adder input are enabled by the signal FBSX. The subtraction of the multiplicand from the partial product at this time will be due to an isolated 0 in the multiplier or because of entering a string of 1's in the multiplier. However, if FBSX is not enabled at this time the partial product will be shifted to the right without change as described in block 808. The A-Register bits A37 and A38 are set to binary 1's. The Control Counter is incremented by two by enabling the FIN2 signal and disabling the FIN4 sginal, thus completing the previous control count incrementation. The FCRE, FBSX, FCRM, and FACI signals are disabled and the floating point unit once again goes to point F of FIG. 22.

The "No" branch from the decision block Q00–Q01= 11? leads to a decision block "Q00–Q01=10?" and a positive answer to the inquiry effects entry into block 810. Block 810 is entered when the floating point unit is in a string condition and a shift right by two will position an action bit in position QX0 thus requiring subtraction of the multiplicand in the B-Register from the partial product in the A-Register. The subtraction of the multiplicand from the partial product may be completed at this time due to an isolated 0 or the entering of a string of binary 1's in the multiplier. Block 810 operations are exactly the same as those previously described for block 809 with the execptions that the signal FCRM is enabled at this time since a subtraction is being performed, and the Timing Counter is set to the FTC2 output state.

Upon leaving block 810, block 811 is entered during which time the QX0 bit position is set to binary 1. The Timing Counter FTC2 output is cleared and the Algorithm Execution Control Logic again tests to see if early adder settle out time is to occur. Upon exiting block 811 the floating point unit enters the "FTC1 Set?" decision block for subsequent actions as previously described.

If the "No" branch is taken from the "Q00–Q01=10?" decision block, a "Q00–Q01=01?" decision block is entered. The "Yes" path from this decision block leads to flow chart block 812 which is entered when a string of 1's has been detected. In block 812, a shift right by two of the A- and Q-Registers will be executed again with the A-Register shifting through the Adder and being added to the B-Register if the FBSX signal is enabled at this time. If not, the shifting operation will place the partial product into the A- and Q-Registers shifted right the two bit positions but unchanged. All other operations of block 812 are identical to those described for block 809 excepting the state of the Timing Counter is not changed. As shown in FIG. 26, after leaving block 812 the floating point unit goes to point F of FIG. 22.

Again referencing the "Q00–Q01=01?" decision block of FIG. 26, which is asking the question "Do the third and fourth multiplier bits=01?", the "No" branch therefrom leads to block 813. Block 813 is entered when the Algorithm Execution Control Logic detects a string condition and a shift right by two is required to position an action bit in the QX0 position thus requiring the addition of the multiplicand to the partial product. The operations of block 813 are identical to those of block 810 with the exception that B-Register bits 00–38 are complemented and the FCRM signal is disabled.

Upon leaving block 813 the floating point unit will enter block 814 wherein the STG signal is disabled since a string of 0's in the multiplier has been detected. Also in block 814 the FTC2 Timing Counter output is cleared and the floating point unit tests to determine if adder settle out time is to occur on the next clock. At this time the "FTC1 Set?" decision block is entered for subsequent operations as previously described.

Referring now to FIG. 22 and the "C=0?" decision block where the Algorithm Execution Control Logic tests to determine if all 38 multiplier bits have been examined, if the "C=0?" decision block's answer is "Yes" it is an indication that all 38 multiplier bits have been examined but that there has been an over-shift to the right by one bit. However, if the results of this decision block are "No" the "$\overline{C}$=0?" decision block is entered to test if all 38 multiplier bits have been examined and that no over-shifting has occurred. The "Yes" branches from these latter two decision blocks both provide entry into flow chart block 778. Upon entry into block 778 the multiply Algorithm Execution has progressed to the point that: (1) the product has been formed and is now located correctly in the A- and Q-Register mantissa fields; or (2) a string of binary 1's is being exited so that an addition of the multiplicand to the partial product has been initiated and will be terminated at this time leaving the product in the correct location in the A- and Q-Register mantissa fields; or (3) the product has been formed and has shifted right one bit from the correct location of the A- and Q-Register mantissa fields. If conditions (1) or (2) above are true; that is, "$\overline{C}$=0", the A- and B-Register mantisas will be added together by the enabling of the FASX signal and if the FBSX signal is not enabled at this time, the A-Register will be transferred directly through the Adder into the mantissa field of the A-Register. If condition (3) is detected, that is, C=0, the A- and Q-Register mantisa fields are shifted left one bit with the A-Register shifting through the Adder. In conclusion of block 778 operations, the A- and B-Register enable signals, FASX and FBSX, are disabled and the Q-Register inputs to the Adder are turned on by enabling the FQSX signal. The FP38 signal is enabled to the exponent portion of the Adder if the floating point unit is in normalized mode (the FUNR flip-flop 46 of FIG. 3 is reset). Also, the product sign bit Q38 is transferred to the A-Register mantissa sign bit position A38 and the product exponent in the A-Register in bit positions 39–46 is transferred into B-Register bit positions 39–46 in preparation for normalizing the product. Also in preparation to entering into the post normalization control state the FPNR flip-flop 108 (FIG. 8) is placed in the set condition and the floating point unit is removed from the Algorith Execution Control state by resetting the FALG flip-flop 106. The Timing Counter is cleared from the FTC1 and set to the FTC0 output state. Upon completion of these operations, the floating point unit will now exit at point H and enter FIG. 27 at point H.

The remaining path in FIG. 22 is the "No" branch from the "QX1 Set?" decision block which leads to point D of FIG. 24 for entry into block 793 the operations of which have been described.

Figure 27:
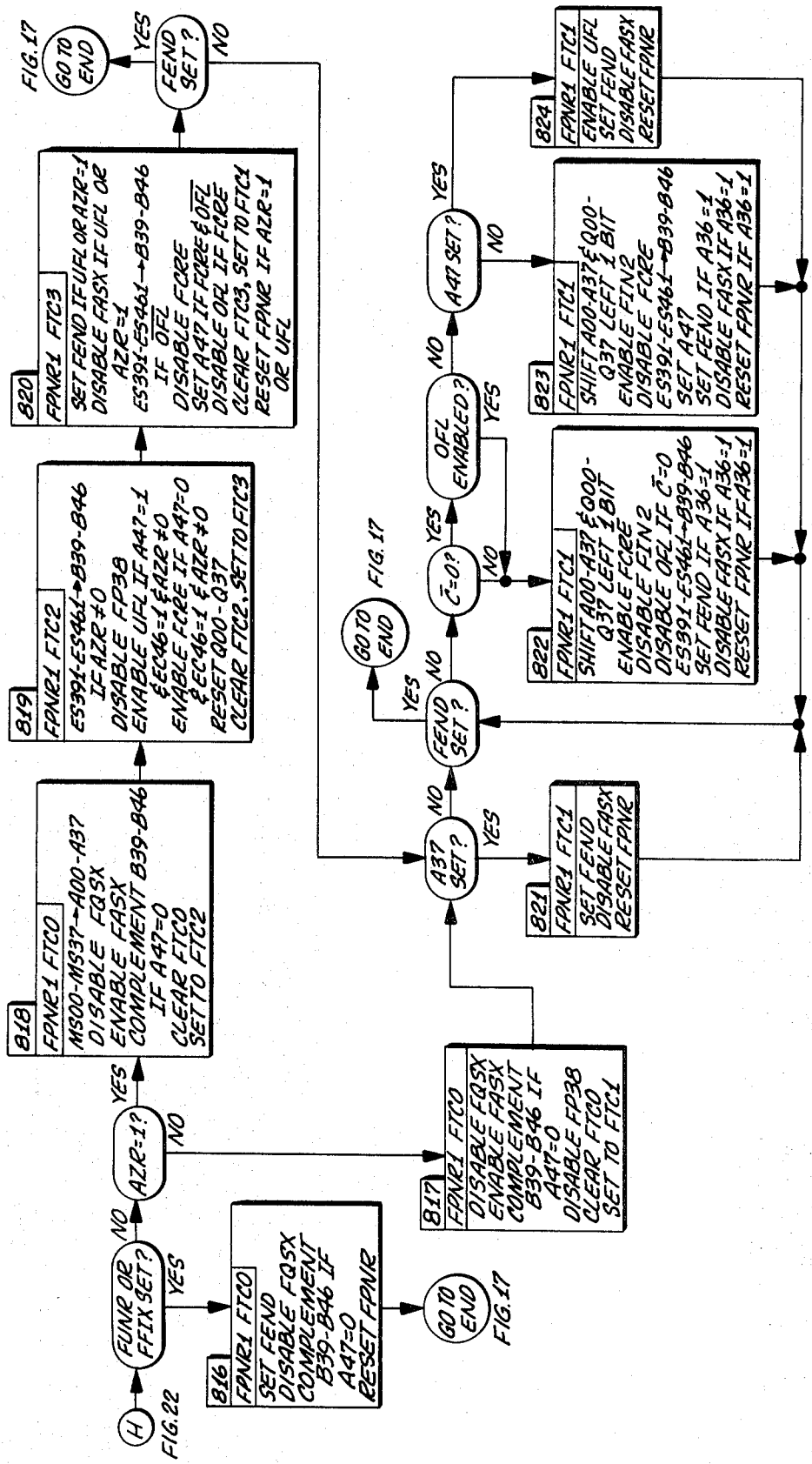

Referring now to FIG. 27, a "FUNR or FFIX Set?" decision block is first met and it is seen that the floating point unit will enter into flow chart block 816 via the "Yes" branch therefrom if the floating point unit is in either the unnormalized mode or the fixed point mode. In block 816, the FEND flip-flop 116 is set, the FPNR flip-flop 108 is reset and the Q-Register enable signal FQSX is disabled since no normalization of the product will be performed. The contents of B-Register bits 39–46 are complemented if the A-Register exponent bit 47 is equal to a binary 0. The Q-Register inputs to the Adder are removed at this time in preparation for resetting the A-Register mantissa if under-flow occurred during the execution of the instruction. This will be accomplished by transferring the Adder into the A-Register with all Adder inputs turned off. The Control Counter, which contains the product exponent at this time, is complemented if the exponent is positive in preparation for transferring the one's compliment of the Control Counter into the A-Register exponent field during the FEND control state. Upon completion of the operations of block 816 the floating point unit will go to the FEND control state as shown by the flow chart of FIG. 17.

Referring once again to the "FUNR or FFIX Set?" decision block, if FFIX is not set and the floating point unit is in the normalized mode, the "No" branch will be taken to a "AZR=1?" decision block.

The remaining portion of FIG. 27, that which follows the "AZR=1" decision block, represents the post normalization flow chart for normalizing the resultant product of the multiply algorithm. It will be noted by comparing FIG. 27 to FIG. 19, the NRM flow chart, that these two flow charts are identical with three minor exceptions. As such, it is believed unnecessary to give a detailed description of FIG. 27, it being deemed adequate to point out the distinctions. The first two distinctions appear between block 820 of FIG. 27 and block 522 of FIG. 19. In block 820 of FIG. 27 the exponent bits from the Adder, lines ES39–ES46, are transferred back into B-Register bits 39–46 if no over-flow condition occurred during the execution of the multiply instruction. This transfer was unconditional in block 522. Also in block 820 it is seen that the exponent sign bit A47 of the A-Register is set if the FCRE signal is true and no over-flow condition occurred during the execution of the instruction. In block 522, the over-flow condition was not present. The third distinction between the flow charts of FIGS. 27 and 19 is that between the "$\overline{C}=0$?" and "A47 Set?" decision blocks a test is made in FIG. 27 by the Algorithm Execution Control Logic to determine if an over-flow condition existed during the algorithm execution. This is shown by a "OFL Enabled?" decision block, the "No" branch of which leads to the "A47 Set?" and the "Yes" branch of which leads to block 822 which corresponds, in FIG. 19 to block 517.

Assuming now the completion of normalization of the product after the multiply algorithm is completed, the floating point unit leaves FIG. 27 to go to the FEND state as shown in the flow chart of FIG. 17. Referencing now FIG. 17, the operations performed under the "All Instructions" heading are the same as those previously described and the operations appearing under the heading including the FMP instruction are identical to those described for the FAD, FSB, FSI, and NRM instructions. Upon completion of these operations in the FEND control state, the FMP instruction is completed and the floating point unit will exit block 506 in preparation for receipt of the next instruction.

As mentioned at the beginning of the description of the FMP instruction, this instruction can be executed in two basic formats. The second format of the FMP instruction occurs when the floating point unit is in the fixed point mode; the FFIX flip-flop 58 (FIG. 3) is set. Referencing now block 505 of FIG. 16, it is seen that the only variance between the FMP instruction in the fixed point mode and the just described FMP instruction is the Timing Counter is set to the FTC2 output state. Upon completion of these operations, the floating point unit will take the "Yes" branch from the "FTC2 Enabled?" decision block to flow chart block 529. In block 529 the FTC2 output is cleared and the FFDW flip-flop 100 (FIG. 8) is reset to prepare the floating point unit for loading the data word from the processing unit into the least significant bits of the B-Register upon occurrence of the first data signal from the processing unit. In addition, as shown in block 529 under the FMP heading, the A-Register bits A00–A37 are transferred into Q-Register bit positions 00–37. Simultaneously, the FASX signal is enabled thus providing the A-Register inputs to the Adder and A-Register bits 00–37 are reset to binary 0's by transferring the contents on lines MS00–MS37 into the A-Register with all Adder inputs disabled. The FP38 signal is enabled and the FEXP flip-flop 102 (FIG. 8) is set and the floating point unit proceeds via the "Gen. Inst.?" decision block to the "First Data Signal Rec'd. from PU?" decision block.

Referring now to FIG. 22, upon receipt of the first data signal I/DS from the processing unit the floating point unit tests to see if the FFIX flip-flop is set. Since the instruction being executed at the present time is designated FXMP (Fixed Multiply instruction), the FFIX flip-flop will be set, and the "Yes" branch taken to flow chart block 775 of FIG. 22. All subsequent operations are identical to those described for the FMP instruction with the floating point unit progressing through the flow charts as was described with the FXMP entering the FEND control state from block 816 of FIG. 27.

The next floating point instruction execution to be described will be the FDV instruction (Floating Divide instruction). However, before proceeding with this description it is believed advantageous at this time to briefly describe the type of divide algorithm used in the present embodiment. The divide algorithm used in the floating point unit is basically a "non-restoring" division process which shifts over strings of binary 0's when the dividend or the partial remainder is positive and over strings of binary 1's when the dividend or partial remainder is negative. This type of division process requires a normalized divisor and normalization of the divisor is the first step performed in the algorithm after exponent calculation has been performed.

At algorithm initiation, the divisor is in B-Register bit positions 00–37 the dividend is in A-Register bit positions 00–37 and Q-Register bit positions 00–37. Both the divisor and the dividend are in absolute magnitude form. Prior to this initiation, the quotient exponent has been calculated by subtracting the divisor exponent from the dividend exponent and the remainder, and quotient sign bits have been set accordingly. In normalizing the divisor, the dividend is shifted with the divisor unless the dividend is already normalized. If the dividend normalizes before the divisor, the quotient exponent is incremented by one for each bit position the divisor is shifted left. If the divisor normalizes prior to the dividend, all leading zeros in the dividend can be shifted out by shifting the dividend left and placing a 0 bit in the quotient for each bit position shifted. This is a necessary operation since the divisor, assumed at this time to be normalized, contains a number equal to or greater than one-half while the dividend, since it is not normalized, must contain a quantity less than one-half. Thus, a subtraction of the quantity of one-half or greater from a quantity of less than one-half will produce a number which is less than zero. Therefore, the normalization of both numbers is necessary. After both the divisor and dividend have been normalized, it is no longer possible to form quotient bits without performing a test requiring arithmetic operations by comparing the divisor to the dividend.

Once the divisor is normalized the first step taken in the initiation of the divide algorithm will vary dependent upon which of the following cases exists at this time:

Case 1—The divisor and the dividend are both normalized and the divisor greater than the dividend.

Case 2—The divisor and the dividend are both normalized and the divisor is equal to or less than the dividend.

Case 3—The divisor normalized and the dividend unnormalized.

In Case 1, the first taken in the initiation of the divide algorithm is subtraction of the divisor from the dividend to give a negative resultant remainder which does not result in generation of a quotient bit. The algorithm then continues by generating a number of quotient bits equal to the number of bits in the divisor; in the case of the present embodiment a total of 38 quotient bits will be generated in the Q-Register. In Case 2, with the first subtraction of the divisor from the dividend, a positive remainder will result in generating a binary 1 for the first quotient bit in the Q-Register. This is a true and valid bit of the resultant quotient. The algorithm will then continue with the generation of the additional 37 quotient bits. In this particular case the least significant bit or the low order bit of the dividend is lost. In Case 3, since the dividend is unnormalized the first step in initiating the divide algorithm will be a left shifting of the dividend until it is normalized, as previously described. After the dividend is normalized the algorithm starts with a subtraction, as in Case 1, and the resulting partial remainder will be negative. Therefore, as in Case 1, while the generation of the first quotient bit on the first shift is ignored, the 0 quotient bits generated during dividend normalization are retained. Again the algorithm will proceed with the generation of 38 quotient bits.

The basic operation of the divide algorithm after the first subtraction of the divisor from the dividend provides the first partial remainder for testing to determine if the partial remainder is normalized or if it is positive. Keeping this in mind, the following rules are established for the development of the quotient during the divide algorithm.

(1) If a positive dividend or a positive partial remainder exists, the number is not normalized. Therefore, shift over all leading zeros and insert a zero bit for the corresponding quotient bits for each bit shifted.

(2) The divisor is subtracted from the normalized positive dividend or a normalized partial remainder and a binary 0 is inserted in the quotient bit of the Q-Register if the results of the subtraction (new partial remainder) are negative. A binary 1 is inserted in a quotient bit if the new partial remainder is positive.

(3) If a negative partial remainder exists with leading 1's, all leading 1's are shifted over with the binary 1 inserted into the corresponding quotient bits for each bit shifted over.

(4) The divisor is added to a normalized negative partial remainder and a binary 1 is inserted for the quotient bit if the new partial remainder (results of addition) is positive. A binary 0 is entered into the quotient bit if the new partial remainder is negative.

The shifting operations just described refer to the simultaneous shifting of the A- and Q-Registers left each time the partial remainder is checked by the floating point unit with the generated quotient bit being placed in the least significant bit of the Q-Register, bit Q00. It should be noted that as the A-Register is shifted left, the most significant bits of the A-Register, which at the beginning of algorithm execution contain the most significant bits of the dividend, are shifted out of the high order mantissa bit positions of the A-Register and are thus lost. At the completion of the algorithm execution, the contents of the A-Register will be the remainder of the divide algorithm and the Q-Register will contain a 38 bit quotient. For a more thorough understanding of the subject of shifting over of binary 0's and 1's in a divide algorithm, reference is made to the aforementioned text The Logic of Computer Arithmetic, by Ivan Flores.

As has been the practice, instruction execution explanation begins in block 505 of FIG. 16 with the assumption that the present instruction is in the I-Register 24 and is decoded by the Instruction Decode Logic 40. In the present case this is the FDV instruction. The operations which take place in block 505 include those previously described under the heading "All Instructions." Additionally, as shown under the FDV or FDI heading, the Q-Register bits 00–38 are reset to binary 0's if the floating point unit is not in a double precision mode; that is, the FDPR flip-flop 48 (FIG. 3) is reset, and the floating point unit is not in the fixed point mode, the FFIX flip-flop 58 is reset. The A-Register sign bit A38 is set to a binary 1 if the Q-Register bit 38 is a binary 1 and the floating point unit is in the double precision mode, which is the present case. Assuming at this time that the present instruction is being executed in the floating point mode and not in the fixed point mode, the Timing Counter will not be set to the FTC2 output state.

Upon completion of these operations the floating point unit will leave block 505 and, via the "No" branch of the "FTC2 Enabled?" and "Gen. Inst.?" decision blocks, enters the "First Data Signal Rec'd. from PU?" decision block.

With the receipt of the first I/DS signal, the floating point unit proceeds to the starting points of FIGS. 28 and 29. Referencing first the flow chart of FIG. 28, it is seen that this chart is exited for entry to point A of FIG. 29 at the "SBE Inst.?" decision block. The appropriate operations of FIG. 28 are accomplished simultaneously with the operations defined between the start and point A of FIG. 29. However, since the operations of FIG. 28, which pertain to exponent calculation, were described in detail during the explanation of the SBE instruction, it is deemed unnecessary to repeat this explanation and the reader is referred to that portion of the specification for a review of this matter.

Referring now specifically to FIG. 29, the floating point unit first determines that this is not a fixed point mode situation and the "No" path is taken from a "FFIX Set?" decision block to flow chart block 825. During the time of block 825 the FFDW flip-flop 100 is reset, the FEXP flip-flop 102 is set, the Timing Counter is set to FTC0, and the first data word containing the divisor exponent and the most significant bits of the divisor mantissa are transferred into B-Register bit positions 24–47. Upon completion of these operations, block 826 is entered and remainder sign bit A38 is transferred into the Q-Register sign bit position Q38. It should be recalled that this time that the A- and Q-Registers presently contain the dividend. The exponent calculation is now in process as previously described in FIG. 28 and the floating point unit will cycle through blocks 827, 828, and 829 during which time the Timing Counter is stepped from FTC1 to FTC4. Upon setting the Timing Counter to the FTC4 output in block 829, the floating point unit enters into block 830. Entry from FIG. 28 is also made into block 830 which is an additional wait cycle for completion of exponent calculation and at this time the Timing Counter is stepped to its FTC5 output. In block 831, the quotient sign bit is calculated and stored in the B-Register exponent, sign bit position B47. B47 is set if bit A38 is not equal to bit B38, or B47 is reset to a binary 0 if A38 is equal to B38. In addition, the B-Register mantissa sign bit B38 is reset and the quotient exponent in A-Register bit positions 39–46 is transferred into B-Register bit positions 39–46. The Timing Counter FTC5 output is cleared. At this time the floating point unit enters into a "2nd Data Signal Received from PU?" decision block and loops therethrough until receipt of the second I/DS signal at which time the "Yes" branch is taken and the floating point unit will enter into block 832.

In block 832 the second data word from the processing unit is transferred into bit positions 00–23 of the B-Register, the FEXC and FADJ flip-flops 112 and 104 are set, and the FEXP flip-flop 102 is reset. Upon setting the Timing Counter to the FTC0 output state, the floating point unit enters into block 833 wherein the Algorithm Execution Control Logic checks for a zero divisor mantissa. In the case of the present instruction, the divisor is in the B-Register. Therefore, the Algorithm Execution Control Logic tests to determine if the B-Register mantissa field is zero. If the B-Register is zero at this time, the Algorithm Execution Control Logic stores a temporary divide check condition, the FEND flip-flop 116 is set, and the FADJ 104 flip-flop is reset. In addition, the A-Register mantissa sign bit A38 is reset, the FBSX signal is disabled, and the B-Register bits 39–46 are complemented if the A-Register exponent sign bit is equal to a binary 1. This latter operation is performed in preparation for incrementing the divisor by adding to its exponent at a later time.

Upon setting the FTC1 output state in the Timing Counter, a "FEND Set?" decision block is entered and the "Yes" branch is taken to FIG. 17, the FEND control state, if an attempt was made to divide by zero, thus terminating the instruction. If the FEND flip-flop was not set during block 833, the "No" branch is taken and a "B37 Set?" decision block is entered. If B37 is not set, thus indicating that the divisor is not normalized, the "No" branch will be taken and a test made to determine if A37 is set in a "A37 Set?" decision block. If A37 is not set, thus indicating that the dividend is not normalized, the "No" branch will be taken to block 834. Since in the path thus far taken both B37 and A37 mantissa bits are binary 0's, indicating that the mantissas are not normalized, the A-, Q-, and B-Register bits 00–37 are shifted left one bit position. In addition, B-Register bit 00 is reset, as shown in FIG. 9, by the signal reset B00 and a binary 0 is inserted into the Q-Register bit 00 by the signal set or reset Q00, shown in FIG. 13. A binary 0 is added to the quotient exponent at this time since shifting both the divisor and the dividend left an equal amount does not change the exponent value. The floating point unit now exits block 834 and loops back through the "B37 Set?" and "A37 Set" decision blocks repeating the operations of block 834 until the dividend and divisor mantissas are normalized.

Assuming, with the last shift operation of block 834 that the dividend mantissa is normalized, the "Yes" branch will be taken from the "A37 Set?" to the "A47 Set?" decision block. If A47 is not set, the "No" branch will be taken and block 835 will be entered indicating that the dividend is normalized, the divisor is not normalized, and the present quotient exponent is not equal to minus one. In block 835, the B-Register divisor bits 00–37 are shifted left one bit with a binary 0 being inserted into B00, the FCRE signal into the exponent Adder is enabled, the FIN2 signal is disabled if it was previously enabled and a temporary over-flow condition is stored in the Algorithm Execution Control Logic if the A-Register exponent sign bit A47 is equal to zero, and if control count $\overline{C}=0$. In addition, the UFL signal is disabled if a temporary under-flow condition is detected before entering into block 835 if the Control Count is $\overline{C}=0$. The quotient exponent is corrected by initiating an incrementation by one cycle and completing the previous incrementation cycle by passing the B-Register through the Adder and back into the B-Register with FCRE enabled. The floating point unit now leaves block 835 to re-enter the "B37 Set?" decision block. Assuming that the divisor is not yet normalized, the "No" branch will be taken into the "A37 Set?" decision block from which the "Yes" branch again is to be taken to the "A47 Set?" decision block. Assuming now that A47 is set, the "Yes" branch will be taken and the floating point unit will enter a "$\overline{C}=1$?" decision block, the "No" branch from which leads to block 835. Assuming now that the "Yes" branch is taken out of the "$\overline{C}=1$?" decision block, the floating point unit will then test to see if a temporary under-flow condition exists in a "UFL Enabled?" decision block. If UFL was enabled in block 552 in FIG. 28 during the exponent calculation control state due to A47=binary 1, and a binary 1 carry out of EC46, the "Yes" branch will be taken and block 835 will again be entered, the UFL signal will be disabled if $\overline{C}=0$, thus indicating that the exponent has come out of an under-flow condition.

Assuming now that the UFL signal is not enabled, the "No" branch will be taken from that decision block to block 836. Here, the B-Register bits 00–37 are shifted left one bit position with bit B00 being reset to a binary 0 thus shifting the divisor left one bit toward normalization (the dividend is normalized). It should also be recalled at this time that the present exponent quotient, that is the divisor in the B-Register, is equal to a minus one. The present quotient exponent is represented by the Control Counter plus the FCRE signal into the Adder, the outputs (11111110) of which are the one's complement of a minus one. Since this left shift by one of the B-Register toward normalization will cause the exponent to be adjusted in a positive direction, an incrementation of two is required and thus the FIN2 signal is enabled into the exponent Adder and the A-Register exponent sign bit A47 is reset to a binary 0 so that it is positive. The incremented B-Register contents are replaced into the B-Register via lines ES391–ES461.

Upon completion of these operations, the floating point unit again enters the "B37 Set?" decision block. Assuming now that B37 is set, indicating that the divisor is normalized, the "Yes" branch will be taken from point B of FIG. 29 which corresponds to point B of FIG. 30. At point B of FIG. 30 block 837 is entered and the divisor in B-Register bits 00–38 is complemented since it will be subtracted from the dividend as soon as the dividend is normalized. If the dividend is normalized, the subtraction is initiated by enabling the initial carry FCRM into the mantissa adder and by turning on the B-Register by enabling the FBSX signal. The divide algorithm assumes a divisor magnitude greater than the dividend; therefore, this substraction is a check to see if the divisor is greater than the dividend and, if not, the first quotient bit will be generated as a result of this subtraction and the algorithm control count in the A-Register exponent field will be initialized to a binary 1 at a later time (block 842). Also at a later time (block 842), the quotient exponent will be incremented by one. The generation of a quotient bit due to this subtraction is equivalent to shifting the dividend right one bit, incrementing its exponent by one bit and then initiating the divide algorithm with the divisor magnitude greater than the dividend magnitude. In addition, in block 837, the A-Register exponent field, bits 39–46, is reset to binary 0's in preparation for initializing the algorithm control count which will go into the A-Register exponent field. Also, the previous quotient exponent incrementation is completed by transferring the Adder outputs back into the A-Register. This will add zero to the exponent if no incrementation was initiated. Prior to exiting block 837, the FCRE and FIN2 signals are disabled if they were enabled and the Timing Counter is set to the FTC2 output state.

Upon leaving block 837, a wait period shown by blocks 838, 839, and 840 is entered at which time the Timing Counter steps from the FTC2 to the FTC5 output state. A "FCRM Enabled & MC37=1?" decision block is now entered. Assuming that FCRM was enabled in block 837 thus indicating that the divisor magnitude is greater than the dividend magnitude, block 841 is entered and the Timing Counter FTC5 output state is cleared, the FADJ control state flip-flop 104 is reset, the FALG flip-flop 106 is set, and the Timing Counter is set to the FTC0 state at which time the floating point unit will leave FIG. 30 and enter FIG. 31 at point J. Referring back to the "FCRM Enabled & MC37=1?" desision block (FIG. 30), if these conditions are true the "Yes" branch will be taken and the floating point unit will test to see if bit A47 is a binary 1 ("A47 Set?" decision block). If A47 is not set, block 842 is entered. On the other hand, if A47 is set the "Yes" branch is taken to a "$\overline{C}=1?$" decision block. The "No" branch from the "$\overline{C}=1?$" decision block leads to block 842 as does the "Yes" branch from another decision block, "UFL Enabled?". This latter block is reached by the "Yes" path from the "$\overline{C}=1?$" block and it is here that the floating point unit tests to see if a temporary under-flow condition exists. If a temporary under-flow condition does not exist, the "No" branch is taken to block 843.

Referring now to block 842 which is entered since the dividend magnitude is greater than the divisor magnitude and the quotient exponent is not equal to a minus one, since a quotient bit will be generated due to the subtraction previously made in block 837, the initial algorithm control count contained in the A-Register exponent field is initialized to a binary 1 by a signal set A39 as shown in FIG. 11. This signal originates in Algorithm Execution Control Logic. The incrementation by one of the quotient exponent in the B-Register is initiated by enabling the FCRE signal into the exponent portion of the Adder. A temporary over-flow condition is stored by enabling the OFL signal if bit A47 equals 0 and the $\overline{C}=0$. The temporary under-flow condition is disabled if $\overline{C}=0$. Also in block 842 prior to exiting, the FADJ flip-flop 104 is reset, the FALG flip-flop 106 is set and the Timing Conuter is set to the FTC0 output state at which time FIG. 31 is entered at point J. Block 843 of FIG. 30 is entered from the "UFL Enabled?" decision block if the dividend magnitude is greater than the divisor magnitude and the quotient exponent is equal to a minus 1. Here, the initial control count contained in the A-Register is initialized to a binary 1 as explained for block 842, an incrementation by two of the quotient exponent is also initiated and the exponent sign bit A47 is reset since the exponent must be incremented from the one's complement of minus one to zero. In addition, the FADJ flip-flop 104 is reset, the FALG flip-flop 106 is set, and the Timing Counter is set to the FTC0 output state. The floating point unit now leaves block 843 and proceeds to point J in FIG. 31.

At point J of FIG. 31, block 844 is entered and the quotient incrementation started in the previous block is completed by transferring the one's complement of the Control Counter, plus the incrementing input of the exponent Adder, into the A-Register exponent field if A-Register sign bit A47 is negative. This transfer is, as was previously described, over lines ES390–ES460 via AND-gate 158 as shown in FIG. 11. However, if A-Register sign bit A47 is equal to a binary 0, the B-register Control Counter contents are transferred into the A-Register exponent field (bits 39–46) via lines ES391–ES461 and AND-gate 160. Simultaneously, the algorithm control count which is now in the A-Register is transferred into the Control Counter via lines A39–A46 and AND-gate 120. In addition, the FCRE and FIN2 input signals to the exponent portion of the Adder are disabled, and the Timing Counter is set to the FTC1 output state.

A "C=38?" decision block is now entered. Assuming that C=38 is not true, indicating that all 38 quotient bits have not been examined, a "A38=A37?" decision block is entered, the "Yes" branch of which leads to a "A38 Set?" decision block. Assuming that the latter condition is true, block 845 is entered indicating that the partial remainder now in the A-Register is negative and unnormalized and that the last quotient bit is not being generated. The A- and Q-Registers are shifted left one bit with the A-Register shifting through the Adder displaced left one bit in the normal manner and a binary 1 is placed in the least significant bit position of the Q-Register. If this shift normalizes the partial remainder in the A-Register, the addition of the divisor to the partial remainder is initiated by enabling the B-Register into the Adder by the enabling of the FBSX signal. The enabling of the FBSX signal is a result of the Algorithm Execution Control Logic monitoring the MS36 Adder stage output. If this output is a binary 1, FBSX is enabled at this time. In addition, in order to prepare the Adder for adding two numbers together the signal FACI is enabled. The previous control count incrementation is completed and an incrementation by one is initiated by enabling FCRE and transferring the Adder sum outputs ES391–ES461 into B-Register bit positions 39–46. If the FBSX signal was enabled in this block it was necessary to add the divisor to the partial product and the Timing Counter FTC1 is set to its FTC2 output. In addition, the mantissa sign bit from the Adder from the stage MA38 is transferred into the A-Register sign bit A38 via line MS38 through an AND-gate 224, enabled by signal XFR38, and OR-gate 170. These operations being complete, the floating point unit proceeds to a "FTC1 Set?" decision block. If, at this time, the FTC1 output is true, the floating point unit returns to the "C=38?" decision block.

Referencing once again the left "A38 Set" decision block of FIG. 31 and assuming that bit A38 is not set thus indicating that the partial remainder is positive (first dividend test), unnormalized, and that the last quotient bit is not being generated, the floating point unit now enters block 846. All operations performed in block 846 are identical to those described for block 845 with the exception that the FBSX, FCRM and FACI signals are all enabled if MS36 of the control count equals zero. This is done in order that a subtraction of the divisor from the partial remainder can be executed in block 846.

Upon completion of the above operations of block 846 the floating point unit will once again enter the "FTC 1 Set?" decision block. Assuming at this time that FTC1 is not set, the "No" branch will be taken and the floating point unit will enter into block 851 wherein the Timing Counter is cleared and the Adder inputs are checked for early adder settle out configurations. Upon leaving block 851 the floating point unit again tests ("FTS1 Set?") to see if FTC1 is set and if it is, the "Yes" branch will be taken to the "C=38?" decision block. If FTC1 is not set at this time, block 852 is entered and the Timing Counter is set to the FTC1 output, thus allowing additional adder settle out time. From block 852 the floating point unit proceeds to the "C=38?" desision block.

With reference now to the "A38=37?" decision block and assuming that this condition is false, the "No" branch will be taken and the floating point unit will test to see if bit A38 is a binary 1 in a "A38 Set?" decision block. Assuming that bit A38 is a binary 1, the "Yes" branch will be taken and a test will then be made in decision block "A38=MS38?" to determine if bit A38 is equal to the output of Adder stage MS38. If this latter test produces a negative answer, block 847 is entered indicating that the partial remainder is negative and normalized and the last quotient bit is not generated. The addition of the divisor to the partial remainder is to be completed at this time, thus resulting in the new partial remainder being positive. The new partial remainder is transferred into the A-Register displaced left one bit, and B-Register bits 00–38 are complemented in preparation for subtracting the divisor from the partial remainder when it is normalized. If the new partial remainder will be normalized after transferring into the A-Register, the B-Register is left turned on (FBSX enabled) into the Adder and the initial carry FCRM signal into the Adder is set initiating a subtraction of the divisor from the partial remainder. However, if the new partial remainder will not be normalized after transferring into the A-Register, the B-Register is disabled from the Adder by disabling the FBSX signal. The lack of normalization results from detecting a one bit carry out of the MS36 Adder stage in which case the FACI signal is disabled and the FCRM signal is not enabled. Upon completion of these operations the floating point unit will again enter the "FTC1 Set?" decision block.

If at the "A38=MS38?" decision block the "Yes" branch is taken, block 848 is entered because the partial remainder is negative and normalized and the last quotient bit is not being generated. The operations of block 848 are identical to those described in block 847 with the exception that a binary 0 is placed in bit position Q00 and the B-Register bits 00–38 are not complemented. Therefore, the FCRM signal does not enter into the manipulations in block 848. If the new partial remainder will be normalized after transferring into the A-Register (MS36=0)

the B-Register is left enabled to the Adder thus initiating an addition of the divisor to the partial remainder. The floating point unit now leaves block 848 and enters the "FTC1 Set?" decision block. Referring now to the decision block "A38 Set?" in FIG. 31 which is asking the question, "Is the dividend or the partial remainder in the A-Register negative?", assuming that it is positive the "No" branch will be taken and the decision block

"A38=MS38?"

will be entered. The decision reached at this point is whether or not the new partial remainder is going to be positive. If it is going to be negative, block 849 is entered. With the conditions established that the partial remainder is now positive and normalized, and that the last quotient bit is being generated, a substraction of the divisor from the partial remainder is to be completed at this time to provide a new partial remainder which is negative. The control count incrementation previously begun is completed and an incrementation by one is initiated by enabling the FCRE signal. The A- and Q-Registers are shifted left one bit with a quotient bit of one being inserted into the Q00 bit position. The new partial remainder is transferred into the A-Register, displaced left one bit, the B-Register is complemented in preparation for adding the divisor to the partial remainder once it is normalized and the initial carry signal FCRM is disabled. If the new partial remainder will be normalized after transferring into the A-Register, the B-Register is left enabled to the Adder thus initiating an addition of the divisor to the partial remainder. Upon completion of the operations in block 849 the floating point unit again enters the "FTC1 Set?" decision block.

Again referencing the decision block "A38=MS38?" and assuming from the results of the decision that the new partial remainder is going to be negative, the "Yes" branch will be taken and block 850 will be entered with the conditions established that the partial remainder is now positive and normalized and that the last quotient bit is not going to be generated. A subtraction of the divisor from the partial remainder is to be completed at this time resulting in the new partial remainder which remains positive. Again the A- and Q-Registers are shifted left one bit position with a binary 1 being inserted into bit position Q00. If the new partial remainder will be normalized after transfer into the A-Register (MS36=0), the B-Register remains enabled to the Adder, the FBSX signal is not disabled, and the initial carry signal FCRM remains enabled thus initiating a subtraction of the divisor from the partial remainder. Also in block 850 the previous control count incrementation is completed by transferring the contents of Adder stages MS39–MS46 into B-Register bit positions 39–46 and an incrementation is initiated by enabling the FCRE signal. Upon completion of these operations the floating point unit enters the "FTC1 Set?" decision block.

When the "Yes" branch is taken from the "C=38?" decision block of FIG. 31, indicating that the last quotient bit is being generated, the floating point unit enters FIG. 40 at point 15 and block 858. In block 858 the Q-Register is shifted left one bit, the B-Register quotient sign bit B47 is transferred into the A-Register mantissa sign bit position A38 via an AND-gate 226 and OR-gate 170, the former gate being enabled by a signal XFB47 (originating in the Algorithm Execution Control Logic) as shown in FIG. 11. The FCRM signal input to the mantissa portion of the Adder and the FCRE signal to the exponent portion of the Adder are disabled. The contents of the A-Register bits 39–46 are transferred into B-Register bits 39–46; that is, the quotient exponent is transferred from the A-Register into the Control Counter in preparation for normalizing the quotient. The FQSX signal is now enabled to the Adder if the correct remainder is generated at this time in preparation for exchaging the quotient in the Q-Register and the remainder in the A-Register prior to normalizing the quotient. If the partial remainder is positive and unnormalized, it is the correct remainder. Therefore, a binary 0 is generated in the quotient by resetting bit position Q00 and the A-Register is disabled from the Adder by disabling the FASX signal.

If the partial remainder is positive and normalized, a subtraction of the divisor from the partial remainder has been accomplished prior to entering block 858. If the new partial remainder will be positive, it is the correct remainder and is, therefore, transferred directly into the A-Register and a binary 1 quotient bit is generated by setting the Q-Register bit Q00. However, if the new partial remainder will be negative, the A-Register already contains a correct final remainder. Therefore, the partial remainder will not be transferred into the A-Register and a binary 0 quotient bit is generated by resetting bit position Q00. If the partial remainder is negative and unnormalized, addition of the divisor to the partial remainder will give the final remainder. This addition is initiated by enabling the FBSX signal thus enabling the B-Register inputs to the Adder, in conjunction with the A-Register inputs. Simultaneously, a binary 1 quotient bit is generated by setting the Q-Register bit 00.

If the partial remainder is negative and normalized, an addition of the divisor to a partial remainder was executed prior to entering block 858. Therefore, the new partial remainder is transferred directly into the A-Register. This new partial remainder will be positive and is the correct final remainder. Therefore, a binary 1 quotient bit is generated by setting bit Q00 and the A- and B-Registers are disabled from the Adder. However, if the new partial remainder will be negative, the divisor must be added to it to obtain the correct final remainder. Therefore, a binary 0 quotient bit is generated by resetting bit Q00 and the A- and B-Registers are left enabled to the Adder thereby initiating the addition of the divisor to the partial remainder.

In addition, in block 858 the FACI signal to the mantissa portion of the Adder is either enabled or disabled as previously described in other instructions depending on whether an addition is taking place through the Adder or whether a straight through transfer, or transfer and shift operation, is being performed. The Timing Counter FTC0 output is set and the FPNR flip-flop 18 is set if no add function is being performed in the present block. With the setting of the FPNR flip-flop the FALG flip-flop 106 is reset. However, if the add function is being performed the Timing Counter is set to its FTC2 output thus placing the Timing Counter into a longer Adder settle out time. At the completion of these operations the floating point unit now enters the "FPNR Set?" decision block. If the FPNR flip-flop is set, the floating point unit enters block 853. If the FPNR flip-flop is not set, the floating point unit will take the "No" branch to blocks 859, 860, and 861 which are adder settle out time wait periods during which the Timing Counter steps from the FTC2 to the FTC5 output state.

Block 862 is entered because the partial remainder was negative and an addition of the divisor is needed to make it positive. The final remainder is transferred from the Adder directly into the A-Register bit positions 00–37, the FACI signal is disabled, the FALG flip-flop 106 is reset, the FPNR flip-flop 108 is set, and the FASX and FBSX signals are disabled. After completion of the addition, the FQSX signal is enabled to the input of the Adder in preparation for exchanging the remainder, now in the A-Register and the quotient, now in the Q-Register. The Timing Counter is set to FTC0 at which time the floating point unit will enter block 853.

In block 853 the quotient in the Q-Register is transferred through the Adder into the A-Register and the remainder in the A-Register is transferred to the Q-Register since the floating point unit is not in the fixed point mode. This is done in preparation for normalizing the quotient. Also, the Q-Register is turned off by disabling FQSX, the FASX signal is enabled, if the floating point unit is in normalized mode, and not in fixed point mode. The Control Counter bits 39–46 now contain the quotient exponent which is complemented if its sign bit, A47, is positive in preparation for decrementing the exponent during normalization. The FEND flip-flop 116 is set if the floating point unit is in the unnormalized mode or in the fixed point mode. In addition, if the floating point unit is not in the normalized or the fixed point mode, the FPNR flip-flop 108 is reset. Q-Register bits 00–38 are reset at this time if the floating point unit is in the fixed point mode. Upon completion of these operations the floating point unit tests in the left "FEND Set?" decision block of FIG. 40 to see if the FEND control state should be entered. If the "Yes" branch is taken, the floating point unit will then enter into the FEND control state (FIG. 17).

If the FEND flip-flop 116 is not set, the "No" branch is taken and the floating point unit enters into the "AZR=1 or A37 Set?" decision block. If the A-Register is zero or if A37 is set thus indicating that the A-Register is already normalized, block 854 will be entered and the FPNR flip-flop is reset, the FEND flip-flop is set, the FASX input signal to the Adder is disabled and the floating point unit will exit and enter into the FEND control state of FIG. 17. However, if neither of those conditions exists in the previously mentioned decision block, the "No" branch is taken and the right "FEND Set?" decision block of FIG. 40 is entered and the "No" branch is taken to a "$\overline{C}=0$?" decision block. Assuming that the "No" branch is taken from this decision block, indicating that the mantissa is not yet normalized and that the exponent is less than or equal to +255 but greater than zero or that the exponent is equal to or less than minus one but greater than a −255, block 855 will be entered.

In block 855 the A-Register mantissa field is shifted left one bit position with the A-Register shifting through the Adder and a binary 0 is placed in bit A00. One is added to the new Control Counter content by enabling the FCRE signal which decrements the exponent magnitude if positive; that is, the Control Counter contains the one's complement, or increments the exponent magnitude of the Control Counter if negative; that is, the Control Counter now contains the true magnitude of the number. If this shift normalizes the mantissa A-Register bit 36 is set and the FEND control state flip-flop 116 is also set. In addition, if normalization occurs in block 855, the FASX signal is disabled, the FPNR flip-flop is reset and if the decrementation causes $\overline{C}=0$, the OFL signal in the Algorithm Execution Control Logic is disabled. Also, the FIN2 signal, if enabled upon entry into block 855, is disabled. Upon completion of these operations, the floating point unit will enter the right "FEND Set?" decision block. Referring to the "Yes" branch from the "$\overline{C}=0$?" decision block, the floating point unit will test to see if OFL is enabled ("OFL Enabled?" decision block). If a temporary over-flow condition occurred the "Yes" branch will be taken from the "OFL Enabled?" decision block and block 855 will be entered wherein the OFL signal will be disabled as previously described.

The "No" path from the "OFL Enabled?" decision block goes to a "A47 Set?" decision block. Assuming that A47 is not set, block 856 is entered indicating that the mantissa is not yet normalized and that the exponent is equal to zero. Again, the A-Register is shifted left one bit position with a binary 0 going into a position A00. Two is added to the new Control Counter contents by enabling the FIN2 signal which decrements the exponent to a minus one (the one's complement of 0+2 is equal to the absolute magnitude of minus one). In addition, in block 856, the FCRE signal is disabled to complete the incrementation of the Control Counter and the Adder outputs are transferred to B-Register bits 39–46. If this operation normalizes the mantissa, that is A36=1, the FEND flip-flop 116 is set, the FASX signal is disabled and the FPNR flip-flop 108 is reset. Upon completion of these operations the floating point unit enters the right "FEND Set?" decision block.

Referring again to the "A47 Set?" decision block, the "Yes" branch will be taken and block 857 will be entered indicating that the mantissa is not yet normalized and that the exponent is equal to a −255. Therefore, the next shift will cause the exponent to under-flow resulting in the necessity of resetting the mantissa field and forcing the largest negative exponent into the exponent field. Thus, in block 857 the UFL signal is enabled storing the temporary under-flow condition, the FEND flip-flop 116 is set, the FASX signal is disabled and the FPNR flip-flop 108 is reset. The floating point unit is now in the FEND control state and the floating point unit will go to block 506 of FIG. 17.

Referring now to FIG. 17, in the FEND control state block 506, the operations which take place under the "All Instructions" heading have been described under the heading containing FDV. It is seen that the largest negative exponent is forced into the A-Register exponent field (bits 39–47) if a zero mantissa was generated during the execution of the FDV instruction. Also, the contents of the Control Counter Incremented by the appropriate amount are transferred into the A-Register if the Control Counter contains the resultant negative exponent and the largest negative exponent is not being forced at this time. However, if the Control Counter contains the one's complement of the resultant positive exponent and the largest negative exponent is not being forced, the one's complement plus incrementation is transferred from the B-Register into the A-Register exponent field. This completes the execution of the FDV instruction and the floating point unit will exit the FEND control state in preparation for receipt of the next instruction to be executed.

The FDV instruction, similarly to the FMP instruction, utilizing the same operation code can be executed with two basic formats. The first basic format, which has just been described, utilizes the floating point mode. The second exists when the floating point unit is in the fixed point mode, that is the FFIX flip-flop 58 (FIG. 3) is in the set condition and is called the FXDV (Fixed divide) instruction. Referring to block 505 of FIG. 16, under the "FDV or FDI" heading it is shown that the Timing Counter is set to the FTC2 output state if the FFIX flip-flop is set. The A-Register mantissa sign bit is set if Q38 is set and the floating point unit is in double precision mode. The other operations in block 505 are as previously described under the heading "All Instructions."

With these conditions established the floating point unit enters the "FTC2 Enabled?" decision block wherein the "Yes" branch will be taken and block 529 will be entered. Here, the FFDW flip-flop 100 is set and the FTC2 state is cleared. Under the heading containing FDV, the FEXP flip-flop 102 (exponent calculation control state) is set and block 529 is exited and the floating point unit proceeds to FIG. 22. Referring now to FIG. 22, entry is made into a "FFIX Set?" decision block. Inasmuch as this condition is true the "Yes" branch will be taken to block 775.

It should be pointed out that no exponent calculation was performed during the execution of this instruction since the setting of the FFIX flip-flop caused the floating point unit to enter directly into the FEXP control state in block 529 wherein the Timing Counter was placed into a no active state condition. In this situation the floating point unit will operate only on bits 00–23 of the divisor and dividend mantissas. In block 775 due to the resetting of FTC2 in block 529, the floating point unit entered into the FEXP control state with the I/DS and ITS signals, thereby disabling the Timing Counter. From block 775 the fixed point division operation is excuted identically to the floating point double precision division with the 24 bit divisor loaded into bits 00–23 to the B-Register. Once the divisor is normalized, the first 14 quotient bits generated in the Q-Register will be binary 0 due to bits 24–37 of the A-Register being zero initially. The 24 bit quotient will, therefore, be generated following the 14 binary 0's and will reside in bit positions 00–23 of the A-Register at instruction completion. The remainder is not saved in fixed point division.

As shown in FIG. 27, at the "FUNR or FFIX Set?" decision block, if the floating point unit is in fixed point mode the "Yes" branch is taken and block 816 is entered. In block 816 the FEND flip-flop 116 is set, the Q-Register inputs to the Adder are disabled by disabling the FQSX signal, and the Control Counter is complemented if A-Register bit 47 is equal to a binary 0. The above complementation is insignificant when in the fixed point mode. The FPNR flip-flop 108 is reset at this time and the floating point unit will then enter block 506 of FIG. 17, the FEND control state where the operations will be performed as previously described to terminate the FXDV (Fixed Divide) instruction.

The Floating Divide Inverse (FDI) instruction is executed in the identical manner as the FDV instruction with the exception that the FDI instruction carries a separate operation code which is loaded into the I-Register 24 and decoded by the Instruction Decode Logic 40. Also, during the execution of the FDI instruction, the A-Register is divided into the floating point number from memory locations X and X+1 which are transferred into the B-Register. The Q-Register is used as an extension of the dividend mantissa, that is, the mantissa in X and X+1, if the floating point unit is in the double precision mode. If the floating point unit is in the single precision mode, the Q-Register is reset.

The FDI instruction also can be executed when the floating point unit is in the fixed point mode. Under this condition, the instruction is executed as FXDI (Fixed Divide Inverse). This instruction is executed in exactly the same manner as Fixed Divide except that bit positions 0–23 of the A-Register are divided into bit positions 0–23 of the Q-Register. Bit positions 24–47 of the A-Register and bits 24–38 of the Q-Register are binary 0's at instruction initiation. The contents of memory locaton X can be anything as it will be transferred to the floating point unit but will not be used and will not be changed. Only location X+1 carries significant information.

The next instruction to be executed is the FCP (Floating Compare) instruction. Like several of the previously described instructions, it can be executed in two basic formats both of which utilize the same operation code. When the floating point unit executes the FCP instruction in the floating point mode, the information item which is transferred into the B-Register from memory locations X and X+1 is compared to the entire contents of the A-Register. However, when the instruction is executed in the fixed point mode designated the FXCP instruction, only the information item in memory location X which is transferred into B-Register bits 00–23 is compared to A-Register bits 00–23.

Referring now to block 505 of FIG. 16, and assuming that the present instruction is to be executed as FCP, it can be seen under the FCP heading in block 505 that the FGRE (greater than) flip-flop 60 and the FLES (less than) flip-flop 62 (FIG. 3) are both placed in the reset condition. Since it is assumed at this time that the floating point unit is not in the fixed point mode, FTC2 is not enabled. The "All Instructions" heading under block 505 illustrates the various operations which also occur at this time as were previously described.

Referring now to the "FTC2 Enabled?" decision block, since FTC2 is not enabled the "No" branch will be taken through the "Gen. Inst.?" decision block exiting from there by the "No" branch into the "First Data Signal Rec'd. from PU?" decision block. The floating point unit will cycle in this decision block until the first data signal I/DS is received from the processing unit. Upon receipt of the I/DS signal, FIG. 38 is entered at a "FFIX Set?" decision block. Since it has been assumed that the floating point unit is not in the fixed point mode, the "No" branch will be taken and block 923 is entered wherein the FESX signal is enabled thus enabling the A-Register exponent into the exponent portion of the Adder in preparation for comparing exponents. Also at this time, the first operand word from the processing unit is transferred into the most significant bit positions, bits 24–37 of the B-Register, the FFDW flip-flop 100 is reset, the FEXP flip-flop 102 is set, and the Timing Counter is set to the FTC0 output. A "A38=B38?" decision block is now entered. Assuming this condition is true, the "Yes" branch is taken and the floating point unit tests to see if the exponent sign bits A47 and B47 are equal in a decision block "A47=B47?".

Assuming that this condition is also true, indicating that the exponent and mantissa signals are equal, block 924 is entered. In block 924 the two's complement of the B-Register is taken in preparation for subtracting the B-Register exponent from the A-Register exponent. Prior to leaving block 924 the Timing Counter is set to the FTC1 output state and block 927 is entered. During the time of block 927, the Timing Counter is set to the FTC2 output and a test is then made by the Algorithm Execution Control Logic in the decision block "EC46=0?" to determine if the result of the A-Register exponent minus the B-Register exponent is in the two's complement form. If the answer to this decision block is "Yes," block 931 is entered wherein the FESX and FCRE signals into the exponent portion of the Adder are disabled and, if the A-Register exponent sign bit A47 equals the A-Register mantissa sign bit A38, the FLES flip-flop 62 is placed in the set condition. However, if the A-Register exponent sign bit does not equal the A-Register mantissa sign bit, the FGRE flip-flop 60 is set.

Upon setting the Timing Counter to the FTC3 output state, block 933 is entered. In block 933 the Timing Counter is stepped from FTC3 to FTC4 and the floating point unit then enters block 935 of FIG. 39 where the Timing Counter is stepped from FTC4 to FTC5 to enter block 936 wherein the Timing Counter FTC5 output is cleared.

Referring again to the "EC46=0?" decision block in FIG. 38, and assuming that the "No" branch is taken, block 930 is entered. Here, the absolute result of the A-Register exponent minus the B-Register exponent is transferred into the B-Register exponent field. This latter operation is performed to detect if the A-Register exponent minus the B-Register exponent is equal to zero. Also in block 930, the FESX and FCRE inputs to the exponent Adder are disabled, the Timing Counter FTC2 is set to the FTC3 output state and the floating point unit goes to block 932. In block 932 the Timing Counter FTC3 steps to the FTC4 output at which time the floating point unit will enter FIG. 39 at point 2 and a "C=0?" decision block. This test by the Algorithm Execution Control Logic is a determination to see if the result of the A exponent minus the B exponent is equal to zero. Assuming the result is zero, block 935 is entered for operations previously described and progresses to block 936.

Assuming now that the "C=0?" decision block is not true, block 934 is entered indicating that the result of the A exponent minus the B exponent is not equal to zero. Also, since this block was entered from block 938 in FIG. 38, it is an indication that the magnitude of the A exponent was greater than the magnitude of the B exponent. This is due to the results of the test made in FIG. 38 in the "EC46=0?" decision block. It will be noted in block 934 that if the A exponent sign bit equals the A mantissa sign bit, the FGRE flip-flop 60 is set. However, if the A exponent sign bit does not equal the A-Register mantissa sign bit, the FLES flip-flop 62 is set. Upon clearing FTC4 and setting the Timing Counter to the FTC5 output, block 936 is again entered and the Timing Counter FTC5 output state is cleared. From block 936, the floating point unit goes into a wait cycle in a "2nd Data Signal Received from PU?" decision block. Upon receipt of the second I/DS signal, the "Yes" branch is taken and block 937 is entered. During the time of block 937 the second data word of the operand received from the processing unit is stored into bit positions 00–23 of the B-Register. In addition, the FEXC flip-flop 112 is set, the FEXP flip-flop 102 is reset, the Timing Counter is set to the FTCO output and the FEND flip-flop 116 is placed in the set condition if either the FGRE or FLES flip-flops are in the set condition. However, if FGRE and FLES flip-flops are not in the set condition the mantissa adjustment control state is entered by setting the FADJ flip-flop 104 in preparation for comparing the A-Register mantissa to the B-Register mantissa.

Upon completion of the above operations the floating point unit then tests to see if FEND flip-flop 116 is in the set condition. If it is set, the "Yes" branch is taken out of a "FEND Set?" decision block and the floating point unit enters the FEND control state, block 506 of FIG. 17. However, if the FEND flip-flop is not set at this time the floating point unit then exits via the "No" branch of the decision block to enter block 938. In block 938 the B-Register mantissa is two's complemented by complementing bits 00–37 of the B-Register and enabling the FCRM input signal to the mantissa Adder in preparation for subtracting the B-Register mantissa from the A-Register mantissa. The A- and B-Register mantissas are enabled into the mantissa portion of the Adder by the enabling of signals FBSX and FASX. Simultaneously, the FACI signal is enabled to permit the Adder to function as a normal Adder. It should be noted that the comparison will actually occur at this time with the setting of the FGRE or FLES flip-flop if the floating point unit is executing the instruction in the fixed point mode; that is, the FXCP instruction being executed. With the setting of the Timing Counter to the FTC1 output, the floating point unit leaves block 938 and blocks 939, 940, and 941 are successively sequenced with the Timing Counter stepping from the FTC1 to the FTC4 output state, in block 941. The floating point unit then enters a "MC 37=0 & FLES=0 & FGRE=0?" decision block. Assuming that the "No" branch is taken from this block, block 942 is entered indicating that the fixed point comparison had been exited in block 938 or, in the floating point mode of operation, it was found from subtracting the B-Register mantissa from the A-Register mantissa that the A-Register mantissa was equal to or greater than the B-Register mantissa. Therefore, the result of the A-Register mantissa minus the B-Register mantissa is loaded into the A-Register with the original contents of the A-Register being transferred to the B-Register. In addition, in block 942 the FASX, FACI, and FCRM signals are disabled and the Timing Counter is set to the FTC5 output state.

At this time the floating point unit tests to see if the A-Register is equal to one or if either of the FLES or FGRE flip-flops is set. This is indicated by a decision block "AZR=1 or FLES=1 or FGRE=1?". If neither of these conditions exists, the "No" branch will be taken and block 944 is entered indicating that the A-Register mantissa was greater than the B-Register mantissa. In block 944, if the A-Register mantissa sign is positive, the FGRE flip-flop is set. However, if the A-Register mantissa sign is negative, the FLES flip-flop is set and the original A-Register contents which were temporarily stored in the B-Register in block 942 are now transferred back into the A-Register and the FEND flip-flop 116 is set in preparation to going into the FEND control state for final instruction execution. Prior to exiting block 944, the FADJ flip-flop 104 is reset and the Timing Counter FTC5 output is cleared. The floating point unit now leaves block 944 and goes to the FEND control state of FIG. 17.

Referring back to the "MC37=0 & FLES=0 & FGRE=0?" decision block, and assuming that these conditions all exist, the "Yes" branch is taken and block 943 is entered. Entry into block 943 results from subtracting the B-Register mantissa from the A-Register mantissa and finding that the B-Register mantissa was the greater. As such, if the A-Register mantissa sign is positive, the FLES flip-flop 62 is set and if the A-Register mantissa sign is negative, the FGRE flip-flop 60 is set. In addition, the result of the A-Register minus the B-Register subtraction is loaded into the A-Register while the original contents of the A-Register are transferred into the B-Register. The FASX, FACI, and FCRM signals are disabled, the Timing Counter is set to the FTC5 output state and entry is made into block 945. Block 945 is entered into since it was found by subtracting the B-Register mantissa from the A-Register mantissa, the result of which was loaded into the A-Register, that the B-Register mantissa was the greater, that they were equal which resulted in the A-Register contents being equal to zero or that the fixed point comparison was executed as previously mentioned in block 938. Therefore, the original A-Register contents which were temporarily stored in the B-Register in either of the blocks 942 or 943 are transferred back into the A-Register mantissa bit positions 00–37. The FADJ flip-flop 104 is reset and the FEND flip-flop 116 is set and the Timing Counter FTC5 output is cleared. Upon completion of these operations, the floating point unit will then enter into FIG. 17 to the FEND control state (flow chart block 506).

Referring now to FIG. 17 and block 506, those operations performed under the "All Instructions" heading have been previously described. In addition, as may be seen under a heading FCP, the following operations take place. If the FEND control state was entered from block 937 in FIG. 39, the FLES flip-flop 62 is reset since the Timing Counter is in the FTC0 output state and A-Register bit 38 and the B-Register bits 00-37 are binary 0's. The FGRE flip-flop 60 is reset as the Timing Counter is in the FTC0 output state and if bit B38 is equal to zero and the A-Register bits 00-37 are equal to zero. The FLES flip-flop 62 is set if the floating point unit went into the FEND control state from block 937 if the B-Register sign bit B38 is equal to zero, the B-Register bits 00-37 are not equal to zero and the A-Register bits 00-37 are equal to zero. In a similar fashion, the FGRE flip-flop is set if the A-Register sign bit A38 is equal to zero, A-Register bits 00-37 are not equal to zero and B-Register bits 00-37 are equal to zero. At the completion of these operations the floating point unit has completed the FCP (or FXCP) instruction and will leave block 506 in preparation for receipt of the next instruction to be executed.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A method, in an electronic data processing apparatus, of performing a division of a first normalized binary number representing a dividend by a second normalized binary number representing a divisor to produce a third binary number representing a quotient, each of said first, second and third binary numbers having an exponent portion and a mantissa portion comprising the steps: generating an initial quotient exponent portion by forming the difference between the exponent portions of said dividend and said divisor; performing a first subtraction of the mantissa portion of said divisor from the mantissa portion of said dividend to develop a partial remainder, and subsequently incrementing the exponent portion of said quotient and generating a quotient mantissa binary bit when said divisor mantissa is equal to or less than said dividend mantissa; performing a second subtraction of the mantissa portion of said divisor from said partial remainder to generate a quotient mantissa bit; and examining the most significant bit of said partial remainder after said second subtraction and generating either a binary 1 or a binary 0 quotient mantissa bit in accordance with the state of the most significant bit of said partial remainder.

2. In an electronic data processing apparatus having first and second temporary storage devices, a method of dividing a first binary number in said first temporary storage device representing a dividend by a second binary number in said second temporary storage device representing a divisor to develop a third binary number representing a quotient for storage in said first temporary storage device, each of said binary numbers including an exponent portion and a mantissa portion and each of said portions consisting of a plurality of binary bits, comprising the steps: calculating an initial exponent portion of said quotient by forming the difference between the exponent portions of said divisor and said dividend; storing said initial exponent portion of said quotient in said first temporary storage device; shifting the mantissa portions of said divisor and said dividend until said portions achieve a normalized state; inserting a binary bit into the mantissa portion of said quotient in said first temporary storage device with each bit position said dividend mantissa in said first temporary device is shifted after said divisor mantissa in said second temporary storage device is in a normalized state; incrementing said initial quotient exponent in said first temporary storage device by one for each bit position said divisor mantissa is shifted after said dividend mantissa is in a normalized state; initiating a subtraction of the normalized mantissa portion of said divisor from the normalized mantissa portion of said dividend to develop a partial remainder for storage in said first temporary storage device; generating a next quotient manissa bit and incrementing the initial quotient exponent by one when said divisor mantissa is less than said dividend mantissa at the time of said subtraction; and generating subsequent quotient mantissa bits by repeatedly normalizing the partial remainder and generating next quotient mantissa bits for each bit posiiton said partial remainder is shifted until normalized and, in a first instance subtracting said divisor from a positive normalized partial remainder and generating a next quotient bit, and in a second instance adding said divisor to a negative partial remainder and generating a next quotient mantissa bit.

3. In a data processing system, an arithmetic unit for dividing a first floating point number representing a dividend by a second floating point number representing a divisor, each of said numbers including an exponent portion and a mantissa portion, said arithmetic unit comprising: first and second temporary storage means for retaining, respectively, said first and second floating point numbers; adder means in communication with said first and second temporary storage means whereby signals representative of said numbers may be transferred therebetween; means for supplying signals representing said exponent portions of said first and second floating point numbers to said adder whereby an initial quotient exponent is generated for storage in said first temporary storage means; means including said adder for subtracting the mantissa portion of said divisor from the mantissa portion of said dividend to develop a partial remainder for storage in said first temporary storage means; means responsive to the states of signals from said adder means representative of certain ones of the most significant bits of said partial remainder for incrementing said initial quotient exponent and generating a quotient mantissa bit for storage in said first temporary storage means at the time of subtracting the mantissa portion of said divisor from the mantissa portion of said dividend when said divisor mantissa portion is less than said dividend mantissa portion; and means responsive to the states of signals from said first storage means representative of certain ones of the most significant bits of said partial remainder for generating subsequent quotient mantissa bits for storage in said first temporary storage means in accordance with the states of said signals representative of said partial remainder.

4. In a programmable data processing system, including an electronic arithmetic unit capable of generating logic signals representative of binary numbers during execution of a programmed divide instruction, a method of performing a division operation utilizing a first normalized binary number electronically stored as a dividend and a second normalized binary number electronically stored as a divisor to produce a third binary number of electronically stored as a quotient, each of said first, second and third binary numbers having an exponent portion and a mantissa portion comprising the steps: generating and storing an initial quotient exponent portion by forming the difference between the exponent portions of said dividend and said divisor; performing a first subtraction of the mantissa portion of said divisor from the mantissa portion of said dividend to develop and store a first partial remainder having a variable sign bit the status of which represents either a positive partial remainder or a negative partial remainder, and subsequently incrementing the exponent portion of said quotient; generating and storing a quotient mantissa binary bit when the divisor mantissa is equal to or less than the dividend mantissa; performing a second subtraction of the mantissa portion of said divisor from said partial remainder to generate a quotient mantissa bit and a new partial remainder replacing said first partial remainder; examining the variable sign bit of said new partial remainder; generating and storing a quotient mantissa bit of a first binary notation when the status of the variable sign bit of the new partial remainder represents a negative new partial remainder; and generating and storing a quotient mantissa bit of a second binary notation when the status of the variable sign bit of the new partial remainder represents a positive new partial remainder.

5. In an electronic data processing apparatus having first and second temporary storage means, a method of dividing a first binary number representating a dividend in said first temporary storage means by a second binary number representing a divisor in said second temporary storage means to develop and store in said first temporary storage means a signed partial remainder and a third binary number representing a quotient, each of said binary numbers including an exponent portion and a mantissa portion and each of said portions and said signed partial remainder consisting of a plurality of binary bits, comprising the steps: calculating an initial exponent portion of said quotient by forming the different between the exponent portions of said divisor and said dividend respectively stored in said second and first storage means; storing said initial exponent portion of said quotient in said first storage means; shifting the mantissa portions of said dividend and said divisor in said first and second storage means until said portions achieve a normalized state; inserting a binary bit into the mantissa portion of said quotient in said first storage means with each bit position said dividend mantissa is shifted after said divisor mantissa is a normalized state; incrementing said initial quotient exponent porton in said first storage means by one for each bit position said divisor mantissa is shifted after said dividend mantissa is in a normalized state; initiating a subtraction of the normalized mantissa portion of said divisor from the normalized mantissa portion of said dividend to develop a signed partial remainder; storing said signed partial remainder in said first storage means; generating a next quotient mantissa bit and incrementing the initial quotient exponent by one when said divisor mantissa is less than said dividend mantissa at the time of said subtraction; shifting over leading binary zero bits in the signed partial remainder when the signed partial remainder is positive and inserting a binary zero quotient bit in the mantissa portion of said quotient for each binary zero bit shifted over until the signed partial remainder is normalized; shifting over leading binary one bits in the signed partial remainder when the signed partial remainder is negative and inserting a binary one bit in the mantissa portion of said quotient for each binary one bit shifted over until the signed partial remainder is normalized; and subtracting said divisor, in a first instance, from the nomalized signed partial remainder and generating a binary zero quotient mantissa bit when the subtraction yields a negative signed partial remainder and generating a binary one quotient mantissa bit when the subtraction yields a positive normalized signed partial remainder and, in a second instance, adding said divisor to a normalized negative signed partial remainder and generating a binary one quotient matissa bit when the addition yields a positive signed partial remainder and generating a binary zero quotient mantissa bit when the addition yields a negative signed partial remainder.

6. In a data processing system an arithmetic unit for performing a division operation utilizing a first binary number representing a dividend and a second binary number representing a divisor to develop a third binary number representing a quotient, each of said binary numbers including an exponent portion and a mantissa portion and each of said portions consisting of a plurality of binary bits, said arithmetic unit comprising: first temporary storage means for initially retaining said first binary number and for retaning a final quotient exponent, a remainder and a mantissa quotient at the completion of said division operation; second temporary storage means for retaining said secondary binary number and retaining an initial quotient exponent during the division operation; adder means in communication with said first and second temporary storage means whereby signals representative of said binary numbers may be transferred therebetween; means for supplying signals representing said exponent portions of said first and second binary numbers to said adder means whereby said initial quotient exponent is generated for temporary storage in said second temporary storage means; shifting means for shifting the mantissa portions of said divisor and said dividend in said first and second temporary storage means until said portions achieve a normalized state; means responsive to said shifting means for inserting a quotient mantissa binary bit into said first temporary storage means for each bit position the dividend mantissa portion in said first temporary storage means is shifted after the divisor mantissa portion in said second temporary storage means is in a normalized state and for incrementing said initial quotient exponent portion in said second temporary storage means by one for each bit position said divisor mantissa portion is shifted after said dividend mantissa portion is in a normalized state; complementing means responsive to said shifting means for complementing said divisor mantissa portion in said second temporary storage means to form a subtraction through said adder of the normalized divisor mantissa portion in said second temporary storage means from the normalized dividend mantissa portion in said first temporary storage means to develop a partial remainder for storage in said first temporary storage means; first control means responsive to said shifting means, at the time of said subtraction, for providing a next quotient mantissa binary bit to said first temporary storage means, incrementing the initial quotient exponent by one to form a final quotient exponent and transferring said final quotient exponent through said adder into said first storage means when said divisor mantissa portion is less than dividend mantissa portion; and second control means responsive to said shifting means for inserting next quotient mantissa binary bits into said first temporary storage means by repeatedly shifting the partial remainder in said first temporary storage means to a normalized state and inserting a next quotient mantissa binary bit into said first temporary storage means for each bit position said partial remainder in said first temporary storage means is shifted until normalized and in a first instance activating said complementing means to effect a subtraction of said divisor mantissa portion in said second temporary storage means from a positive normalized partial remainder in said first temporary storage means to insert a next quotient mantissa binary bit in said first temporary storage means and in a second instance activating said adder means to effect an addition of said divisor mantissa to a normalized negative partial remainder and inserting a next mantissa quotient binary bit in said first temporary storage means.

7. In a data processing system an arithmetic unit for performing a divide algorithm utilizing a first binary number representing a divisor and a second binary number representing a dividend to develop a third binary number representing a quotient, each of said binary numbers including an exponent portion and a mantissa portion and each of said portions consisting of a plurality of binary bits, said arithmetic unit comprising: first temporary storage means for retaining said exponent portion of said divisor; second temporary storage means for retaining said exponent portion of said dividend and retaining said exponent portion of said quotient at the termination of said divide algorithm; third temporary storage means for retaining said mantissa portion of said divisor and a remainder at the termination of said divide algorithm; fourth temporary storage means for retaining said mantissa portion of said dividend and retaining said mantissa portion of said quotient at the termination of said divide algorithm; adder means in communication with said first, second, third and fourth temporary storage means whereby signals representative of said binary numbers may be transferred therebetween; means for supplying signals representing the exponent portions of said divisor and said dividend from said first and second storage means to said adder means whereby an initial quotient exponent is generated for storage in said second temporary storage means; shifting means for shifting said third and fourth temporary storage means until the divisor and dividend mantissa portion in said storage means achieve a normalized state; transfer mean responsive to said shifting means for supplying signals representing the mantissa portions of said divisor and said dividend from said second and third storage means to said adder means whereby a partial remainder is generated for storage in said fourth temporary storage means after the dividend and mantissa portions in said third and fourth temporary storage means achieve a normalized state; incrementing means including said adder for adding a binary bit to said initial quotient exponent for each binary bit shifted into the most significant bit position of said third temporary storage means until the mantissa portion in said third storage means achieves a normalized state after said dividend mantissa portion in said fourth temporary storage means is in a normalized state and for inserting a binary 0 quotient mantissa bit in said fourth temporary storage means for each binary bit shifted into the most significant bit portion of said fourth temporary storage means until the mantissa portion in said fourth storage means achieves a normalized state after said divisor mantissa portion in said third temporary storage means is in a normalized state; means including said incrementing means responsive to said shifting means for inserting a binary 1 quotient mantissa bit into said fourth temporary storage means and inserting a binary 1 bit into the initial quotient exponent, at the time of the generation of said partial remainder, when said divisor mantissa portion in said third temporary storage means is equal to or less than the partial remainder in said fourth temporary storage; and generating means responsive to said shifting means for generating subsequent quotient mantissa bits for storage in said fourth temporary storage means, said generating means generating a binary 0 quotient mantissa bit for each bit position said partial remainder in said fourth temporary storage means is shifted by said shifting means until the partial remainder is normalized and further, in a first instance, complementing said divisor mantissa and activating said transfer means to effect a subtraction through said adder means of the divisor mantissa portion in said third temporary storage means from a positive normalized partial remainder in said fourth temporary storage means and inserting a binary 0 quotient mantissa bit into said fourth temporary storage means when the results of the subtraction yield a negative partial remainder and inserting a binary 1 quotient mantissa bit in said fourth temporary storage means when the results of the subtraction yield a positive partial remainder, and in a second instance activating said transfer means to effect the addition through said adder means of the divisor mantissa portion in said third temporary storage means to a negative partial remainder in said fourth temporary storage means and inserting a binary 1 quotient mantissa bit in said fourth temporary storage means when the results of the addition yield a positive partial remainder and inserting a binary 0 quotient mantissa bit in said fourth temporary storage means when the results of the addition yield a negative partial remainder.

References Cited

UNITED STATES PATENTS

| | | | |
|---|---|---|---|
| 3,234,366 | 2/1966 | Davis | 235—156 |
| 3,239,654 | 3/1966 | Jackson | 235—159 |
| 3,254,204 | 5/1966 | Merner | 235—160 |

PAUL J. HENON, Primary Examiner

R. F. CHAPURAN, Assistant Examiner